US012485737B2

(12) United States Patent
Schmeichel et al.

(10) Patent No.: US 12,485,737 B2
(45) Date of Patent: *Dec. 2, 2025

(54) FOLDING TONNEAU COVER APPARATUS

(71) Applicant: Agri-Cover, Inc., Jamestown, ND (US)

(72) Inventors: Charles M. Schmeichel, Jamestown, ND (US); John W. Simon, Nerstrand, MN (US)

(73) Assignee: Agri-Cover, Inc., Jamestown, ND (US)

( * ) Notice: Subject to any disclaimer, the term of this patent is extended or adjusted under 35 U.S.C. 154(b) by 275 days.

This patent is subject to a terminal disclaimer.

(21) Appl. No.: 18/214,358

(22) Filed: Jun. 26, 2023

(65) Prior Publication Data

US 2023/0331074 A1 Oct. 19, 2023

Related U.S. Application Data

(63) Continuation of application No. 17/589,505, filed on Jan. 31, 2022, now Pat. No. 11,685,242, which is a continuation of application No. 16/252,345, filed on Jan. 18, 2019, now Pat. No. 11,235,652, which is a continuation of application No. 15/794,549, filed on Oct. 26, 2017, now Pat. No. 10,189,340.

(60) Provisional application No. 62/414,591, filed on Oct. 28, 2016.

(51) Int. Cl.
*B60J 7/19* (2006.01)
*B60J 7/14* (2006.01)

(52) U.S. Cl.
CPC ............... *B60J 7/198* (2013.01); *B60J 7/141* (2013.01)

(58) Field of Classification Search
CPC ................................. B60J 7/198; B60J 7/141
USPC ..................................................... 296/100.07
See application file for complete search history.

(56) References Cited

U.S. PATENT DOCUMENTS

| | | | | |
|---|---|---|---|---|
| 5,427,428 A * | 6/1995 | Ericson | B60J 7/141 296/100.09 |
| 8,690,224 B2 * | 4/2014 | Maimin | B60P 7/02 296/100.09 |
| 9,895,963 B1 * | 2/2018 | Spencer | B60J 7/141 |
| 10,189,340 B2 * | 1/2019 | Schmeichel | B60J 7/141 |
| 2022/0219516 A1 * | 7/2022 | Schmeichel | B60J 7/141 |

* cited by examiner

*Primary Examiner* — Joseph D. Pape
(74) *Attorney, Agent, or Firm* — Dykema Gossett PLLC

(57) ABSTRACT

A folding tonneau cover apparatus including a cover assembly and a support frame assembly. The cover assembly having a plurality of rigid panels interconnected in series by a series of flexible hinges preferably made from a laminated woven fabric material. The rigid panels are preferably stiffened by elongated support members secured to the undersides of the respective panels and the top surfaces of portions of the rigid panels are preferably downwardly concave. The cover assembly is secured to the support frame assembly to cover a cargo box of a pickup truck by a plurality of locking members when the support frame assembly is secured to sidewalls of the cargo box. Methods of making a tonneau cover apparatus and methods of folding and unfolding the cover assembly are also disclosed.

27 Claims, 117 Drawing Sheets

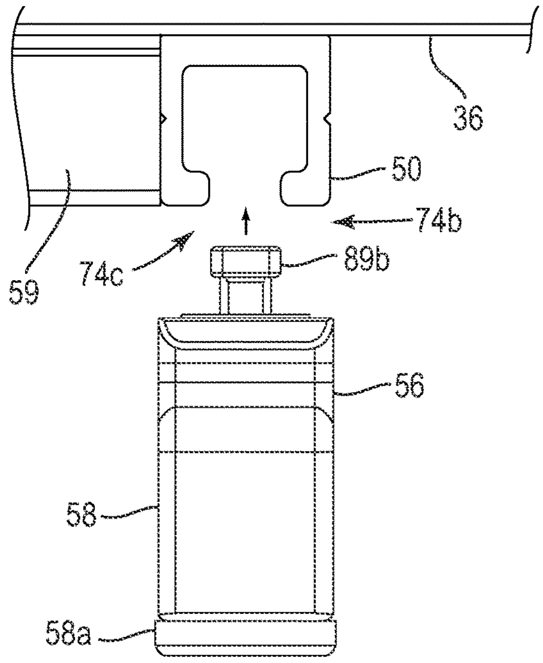
FIG. 14A
FIG. 14B
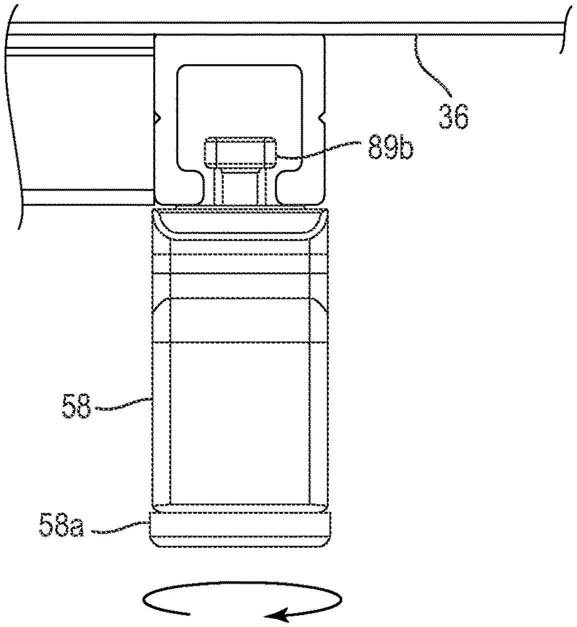
FIG. 14C
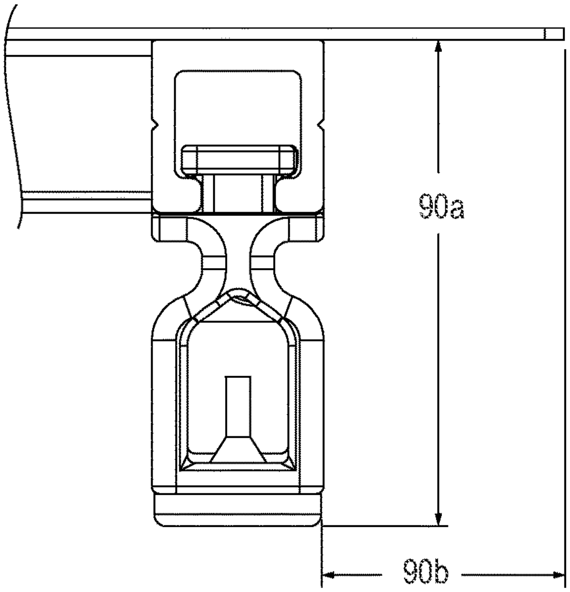
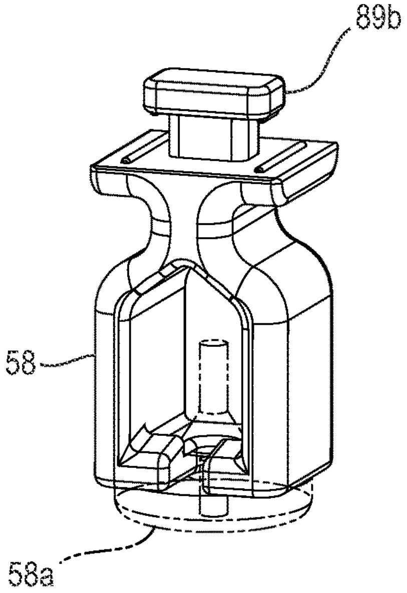
FIG. 14D

FOLDING TONNEAU COVER APPARATUS

RELATED APPLICATIONS

This application is a continuation of U.S. application Ser. No. 17/589,505, filed on Jan. 31, 2022, which is a continuation of U.S. application Ser. No. 16/252,345, filed on Jan. 18, 2019, now U.S. Pat. No. 11,235,652, which is a continuation of U.S. application Ser. No. 15/794,549, filed on Oct. 26, 2017, now U.S. Pat. No. 10,189,340, which claims the benefit of U.S. Provisional Application No. 62/414,591, filed on Oct. 28, 2016, which applications are incorporated herein by reference in their entirety.

FIELD OF THE INVENTION

A tonneau cover apparatus for covering an open bed or cargo box of a pickup truck or other truck or trailer. Particularly, a tonneau cover apparatus including a folding cover assembly having a plurality of panels that are interconnected in series by a series of hinges in such a manner that the respective panels can pivot with respect to one another, so as to fold up and unfold, and which is detachably fastenable to a support frame assembly including a pair of side rails, each of which is secured to one of two opposing sidewalls of the cargo box.

DESCRIPTION OF THE RELATED ART

Numerous protective cover assemblies for preventing rain, debris and wind from damaging or disrupting the contents of a pickup truck bed or cargo box are currently available. Among these protective cover assemblies are tonneau covers. Some tonneau covers are made of a fabric material, often a fabric coated with a polymeric material, which is fastened to a rigid frame so as to enclose and protect the pickup truck cargo box. Various covering materials are used for the tonneau covers; some are flexible or stretchable, and others are more rigid, and they are secured in various manners to cover the cargo box. Tonneau covers are opened in various manners to allow entry into the cargo box, such as by rolling them up, folding them up, pivoting the cover upward, or removing the cover from the cargo box altogether.

Typical tonneau covers have support frames including a pair of elongated side rails that are secured to the sidewalls of the cargo box. Known tonneau covers are often secured to the side rails using hook and loop strip fastener components secured to the side rail, typically within a horizontal channel (see, e.g., U.S. Pat. Nos. 4,036,521; 4,991,640; 6,752,449 and U.S. Patent Application Pub. No. 2004/0212212 A1). Some tonneau covers are secured to the side rails by latches (see. e.g., U.S. Pat. No. 7,104,586).

The present invention provides improvements that address limitations associated with the prior art.

SUMMARY OF THE INVENTION

The present invention includes a tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position. The tonneau cover apparatus will preferably include a support frame assembly for attachment to the cargo box; and a cover assembly including a plurality of rigid panels;

wherein the plurality of rigid panels includes first and second panels, a third panel that is a hinge panel and a fourth panel; each of the plurality of rigid panels having a top surface; wherein the first and second panels have first and second top surfaces, respectively, the hinge panel, has a third top surface, and the fourth panel has a fourth top surface. The plurality of rigid panels are preferably pivotally secure to one another in series such that the first and second panels are pivotally secured to one another by a first flexible hinge, and the hinge panel is pivotally secured to the second panel by a second flexible hinge and pivotally secured to the fourth panel by a third flexible hinge; wherein the first panel can fold over on top of the second panel and, once the first panel is folded over onto the second panel, the first and second panels can fold together over on top of the fourth panel, so that the cover assembly is in a fully folded position; wherein a first top surface of the first panel will be generally parallel to a second top surface of the second panel and to a fourth top surface of the fourth panel when the cover assembly is in the fully folded position; and wherein the cover assembly further includes a perimeter seal secured to an underside of each of the respective rigid panels proximate an outer portion of each of the respective rigid panels, wherein the perimeter seal is a water resistant gasket that forms a continuous border around an underside of the cover assembly so that when the cover assembly is secured to the respective side rails of the support frame and the respective side rails are secured to the respective sidewalls of the pickup truck, the perimeter seal creates a water resistant barrier between the cover assembly and the cargo box. The cover assembly preferably further includes a plurality of elongated support members; wherein each of the plurality of elongated support members is secured to an underside one of the plurality of rigid panels to stiffen the respective rigid panel. The cover assembly preferably further includes a plurality of standoff members secured to the underside of the first panel that engage the fourth top surface of the fourth panel when the cover assembly is in the fully folded position, wherein the respective standoff members separate the underside of the first panel from the fourth top surface of the fourth panel when the cover assembly is in the fully folded position. The first flexible hinge is preferably secured to an underside of the first panel and an underside of the second panel, the second flexible hinge is preferably secured to an underside of the hinge panel and an underside of the second panel, and the third flexible hinge is preferably secured to an underside of the hinge panel and an underside of the fourth panel. In preferred embodiments, the cover assembly will preferably further include a storage strap that can secure the first and second panels to the fourth panel when the cover assembly is in the fully folded position. The storage strap is will preferably be an elastic strap. The support frame assembly preferably includes two opposing side rails each of which can be secured to one of the respective opposing sidewalls when the tonneau cover apparatus is attached to the pickup truck; wherein the cover assembly preferably further includes a securing apparatus and the securing apparatus includes a plurality of locking members; wherein each of the plurality of elongated support members preferably includes a channel and each of the respective locking members are preferably at least partially slidably engaged within the channel of one of the elongated support members such that each of the locking members can move from a first position, in which the respective locking member is engaged with one of the respective side rails when the tonneau cover apparatus is attached to the pickup truck, to a second position in which the respective locking member is disengaged with one of the respective side rails when the tonneau cover apparatus is attached to the pickup truck; wherein the locking members will secure the cover assembly to securing assembly when the plurality of locking members are in the first position and when the tonneau cover apparatus is attached to the pickup truck. In preferred embodiments, the locking members are biased toward the first position, preferably biased toward the first position.

In preferred embodiments, the support frame assembly will include two opposing side rails and each of the respective side rails can be secured to one of the respective opposing sidewalls when the tonneau cover apparatus is attached to the pickup truck; wherein the support frame assembly includes a catch member secured to each of the respective side rails and the cover assembly further includes a plurality of hook members, wherein the respective hook members can engage the catch members to secure the cover assembly to the support frame assembly when the tonneau cover apparatus is attached to the pickup truck. Each of the plurality of elongated support members preferably includes a channel and each of the hook members are preferably at least partially secured within the channel of one of the plurality of elongated support members. In preferred embodiments, the support frame assembly will include a plurality of containment brackets, each of which is secured to one of the respective side rails; wherein the cover assembly further includes a securing apparatus and the securing apparatus includes a plurality of locking members and each of the respective locking members are at least partially slidably engaged within the channel of one of the elongated support members such that each of the locking member can move from a first position in which the respective locking member is engaged with one of the respective side rails when the tonneau cover apparatus is attached to the pickup truck and the locking member is in a second position in which the respective locking member is disengaged with one of the respective side rails when the tonneau cover apparatus is attached to the pickup truck; wherein the locking members will secure the cover assembly to securing assembly when the plurality of locking members are in the first position and when the tonneau cover apparatus is attached to the pickup truck; wherein each of the plurality of locking members will be at least partially engaged within one of the plurality of containment brackets when the respective locking members are in the first position.

In preferred embodiments, the support frame assembly will include two opposing side rails and each of the respective side rails can be secured to one of the respective opposing sidewalls when the tonneau cover apparatus is attached to the pickup truck; wherein the cover assembly further includes a securing apparatus and the securing apparatus includes a plurality of locking members secured to an underside of the fourth panel and each of the respective locking members can move from a first position in which each of the respective locking members is engaged with one of the respective side rails when the tonneau cover apparatus is attached to the pickup truck and a second position in which the respective locking member is disengaged with the respective side rail when the tonneau cover apparatus is attached to the pickup truck; wherein the fourth panel is the panel closest to the forward end and the locking members secured to the fourth panel will secure the fourth panel to the support frame assembly when the plurality of locking members secured to the fourth panel are in the first position and the tonneau cover apparatus is attached to the pickup truck; wherein the fourth panel will be disengaged from the support frame assembly and can be lifted and pivoted toward the hinge panel when the plurality of locking members secured to the fourth panel are in the second position and the tonneau cover apparatus is attached to the pickup truck. The plurality of locking members secured to the fourth panel are preferably biased toward the first position and the cover assembly preferably further includes an actuator that can move the lock members secured to the fourth panel from the first position to the second position. In preferred embodiments, the plurality of elongated support members includes a channel and each of the lock members is at least partially secured within the channel of one of the plurality of elongated support members and are at least partially slidably engaged within the channel of one of the elongated support members such that each of the locking member can slide from the first position to the second position. In preferred embodiments, the actuator includes a turn knob respectively interconnected to each of the respective lock members secured to the fourth panel by a pair of elongated connecting members that can move the respective locking members from the first position to the second position so as to disengage the lock members secured to the fourth panel from the support frame assembly. In further preferred embodiments, the turn knob is accessible from above the top surface of the fourth panel when the fourth panel is secured to the support frame assembly. In preferred embodiments, the actuator includes a remote electronic actuating device that can move the respective locking members from the first position to the second position so as to disengage the respective lock members secured to the fourth panel from the support frame assembly.

In preferred embodiments, the cover assembly includes a cab panel positioned closest to the forward end and secured to the fourth panel by a fourth flexible hinge. In these embodiments, it will be preferred that the first flexible hinge is secured to an underside of the first panel and an underside of the second panel, the second flexible hinge is secured to an underside of the hinge panel and an underside of the second panel, the third flexible hinge is secured to an underside of the hinge panel and an underside of the fourth panel and the fourth flexible hinge is secured to an underside of the fourth panel and an underside of the cab panel; the cover assembly further includes a storage strap that can secure the first and second panels to the fourth panel when the cover assembly is in the fully folded position; the storage strap is an elastic strap; when the cover assembly is in the fully folded position, and the first and second panels are secured to the fourth panel, the fully folded cover can pivot with respect to the cab panel to an upright position in which the first, second and fourth panels are pivoted generally upward with respect to the cab panel so that the first, second and fourth panels rest in a generally vertical position upon the cab panel when the cab panel is in a generally horizontal orientation. In preferred embodiments, the cover assembly further includes a securing strap that can secure the first and second panels to the pickup truck when the first and second panels are secured to the fourth panel and the tonneau cover is attached to the pickup truck in a manner in which the first, second and fourth panels rest in a generally vertical position upon the cab panel.

In further preferred embodiments, the cover assembly further includes a hinge guard member underlying one of the plurality of flexible hinges; wherein the hinge guard is secured to an underside of one of the rigid panels to provide underlying support proximate the respective flexible hinge; the rigid panels are preferably made of an aluminum alloy material and have a thickness of from about 0.020 inches to about 0.200 inches, preferably about 0.063 inches. In further preferred embodiments, the top surface of each of the rigid panels is coated with a polyester paint; the underside of each of the rigid panels is coated with an epoxy coating; the plurality of flexible hinges are made from a coated woven fabric material; preferably from a polyvinyl chloride coated woven polyester fabric material; wherein the plurality of flexible hinges include coated an adhesive tape material that is bonded to the coated woven fabric material; wherein the adhesive tape material secures each of the respective flexible hinges to the undersides of the respective rigid panels.

In preferred embodiments, the cover assembly will preferably include a locking member actuating cord interconnected with a plurality of the respective locking members secured to the underside of first rigid panel and also with a second rigid panel which is secured to the first rigid panel by a flexible hinge, wherein pivoting the second rigid panel with respect to the first rigid panel will cause the actuating cord to draw the respective locking members from the first position to the second position; wherein the first rigid panel is preferably the second panel and the second rigid panel is preferably the first panel.

In preferred embodiments, the plurality of elongated support members includes two first panel support members secured to the underside of the first panel; wherein each of the respective first panel support members include a channel within which at least a portion of one of the respective standoff members is secured; wherein the plurality of standoff members include two standoff members secured within each of the first panel support members; wherein each of the respective standoff members is secured at least partially within the channel within the respective first panel support member.

In preferred embodiments, the third top surface of the hinge panel will generally reside at an angle of from about 30 to about 150 degrees with respect to the forth top surface when the cover assembly is in the fully folded position; wherein the third top surface of the hinge panel will preferably generally reside at an angle of about 90 degrees with respect to the forth top surface when the cover assembly is in the fully folded position.

In preferred embodiments, the plurality of elongated support members includes at least one first panel support member secured to the underside of the first panel, at least one second panel support member secured to the underside of the second panel, at least one third panel support member secured to the underside of the third panel, and at least one fourth panel support member secured to the underside of the fourth panel; wherein each of the respective elongated support members is downwardly curved such that each of the respective rigid panels is at least partially downwardly concave; wherein, in preferred embodiments each of the respective elongated support members has an upper surface that is curved along at least a portion of a length of the elongated support member such that when the upper surface of each of the respective support members is secured to an underside of each of the respective rigid panels, a top surface of each of the respective rigid panels is curved downwardly so as to be at least partially downwardly concave along a width of each of the respective rigid panels, and each of the rigid panels preferably has a thickness of from about 0.020 inches to about 0.200 inches and the flexible hinge is made from a fiber reinforced polymeric material that can withstand deformation without breaking or cracking, and each of the respective rigid support members preferably have first and second ends and each of the respective rigid support members is bent so that it curves through an arc as the support member passes from one end to the other end; wherein when the respective rigid panels are secured to the respective rigid support members, the rigid panels are sufficiently bent to allow water to run off of the top surface of each of the respective rigid panels under the force of gravity.

In preferred embodiments, the flexible hinge is made of a flexible material constructed out of a material that can withstand deformation without failure due to cracking or breakage that is selected from the group consisting of a laminated polymeric material, a fiber reinforced polymeric material, an elastomeric material, a woven material and a material that is in part a laminated woven material and in part a laminated material; the flexible hinge is preferably secured to a first underside of the first panel and to a second underside of the second panel with an adhesive material; wherein the flexible hinge includes first and second adhesive backed portions respectively secured to a first underside of the first panel and to a second underside of the second panel.

In preferred embodiments, the flexible hinge is made at least in part from a moisture resistant, flexible sheet material that includes a laminated woven fabric material; preferably a polyvinyl chloride coated woven polyester fabric material.

In preferred embodiments, the present invention provides a tonneau cover apparatus preferably including a support frame assembly for attachment to the cargo box, the support frame assembly having two opposing side rails, wherein each of the respective side rails can be secured to one of the respective opposing sidewalls; and a cover assembly including a plurality of rigid panels; wherein the plurality of rigid panels includes first and second panels; the first and second panels being flexibly secured to one another by a flexible hinge; each of the rigid panels having a thickness of from about 0.020 inches to about 0.200 inches and the flexible hinge is made from a fiber reinforced polymeric material that can withstand deformation without breaking or cracking; and wherein the cover assembly includes a plurality of elongated support members; wherein each of the plurality of elongated support members is secured to an underside of one of the plurality of rigid panels to stiffen the respective rigid panel; wherein at least one of the respective elongated support members has an upper surface that is curved along at least a portion of a length of the elongated support member such that, when the upper surface of the respective elongated support member is secured to an underside of one of the respective rigid panels, a top surface the respective rigid panel is curved along at least a portion of a width of the respective rigid panel; and wherein each of the respective elongated support members has first and second ends and the upper surface of each of the respective elongated support members is at least partially curved between the first and second ends; wherein, when certain of the respective rigid panels are secured to such elongated support members, the top surfaces of the certain respective rigid panels are at least partially downwardly curved so that water on the respective top surface can run off of the top surface under the force of gravity; and wherein the cover assembly further includes a securing apparatus, wherein the securing apparatus includes a locking member secured to one of the plurality of rigid panels; wherein the locking member is engageable with one of the respective side rails, when the respective side rail is secured to the cargo box, so as to engage the cover assembly with the support frame assembly and the cargo box; wherein the locking member is prevented from disengaging from the respective side rail when the locking member is in a first position, when the respective side rail is secured to the cargo box; wherein the locking member can be moved from the first position to a second position; wherein the locking member can disengage from the respective side rail, when the respective side rail is secured to the cargo box and the locking member is in the second position; and wherein the cover assembly includes a plurality of locking members secured to a plurality of rigid panels; wherein each locking member is biased toward the first position; and wherein the flexible hinge is secured to a first underside of the first panel and to a second underside of the second panel with an adhesive material and the flexible hinge is made of a flexible material constructed out of a material that can withstand deformation without failure due to cracking or breakage that is selected from the group consisting of a laminated polymeric material, a fiber reinforced polymeric material, an elastomeric material, a woven material and a material that is in part a laminated woven material and in part a laminated material. In preferred embodiments, the flexible hinge is preferably secured to a first underside of the first panel and to a second underside of the second panel with an adhesive material and the flexible hinge preferably includes first and second adhesive backed portions respectively secured to a first underside of the first panel and to a second underside of the second panel.

In further preferred embodiments, the tonneau cover apparatus will include a support frame assembly for attachment to the cargo box, the support frame assembly having two opposing side rails, wherein each of the respective side rails can be secured to one of the respective opposing sidewalls; and a cover assembly including a plurality of rigid panels; wherein the plurality of rigid panels includes first and second panels; the first and second panels being flexibly secured to one another by a flexible hinge; and wherein the cover assembly includes a plurality of elongated support members; wherein each of the plurality of elongated support members is secured to an underside of one of the plurality of rigid panels to stiffen the respective panel; wherein each of the respective elongated support members has a upper surface that is curved along at least a portion of a length of the elongated support member such that, when the upper surface of each of the respective support members is secured to an underside of each of the respective rigid panels, each of the respective rigid panels is curved along at least a portion of a width of each of the respective rigid panels; preferably each of the rigid panels will have a thickness of from about 0.020 inches to about 0.200 inches and the flexible hinge will be made from a fiber reinforced polymeric material that can withstand deformation without breaking or cracking. The cover assembly will preferably include a plurality of elongated support members; wherein each of the plurality of elongated support members is secured to an underside of one of the plurality of rigid panels to stiffen the respective panel; wherein each of the respective elongated support members has an upper surface that is curved along at least a portion of a length of the elongated support member such that when the upper surface of each of the respective elongated support members is secured to an underside of each of the respective rigid panels, at least a portion of a top surface of each of the respective rigid panels is curved downwardly so as to be at least partially downwardly concave along a width of each of the respective rigid panels. In preferred embodiments, the cover assembly will further include a securing apparatus, wherein the securing apparatus includes a locking member secured to one of the plurality of rigid panels; wherein the locking member is engageable with one of the respective side rails, when the respective side rail is secured to the cargo box, so as to engage the cover assembly with the support frame assembly and the cargo box; wherein the locking member is prevented from disengaging from the respective side rail when the locking member is in a first position, when the respective side rail is secured to the cargo box; wherein the locking member can be moved from the first position to a second position; wherein the locking member can disengage from the respective side rail, when the respective side rail is secured to the cargo box and the locking member is in the second position.

In a further preferred embodiment, the tonneau cover apparatus will preferably include a support frame assembly for attachment to the cargo box; and a cover assembly including a plurality of rigid panels; wherein the plurality of rigid panels includes first and second panels; the first and second panels being flexibly secured to one another by a flexible hinge; wherein a top surface of each of the respective rigid panels is curved downwardly so as to be at least partially downwardly concave along a width of the respective rigid panels; wherein the support frame assembly preferably includes two opposing side rails, wherein each of the respective side rails are secured to one of the respective opposing sidewalls and the cover assembly further includes a securing apparatus, wherein the securing apparatus includes a locking member secured to one of the plurality of rigid panels; wherein the locking member is engageable with one of the respective side rails, when the respective side rail is secured to the cargo box, so as to engage the cover assembly with the support frame assembly and the cargo box; wherein the locking member is prevented from disengaging from the respective side rail when the locking member is in a first position, when the respective side rail is secured to the cargo box; wherein the locking member can be moved from the first position to a second position; wherein the locking member can disengage from the respective side rail, when the respective side rail is secured to the cargo box and the locking member is in the second position; the cover assembly preferably includes a plurality of elongated support members; wherein each of the plurality of elongated support members is secured to an underside of one of the plurality of rigid panels to stiffen the respective panel; wherein each of the respective support members has an upper surface that is curved along at least a portion of a length of the elongated support member such that when the upper surface of each of the respective elongated support members is secured to an underside of each of the respective rigid panels, at least a portion of a top surface of each of the respective rigid panels is curved downwardly so as to be at least partially downwardly concave along a width of each of the respective rigid panels; wherein each of the rigid panels preferably having a thickness of from about 0.020 inches to about 0.200 inches and the flexible hinge is made from a fiber reinforced polymeric material that can withstand deformation without breaking or cracking and each of the respective elongated support members preferably has first and second ends and each of the respective elongated support members is bent so that it curves through an arc as the elongated support member passes from one end to the other end; wherein when the respective rigid panels are secured to the respective elongated support members, the rigid panels are bent so that gravity can cause water to run off of a top surface of each of the respective rigid panels; wherein the flexible hinge is preferably made of a flexible material constructed out of a material that can withstand deformation without failure due to cracking or breakage that is selected from the group consisting of a laminated polymeric material, a fiber reinforced polymeric material, an elastomeric material, a woven material and a material that is in part a laminated woven material and in part a laminated material. The flexible hinge is preferably secured to a first underside of the first panel and to a second underside of the second panel with an adhesive material and preferably includes first and second adhesive backed portions respectively secured to a first underside of the first panel and to a second underside of the second panel. Wherein the cargo box preferably has a length and the plurality of rigid panels further include a third rigid panel and a fourth rigid panel; wherein the plurality of rigid panels are secured to one another in series by a series of flexible hinges each of which secures respective adjacent rigid panels to one another; wherein a length of each of the plurality of rigid panels is considerably less than the length of the cargo box; and one of the plurality of rigid panels is a hinge panel that has a hinge panel length that is no greater than one-third of an average length of the other rigid panels; and wherein the third rigid panel is a hinge panel that has a hinge panel length that is no greater than one-third of an average length of the other rigid panels; wherein the cover assembly can fold up so that the first, second and fourth rigid panels are oriented such that a top surface of each of the first, second and fourth panels is parallel to a top surface of each of the others and a top surface of the hinge panel is oriented at a 90 degree angle to the top surfaces of each of the other panels.

In further preferred embodiments, the flexible hinge will be made at least in part from a moisture resistant, flexible sheet material that includes a laminated woven fabric material and the cover assembly will further include a cab panel positioned closest to the forward end and secured to the fourth panel by a fourth flexible hinge; wherein the first flexible hinge is secured to an underside of the first panel and an underside of the second panel, the second flexible hinge is secured to an underside of the hinge panel and an underside of the second panel, the third flexible hinge is secured to an underside of the hinge panel and an underside of the fourth panel and the fourth flexible hinge is secured to an underside of the fourth panel and an underside of the cab panel. In further preferred embodiments, the cover assembly will preferably include a storage strap that can secure the first and second panels to the fourth panel when the cover assembly is in the fully folded position; preferably an elastic strap. In further preferred embodiments, when the cover assembly is in the fully folded position, and the first and second panels are secured to the fourth panel, the fully folded cover can pivot with respect to the cab panel to an upright position in which the first, second and fourth panels are pivoted generally upward with respect to the cab panel so that the first, second and fourth panels rest in a generally vertical position upon the cab panel when the cab panel is in a generally horizontal orientation. In such an embodiment, the cover assembly will preferably include a securing strap that can secure the first and second panels to the pickup truck when the first and second panels are secured to the fourth panel and the tonneau cover is attached to the pickup truck in a manner in which the first, second and fourth panels rest in a generally vertical position upon the cab panel; wherein the storage strap is preferably an elastic strap. In a further preferred embodiment, the cover assembly will preferably further include a hinge guard member underlying one of the plurality of flexible hinges; wherein the hinge guard is secured to an underside of one of the rigid panels to provide underlying support proximate the respective flexible hinge.

In a further preferred embodiment, a method of making a tonneau cover apparatus for removable attachment about a top of a perimeter of a cargo box of a pickup truck is provided, wherein the perimeter of the cargo box includes a forward end, two opposing sidewalls and a tailgate, the tailgate being positioned rearward of the forward end and having an open position and a closed position, and the method includes the steps of: providing a cover assembly including a plurality of rigid panels; wherein the plurality of rigid panels includes first and second panels; the first and second panels being flexibly secured to one another by a flexible hinge; the cover assembly including a plurality of elongated support members; wherein the plurality of elongated support members can be secured to an underside of one of the plurality of rigid panels to stiffen the respective rigid panel; wherein each of the respective elongated support members has a upper surface that is curved along a length of the elongated support member such that when the upper surface of each of the respective elongated support members is secured to an underside of one of the respective rigid panels, a top surface of the respective rigid panel will be curved along at least a portion of a width of the respective rigid panels; and securing the respective elongated support members to the respective rigid panels so that the rigid panels are sufficiently bent for water to run off of a top surface of each of the respective rigid panels under the force of gravity when the respective rigid panels are engaged with the support frame assembly. Wherein each of the respective elongated support members preferably has first and second ends and each of the respective elongated support members is curved so that it curves through an arc as the support member passes from one end to the other end and wherein the upper surface each of the respective elongated support members is preferably curved so that the end portions of the upper surface are a deflection distance lower than a center portion of the upper surface, and the deflection distance is from about 1/64 inch and about 1/2 inch. In further preferred embodiments, the upper surface is curved so that the end portions of the upper surface are a deflection distance lower than the center portion of the upper surface, and the deflection distance is about 1/8 inch. The method preferably further provides a support frame assembly for attachment to the cargo box, the support frame assembly having two opposing side rails, wherein each of the respective side rails is secured to one of the respective opposing sidewalls; and wherein the step of securing includes using adhesive material to secure the respective elongated support members to the underside of the respective rigid panels; wherein each of the rigid panels have a top surface and the top surface of each of the respective rigid panels is curved so that end portions of the top surface are a deflection distance lower than a center portion of the respective top surface, wherein the deflection distance is from about 1/64 inch and about 1/2 inch.

In a further preferred embodiment, a method of making a tonneau cover apparatus for removable attachment about a top of a perimeter of a cargo box of a pickup truck is provided, wherein the method includes the steps of: providing a cover assembly including a plurality of rigid panels; wherein the plurality of rigid panels includes first and second panels; the first and second panels being flexibly secured to one another by a flexible hinge; the cover assembly including a plurality of elongated support members; wherein the plurality of elongated support members are secured to an underside of one of the plurality of rigid panels to stiffen the respective rigid panel; and wherein the cover assembly further includes a perimeter seal secured to the underside of each of the respective rigid panels proximate an outer portion of each of the respective rigid panels; providing a support frame assembly including a plurality of side rails for attachment to the sidewalls of the cargo box; securing the support frame assembly to the perimeter of the cargo box; and securing the cover assembly to the support frame assembly, wherein the perimeter seal is a water resistant gasket that forms a continuous border around an underside of the cover assembly so that when the cover assembly is secured to the respective side rails of the support frame and the respective side rails are secured to the respective sidewalls of the pickup truck, the perimeter seal creates a water resistant barrier between the cover assembly and the cargo box.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts;

FIG. 14A illustrates a standoff aligned for attachment to a support bow;

FIG. 14B illustrates the standoff of FIG. 13A inserted into the support bow;

FIG. 14C illustrates the standoff of FIGS. 13A and 13B rotated so that an oblong securement feature engages the support bow;

FIG. 14D is a perspective view illustration of the standoff of FIG. 13A, also showing a protective pad incorporated with the standoff;

Figure 28A:
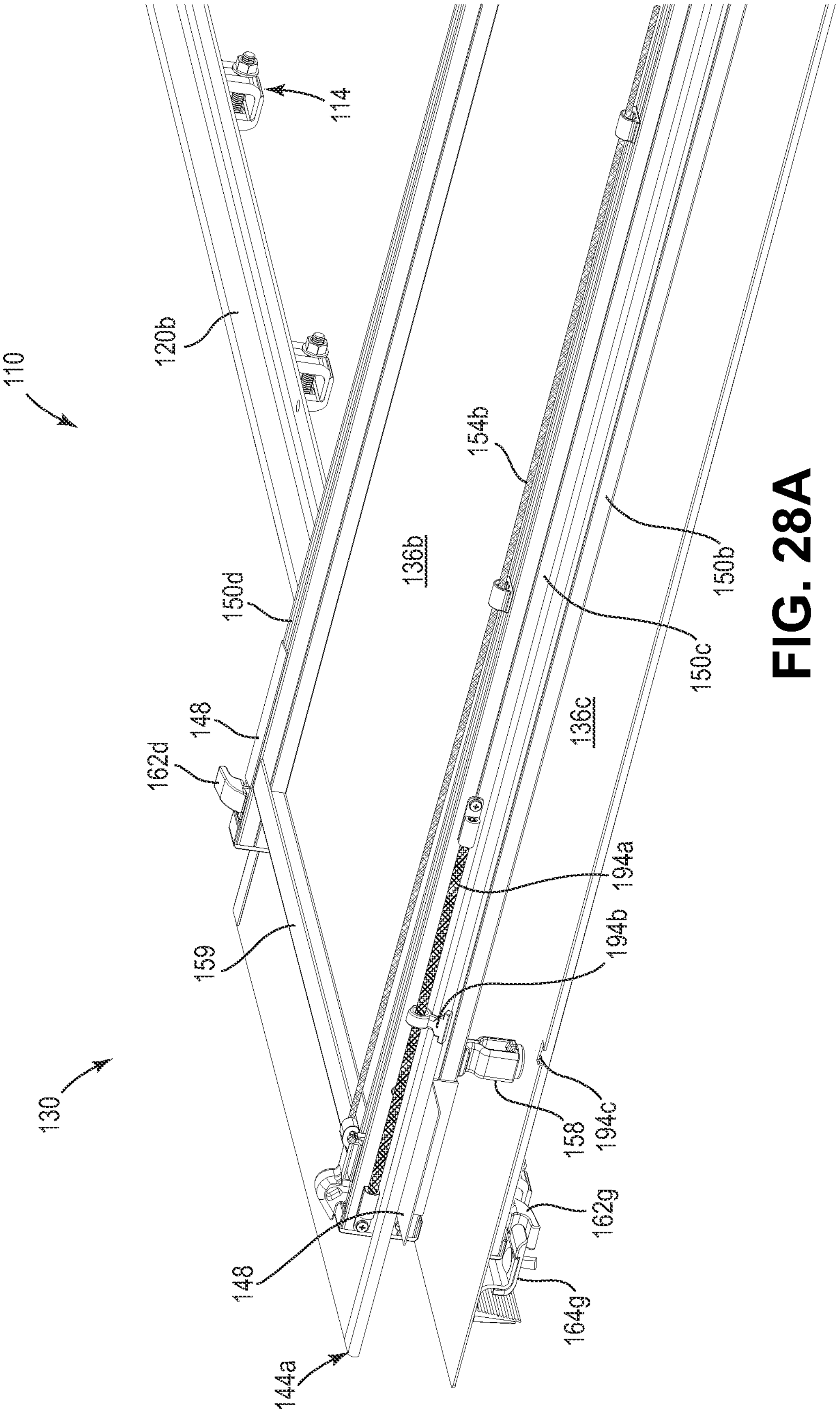
FIG. 28A is a front perspective view of the folding tonneau cover apparatus of FIG. 20 wherein the rear panel together with the middle panel and the spacer panel has been rotated forward so that the middle panel and the rear panel are resting on the spacers on top of the rear panel as in FIG. 27A and showing a storage strap stowed along the middle panel, but for clarity of illustration the perimeter seal is not shown.
Figure 28B:
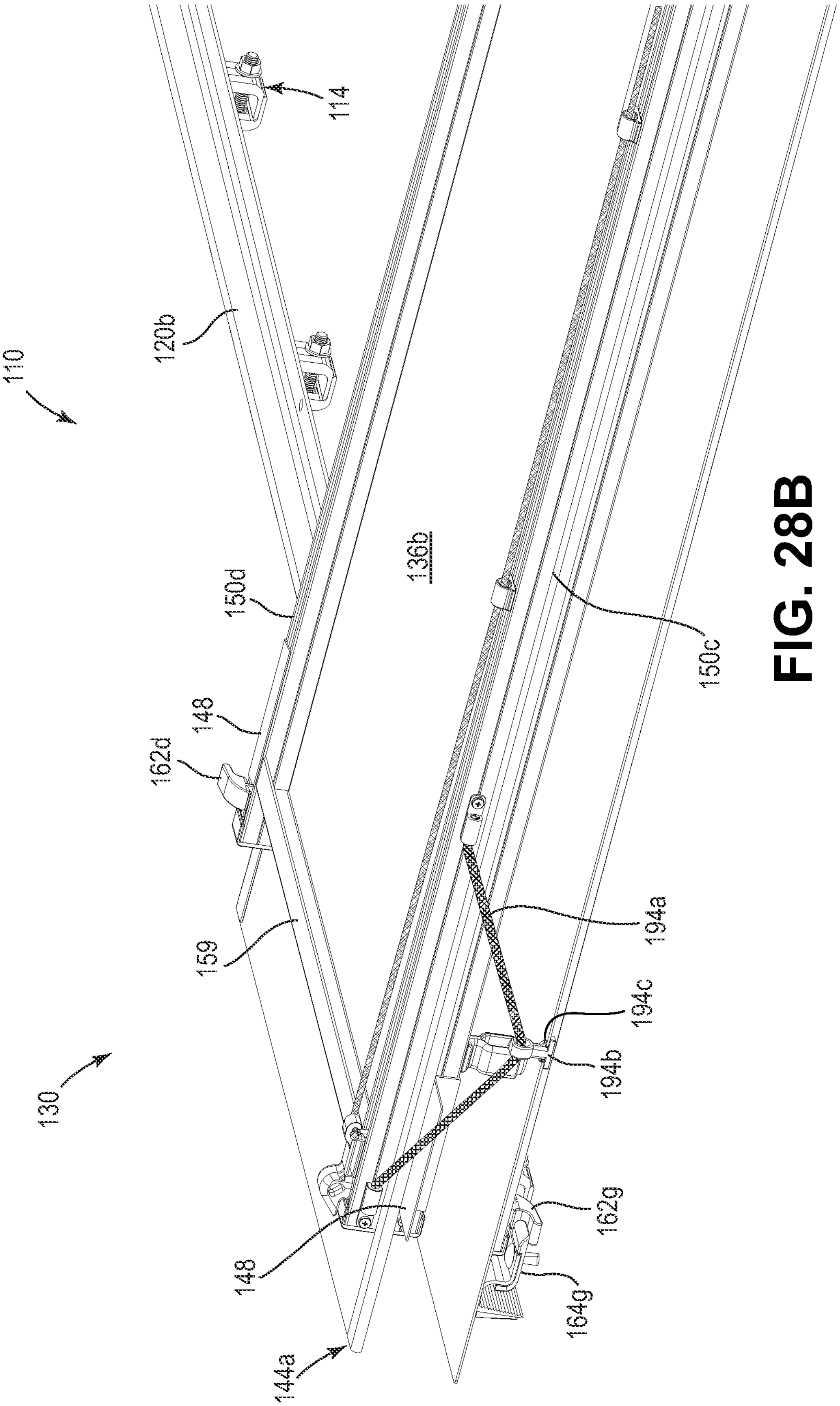
FIG. 28B is a front perspective view of the folding tonneau cover apparatus of FIG. 20 similar to the view of FIG. 28A but showing the storage strap pulled down and engaged with a strap bracket to the front panel, securing the folding tonneau cover in the folded up configuration, but for clarity of illustration the perimeter seal is not shown.
Figure 40:
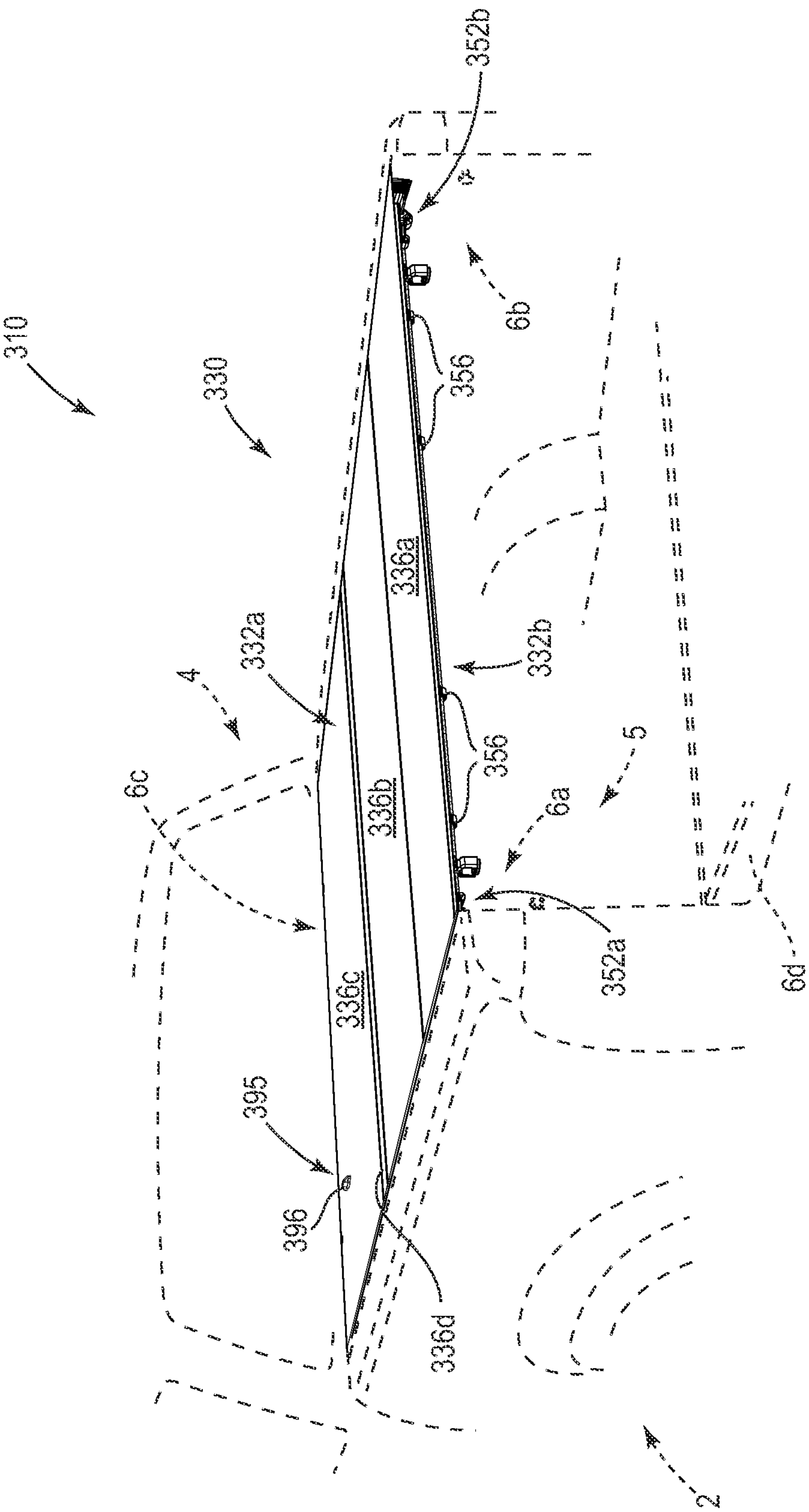
FIG. 40 is a rear perspective view of another alternate embodiment of folding tonneau cover apparatus incorporating an external actuator mechanism to release the latches on the front panel, with the folding tonneau cover apparatus attached to a pickup truck which is shown in phantom.
Figure 43A:
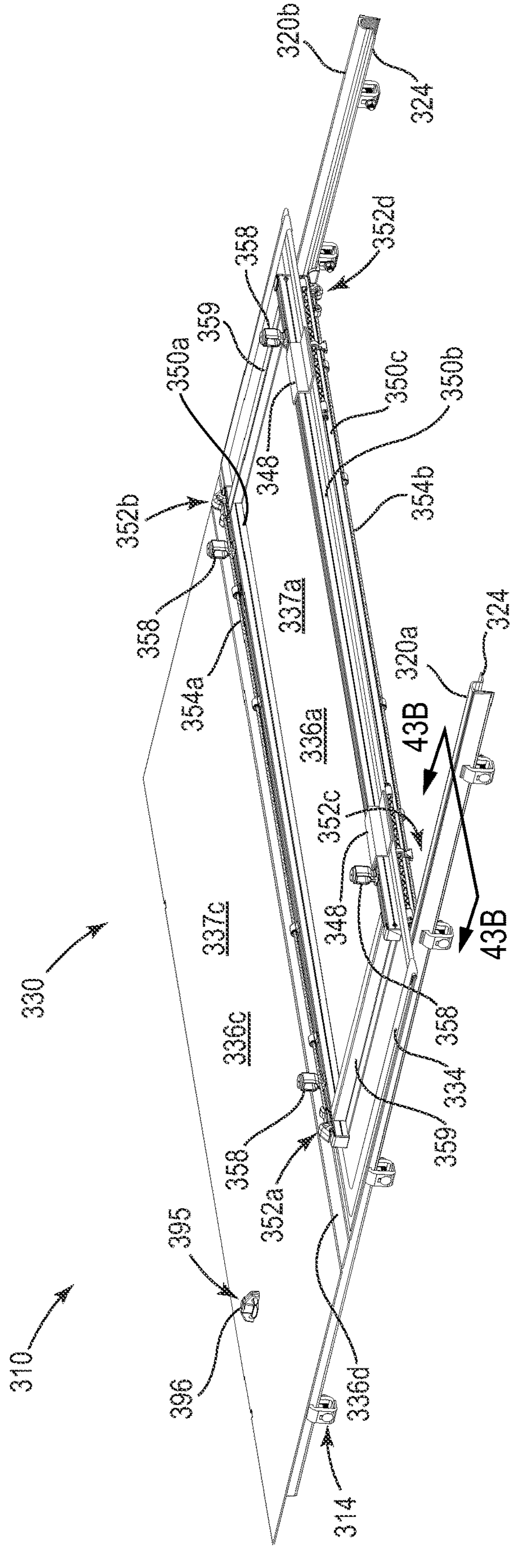
FIG. 43A is a rear perspective view of the folding tonneau cover apparatus of FIG. 40, similar to the illustration of FIG. 24A, in which the release cord at the rear of the rear panel has been pulled to disengage the latches at the rear of the rear panel from the side rails similar to the illustrations of FIGS. 22A and 22B, and the rear panel has been lifted up and rotated completely forward onto the middle panel, but for clarity of illustration the perimeter seal is not shown.
Figure 47A:
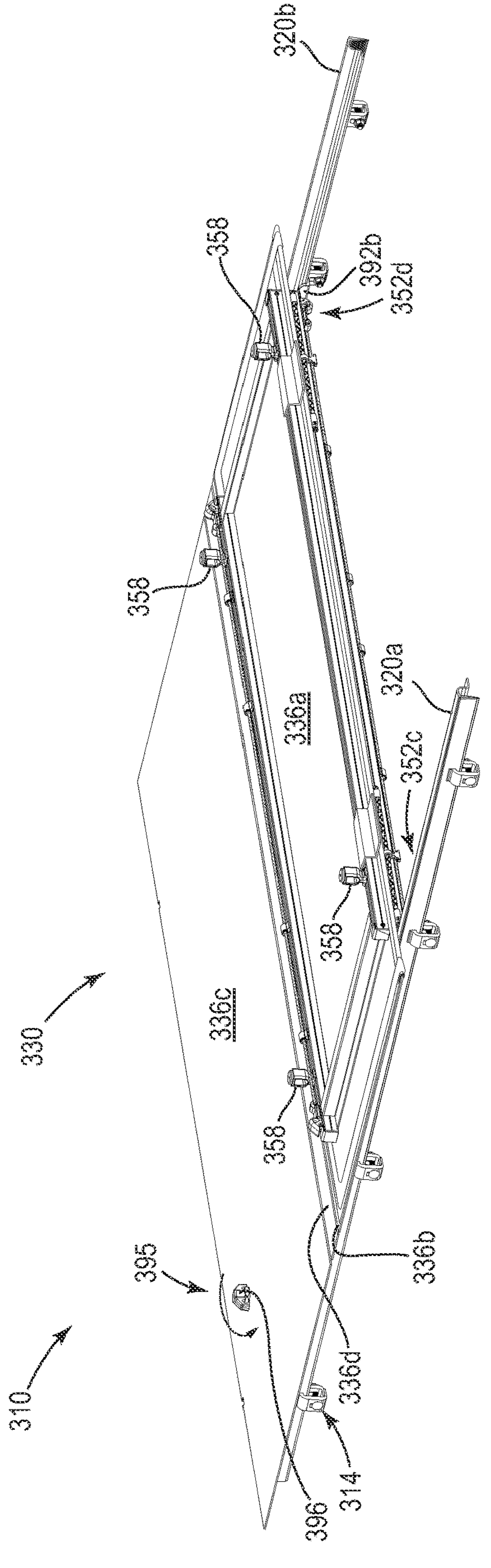
FIG. 47A is a rear perspective view of the folding tonneau cover apparatus of FIG. 40, similar to the illustration of FIG. 43A, in which the rear panel has been lifted up and rotated completely forward onto the middle panel, with an arrow indicating the rotating handle near the front of the front panel being rotated to release the latches at the front of the front panel from the side rail.
Figure 47B:
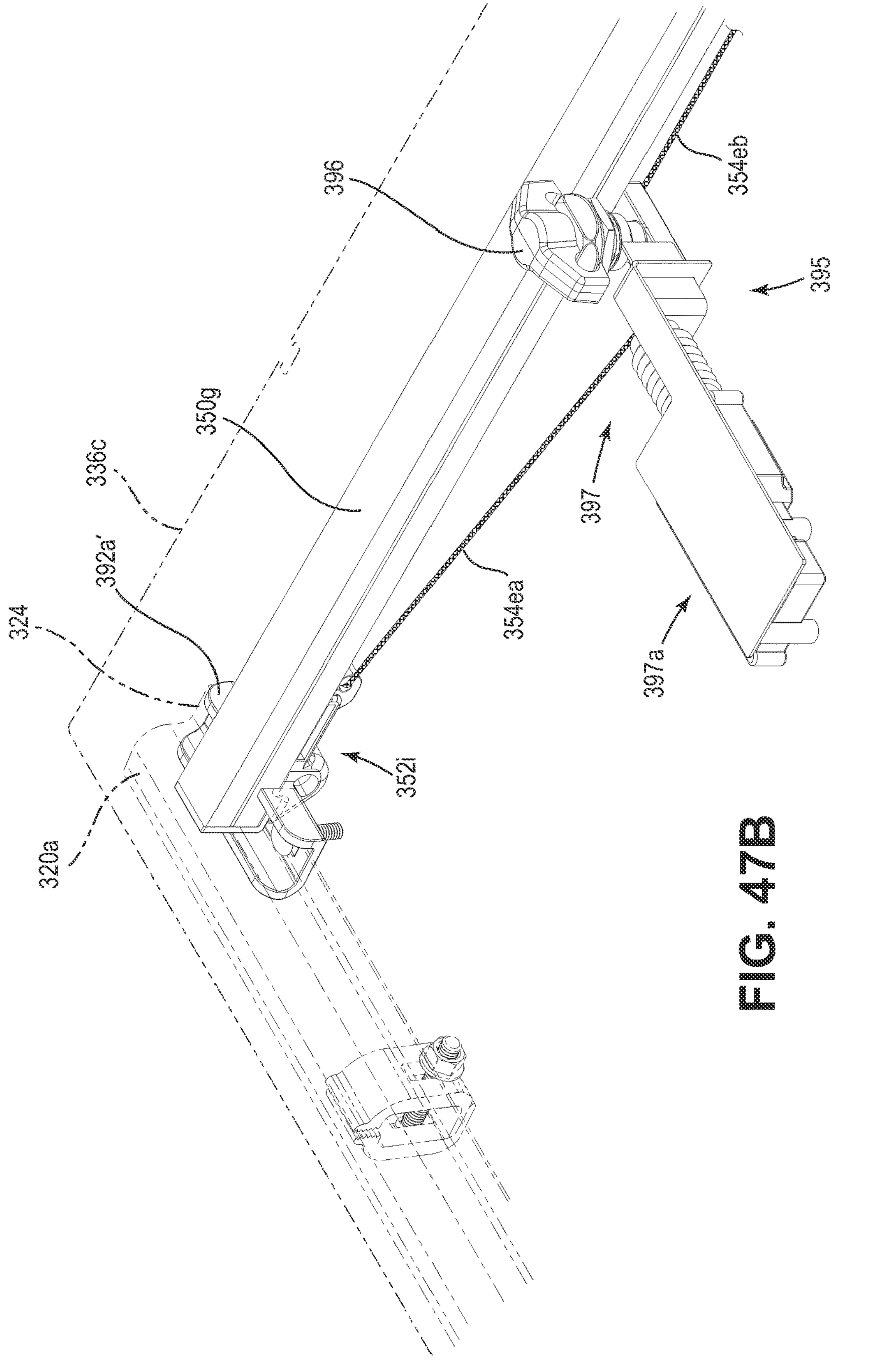
FIG. 47B is a perspective view from above of a portion of the front panel of the folding tonneau cover apparatus of FIG. 40, showing the release handle and release mechanism connected to the release cords which are attached to the latches at the front of the front panel, in the latched configuration in which the latches are engaged with the side rails, with the panel removed to show the underlying structure, but for clarity of illustration the perimeter seal is not shown.
Figure 47C:
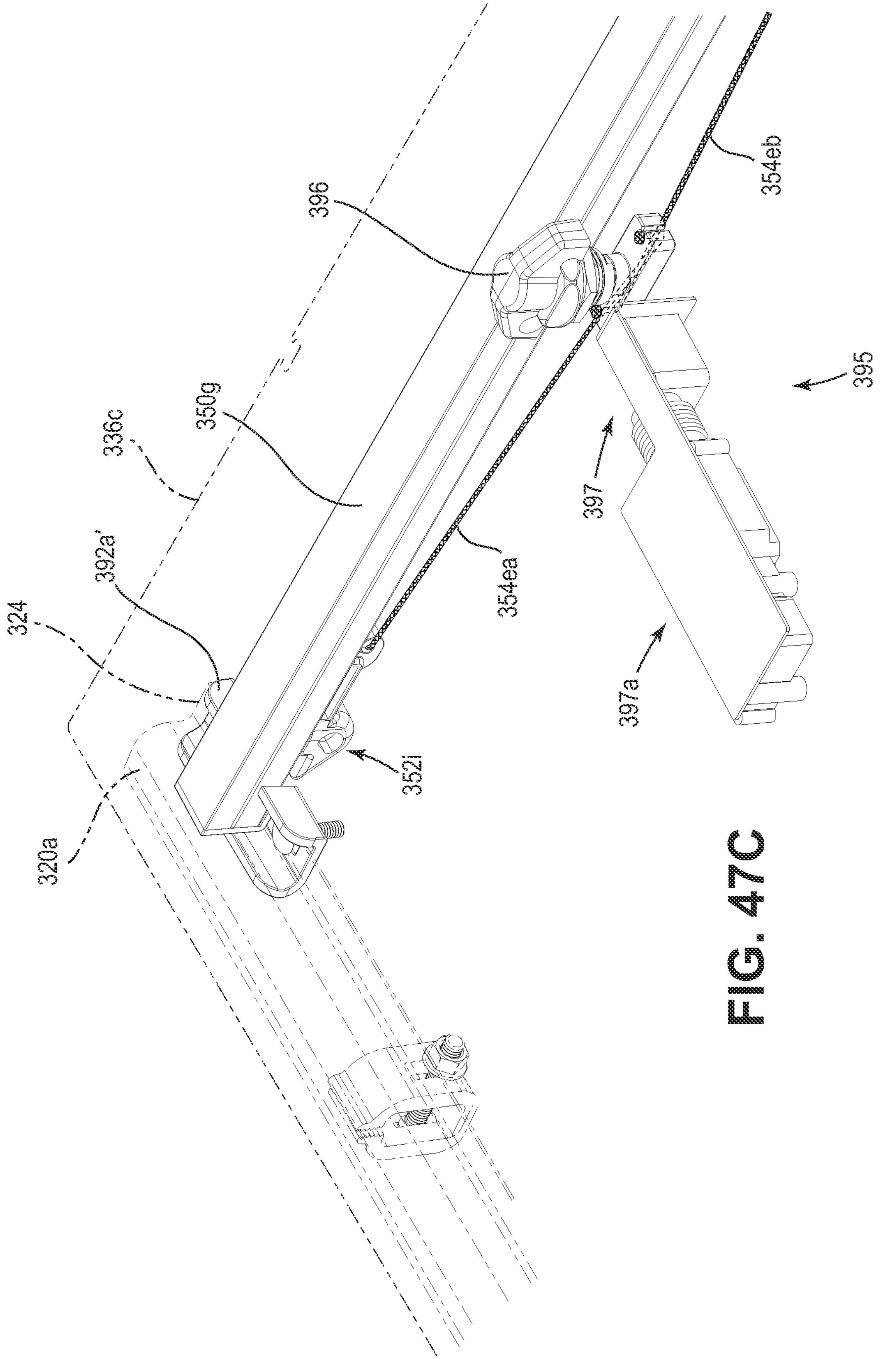
FIG. 47C is a perspective view of a portion of the front panel of the folding tonneau cover apparatus of FIG. 40 similar to that of FIG. 47B, but showing the release handle rotated to pull the release cords and retract the latches at the front of the front panel, with the latches disengaged from the side rails, but for clarity of illustration the perimeter seal is not shown.
Figure 48A:
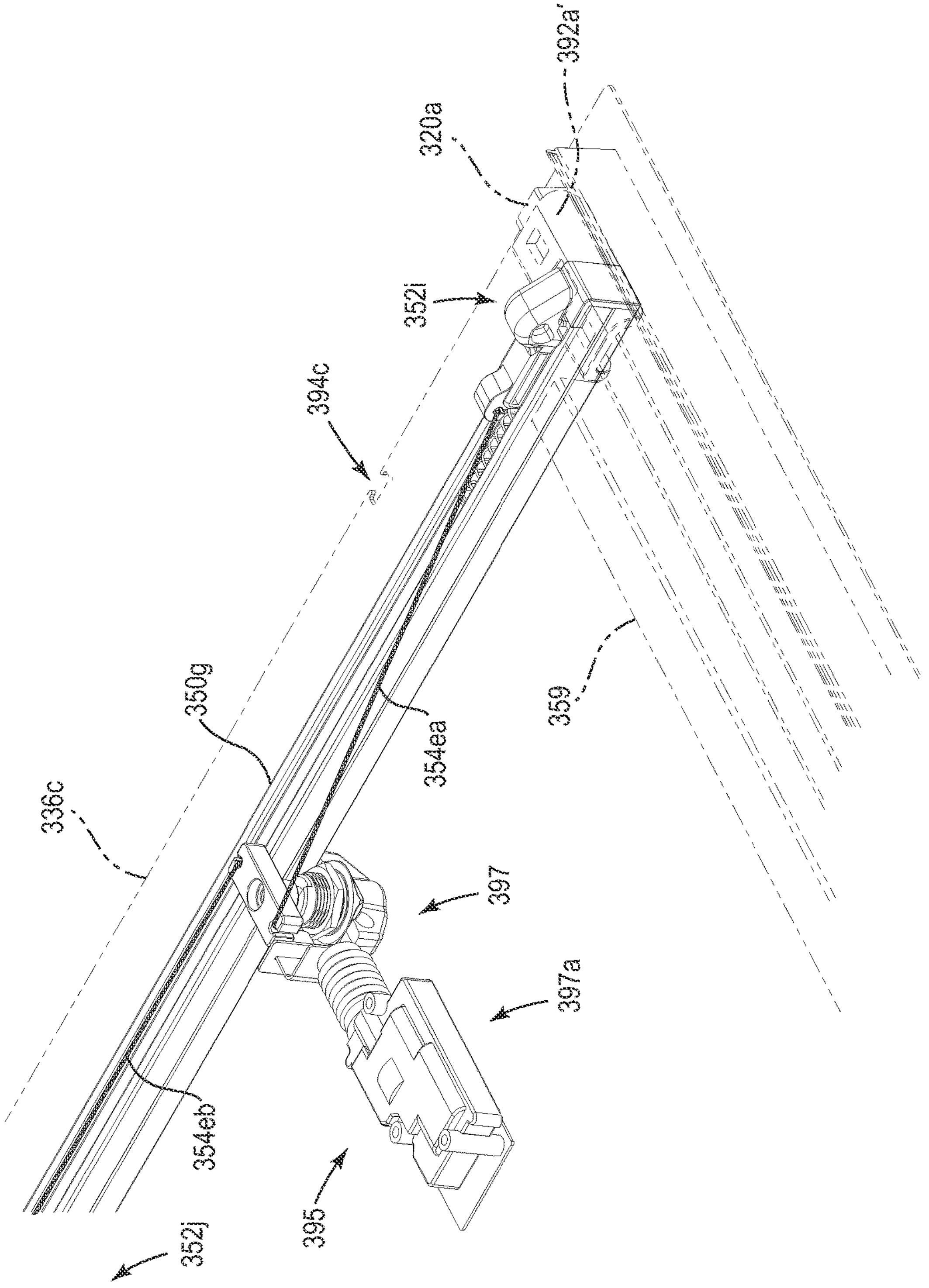
FIG. 48A is a perspective view from below of a portion of the front panel of the folding tonneau cover apparatus of FIG. 40, showing the release mechanism connected to the release cords which are attached to the latches at the front of the front panel, in the latched configuration as illustrated in FIG. 47B in which the latches are engaged with the side rails, with the front panel shown in phantom to show the underlying structure, but for clarity of illustration the perimeter seal is not shown.
Figure 48B:
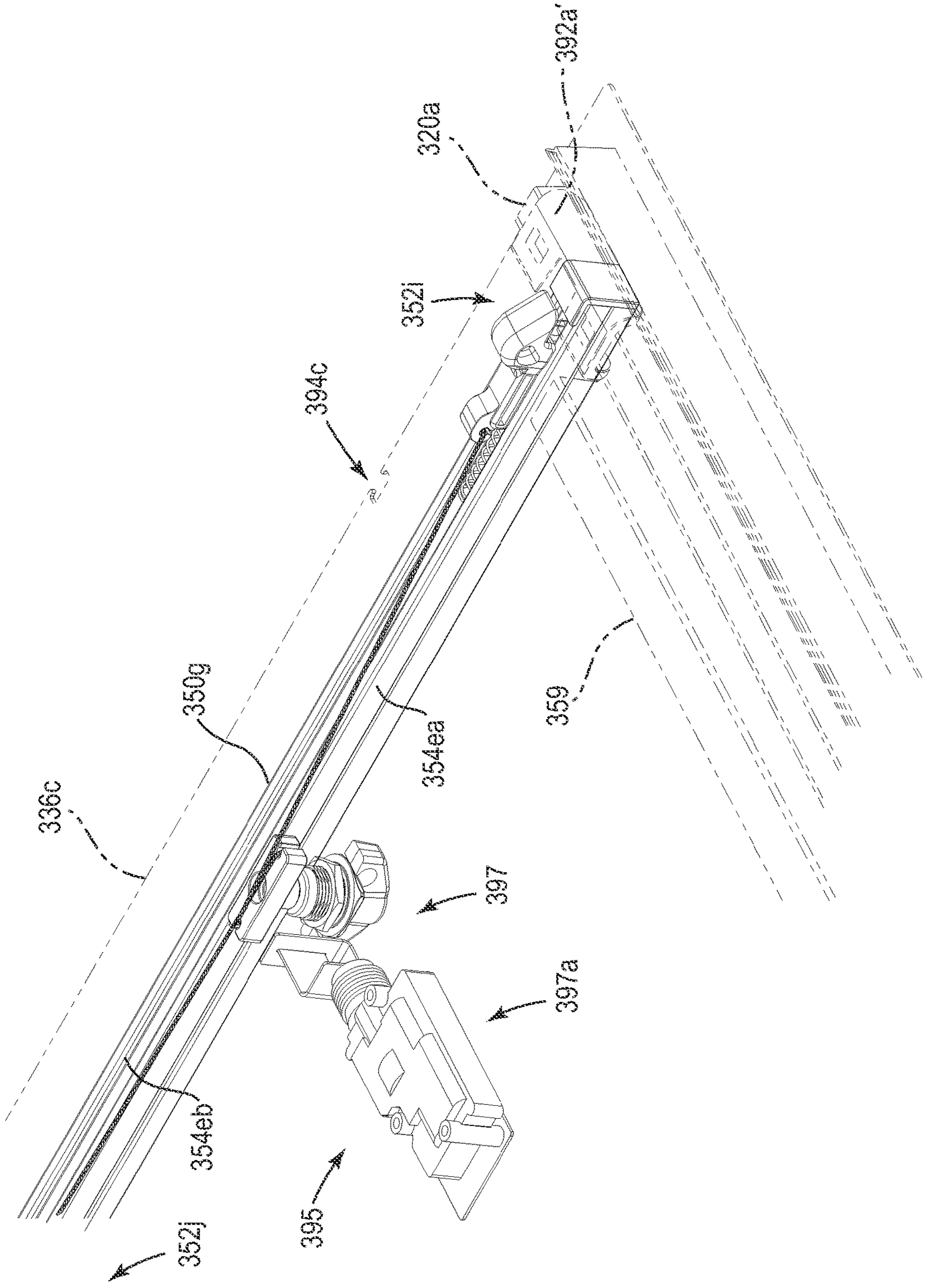
FIG. 48B is a perspective view of a portion of the front panel of the folding tonneau cover apparatus of FIG. 40 similar to that of FIG. 48A, but showing the release handle rotated to pull the release cords and retract the latches at the front of the front panel, with the latches disengaged from the side rails, with the front panel shown in phantom to show the underlying structure, but for clarity of illustration the perimeter seal is not shown.
Figure 49A:
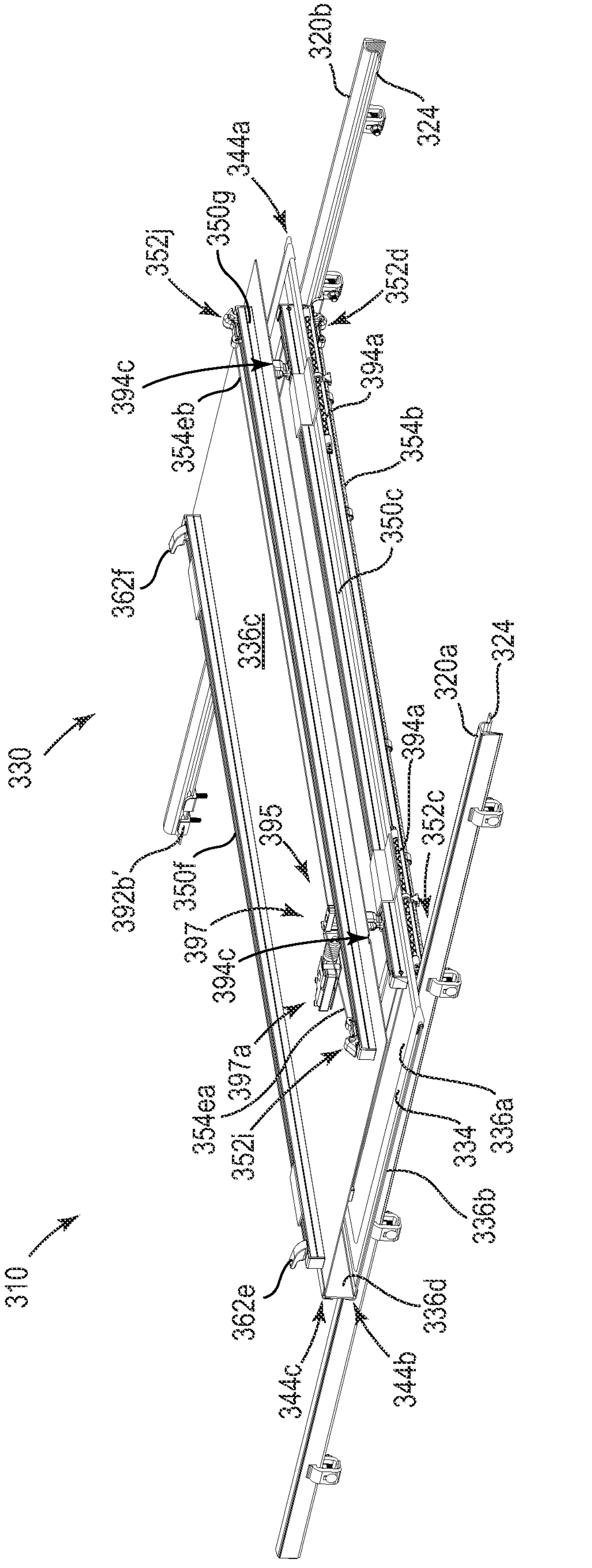
Figure 49B:
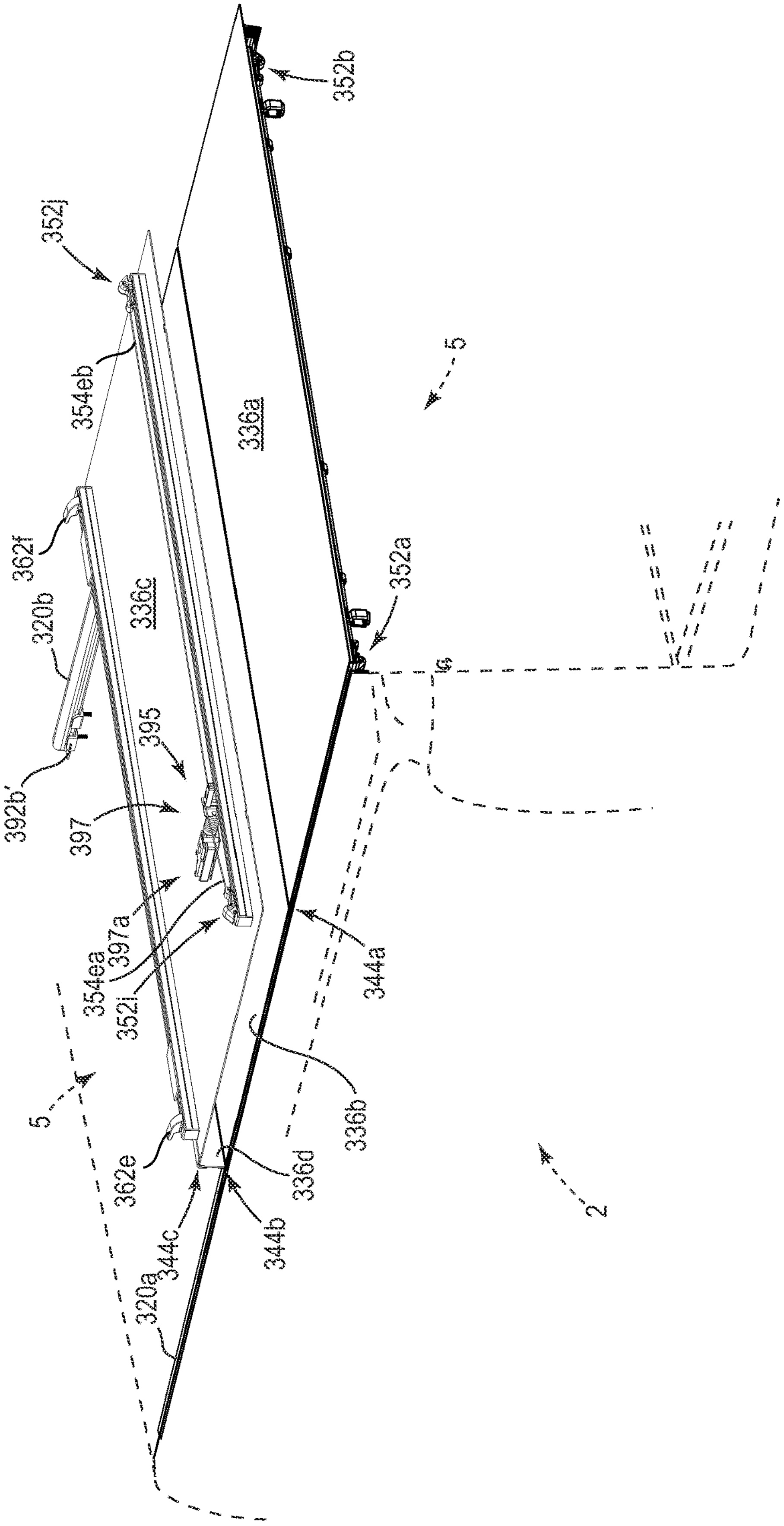
Figure 50:
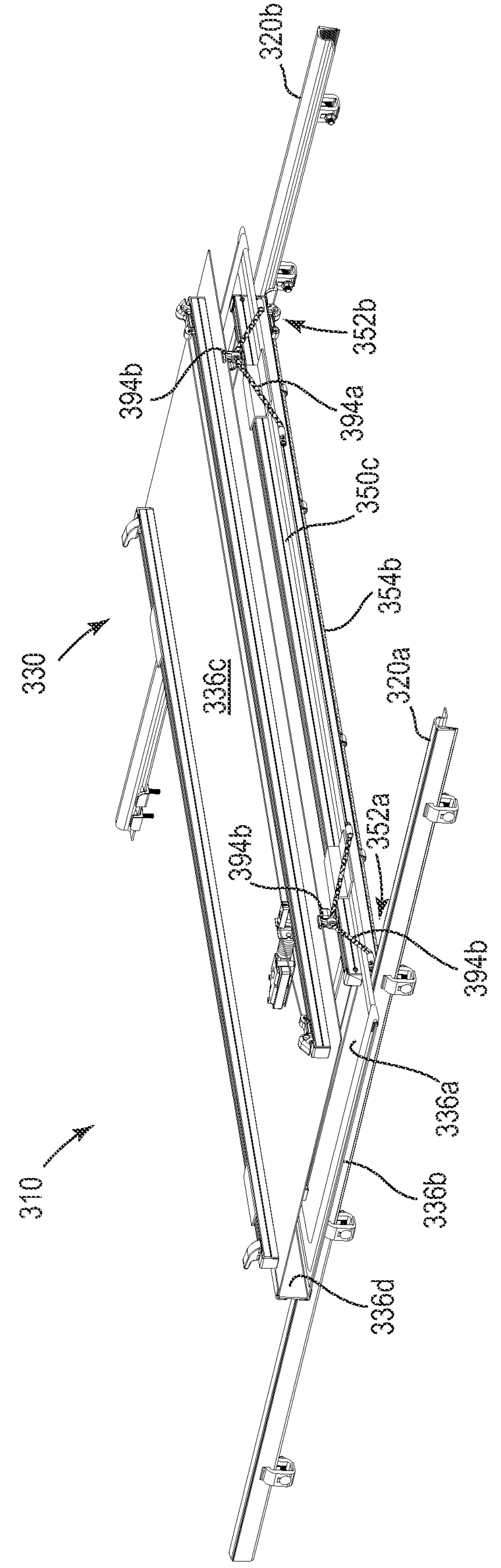
Figure 51A:
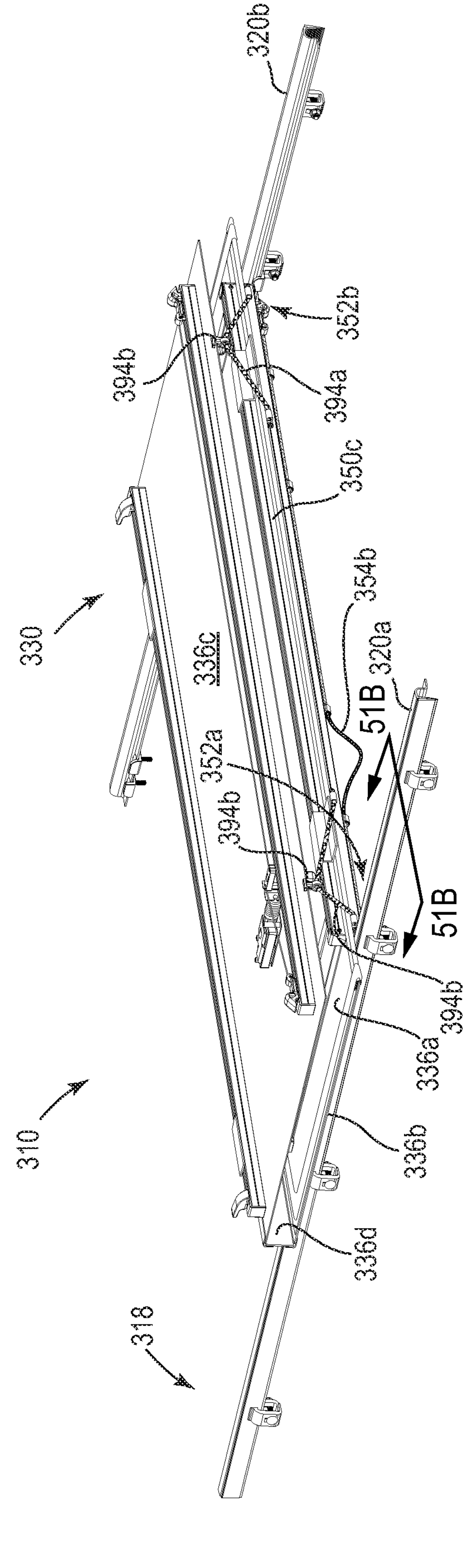
Figure 51B:
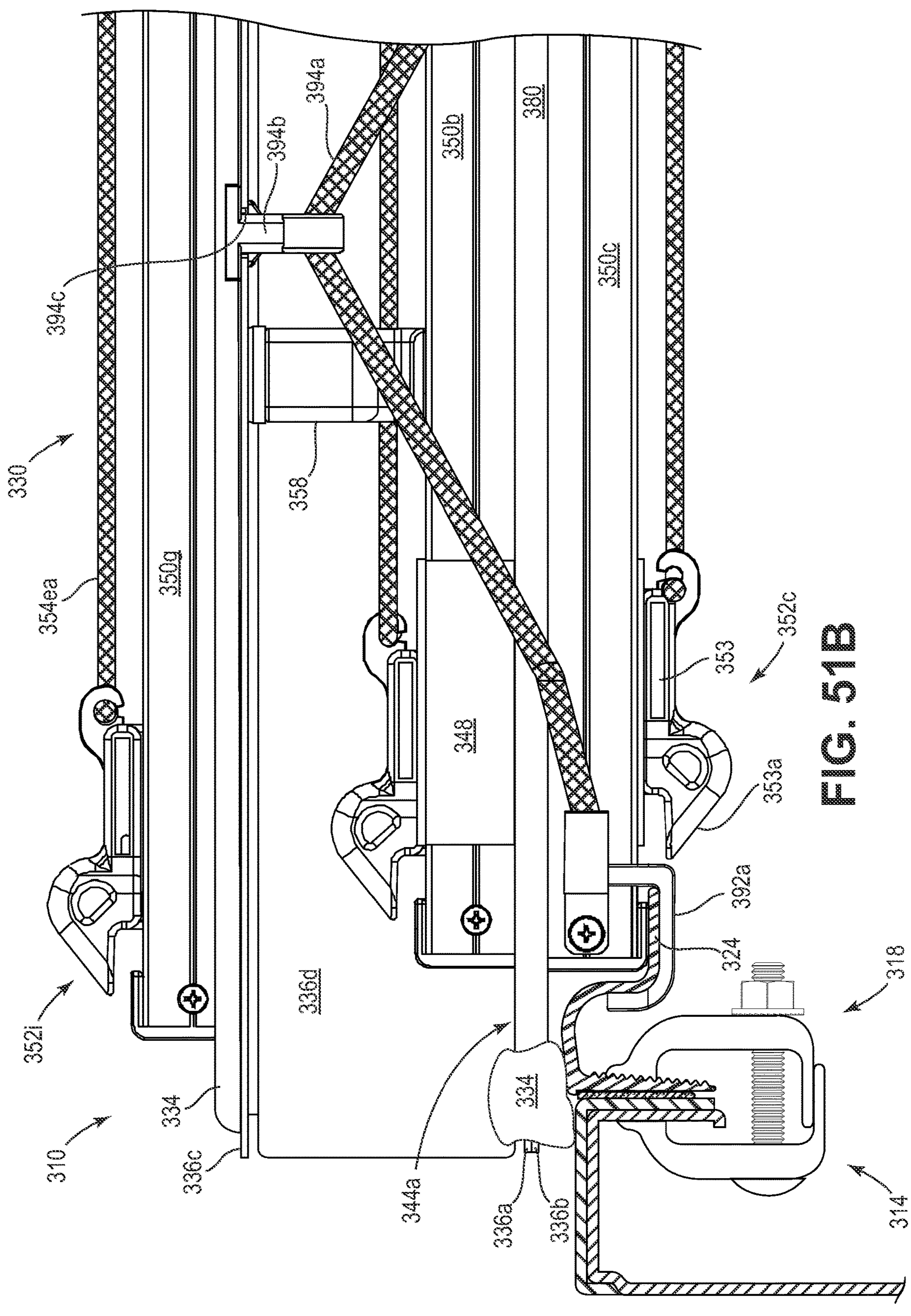
Figure 52:
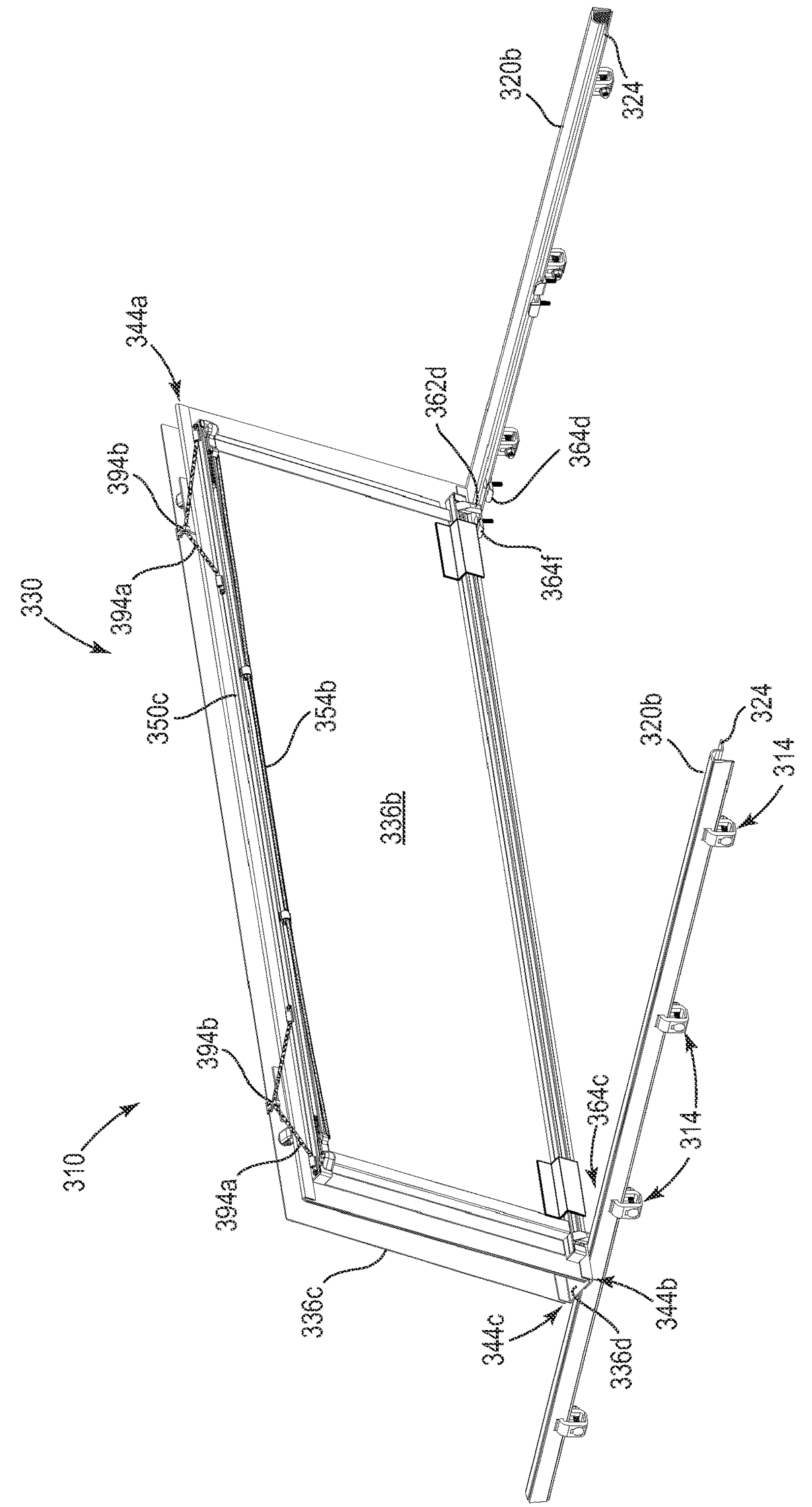
Figure 53A:
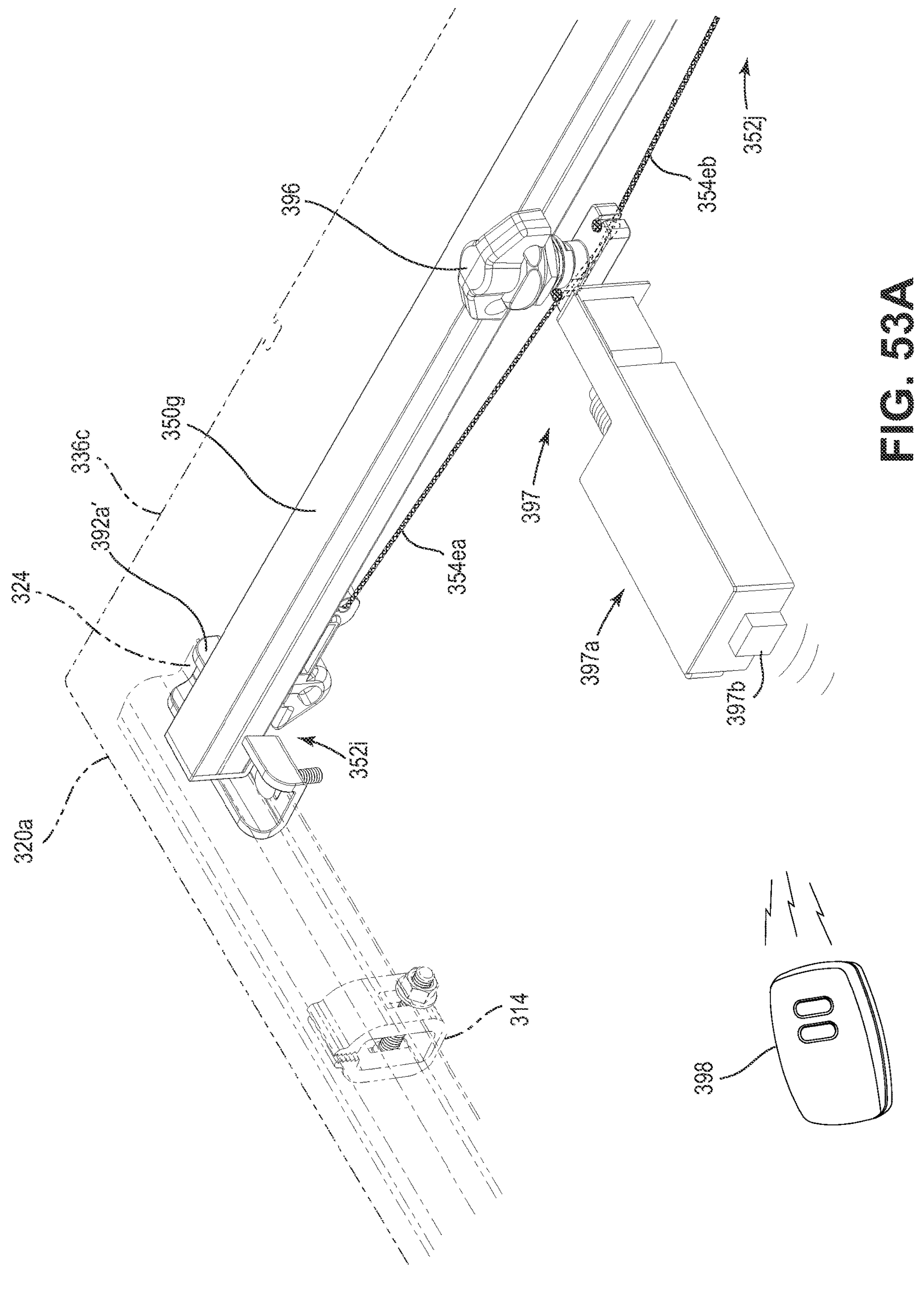
Figure 53B:
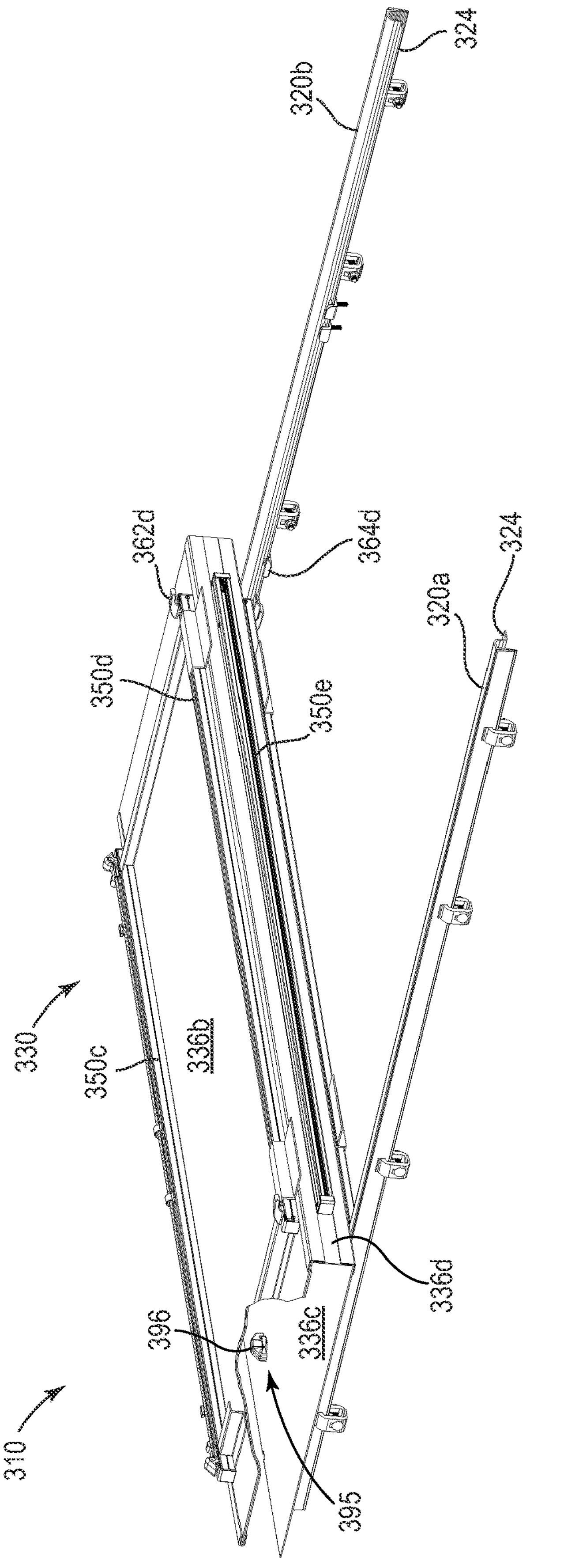
Figure 53C:
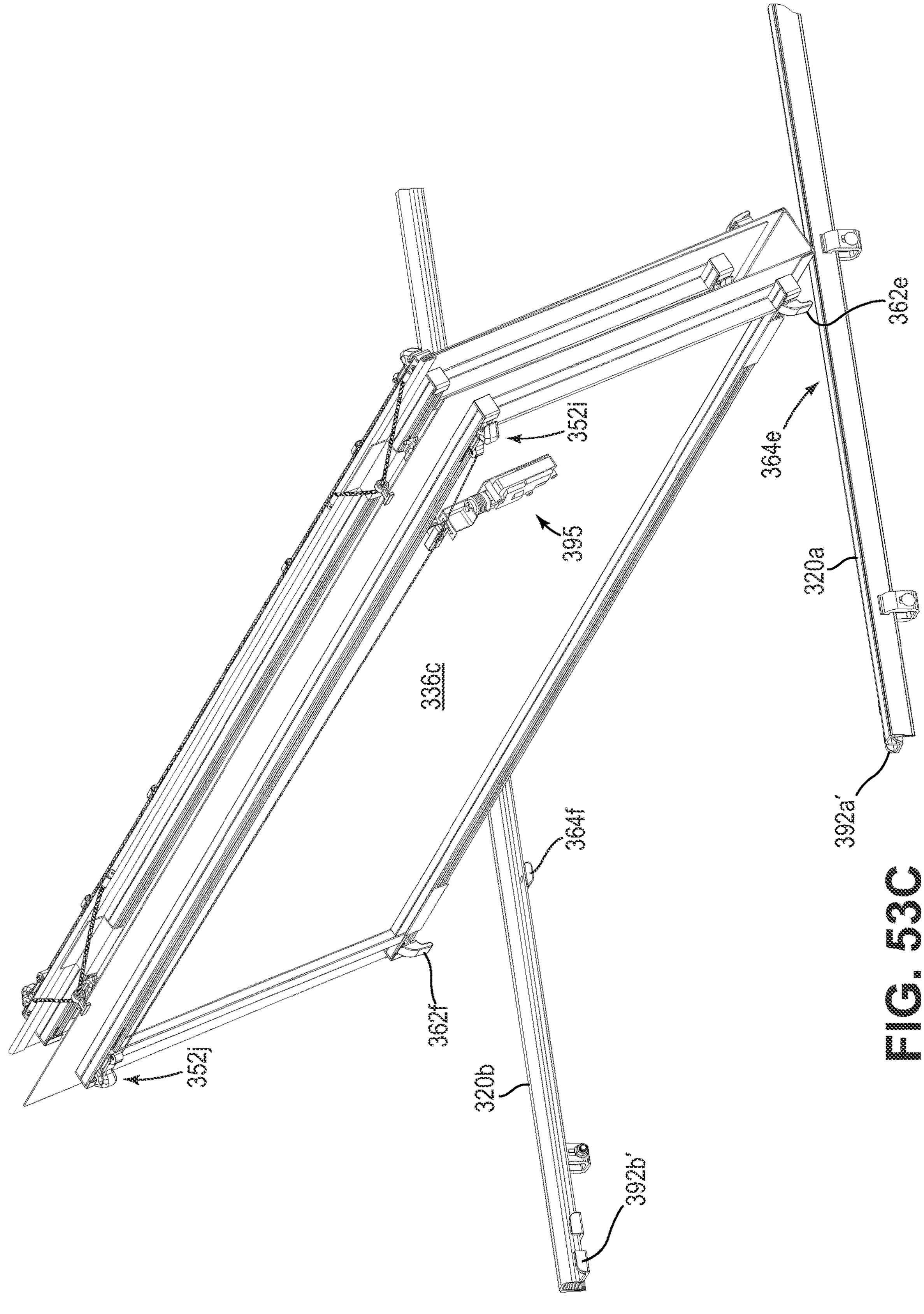
Figure 54:
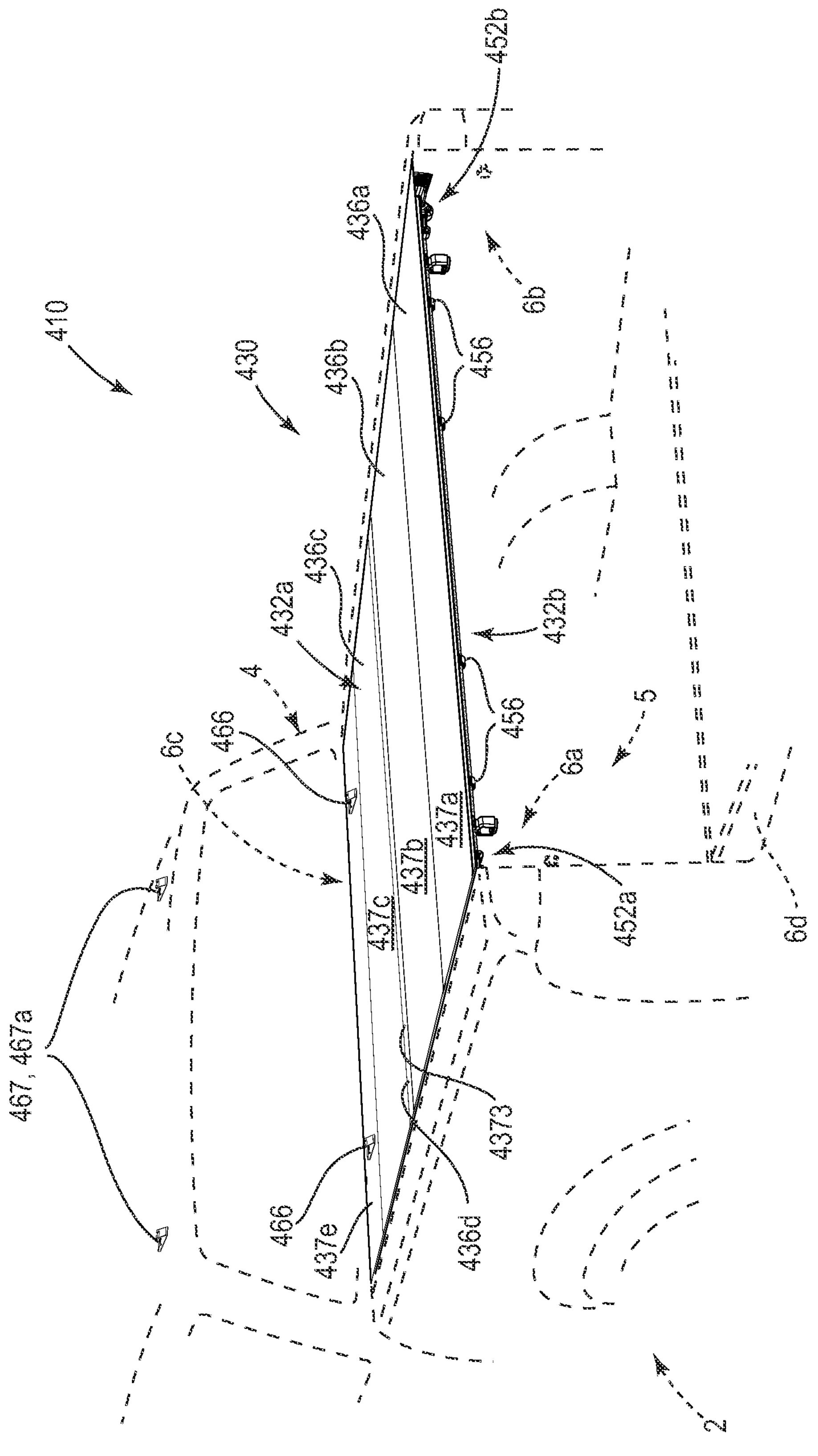
Figure 55:
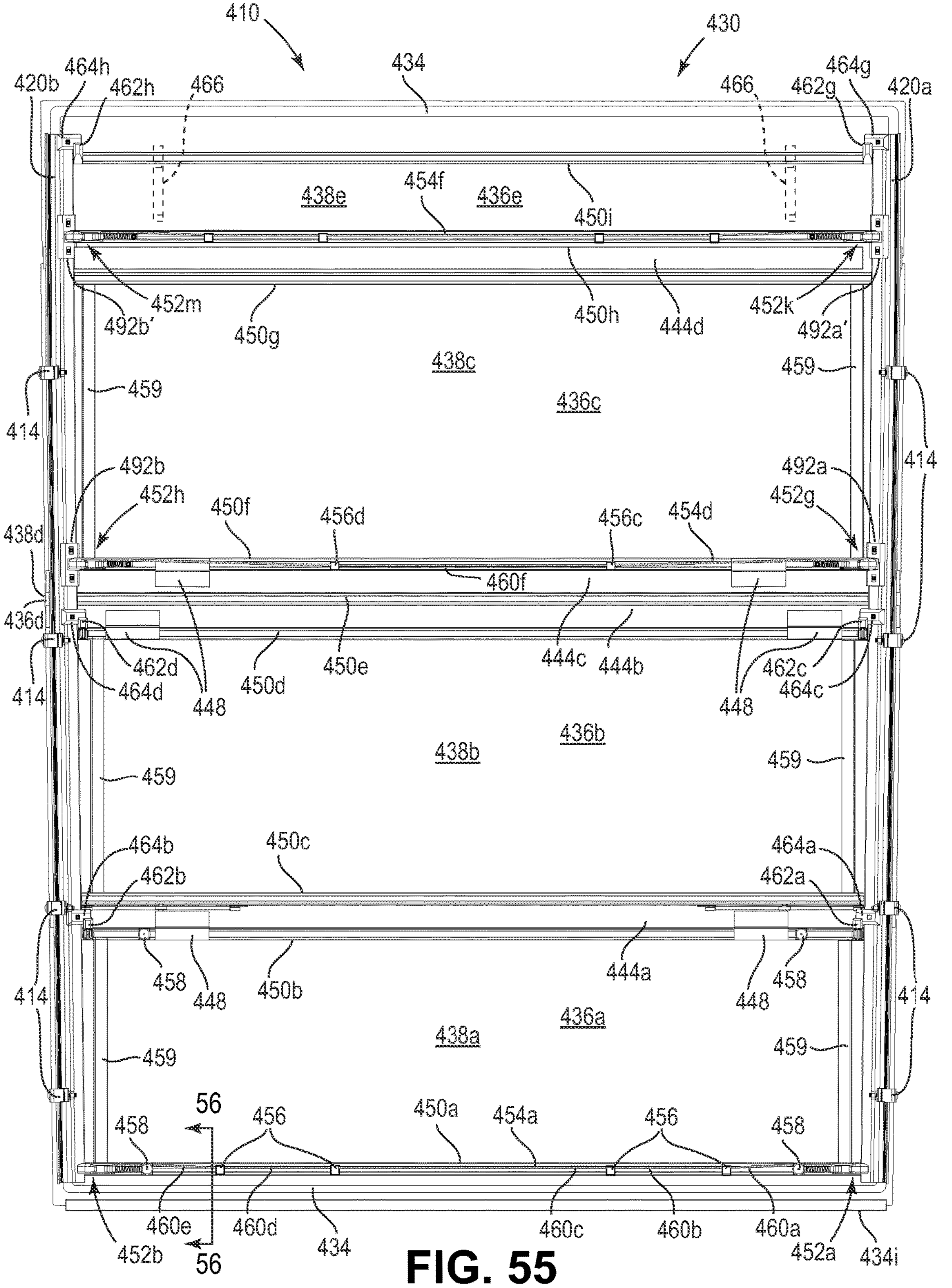
Figure 56:
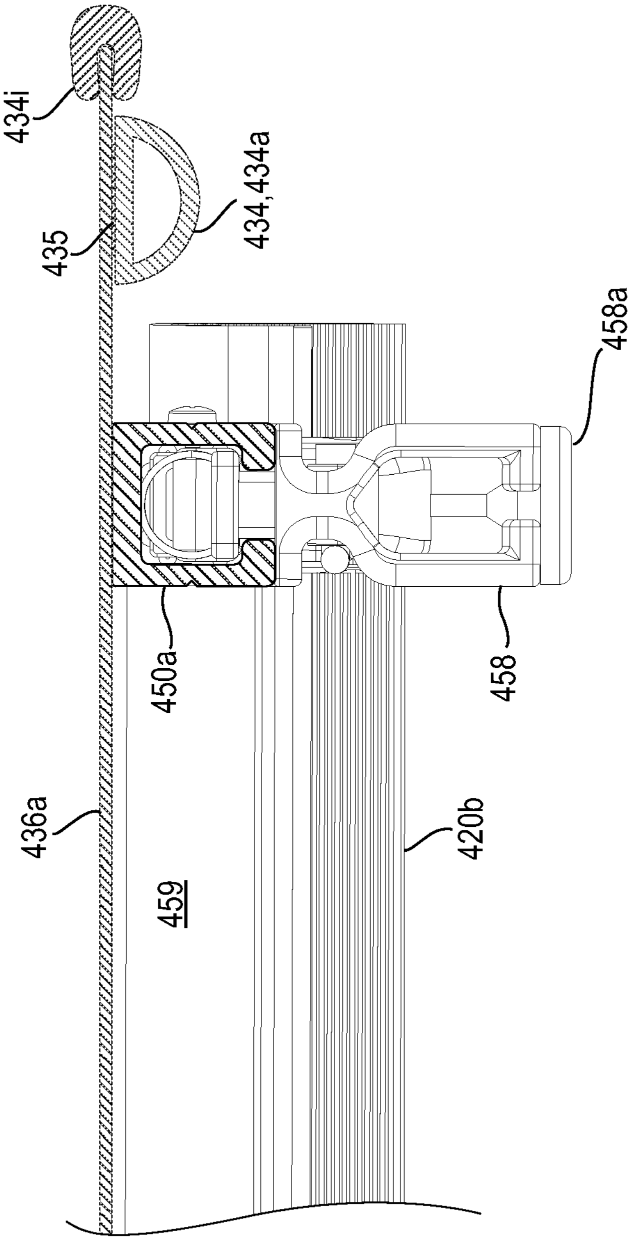
Figure 57:
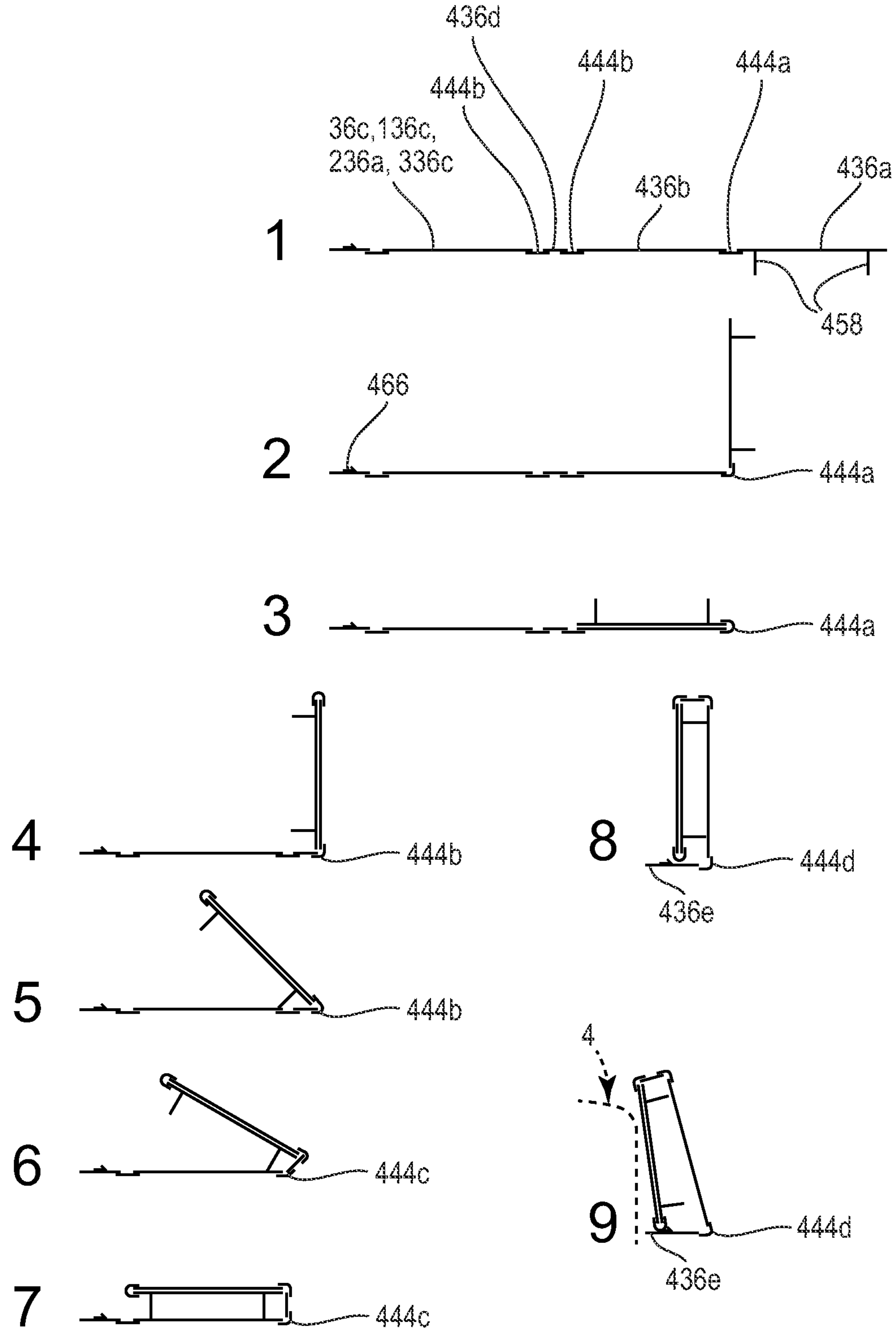
Figure 58:
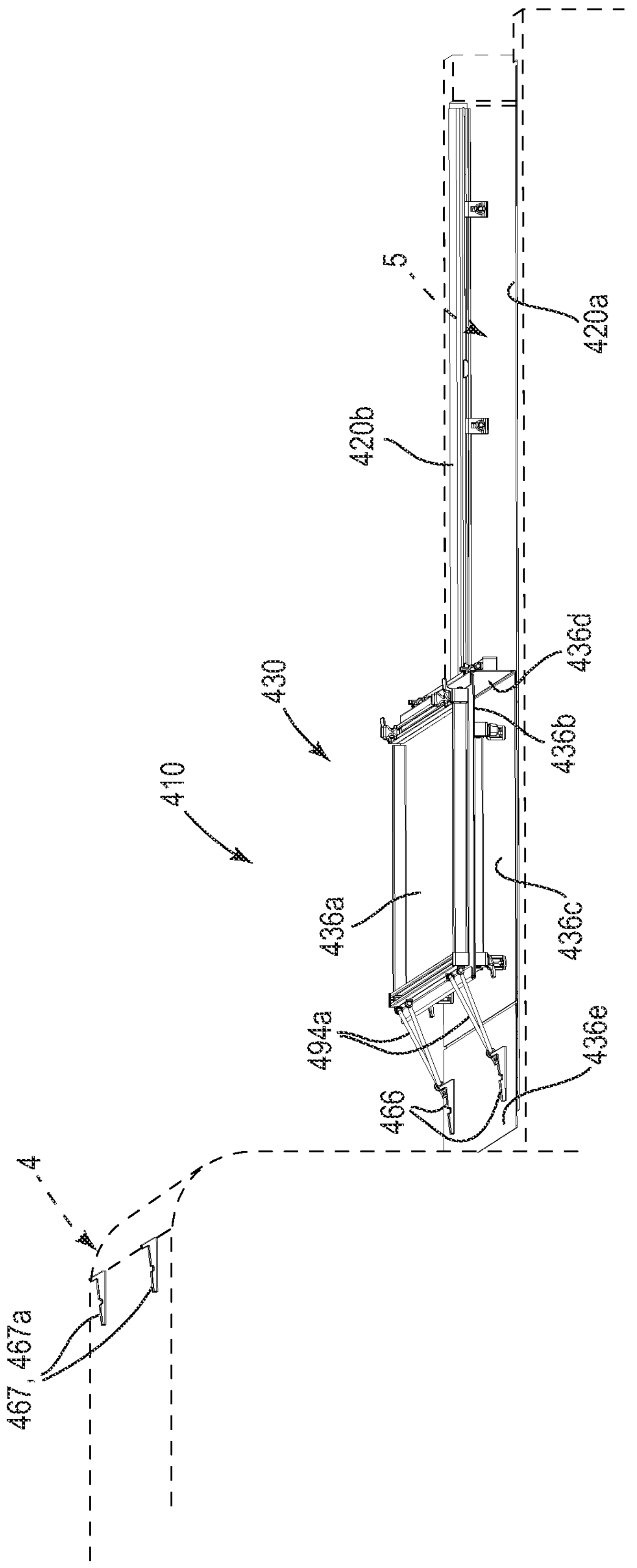
Figure 59:
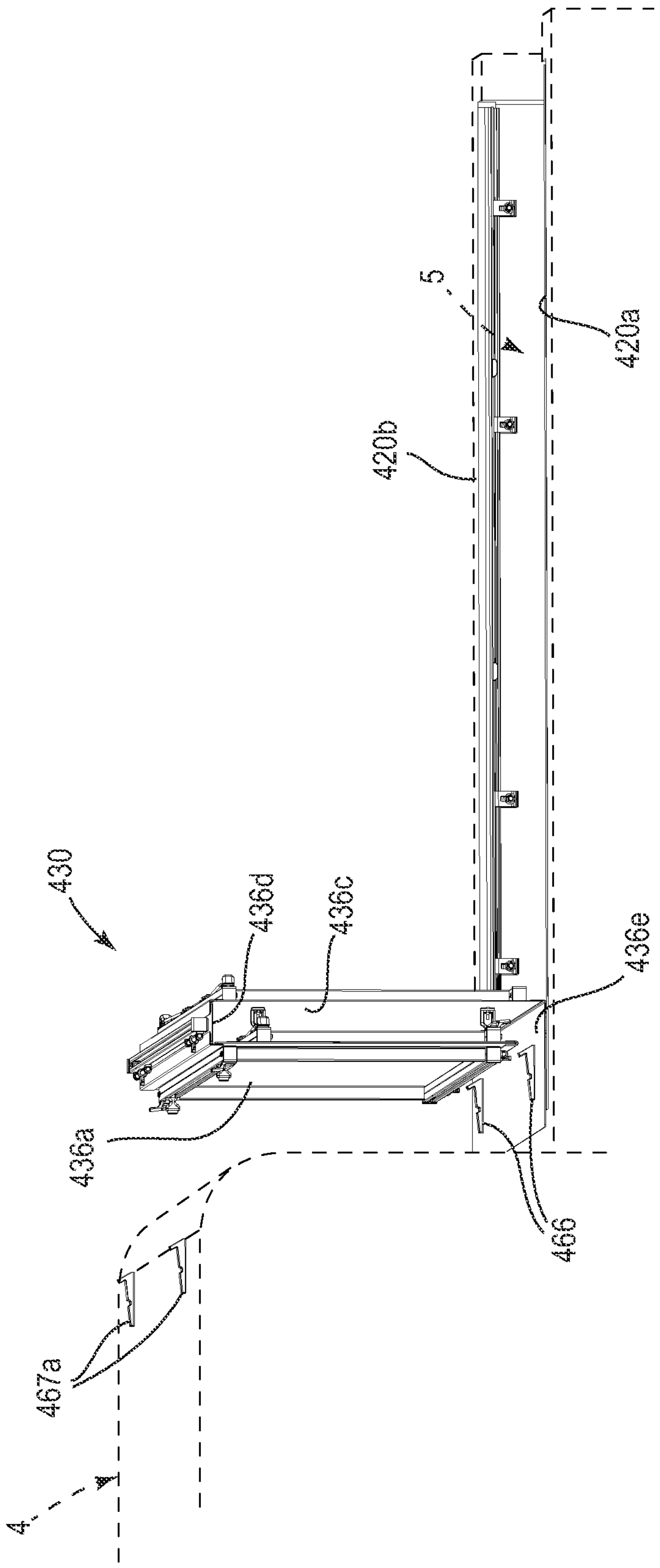
Figure 60A:
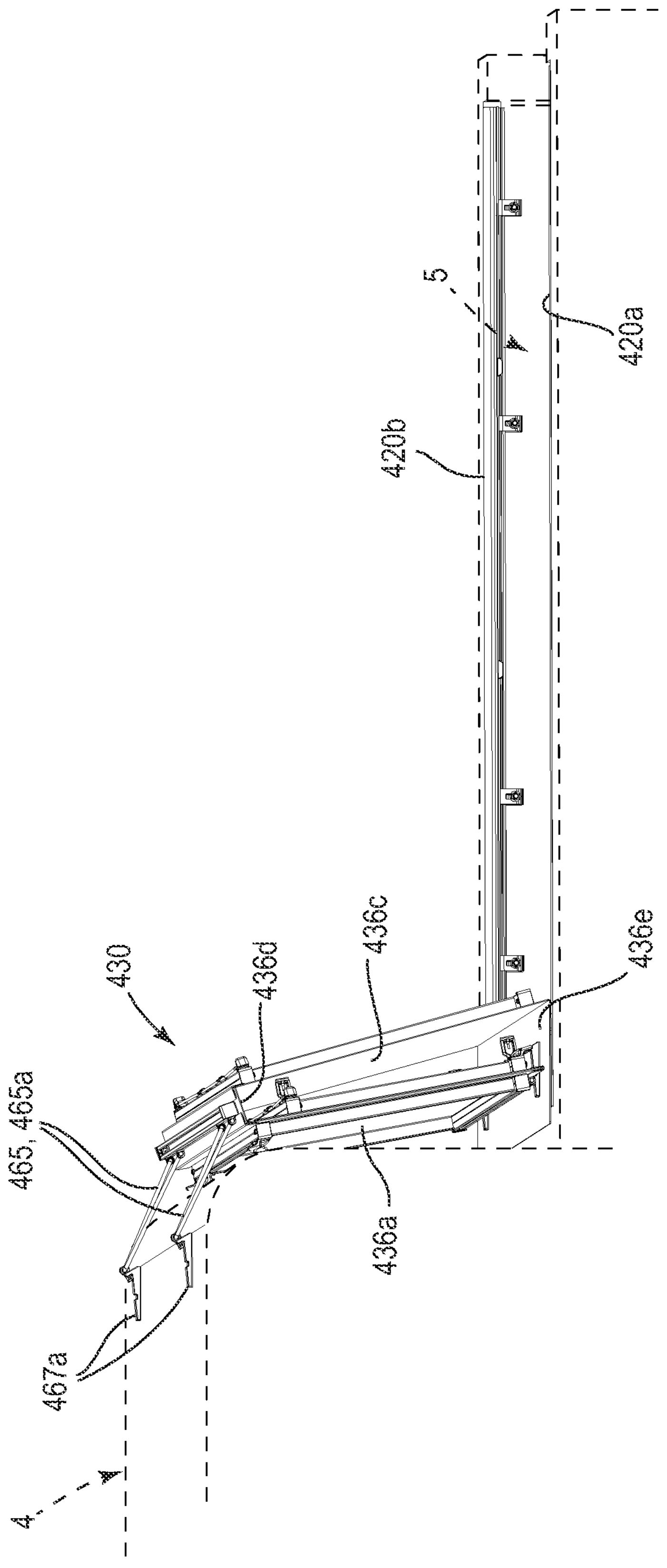
Figure 60B:
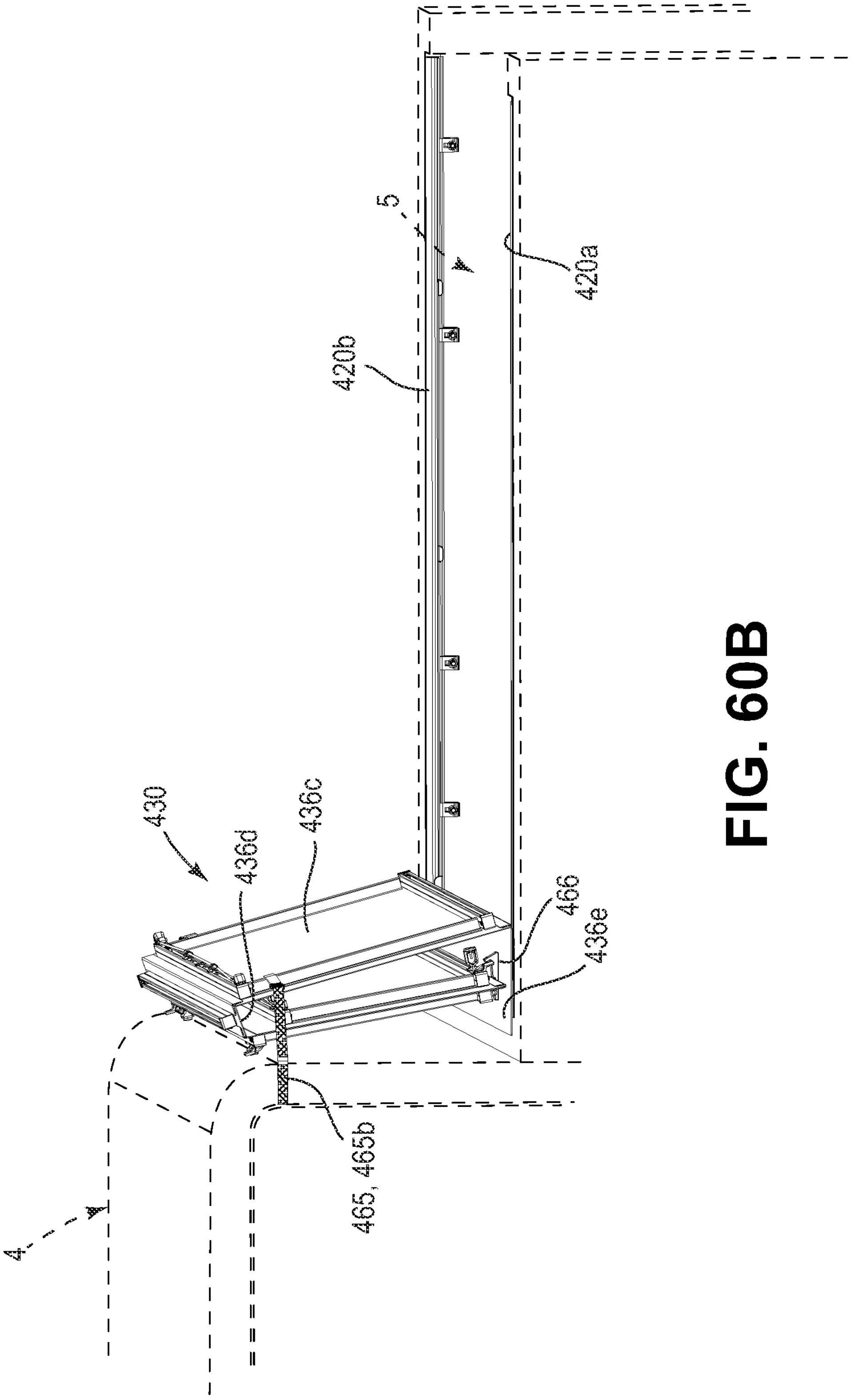
Figure 60C:
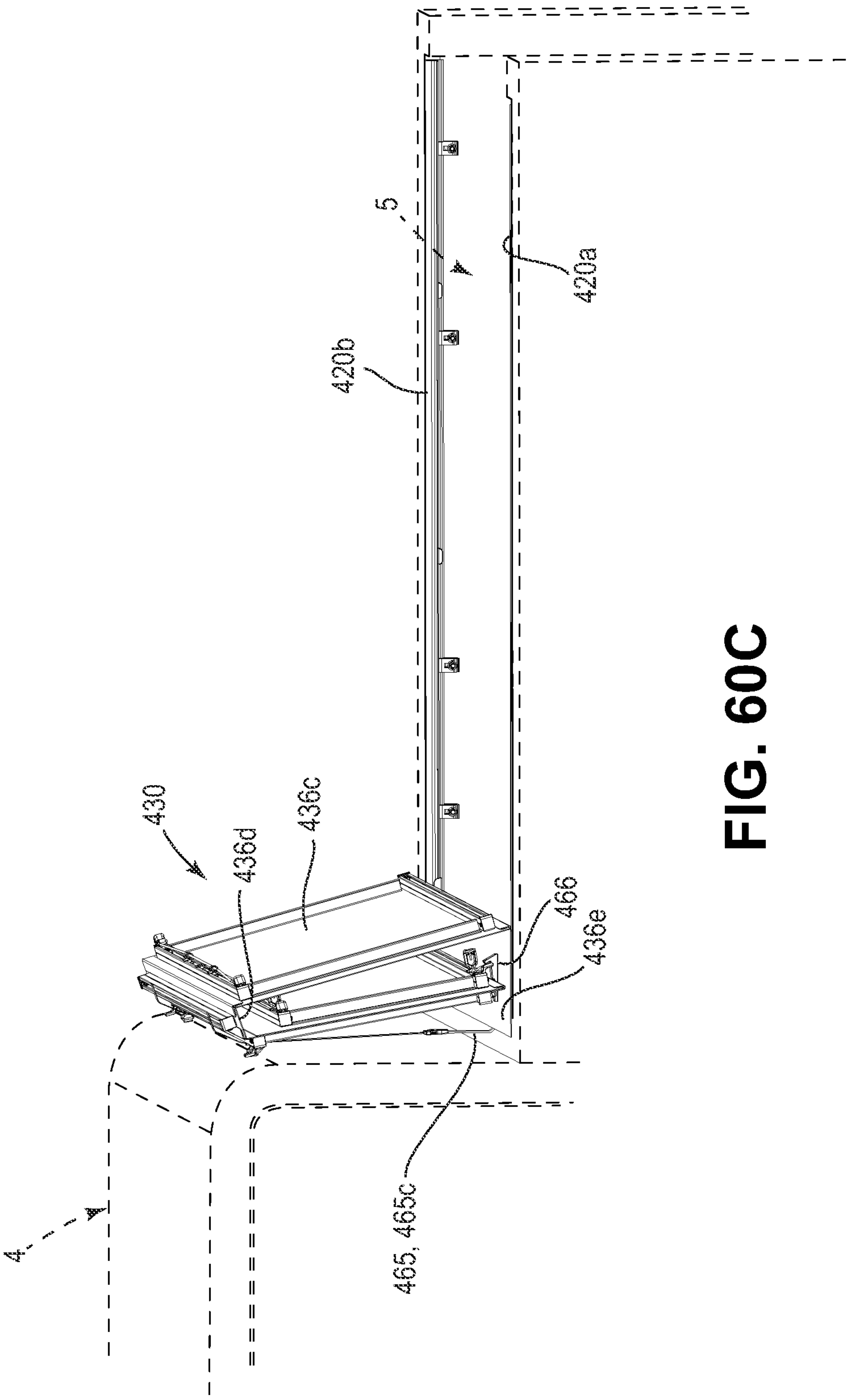
Figure 60D:
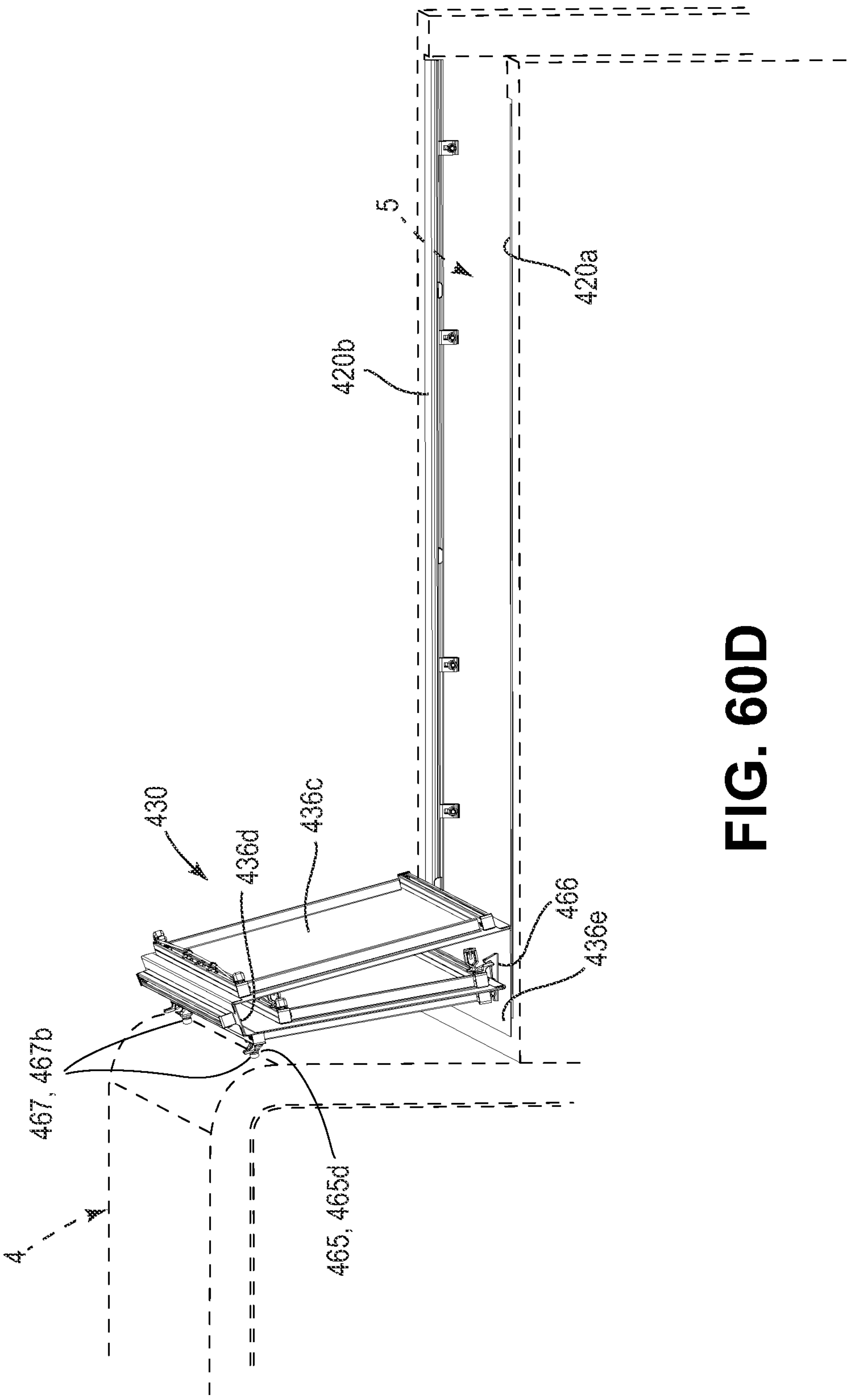
Figure 60E:
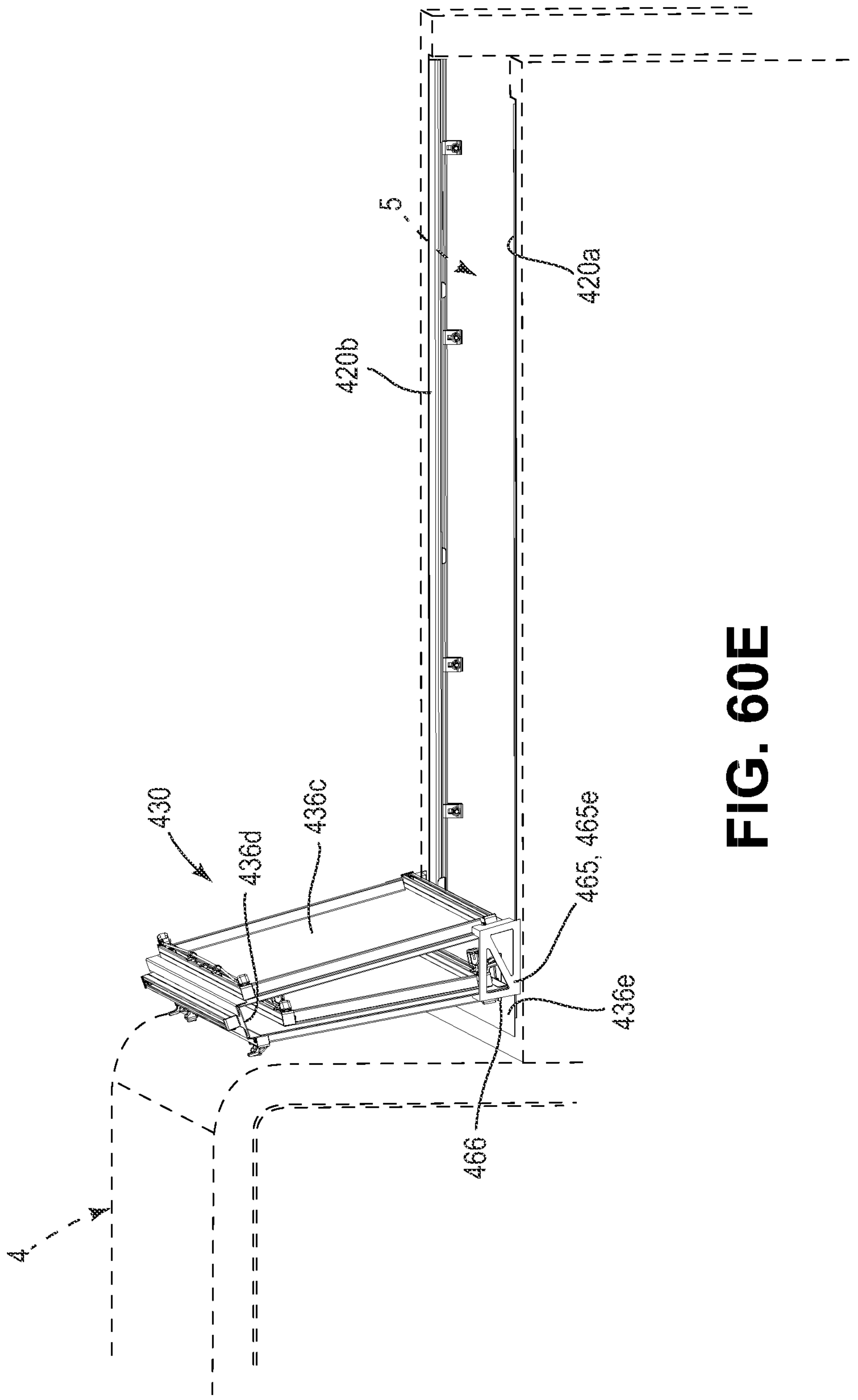
Figure 61A:
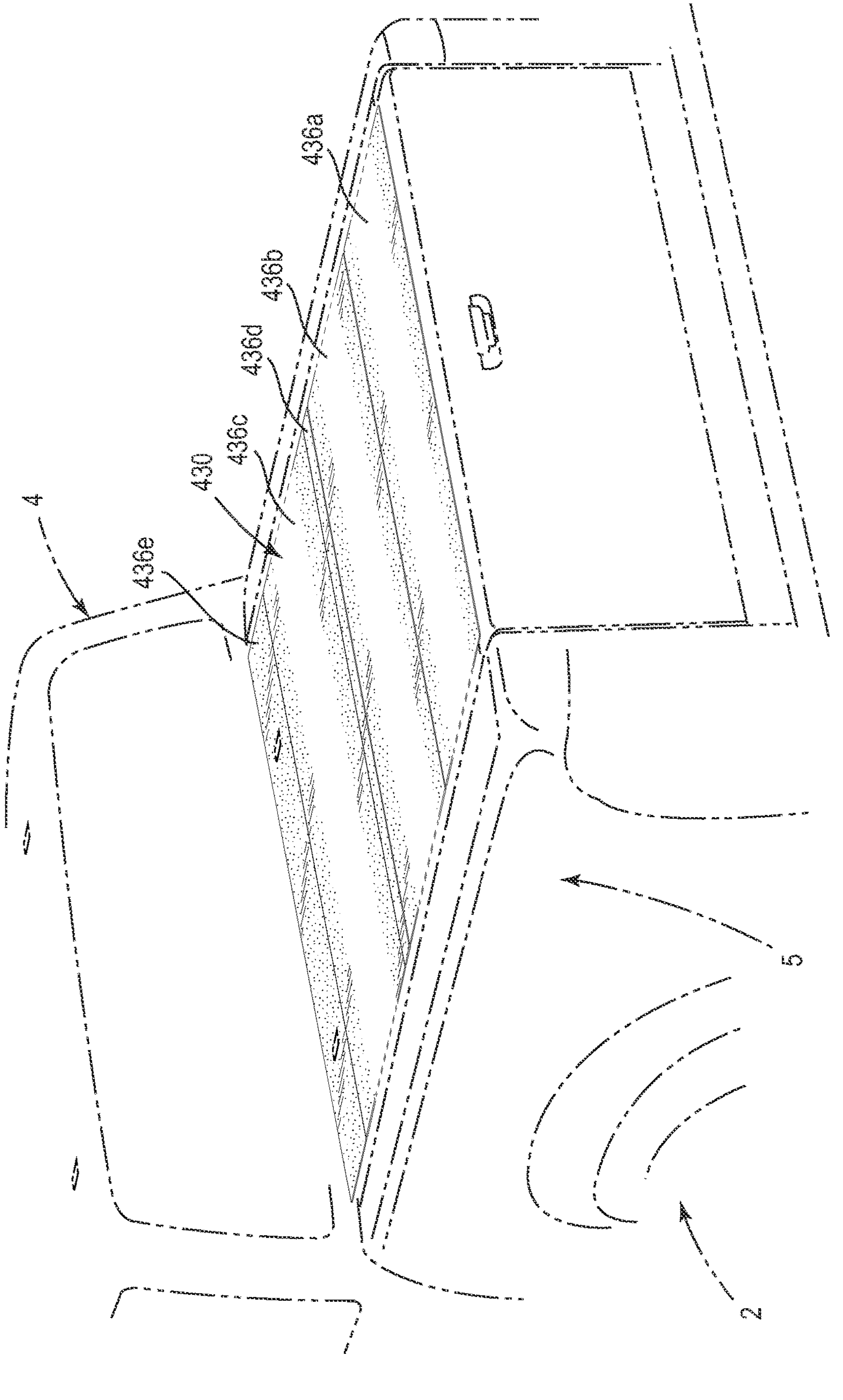
Figure 61B:
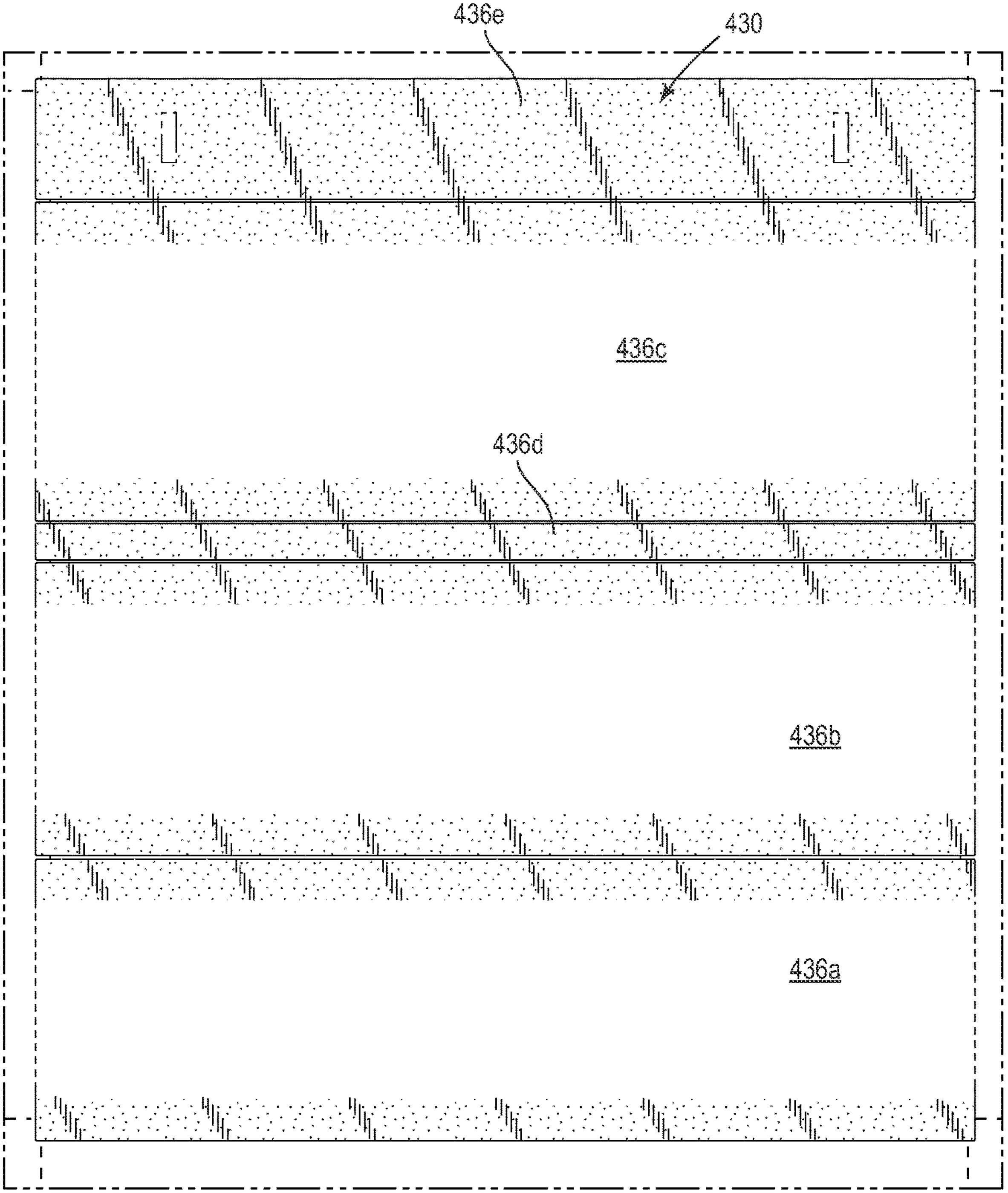
Figure 61C:
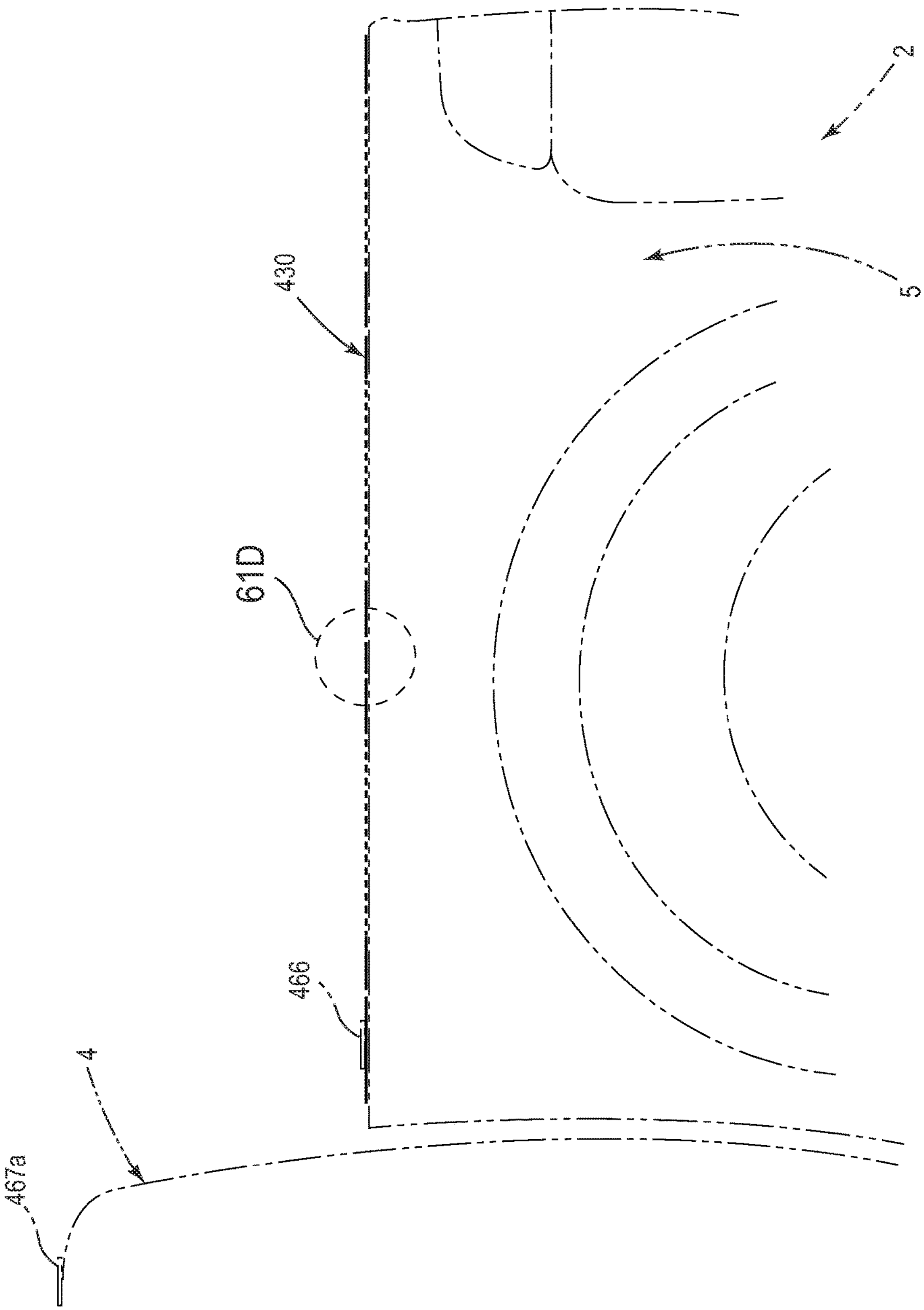
Figure 61D:
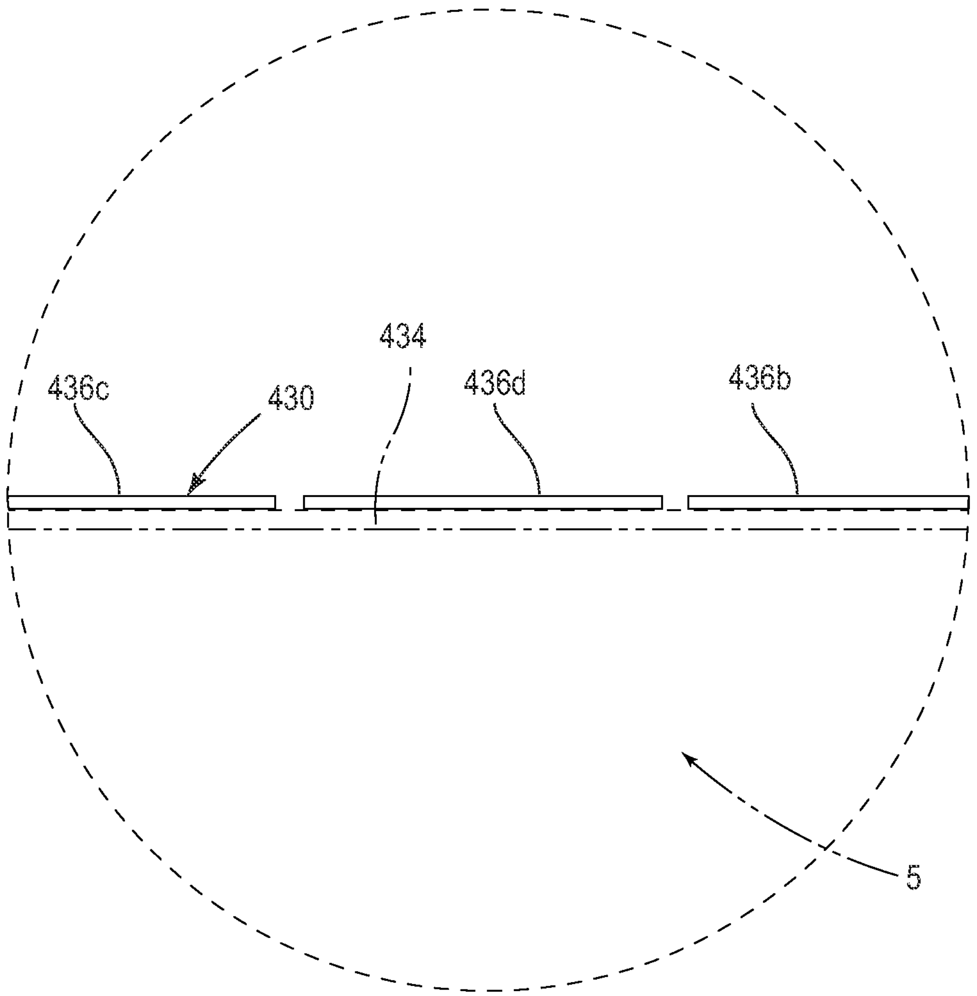
Figure 61E:
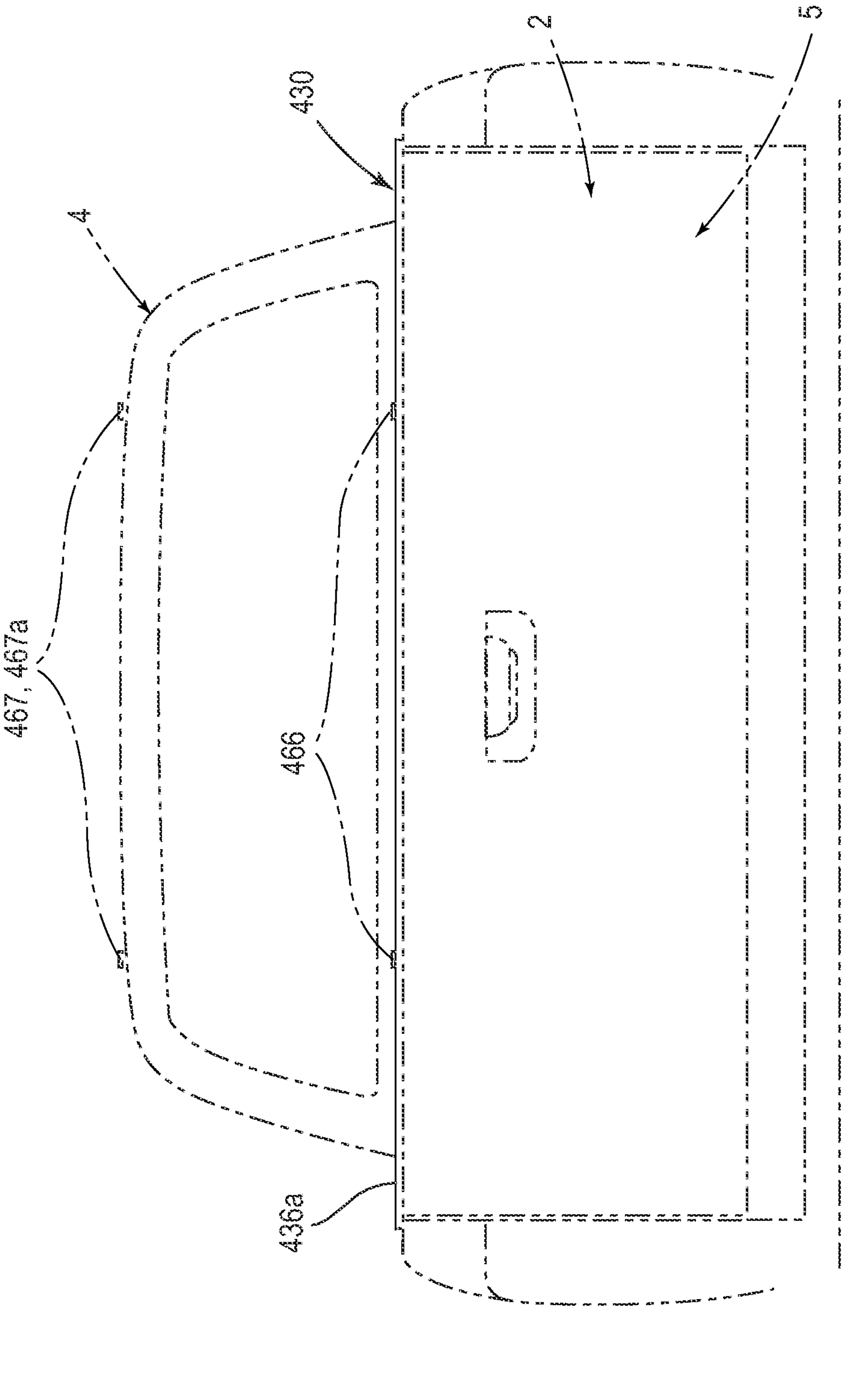

FIG. 49A is a rear perspective view of the folding tonneau cover apparatus of FIG. 40 similar to the view of FIG. 47A, but with the latches at the front of the front panel having been released as illustrated in FIGS. 47C and 48B and the front panel lifted and rotated rearward onto the rear and middle panels;

FIG. 49B is rear perspective view of the folding tonneau cover apparatus of FIG. 40 similar to the view of FIG. 43A, but with the latches at the front of the front panel having been released as illustrated in FIGS. 47C and 48B and the front panel lifted and rotated rearward onto the middle panel, with the rear panel remaining closed and secured with the latches at the rear of the rear panel being engaged with the side rails, but for clarity of illustration the perimeter seal is not shown;

FIG. 50 is a rear perspective view of the folding tonneau cover apparatus of FIG. 40 similar to the view of FIG. 49A, with the front panel stacked on the rear and middle panels, showing a storage strap pulled up and engaged with a strap bracket to the front panel, securing the folding tonneau cover in the folded up configuration, and showing the release cord at the rear of the middle panel, but for clarity of illustration the perimeter seal is not shown;

FIG. 51A is a rear perspective view of the folding tonneau cover apparatus of FIG. 40 similar to the view of FIG. 50, with the folding tonneau cover in the folded up configuration, and the release cord at the rear of the middle panel pulled to release the respective latches, but for clarity of illustration the perimeter seal is not completely shown;

FIG. 51B is partial section view as indicated on FIG. 51A showing the latch near the driver's side end portion of the rear support bow of the middle panel with the engaging portion of the latch retracted from the lip of the side rail and disengaged from the containment bracket;

FIG. 52 is a rear perspective view of the folding tonneau cover apparatus of FIG. 40, with the folding tonneau cover secured in the folded up configuration and the latches at the rear of the middle panel released as illustrated in FIGS. 51A and 51B, wherein the folding tonneau cover has been lifted up and rotated forward, whereby hooks near the front of the middle panel are disengaged from respective catches on the side rails and the folding tonneau cover is free to be removed from the side rails, but for clarity of illustration the perimeter seal is not shown;

FIG. 53A is a partial perspective detail view of a portion of the front panel of the folding tonneau cover apparatus of FIG. 40, showing the release mechanism with an electric actuator and a wireless receiver, and showing a remote transmitter, but for clarity of illustration the perimeter seal is not shown;

FIG. 53B is a rear perspective view of the folding tonneau cover apparatus of FIG. 40, showing the electric actuator having been activated by wireless communication between the remote transmitter and the wireless receiver, and the electric actuator having actuated the release mechanism to pull the release cords and retract the latches at the front of the front panel and disengage the latches from the side rails, but for clarity of illustration the perimeter seal is not shown;

FIG. 53C is a rear perspective view of the folding tonneau cover apparatus of FIG. 40, showing the folding tonneau cover secured in the folded up configuration similar to that of FIG. 50, except with the panels stacked onto the front panel similar to the view of FIG. 28B, and the latches at the front of the front panel disengaged from the side rails, wherein the folding tonneau cover has been lifted up and rotated rearward, whereby hooks near the rear of the front panel are disengaged from respective catches on the side rails and the folding tonneau cover is free to be removed from the side rails, but for clarity of illustration the perimeter seal is not shown;

FIG. 54 is a rear perspective view of a further alternate embodiment of folding tonneau cover apparatus having a folding cover assembly incorporating a cab panel onto which rear, middle, spacer, and front panels can fold, with the folding tonneau cover apparatus attached to a pickup truck which is shown in phantom, but for clarity of illustration the perimeter seal is not shown;

FIG. 55 is a bottom plan view of the folding tonneau cover apparatus of FIG. 54;

FIG. 56 is a partial section view of the rear portion of the folding tonneau cover apparatus of FIG. 54 as indicated on FIG. 55 and illustrating an edge guard at the rear portion of the rear panel;

FIG. 57 is a schematic illustration showing the general steps and configurations of the folding cover assembly of FIG. 54 as it is folded up;

FIG. 58 is a side perspective view from the driver's side of the folding tonneau cover apparatus of FIG. 54, showing a configuration in which the rear, middle, and spacer panels are folded onto the front panel and secured with storage straps, but for clarity of illustration the perimeter seal is not shown;

FIG. 59 is a side perspective view similar to that of FIG. 58, but showing a configuration in which the rear, middle, spacer, and front panels are folded onto the cab panel with the rear, middle, and front panels oriented generally vertically, but for clarity of illustration the perimeter seal is not shown;

FIG. 60A is a side perspective view similar to that of FIG. 58, but showing a configuration in which the rear, middle, spacer, and front panels are folded onto the cab panel with the rear, middle, and front panels oriented generally vertically and secured to the truck cab with a securing member comprising cab straps, but for clarity of illustration the perimeter seal is not shown;

FIG. 60B is a side perspective view similar to that of FIG. 58, but showing a configuration in which the rear, middle, spacer, and front panels are folded onto the cab panel with the rear, middle, and front panels oriented generally vertically and secured to the truck cab with a securing member comprising a side strap, but for clarity of illustration the perimeter seal is not shown;

FIG. 60C is a side perspective view similar to that of FIG. 58, but showing a configuration in which the rear, middle, spacer, and front panels are folded onto the cab panel with the rear, middle, and front panels oriented generally vertically and secured to the truck cab with a securing member comprising a cab panel strap, but for clarity of illustration the perimeter seal is not shown;

FIG. 60D is a side perspective view similar to that of FIG. 58, but showing a configuration in which the rear, middle, spacer, and front panels are folded onto the cab panel with the rear, middle, and front panels oriented generally vertically and secured to the truck cab with a securing member comprising a securing magnet, but for clarity of illustration the perimeter seal is not shown;

FIG. 60E is a side perspective view similar to that of FIG. 58, but showing a configuration in which the rear, middle, spacer, and front panels are folded onto the cab panel with the rear, middle, and front panels oriented generally vertically and secured to the truck cab with a securing member comprising a securing bracket, but for clarity of illustration the perimeter seal is not shown;

FIG. 61A is a rear perspective view of the folding cover assembly of FIG. 54 showing its ornamental design;

FIG. 61B is a top plan view of the folding cover assembly of FIG. 61A further showing its ornamental design;

FIG. 61C is a left side elevational view, which is a mirror image of the right side elevational view, of the folding cover assembly of FIG. 61A, further showing its ornamental design;

FIG. 61D is an enlarged view of a portion of the left side elevational view of the folding cover assembly that is encircled in FIG. 61C, and which is a mirror image of such an enlarged view thereof of a similar portion of the right side elevational view thereof showing its ornamental design; and FIG. 61E is a rear elevational view of the folding cover assembly of FIG. 61A showing its ornamental design.

DETAILED DESCRIPTION OF THE PREFERRED EMBODIMENTS

Herein, reference is made either to the "driver's side" or "passenger side" or to the "front" or to the "rear" of the folding tonneau cover apparatus or portions thereof in a manner that is consistent with the orientation of the folding tonneau cover apparatus when it is secured to a vehicle as envisioned, so that the "rear" of a folding tonneau cover apparatus or portion thereof will be consistent with what is seen when one is looking at the rear of such a vehicle when the folding tonneau cover apparatus or portion(s) thereof are attached to such a vehicle as herein envisioned, or such portion thereof which is closer to the rear. The "driver's side" refers to the side corresponding to the side of the vehicle typically used by the driver to operate the vehicle, and the "passenger side" is opposite the "driver's side". For clarity, the "length" of the folding tonneau cover apparatus, the folding cover assembly, the hinges, and the panels described herein, refers to the "front" to "rear" direction, since the pickup truck and the cargo box are typically longer in that direction. Similarly, "width" of the folding tonneau cover apparatus, the folding cover assembly, the hinges, and the panels described herein, refers to the "driver's side" to "passenger side" direction, since the pickup truck and the cargo box are typically shorter in that direction. However, these terminologies of convenience are not intended to be limiting; the folding tonneau cover apparatus could be shorter in the "length" direction than in the "width" direction, for example. For other items such as support bows and sidebars, "length" has the normal meaning, referring to the longer dimension or to the dimension along an extruded shape, for example; any potential confusion in terminology can be eliminated by examination of the various Figures in the accompanying drawings.

Figure 1:
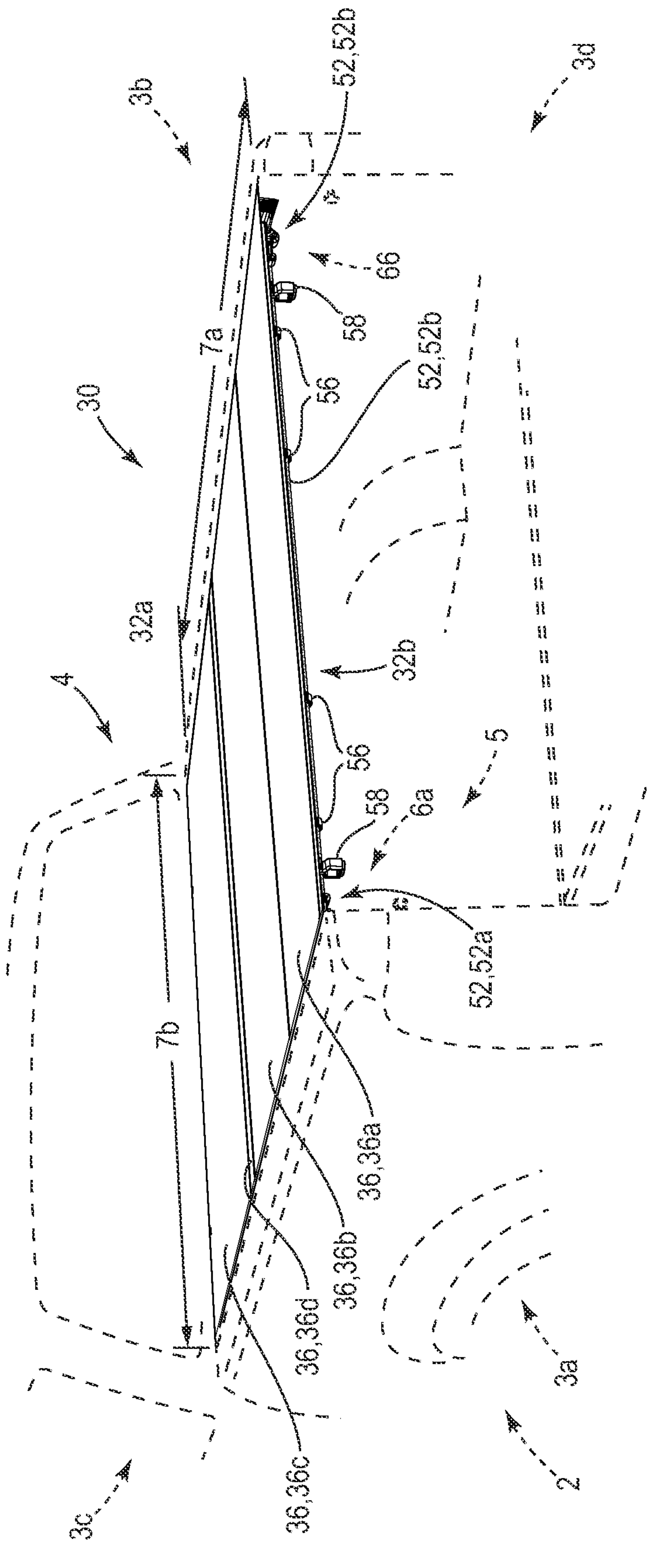
FIG. 1 is a rear perspective view of a folding tonneau cover apparatus, including a folding cover assembly and a support frame assembly, and shown attached to a pickup truck which is shown in phantom.

Referring now to the drawings, the folding tonneau cover apparatus 10 is attachable to sidewalls 6*a*, 6*b* of a cargo box 5, such as the cargo box of a truck or pickup truck 2. In FIG. 1, folding tonneau cover apparatus 10 is shown in a typical application covering the cargo box 5 of a pickup truck 2. The pickup truck 2 and the cargo box 5 and the sidewalls 6*a* and 6*b* and the front wall 6*c* at the forward end of the cargo box 5 and the tailgate 6*d* at the rear end of the cargo box 5 are not a part of the present invention, but are shown as environment to illustrate a typical application and function of the folding tonneau cover apparatus 10 in covering a cargo box 5, which has a length 7*a* and a width 7*b*. The perimeter of the cargo box includes the forward end or front wall 6*c*, the opposing sidewalls 6*a* and 6*b*, and the rearward end or tailgate 6*d*. As further illustrated in FIGS. 2A-3B, the folding tonneau cover apparatus 10 includes a folding tonneau cover assembly, tonneau cover assembly or cover assembly 30 and a support frame assembly 18, including side rails or rails 20*a* and 20*b*. In preferred embodiments, side rails 20*a* and 20*b* are secured to sidewalls 6*a* and 6*b* with clamps 14. In preferred embodiments, the folding cover assembly 30 is configured to be opened to an open position and closed to a closed position, and easily removed and reinstalled by a driver or other operator 8 (FIG. 12), as needed. The side rails 20*a* and 20*b* are constructed and arranged to facilitate securement of the folding cover assembly 30 to the side rails 20*a* and 20*b*. In some embodiments, the side rails 20*a* and 20*b* have a side rail lip 24 and a side rail engagement portion 22*a*. In this example, there are eight clamps 14 arranged to hold the side rails 20*a* and 20*b* to the sidewalls 6*a*, 6*b* of the pickup truck 2, but other numbers of clamps 14 can be used. In some embodiments, the clamps include an outer member 16*a*, an inner member 16*b*, a clamp engagement portion 16*c*, and a fastener assembly 16*d*; the fastener assembly can, for example, include a bolt 16*e*, a washer 16*f* and a nut 16*g* as illustrated.

Figure 2A:
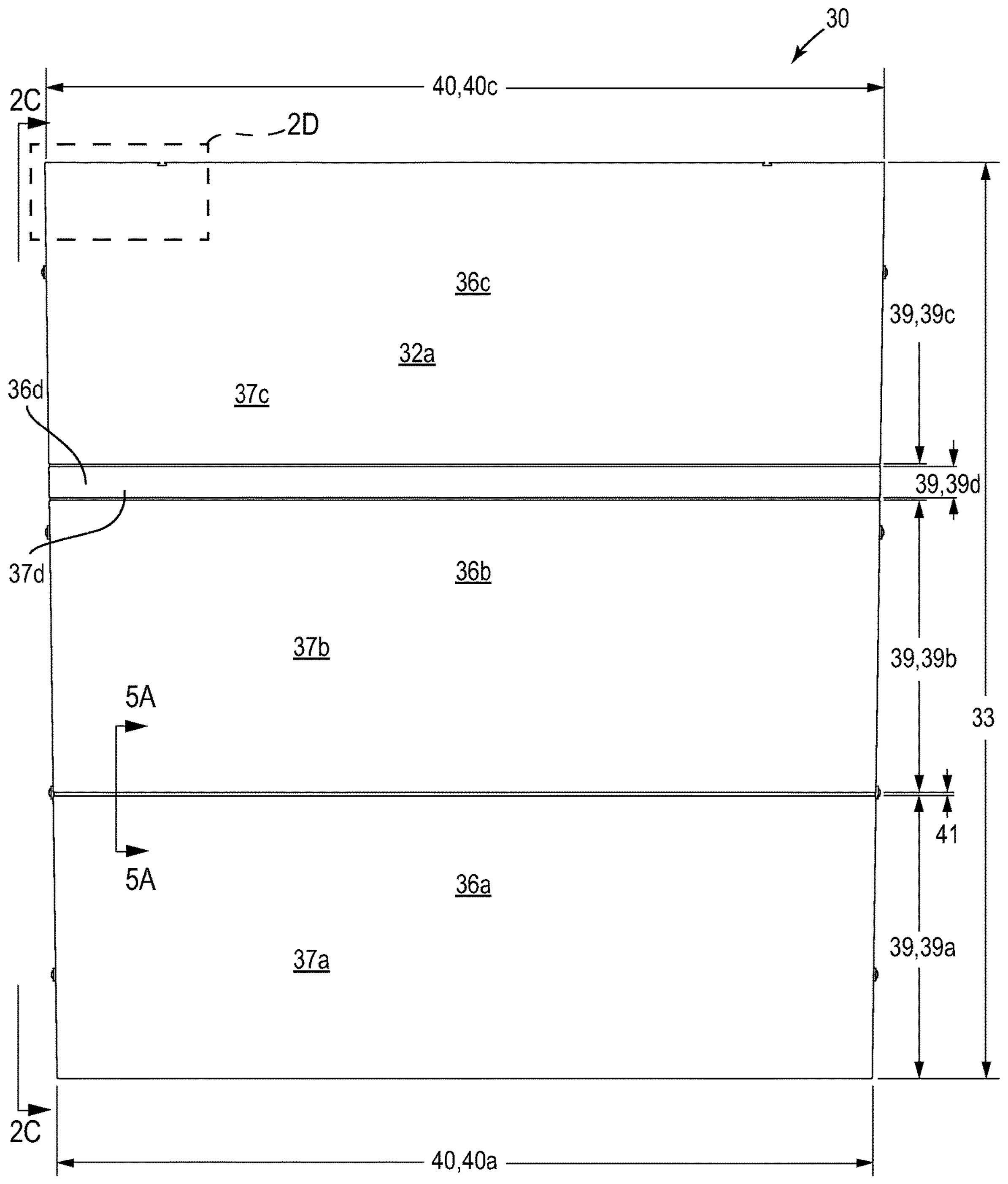
FIG. 2A is a top plan view of the folding tonneau cover apparatus of FIG. 1, with a cut-out illustrating a latch engaging portion engaging with a containment bracket.

Referring again to FIGS. 2A-2C, the folding tonneau cover apparatus 10 of FIG. 1 is shown; in these views, the truck 2 and the cargo box 5 are not shown. FIG. 2A shows a top view of the folding tonneau cover apparatus 10 of FIG. 1. The top 32*a* of the folding cover assembly 30 is shown. The folding cover assembly 30 includes panels 36; in this example, panels 36 include rear panel 36*a*, middle panel 36*b*, front panel 36*c*, and spacer panel or hinge panel 36*d*. For ease of discussion, panels 36 are specifically referenced herein as 36*a*-36*d*, and non-specifically or collectively referenced as 36. The folding cover assembly 30 includes a plurality of panels 36, such as two to 8 panels 36; for example, 6 panels 36 could be used, including 4 "longer" panels (similar to panels 36*a*-36*c* shown herein) and 2 "shorter" panels (similar to panels 36*d* shown herein). While a smaller or a larger number of panels 36 can be used, we have found that the configuration illustrated herein provides a good trade-off of convenient folded configuration vs. complexity. As shown in FIG. 2A, and also as further described herein with respect to FIGS. 19A-19E, the length 39 of each of the panels 36*a*-36*d* is indicated as 39*a*-39*d*, respectively. In this example, the spacer panel 36*d* has a substantially smaller length 39*d* than the other panels, as will be further described herein. The length 39*d* of the spacer panel 36*d* is preferably no greater than about one-third of the length 39*a*-39*c* of the other panels 36*a*-36*c*. Panels 36*a*-36*d* can have similar length 39, or the length of some or all of panels 36*a*-36*d* can differ. The width 40 of each of the panels 36*a*-36*d* is indicated as 40*a*-40*d*, respectively. Panels 36*a*-36*d* can have the same width 40, or the width of some or all of panels 36*a*-36*d* can differ. The side angle 42 of each of the panels 36*a*-36*d* is indicated as 42*a*-42*d*, respectively. Panels 36*a*-36*d* can have the same side angle 42, or the side angle 42 of some or all of panels 36*a*-36*d* can differ. Alternative configurations of folding tonneau covers 30 appropriate for covering the cargo box 5 of various models of pickup truck 2 are further described below. Each panel 36 has a top surface 37 and a bottom surface or underside 38; panel 36*a* has a top surface 37*a* and a bottom surface or underside 38*a*, panel 36*b* has a top surface 37*b* and a bottom surface or underside 38*b*, panel 36*c* has a top surface 37*c* and a bottom surface or underside 38*c*, panel 36*d* has a top surface 37*d* and a bottom surface or underside 38*d*.

Figure 2B:
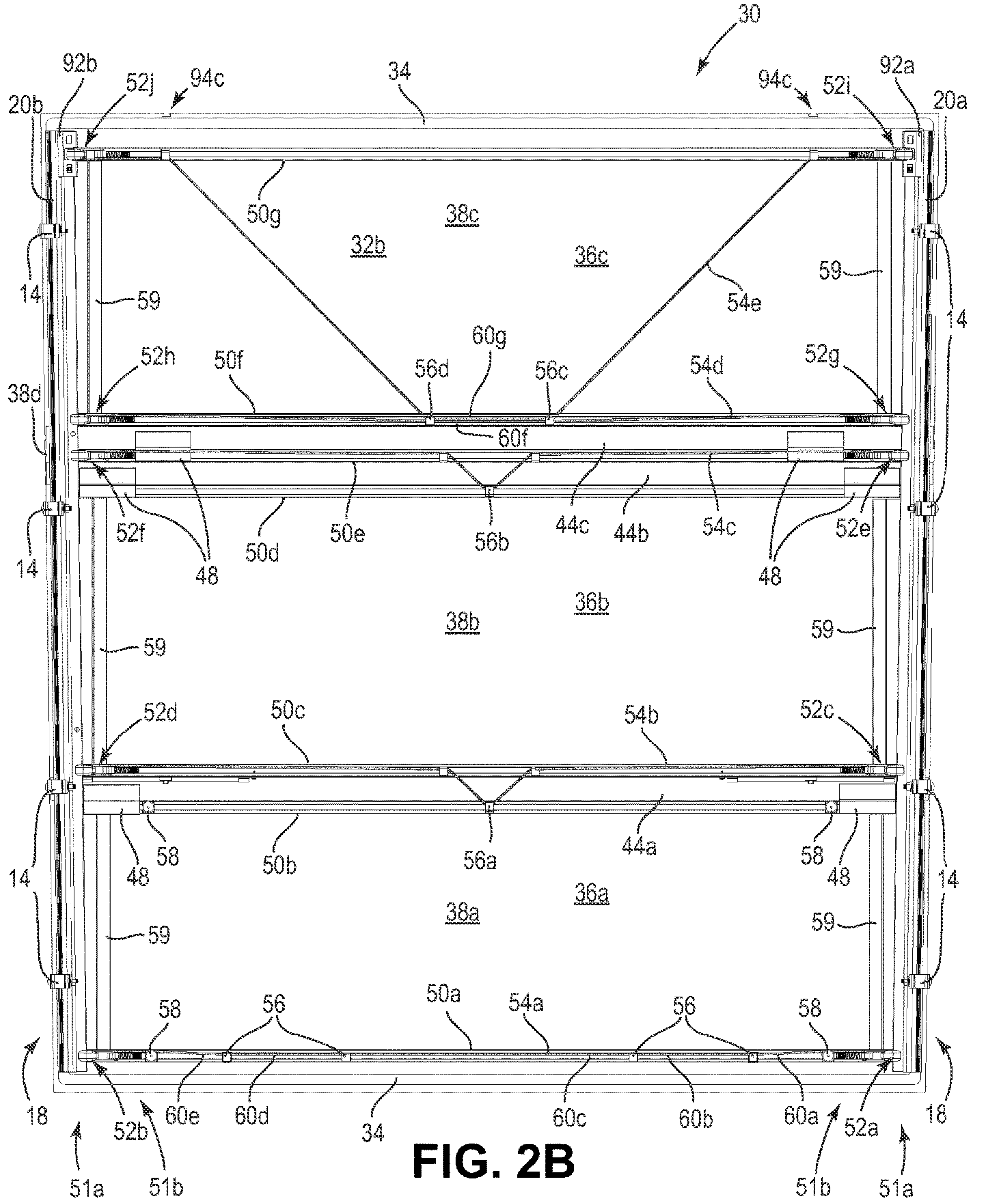
FIG. 2B is a bottom plan view of the folding tonneau cover apparatus of FIG. 1.

FIG. 2B shows a bottom view of the folding tonneau cover apparatus 10. Visible in this view are hinges or flexible hinges 44, which are situated between adjacent panels 36 and adjoin adjacent panels 36. For ease of discussion, hinges 44 are specifically referenced herein as 44*a*-44*c*, and non-specifically or collectively referenced as 44. Specifically, situated between the rear panel 36*a* and the middle panel 36*b* is hinge 44*a*. Similarly, situated between the middle panel 36*b* and the spacer panel 36*d* is hinge 44*b*, and situated between the spacer panel 36*d* and the front panel 36*c* is hinge 44*c*. Hinges 44 allow the folding cover assembly 30 to be folded up and will be more fully described below. Optional hinge guards 48 are shown; hinge guards 48 provide additional support to the hinges 44 when the folding cover assembly 30 is unfolded and in place covering the cargo box 5. Hinge guards 48 also provide protection against slicing through the hinges 44; further description of the hinge guards 48 is provided below. Support bows 50 are attached to the panels 36 to provide additional support and rigidity to the panels 36, and also provide a structure for mounting of various other components as described in detail later herein. For ease of discussion, support bows 50 are specifically referenced herein as 50*a*-50*g*, and non-specifically or collectively referenced as 50. The folding tonneau cover apparatus 10 is removably secured to the support frame assembly 18 by securing apparatus 51*a*. Preferably, securing apparatus 51*a* includes at least one locking member 51*b* which is engageable and disengageable from the support frame assembly 18. Preferably, the locking member 51*b* includes latches 52 which are located at the support bows as shown and secure the folding cover assembly 30 to the side rails 20*a* and 20*b*. Release cords 54 are attached to the latches 52. For ease of discussion, support bows latches 52 are specifically referenced herein as 52*a*-52*j*, and non-specifically or collectively referenced as 52. (Similarly, latches included in other embodiments described herein are non-specifically or collectively referenced as 152, 252, 352, and specifically referenced herein as 152*a*, 252*a*, 352*a*, etc., as indicated.) Also for ease of discussion, release cords 54 are specifically referenced herein as 54*a*-54*e*, and non-specifically or collectively referenced as 54. The release cords 54 pass through cord guides 56 which are attached to support bows 50 as shown. The cord guides are non-specifically or collectively referenced herein as 56, but cord guides 56*a*-56*d* are specifically referenced herein to facilitate the detailed description herein. Standoffs 58 are shown, and will be described in further detail below. Sidebars 59 are attached to panels 36*a*, 36*b*, and 36*c*, near each side of each panel 36 to further support the panels 36. Perimeter seal 34 is located on the bottom 32*b* of the folding cover assembly 30 and is arranged to seal against top of the perimeter of the cargo box 5 at the sidewalls 6*a* and 6*b* and the front wall 6*c* and the tailgate 6*d* of the cargo box 5 as shown; some portions of perimeter seal 34 are behind side rails 20*a* and 20*b* and not visible FIG. 2B. The perimeter seal 34 is further described herein.

The support bows or transverse frame members or channels 50 provide additional support for the panels 36. In this embodiment, the panels each have two support bows 50, one located near each of the front and rear ends of each panel 36, except for the spacer panel 36*d*, which has only a single support bow 50. In this embodiment, there are latches 52 mounted in pairs, one of each pair mounted near each end of each of the support bows 50*a*, 50*c*, 50*e*, 50*f*, and 50*g* as shown. As further described below, the latches 52 engage the side rails 20*a* and 20*b* to secure the folding cover assembly 30, and can slide a short distance towards or away from the side rails 20*a* and 20*b* to engage or release the folding cover assembly 30 or selected panels 36 or portions thereof from the side rails 20*a* and 20*b* as further described below. Note that the support bows 50 near the front end of the rear panel 36*a* and the front end of the middle panel 36*b* do not have associated latches 52 in this embodiment. In this embodiment, there are five latch release cords or release cords or cords 54, each of which are connected to opposing pairs of latches 52 which secure the panels 36 to the side rails 20*a* and 20*b*. The release cords 54 preferably pass through cord guides 56 which are mounted to the support bows 50; the release cords 54 can slide within the cord guides 56. The release cords 54 generally extend from the latches 52 along the support bows 50, except that some of the release cords 54 pass through cord guides 56 which are mounted to an adjacent support bow 50 on an adjacent panel 36, forming a "V" or "elongated V" configuration extending between adjacent support bows 50, as shown. This configuration in which a release cord 54 extends between adjacent support bows 50 on adjacent panels 36 allows the lifting and rotation of one panel 36 to cause the release of latches 52 on an adjacent panel 36; in this way, lifting and rotating the rear panel 36*a* can release latches 52 on the middle panel 36*b*, for example, and lifting and rotating the middle panel 36*b* can release latches 52 on the spacer panel 36*d*, for example, as further described below. In this way, manual actuation of each pair of latches 52 by a driver or operator is not needed, facilitating the easy opening of the folding cover assembly 30. Also seen on FIG. 2B are optional hinge guards 48; the optional hinge guards 48 are preferably attached to the support bow 50 adjacent to and to the rear of the hinges 44. The hinge guards 48 are shown attached to the support bows 50*b*, 50*d*, and 50*e*. The hinge guards 48 provide support for the hinges 44, such as to support weight or pressure applied to the hinges 44, the panels 36, or other portions of the folding cover assembly 30. The hinge guards 48 can also provide protection against entry into the cargo box 5 by cutting through a hinge 44. The preferred hinge guards 48 are further described below.

Figure 2C:
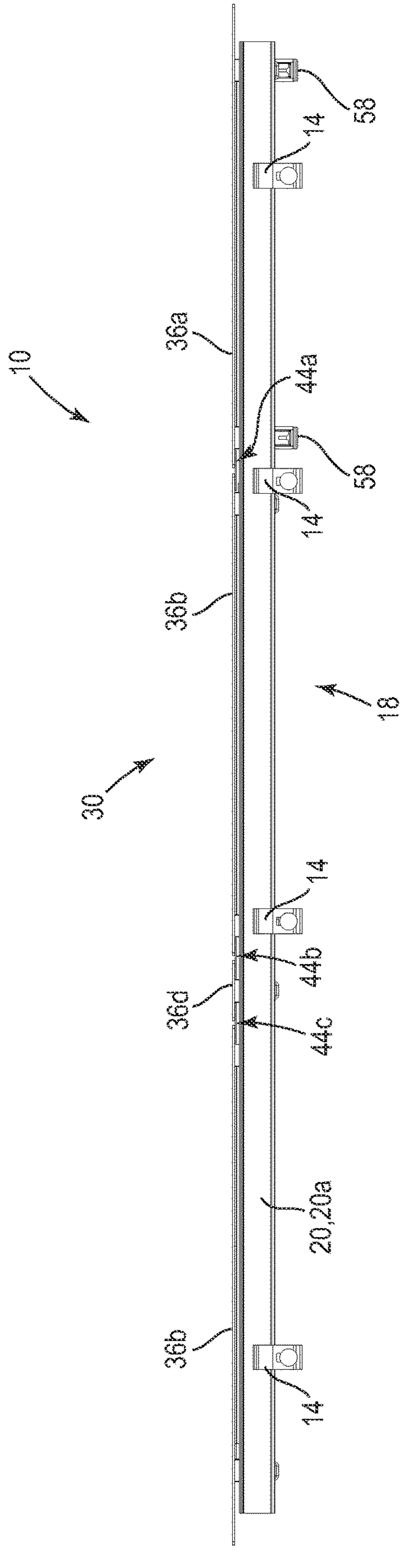
FIG. 2C is a side view of the folding tonneau cover apparatus of FIG. 1 as viewed from line 2C-2C as indicated on FIG. 2A from the driver's side, with the driver's-side side rail shown in phantom, but for clarity of illustration the perimeter seal is not shown.

FIG. 2C shows a side view of the folding tonneau cover apparatus 10, viewed from the driver's side. As illustrated in FIGS. 2B and 2C, the clamps 14 secure the side rails 20*a* and 20*b* to the sidewalls 6*a* and 6*b* of the cargo box 5.

Figure 2D:
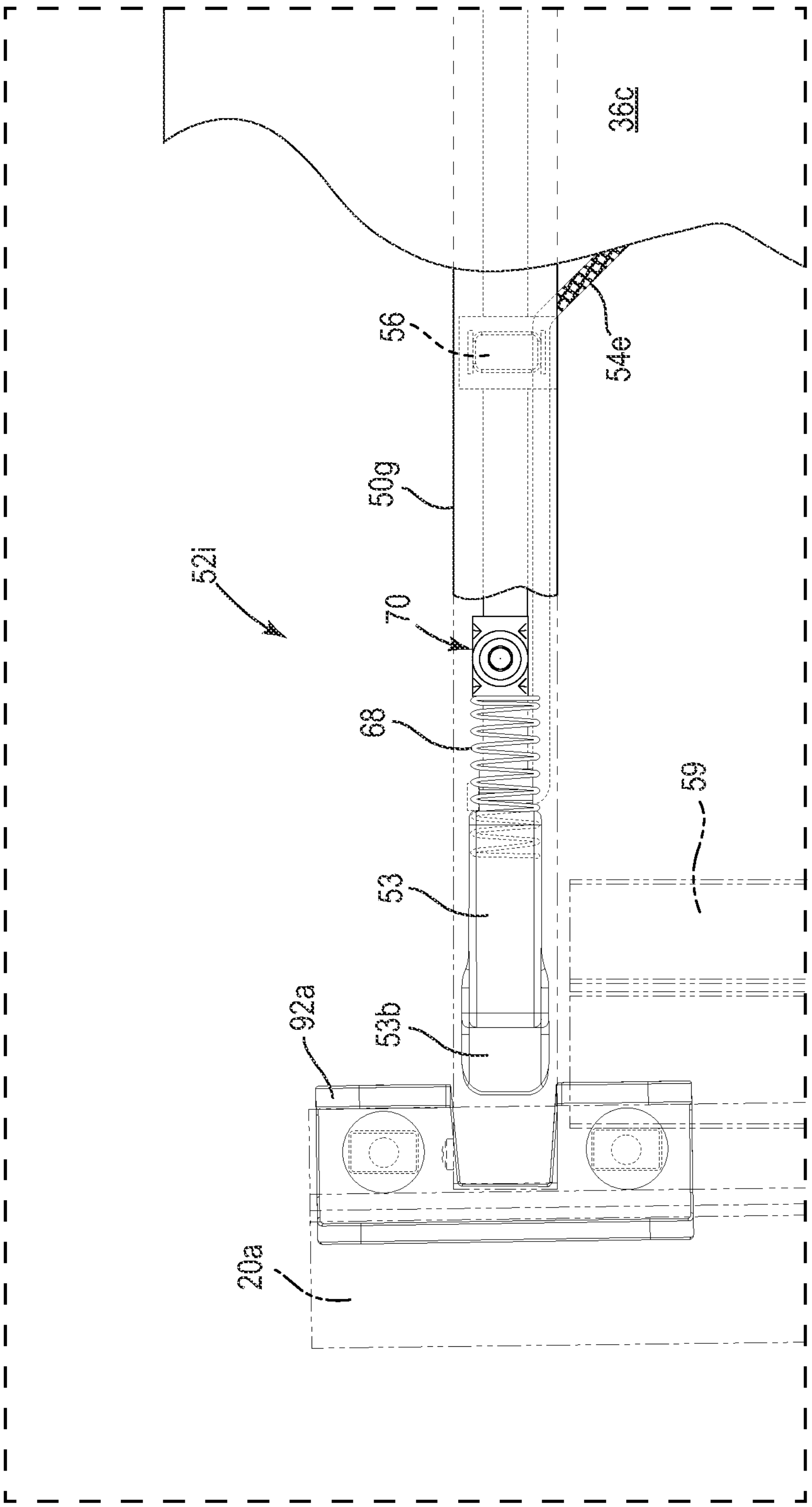
FIG. 2D is a detail view of a portion of the folding tonneau cover apparatus as indicated on FIG. 2A, illustrating the engaging portion retracted from the containment bracket and the side rail.
Figure 2E:
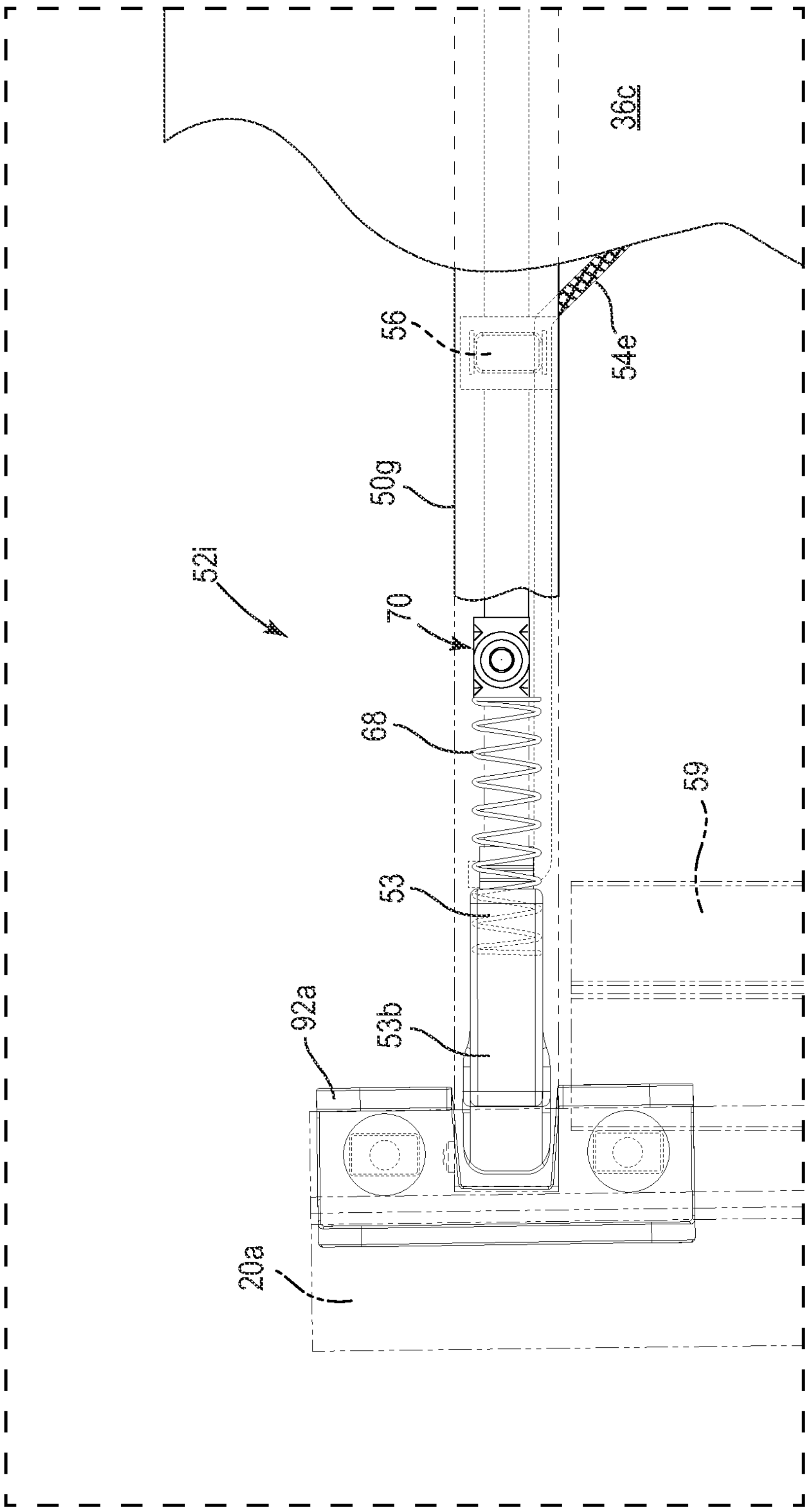
FIG. 2E is a detail view of a portion of the folding tonneau cover apparatus similar to the view of FIG. 2D, but illustrating the engaging portion engaging with the containment bracket and the side rail.

FIGS. 2D and 2E further illustrate the structure and function of the containment bracket 92 (in this example, specifically containment bracket 92*a*) which contains the engaging portion 53*b* of the latch 52. In FIG. 2E, the engaging portion 53*b* is engaged under the side rail 20*a* and is contained by the containment bracket 92*a* so that it cannot slide frontwards or rearwards along the side rail 20*a*. The spring 68 is in the extended configuration, urging the latch slide 53 outwards towards the side rail 20*a*. In FIG. 2D, the release cord 54*e* has been pulled, retracting the latch slide 53 and compressing the spring 68, and disengaging the engaging portion 53*b* from the side rail 20*a* and the containment bracket 92*a*, releasing the latch 52.

Figure 3A:
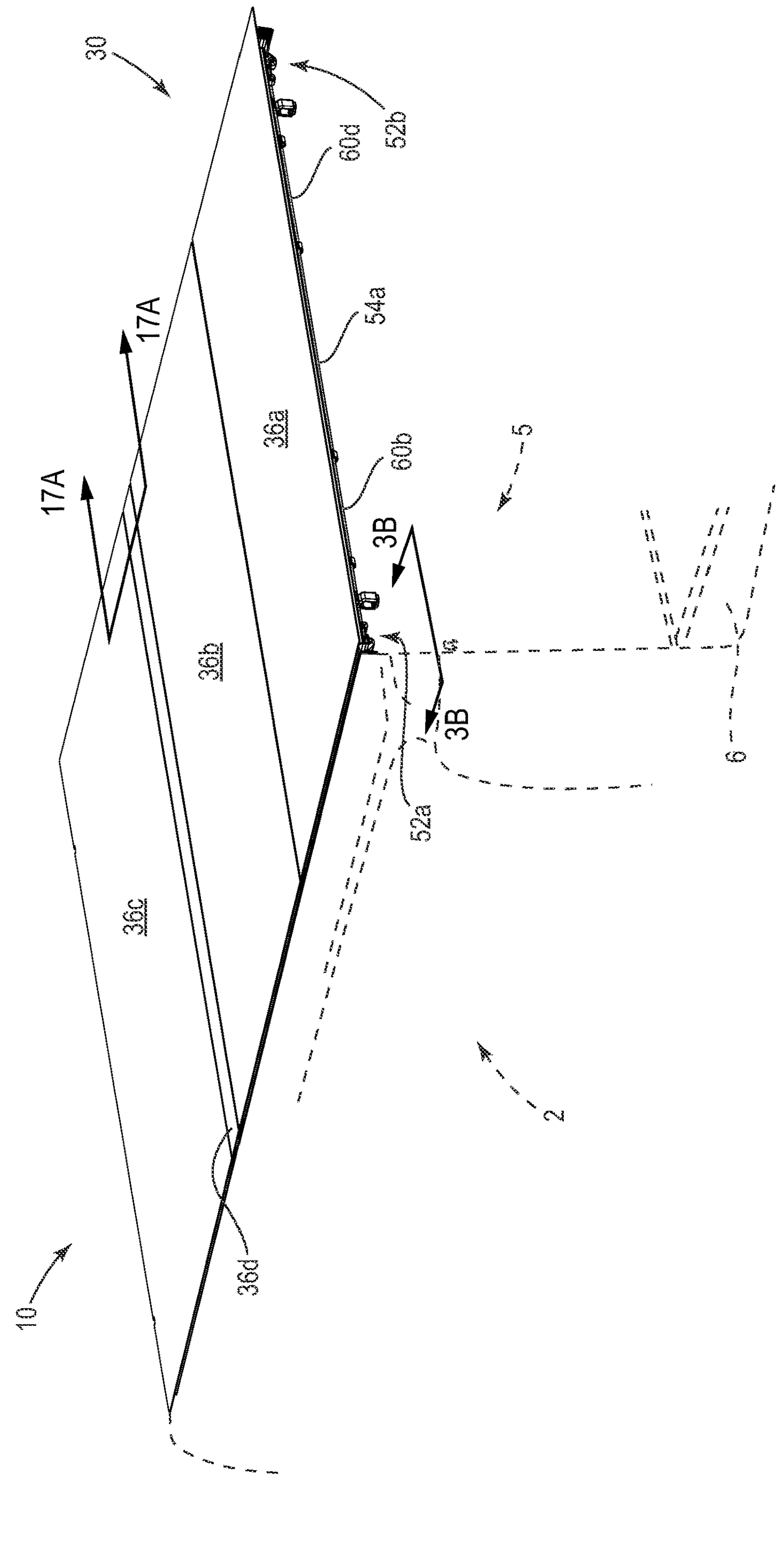
FIG. 3A is a rear perspective view of the folding tonneau cover apparatus of FIG. 1, illustrating additional details.
Figure 3B:
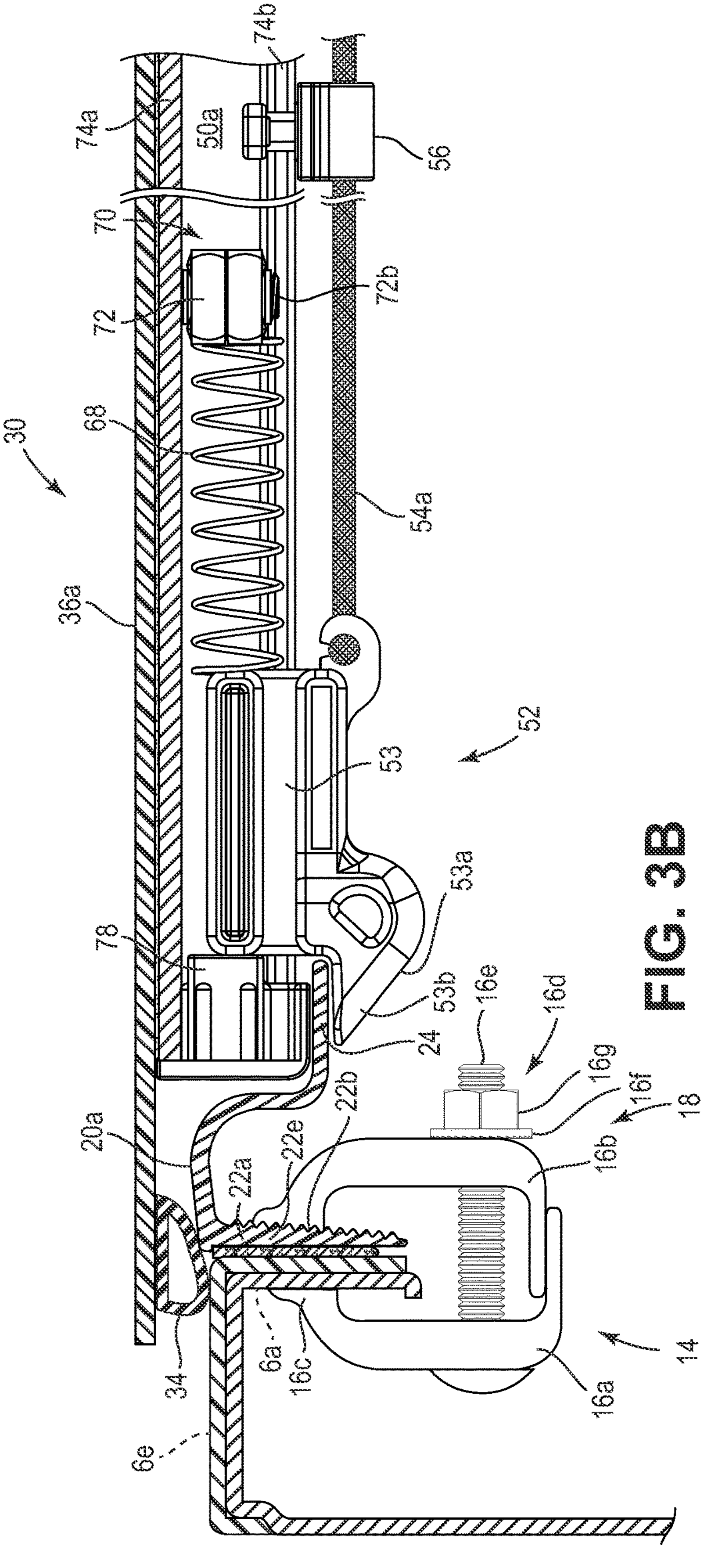
FIG. 3B is a partial section view as indicated on FIG. 3A illustrating the engaging portion of one of the latches on the rear support bow of the rear panel engaged to the lip of the side rail and the side rail clamped to the sidewall of the pickup truck.

Referring now to FIGS. 3A and 3B, the release cord 54*a* near the rear end of the rear panel 36*a* passes through four cord guides 56; these four cord guides 56, together with the two latches 52 to which the ends of the release cord 54*a* is attached, define five contiguous cord segments 60*a* through 60*e* (FIG. 3A). FIG. 3B is an enlarged partial section view of the driver's side end portion of the support bow 50*a* as indicated on FIG. 3A. The cord guides 56 are preferably molded products made of a strong polymer such as Nylon and may be reinforced with fiberglass or other embedded material to strengthen the polymer. In alternate embodiments, the cord guides 56 can made of polymeric, metallic or ceramic materials using three-D printing methods or three-D etching methods or other additive or subtractive machining process. A standoff 58 can be seen in FIG. 3A, and will be described in more detail later.

As seen in FIG. 3B, the latch 52 includes latch slide 53 having a engaging portion 53*b* which extends forward to engage the lip 24 of the side rail 20*a*, so as to secure the respective panel 30 to the side rail 20*a*. The latch slide 53 preferably includes a stiff polymer, composite, or metal, although other materials and combinations can be used. Preferably, the latch slide 53 includes fiberglass-reinforced nylon. The latch slide 53 is biased by a biasing member or spring 68 towards the side rail 20*a* so that the engaging portion 53*b* engages the side rail 20*a* to form a secured configuration in which the respective panel 30 is restricted from being lifted up from the cargo box 5; in this example, the spring 68 is a compression spring, but an extension spring, or an elastic element, or other known elements could alternatively be used to bias the latch slide 53 towards the side rail 20*a* so that the engaging portion 53*b* engages the side rail 20*a* so that the latch 52 is in the secured configuration. In this embodiment, the spring 68 is held between the latch slide 53 and a spring retainer 70. In this example, the spring retainer 70 includes square nuts 72*a* and a retainer bolt 72*b*; in assembly, the spring retainer 70 can be inserted into the support bow 50*a* and by rotating the retainer bolt 72*b* with respect to the square nuts 72*a*, the upper end of the retainer bolt 72*b* presses against the bow top portion 74*a* of the support bow 50*a* while the square nuts press against the bow bottom portion 74*b* of the support bow 50*a*, fixing the spring retainer 70 in the desired location in the support bow 50*a*. The side rails 20*a* and 20*b* preferably include extruded metal, and have an side rail engagement portion 22*a* (FIG. 3B), arranged to approximate a portion of the sidewall 6*a*, 6*b* of the pickup truck 2. A clamp 14 can be seen in detail in FIG. 3B. Clamps 14 preferably include aluminum, although other metals or alloys or polymers or other composite materials can be used. Clamps 14 as illustrated have an outer member 16*a* and an inner member 16*b* which are tightened towards each other and held as an assembly on the sidewall 6*a* by a fastener assembly 16*d* which typically includes a bolt 16*e*, a washer 16*f*, and a nut 16*g*. Preferably, inner member 16*b* has a clamp engagement portion 16*c* which, together with side rail engagement portion 22*a* of side rail 20*a*, aids in securing the clamps 14 in place on the side rail 20*a*. Preferably, the clamps 14 are arranged and tightened to secure the side rail 20*a* to the sidewall 6*a*, with a sidewall gasket 76 arranged between the side rail 20*a* and the sidewall 6*a* as illustrated. A bow end cap 78 is located at the end of the support bow 50*a*. A release cord 54 and a cord guide 56 are shown, and will be described in further detail herein. In the present example, the side rail engagement portion 22*a* is a generally vertically-oriented portion which configured to be located adjacent a similarly vertically-oriented portion of the sidewall 6*a*, 6*b*. In the example of FIG. 3B, a portion of the sidewall 6*a* of a cargo box 5 of a Chevrolet Silverado pickup truck is illustrated; however, other sidewalls of other cargo boxes of other pickup trucks and the like can be accommodated, by incorporating a side rail engagement portion 22*a* along the length of the side rails 20*a* and 20*b* that are appropriately configured and oriented. In this example, the cargo box 5 of the pickup truck 2 includes a sidewall cap 6*e*, but other cargo boxes 5 lack a sidewall cap. Preferably, the side rail engagement portion 22*a* has a side rail engagement feature 22*b*, such as ridges, knurling, surface patterns or textures, or other features which aid in securing the clamps 14. Preferably, a sidewall gasket 22*c* is located between the side rail engagement portion 22*a* and the sidewall 6*a*; the sidewall gasket 22*c* can provide protection against damage to the sidewall 6*a* by abrasion against the side rail 20*a*. The sidewall gasket 22*c* can provide leak resistance to prevent water, dust, or other debris from passing into the cargo box 5 along the side rail engagement portion 22*a*. The side rail 20*a* has a flange or side rail lip 24 along the length of the side rail 20*a*. The side rail lip 24 provides support for the folding cover assembly 30. In addition, the side rail lip 24 provides a feature for engagement of the engaging portion 53*b* of the latches 52. The driver's side portion of the support bow 50*a* is shown in this figure; the other end of the support bow 50*a* (toward the passenger side) has a mirror-image configuration, with a latch 52 engaging side rail 20*b*, and side rail 20*b* being attached to sidewall 6*b* in a similar manner.

Figure 4A:
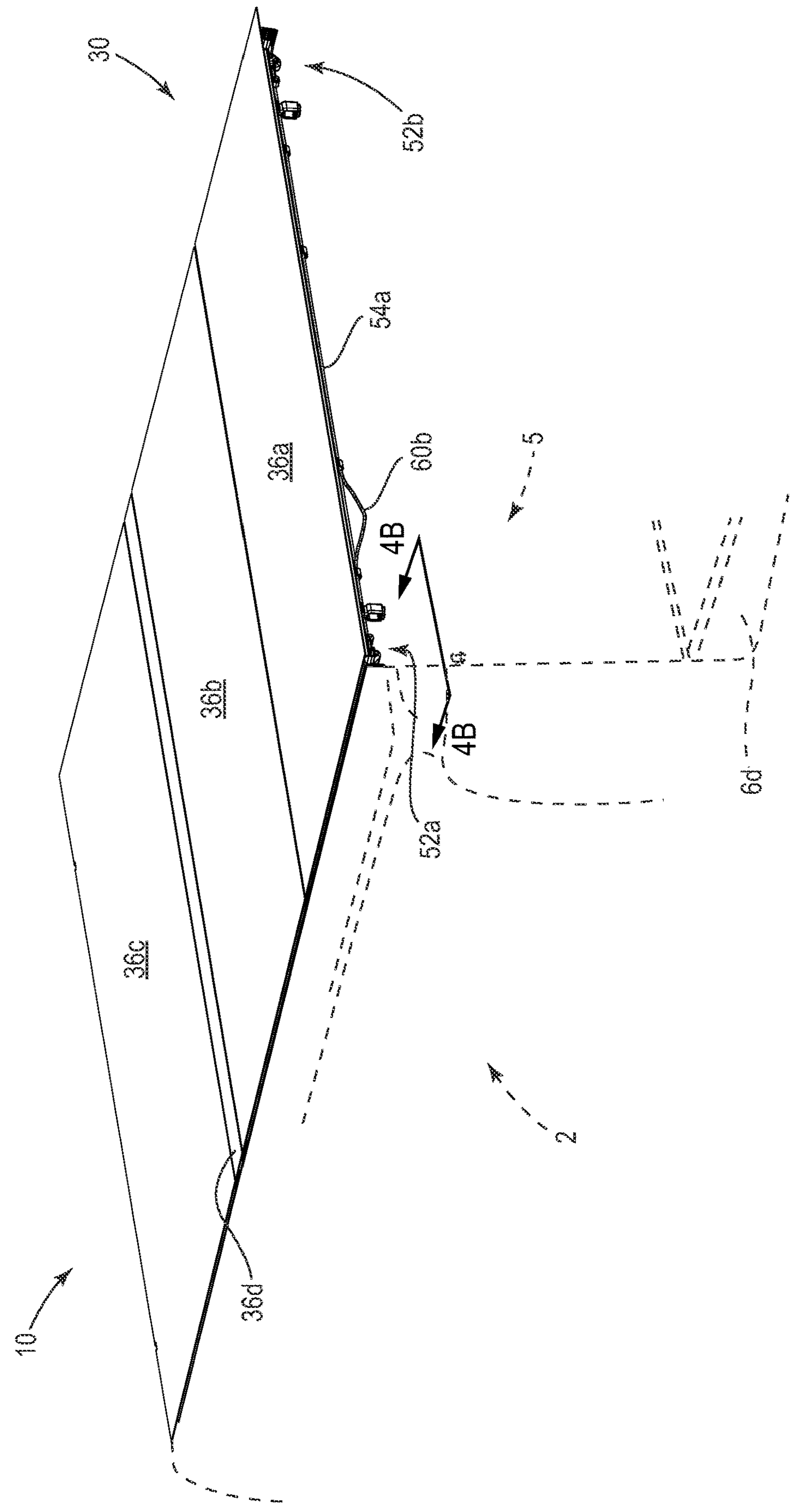
FIG. 4A is a rear perspective view of the folding tonneau cover apparatus of FIG. 1, with the release cord pulled to release the latches.
Figure 4B:
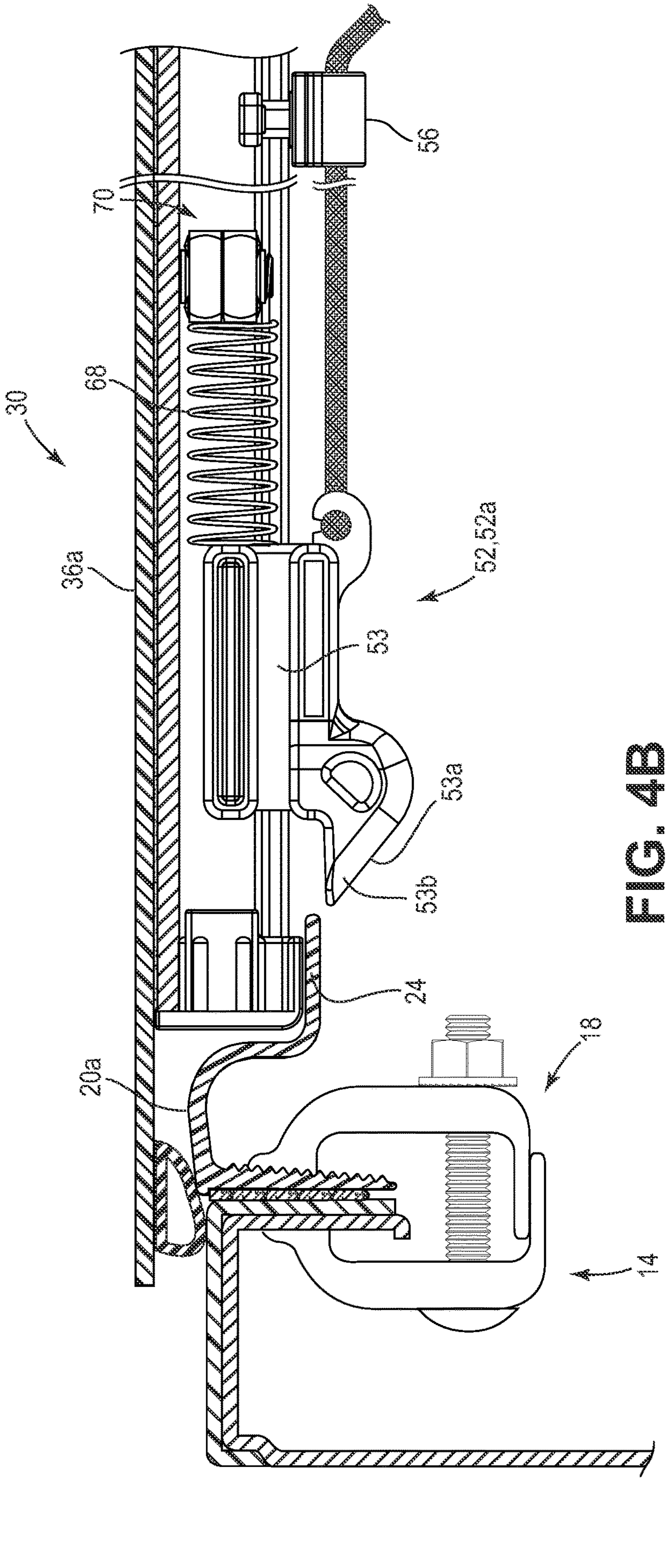
FIG. 4B is a is a partial section view as indicated on FIG. 4A similar to the view of FIG. 3B but showing the arrangement with the engaging portion of the latch retracted from the lip of the side rail.

As illustrated in FIGS. 4A and 4B, when it is desired to release the latches 52 at the rear end of the rear panel 36*a*, the release cord 54*a* can be pulled in segment 60*b*, 60*c*, or 60*d*, which will retract the latches 52 against the force of the biasing member or spring 68. Typically, the release cord 54*a* will be pulled in segment 60*b* as illustrated, by a driver (not shown) who has walked to the rear of the cargo box 5 and has opened the tailgate 6*d* and reaches in to pull the release cord 54*a*. The release cord 54*a* can alternatively be pulled in segment 60*c* or segment 60*d*, however, if that is more convenient. When the release cord 54*a* is pulled, the engaging portion 53*b* of the latch 52 is retracted away from the lip 24 of the side rail 20*a* as shown in FIG. 4B, releasing the latch 52 from the side rail 20*a* and allowing the rear portion of the rear panel 36*a* to be lifted up from the side rail 20*a*. The cord guides 56 adjacent to the latches 52 help to maintain alignment of the ends of the release cord 54*a* so that the latches 52 are retracted in alignment with the support bow 50*a*, to avoid excessive friction, wear and potential binding. The driver's side portion of the support bow 50*a* is shown in this figure; the other end of the support bow 50*a* (toward the passenger side) has a mirror-image configuration, and when the release cord 54*a* is pulled, the latches 52 at both ends of the support bow 50*a* are retracted, so that the rear end of the rear panel 36*a* can be lifted up from both side rails 20*a* and 20*b*.

Referring now to FIGS. 5A-5E, hinges 44, 144, 244, 344 include flexible sheet material or flexible material 80, 180, 280, 380 which is attached to each of the adjacent panels 36, 136, 236, 336 (specifically, respective adjacent panels of 36*a*-36*d*, 136*a*-136*d*, 236*a*-236*d*, 336*a*-336*d* as described herein). Flexible sheet material 80, 180, 280, 380 is moisture resistant to avoid leakage into the cargo box 5. Flexible sheet material 80, 180, 280, 380 can include fabric, or a polymeric layer, and may have a reinforcing fiber which can be separate fibers, long (generally continuous) or short (generally discrete) fibers, fibrous yarns, or a web material, or woven material, single-axis or biaxial oriented fibers, or a braid or a felt of fibers, for example. For example, flexible material 80, 180, 280, 380, 480 can be a vinyl material, preferably a polyvinyl chloride or PVC covered fabric, a fiber-reinforced rubber or other flexible polymeric material, or a fabric having a water-resistant coating or impregnation. In additional examples, the flexible material 80, 180, 280, 380, 480 can be cloth-inserted EPDM rubber, cloth-inserted neoprene rubber, nylon cloth reinforced nitrile rubber, fiberglass-reinforced silicone rubber, polyester-reinforced neoprene sheet, nylon-reinforced neoprene sheet, and other materials available from multiple sources; information regarding example materials is available from www.rubber-sheetroll.com and from www.mscdirect.com; note that not all materials listed on those web sites would be preferred for this application. A variety of materials could be used as flexible hinge material, such as neoprene, EPDM, flexible PVC, nitrile, natural rubber, flexible thermoplastics, silicone, latex, Hypalon rubber, butyl rubber, recycled rubber, Viton rubber, Santoprene rubber, Skirtboard rubber, SBR rubber, and so forth, that can be used in conjunction with a reinforcing fiber such as EPDM, Nylon, polyester, fiberglass, carbon fiber, aramid fibers, boron fibers, metal fibers, cellulose, wood-derived fibers, and so forth can be used for the flexible hinge material 80. The hinge or flexible hinge 44 is preferably made of a flexible material that can withstand deformation without failure due to cracking or breakage and that is selected from the group consisting of a laminated polymeric material, a fiber-reinforced polymeric material, an elastomeric material, a woven material and a laminated material that is includes a woven material and a moisture-resistant polymeric material. Preferably, a hinge material 80 is chosen that can be heat bonded to the thermal adhesive tape 84*a* such as 3M 5933 from 3M, St. Paul, MN described herein. Other considerations in choosing an acceptable flexible hinge material 80 are durability over time and resistance to environmental factors such as precipitation, sunlight, temperature ranges, and physical stresses such as impacts and abrasions. Preferably, the flexible material 80, 180, 280, 380, 480 is polyester fiber reinforced polymeric material. More preferably, flexible material 80, 180, 280, 380, 480 is PVC-coated woven polyester material such as part number 90749 available from Lakeview Industries, Chaska, MN.

Figure 5A:
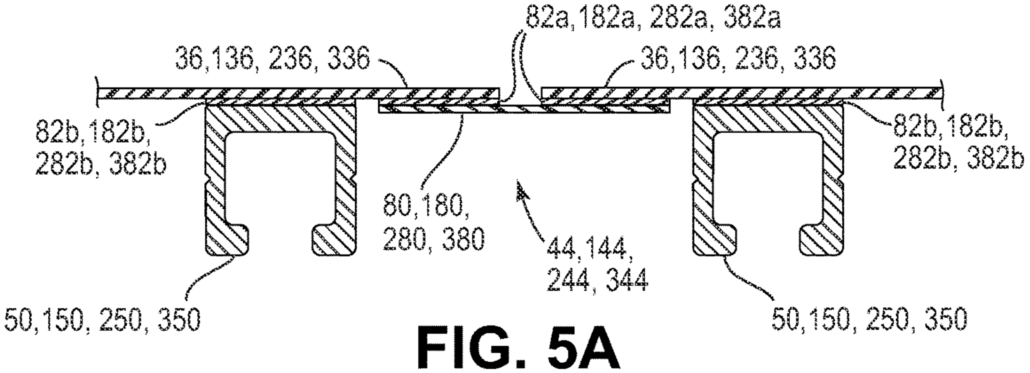
FIG. 5A is schematic illustration of a cross section along a front-back plane of one of the hinges of the folding tonneau cover of FIG. 1 showing the basic configuration with the hinge unfolded.
Figure 5B:
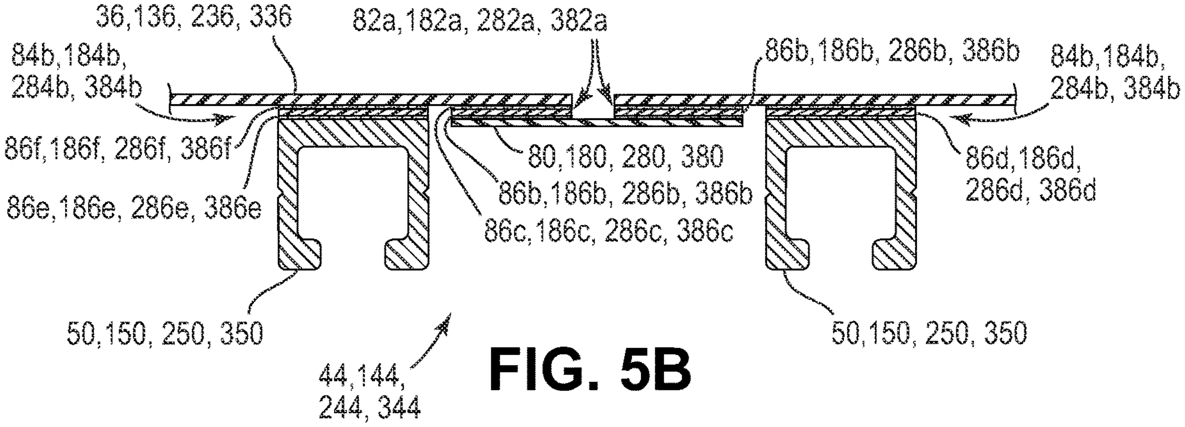
FIG. 5B is a schematic illustration of a cross section along a front-back plane of a preferred embodiment of one of the hinges of the folding tonneau cover of FIG. 1 showing the hinge unfolded.
Figure 5C:
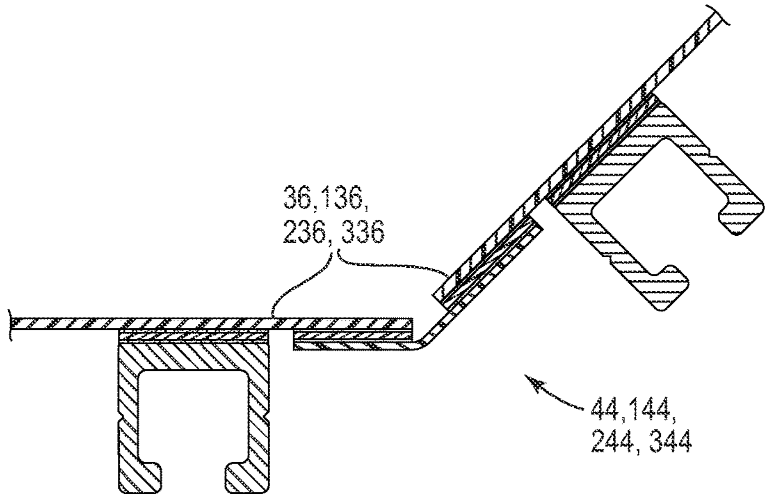
FIG. 5C is a schematic illustration showing the hinge of FIG. 5B but with the hinge folded about 45 degrees.
Figure 7C:
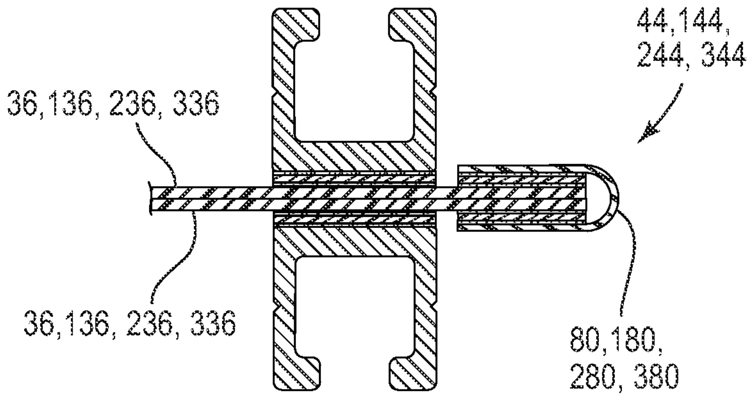
FIG. 7C is a schematic illustration showing the hinge of FIG. 5B but with the hinge folded about 180 degrees.
Figure 8A:
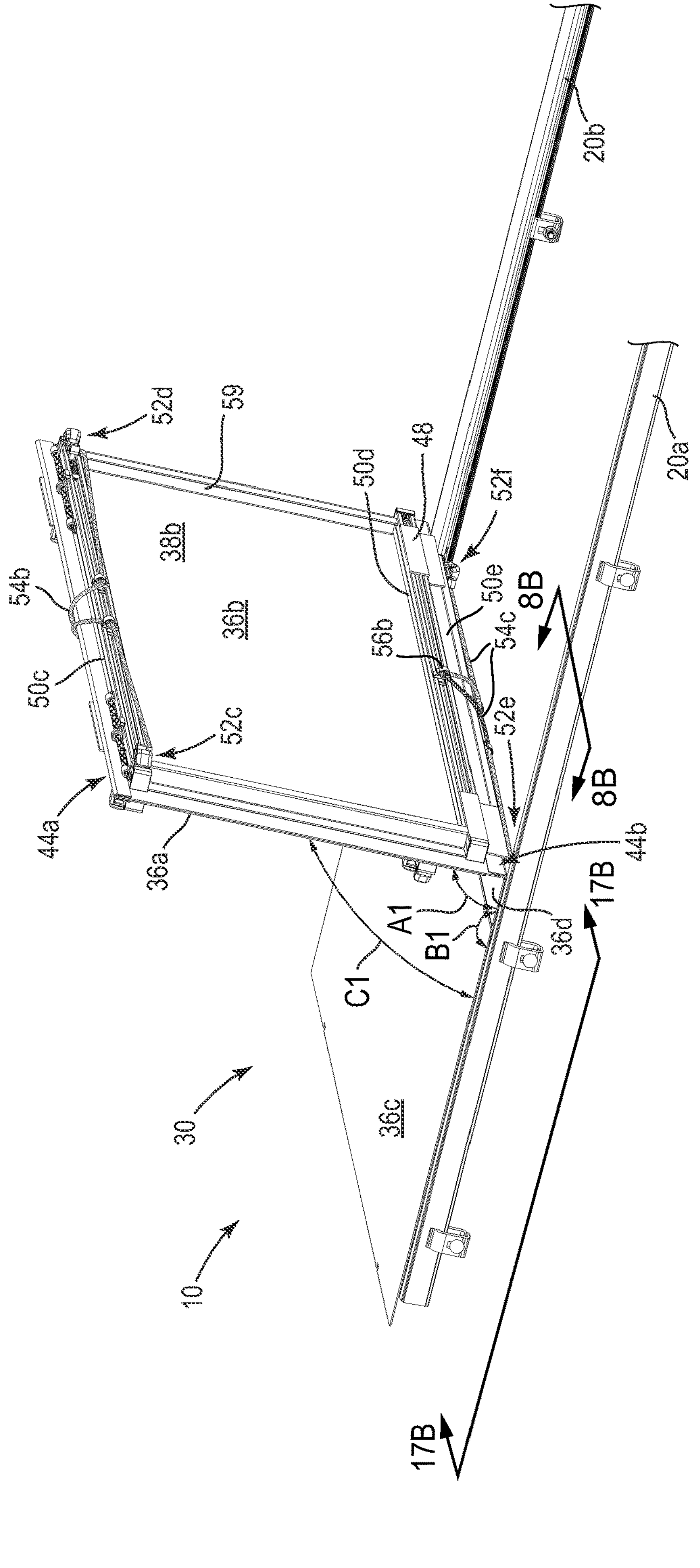
FIG. 8A is a rear perspective view of the folding tonneau cover apparatus of FIG. 1 wherein the rear panel together with the middle panel has been lifted up and rotated forward, whereby displacement of yet another release cord releases latches on the spacer panel, but for clarity of illustration the perimeter seal is not shown.
Figure 8B:
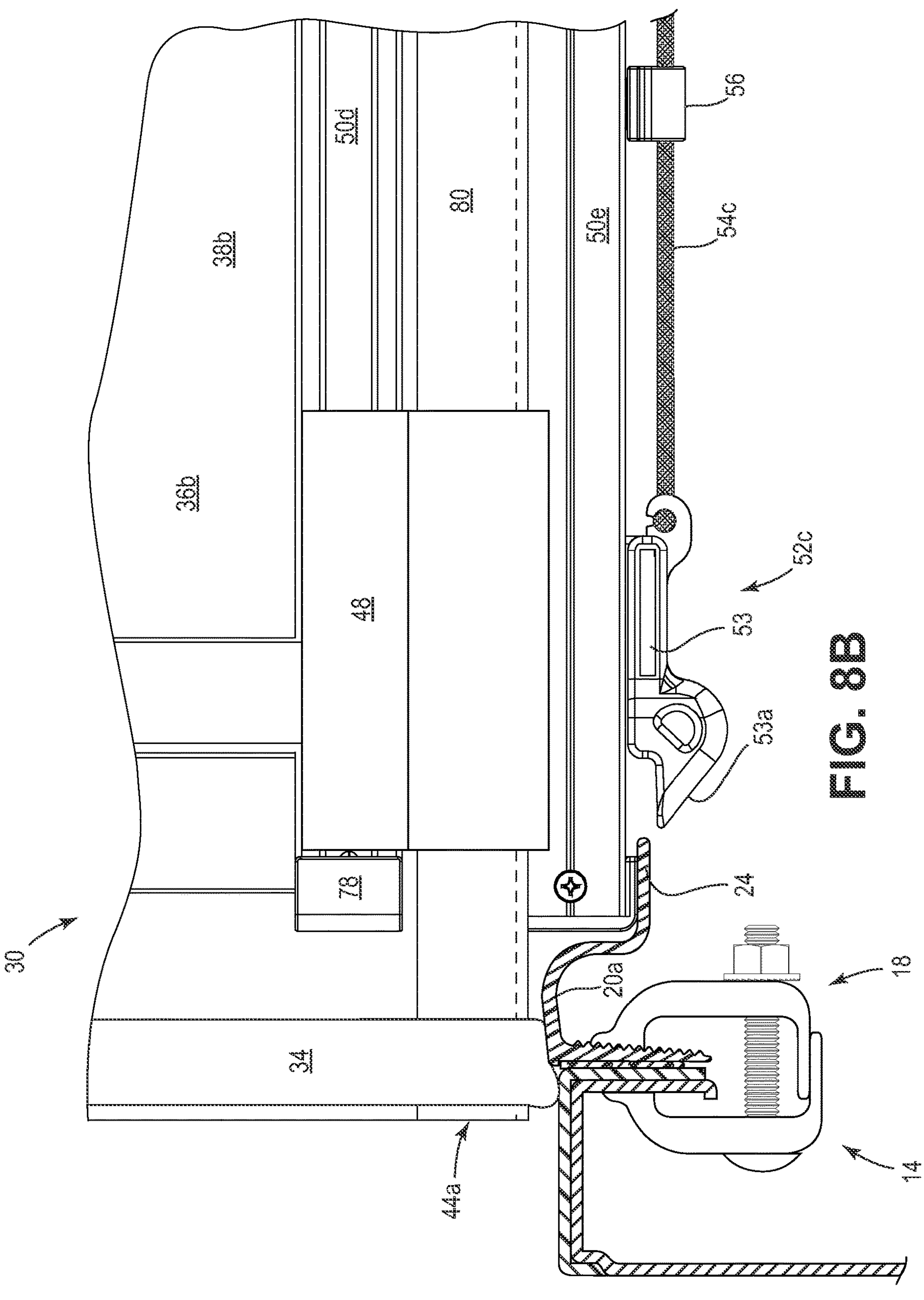
FIG. 8B is a partial section view as indicated on FIG. 8A showing the latch near the driver's side end portion of the support bow of the spacer panel with the engaging portion of the latch retracted from the lip of the side rail.
Figure 8C:
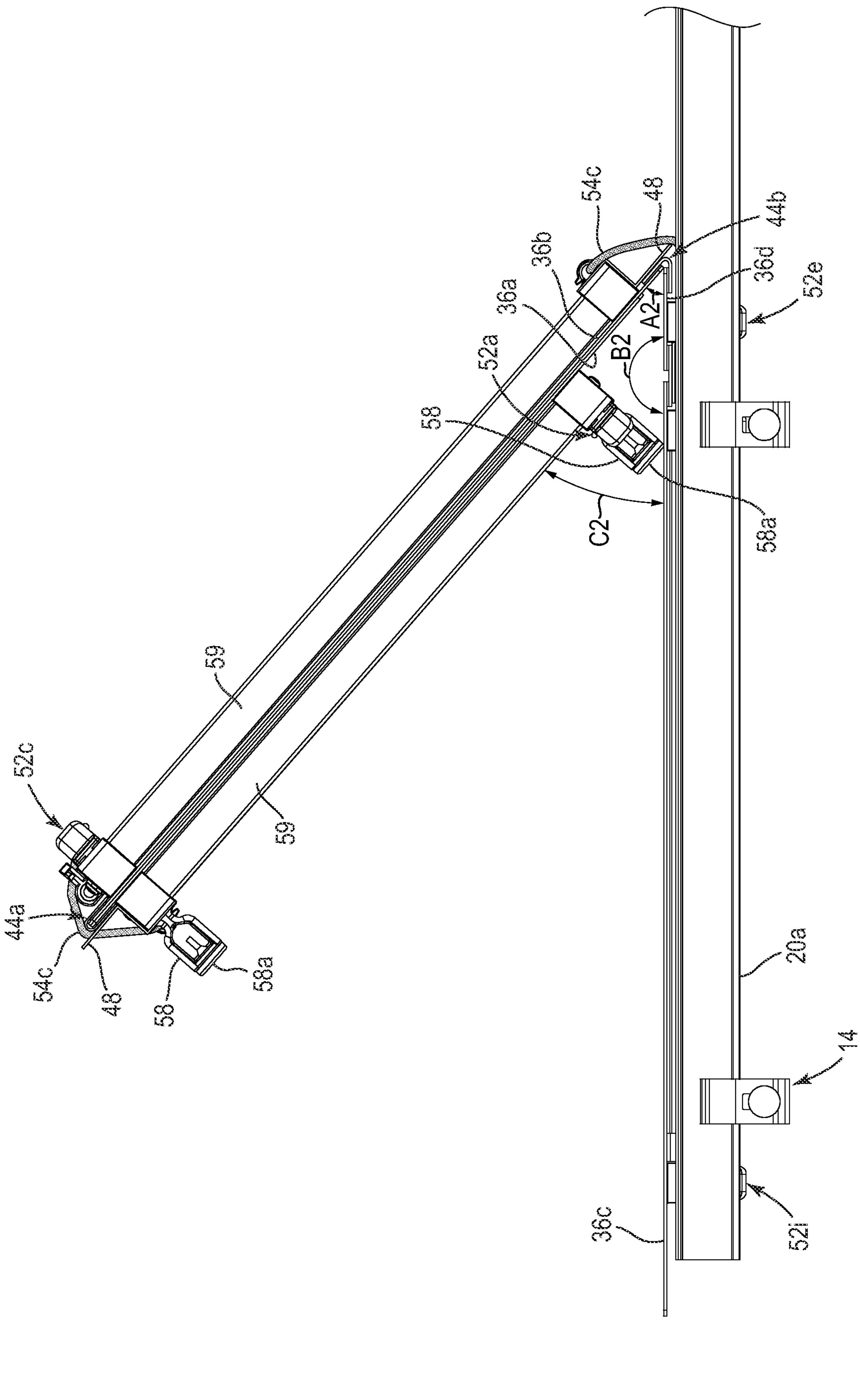
FIG. 8C is a side view illustrating the rear panel together with the middle panel rotated forward to the point that the standoffs touch the front panel, but for clarity of illustration the perimeter seal is not shown.
Figure 8D:
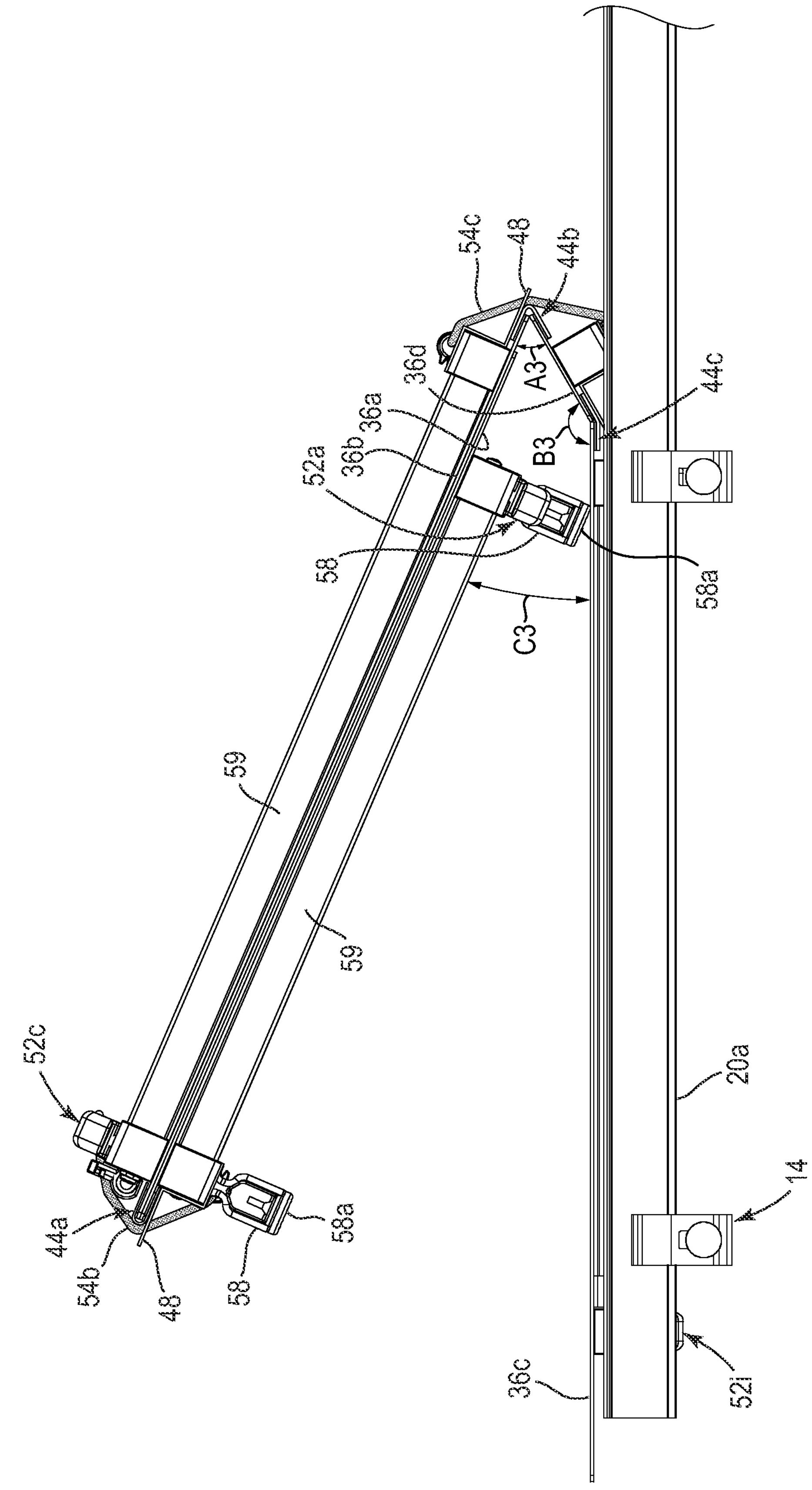
FIG. 8D is a side view illustrating the rear panel together with the middle panel rotated farther forward with the standoffs touching the front panel and the spacer panel being lifted up and rotated forward, but for clarity of illustration the perimeter seal is not shown.
Figure 8E:
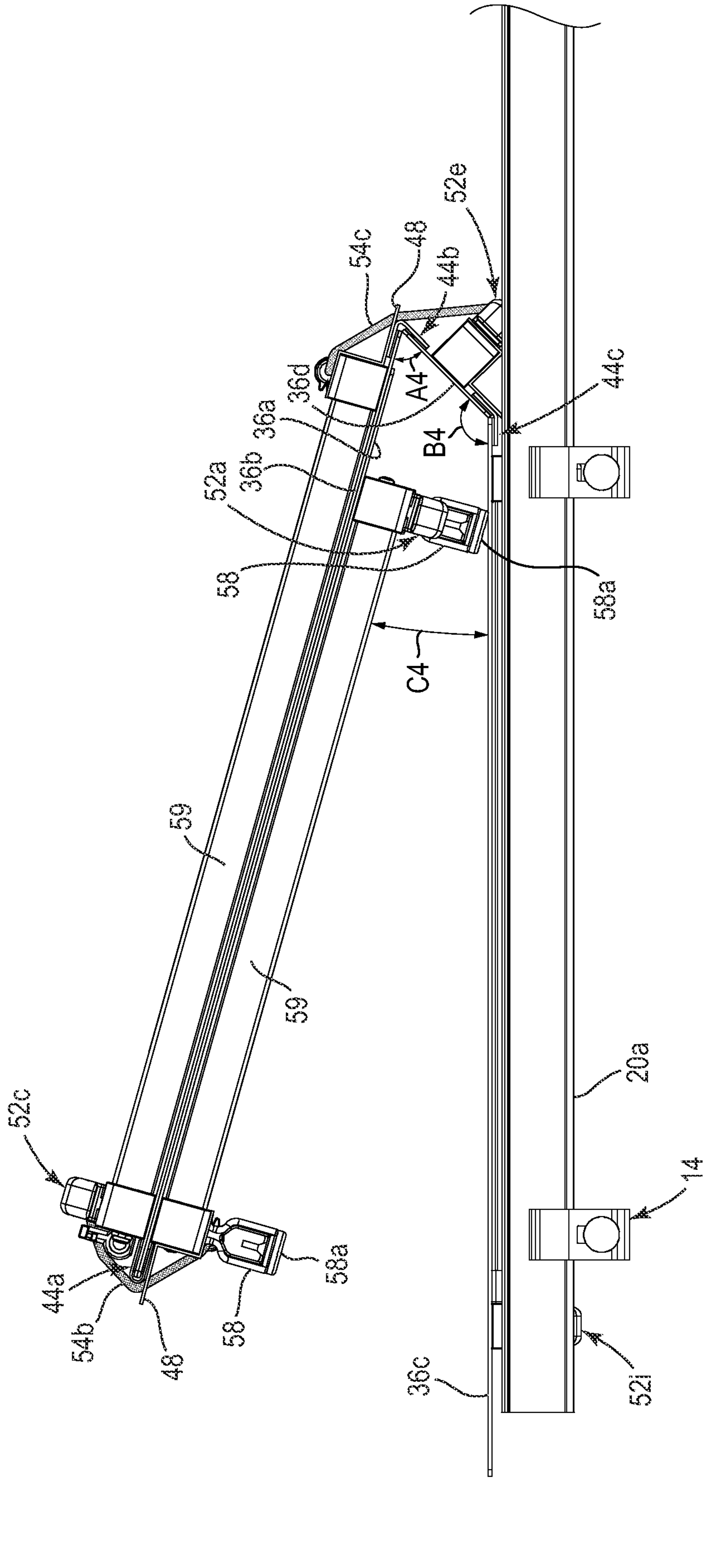
FIG. 8E is a side view illustrating the rear panel together with the front panel rotated still farther forward with the standoffs touching the front panel and the spacer panel being lifted up farther and rotated farther forward, but for clarity of illustration the perimeter seal is not shown.
Figure 8F:
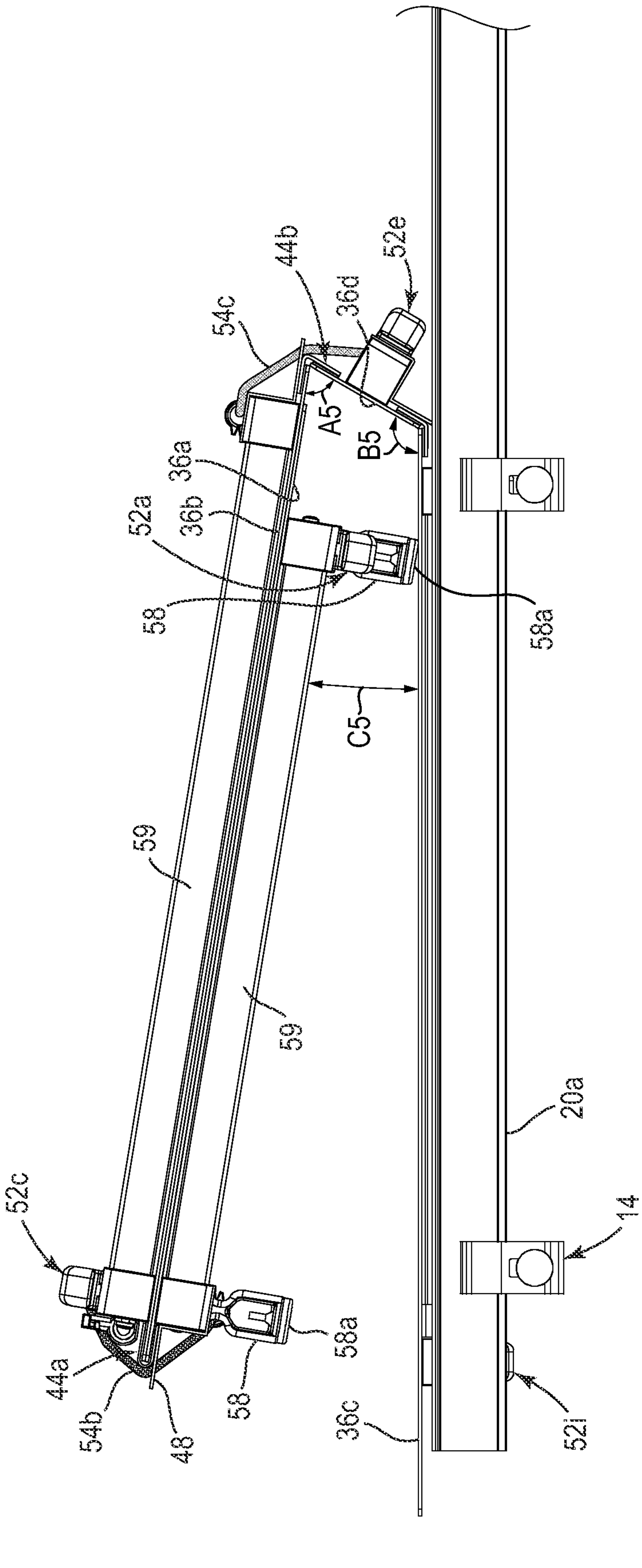
FIG. 8F is a side view illustrating the rear panel together with the front panel rotated yet farther forward with the standoffs touching the front panel and the spacer panel being lifted up still farther and rotated still farther forward, but for clarity of illustration the perimeter seal is not shown.
Figure 8G:
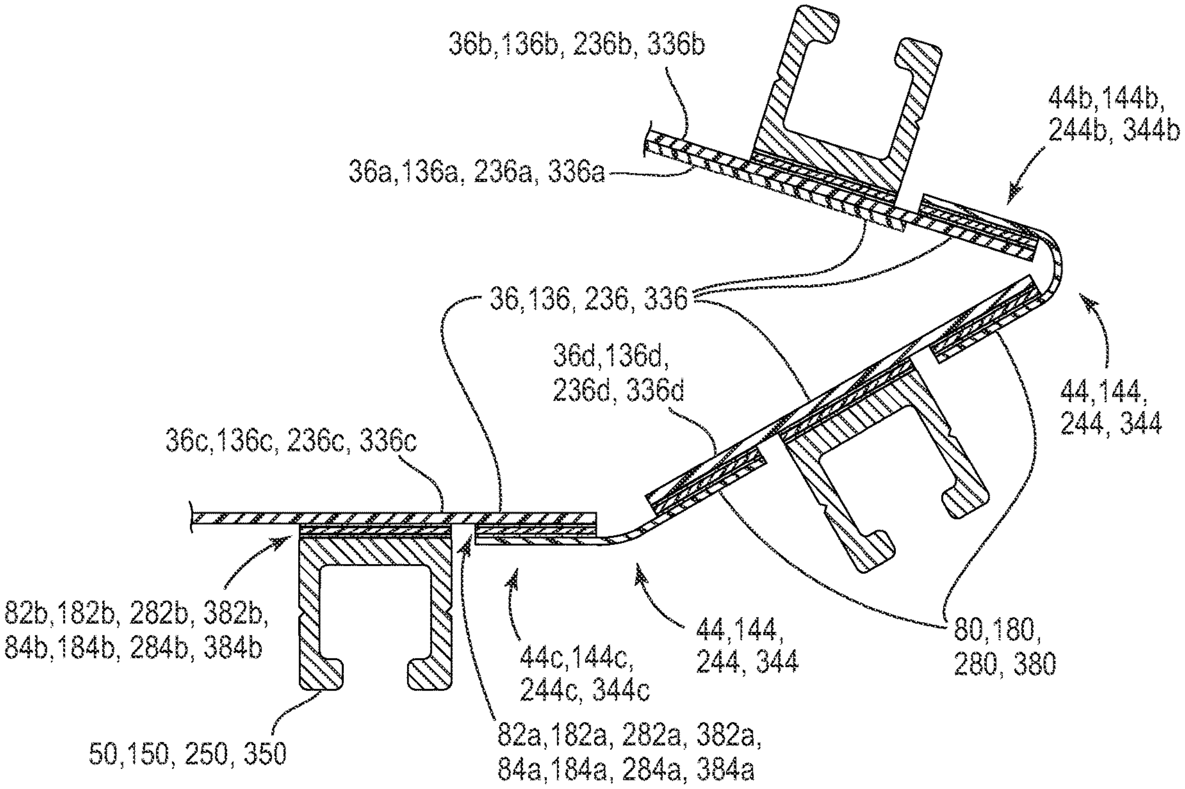
FIG. 8G is a schematic illustration showing a cross section similar to that of FIG. 5A showing a spacer panel and two adjacent hinges of the folding tonneau cover of FIG. 1, illustrating both hinges in a partially folded configuration.

Attachment of the flexible sheet material 80, 180, 280, 380, 480 to the panels 36 is preferably by an adhesive 82*a*, 182*a*, 282*a*, 382*a*, 482*a* which may include a layer or coating of adhesive or a double-sided adhesive tape 84*a*, 184*a*, 284*a*, 384*a*, 482*a* for example. Alternatively, a contact adhesive, or a thermal or hot-melt or chemically activated adhesive, or a mechanical attachment, or a combination, can be used to attach the flexible sheet material 80, 180, 280, 380, 480 to the panels 36, 136, 236, 336, 436. Double-sided adhesive tape 84*a*, 184*a*, 284*a*, 384*a* can include an acrylic foam material 86*a*, 186*a*, 286*a*, 386*a* with adhesive layer 86*b*, 186*b*, 286*b*, 386*b* arranged on one side of the acrylic foam material 86*a*, 186*a*, 286*a*, 386*a*, and adhesive layer 86*c*, 186*c*, 286*c*, 386*c* arranged on the other side of the acrylic foam material 86*a*, 186*a*, 286*a*, 386*a*, for example. Preferably, the adhesive 82*a*, 182*a*, 282*a*, 382*a* includes a double-sided adhesive tape 84*a*, 184*a*, 284*a*, 384*a* such as 3M 5933 from 3M, St. Paul, MN ("thermal adhesive tape"), wherein the double-sided adhesive tape 84*a*, 184*a*, 284*a*, 384*a* is an acrylic foam tape having an acrylic foam material 86*a*, 186*a*, 286*a*, 386*a* and an adhesive layer 86*b*, 186*b*, 286*b*, 386*b* which includes heat-activated adhesive and an adhesive layer 86*c*, 186*c*, 286*c*, 386*c* which includes pressure-sensitive adhesive which may be protected by a release strip (not shown) until it is desired to activate the pressure-sensitive adhesive, adhesive layer 86*c*, 186*c*, 286*c*, 386*c*. Preferably, the adhesive layer 86*b*, 186*b*, 286*b*, 386*b* (in this example, heat-activated adhesive) is aligned with the flexible sheet material 80, 180, 280, 380 while the heat-activated adhesive is activated to adhere the double-sided adhesive tape 84*a*, 184*a*, 284*a*, 384*a* to the flexible sheet material 80, 180, 280, 380, 480; the flexible sheet material 80, 180, 280, 380, 480 together with the attached double-sided adhesive tape 84*a*, 184*a*, 284*a*, 384*a* is subsequently aligned with the panel 36, 136, 236, 336, 436 and the release strip is removed. Preferably, after the adhesive layer 86*c* is aligned with the panel 36, 136, 236, 336, 436 the flexible sheet material 80, 180, 280, 380, 480 is attached to the panel 36, 136, 236, 336, 436 by activating the adhesive layer 86*c*, 186*c*, 286*c*, 386*c*, 486*c* (in this example, pressure-sensitive adhesive). The adjacent panel 36, 136, 236, 336, 436 is similarly attached to the flexible sheet material 80, 180, 280, 380, 480 with double-sided adhesive tape 84*a*, 184*a*, 284*a*, 384*a*, 486*a* forming the structure of hinge 44, 144, 244, 344. 444 as shown in FIG. 5B. The flexible sheet material 80, 180, 280, 380, 480 allows hinges 44, 144, 244, 344, 444 to take a flat or open configuration as illustrated in FIGS. 5A and 5B, or to flex or bend as illustrated in FIGS. 5C, 7C and 8G, providing a hinge 44, 144, 244, 344, 444 that allows the folding cover assembly 30, 120, 230, 330 to fold as illustrated throughout the Figures and described herein, with panels 36, 136, 236, 336, 436 folding up and rotating towards other panels as shown. Preferably, the flexible sheet material 80, 180, 280, 380, 480 is adhered to the respective bottom or underside 38, 138, 238, 338, 438 of the panels 36, 136, 236, 336, 436 (specifically, the underside 38*a*-38*d*, 138*a*-138*d*, 238*a*-238*d*, 338*a*-338*d* of respective adjacent panels of 36*a*-36*d*, 136*a*-136*d*, 236*a*-236*d*, 336*a*-336*d* as described herein) of the folding cover assembly 30, 120, 230, 330, 430 as shown. In the preferred arrangements discussed herein, the hinges 44 are securely attached to the respective panels 36, are sealed to prevent water or debris from entering the cargo box through the folding cover assembly 30 at the hinges 44, and are generally impervious to environmental factors such as precipitation, wind, and temperatures to which a typical cargo box 5 would be exposed. Preferably, the hinge 44 is low profile, so that the thin structure provides an effectively continuous seal along the perimeter seal 34 to prevent ingress of precipitation or debris or loss of contents from the cargo box 5, or lifting of the folding cover assembly by the wind under normal circumstances. All of the respective seals that are disclosed herein and can be used as a perimeter seal 34, 134, 234, 334, 434 are water resistant, preferably water proof such that water cannot flow through the seal material and is prevented from egress into the cargo box 5 through the respective seal material. In preferred embodiments, the perimeter seal 34, 134, 234, 334, 434 will be secured with an adhesive material to the underside of each of the respective panels proximate an outer portion of each of the respective panels and an outer portion of each of the respective flexible hinges proximate the outer edges of each of the respective panels, so that the passage of moisture through the juncture of any areas where such bonding occurs is minimized, if not entirely prevented. Furthermore, when the perimeter seal 34, 134, 234, 334, 434 is secured to each of the respective rigid panels proximate an outer portion of each of the respective panels and to an outer portion of each of the respective flexible hinges proximate the outer edges of each of the respective panels and compressed between the outer edges of each of the respective panels and each of the respective side rails 20*a*, 20*b*, 120*a*, 120*b*, 220*a*, 220*b*, 320*a*, 320*b*, 420*a*, 420*b*, the top of the tailgate 6*d* and the top of front wall 6*c*, wherein the cover assembly 30, 130, 230, 330, 430 is fully secured to the support frame assembly 18, 118, 218, 318, 418, the perimeter seal 34, 134, 234, 334, 434 will act to minimize the egress of moisture, wind and debris into the cargo box 5, preferably completely preventing moisture, wind and debris of any kind from entering the cargo box 5 when the cover assembly is fully secured to the support frame and the pickup truck.

FIG. 5B also schematically illustrates support bows 50, 150, 250, 350, 450 which are preferably attached to respective panels 36, 136, 236, 336 by an adhesive 82*b*, 182*b*, 282*b*, 382*b*, which may include a layer or coating of adhesive or a double-sided adhesive tape 84*b*, 184*b*, 284*b*, 384*b*, for example. Alternatively, a thermal or hot-melt or chemically activated adhesive, or a mechanical attachment, or a weld, or a combination, can be used to attach the support bows 50, 150, 250, 350 to the respective panels 36, 136, 236, 336. Double-sided adhesive tape 84*b*, 184*b*, 284*b*, 384*b* preferably includes an acrylic foam material 86*d*, 186*d*, 286*d*, 386*d*, with adhesive layer 86*e*, 186*e*, 286*e*, 386*e* arranged on one side of the acrylic foam material 86*d*, 186*d*, 286*d*, 386*d*, and adhesive layer 86*f*, 186*f*, 286*f*, 386*f* arranged on the other side of the acrylic foam material 86*d*, 186*d*, 286*d*, 386*d*, for example. Preferably, the adhesive 82*b*, 182*b*, 282*b*, 382*b* includes a double-sided adhesive tape 84*b*, 184*b*, 284*b*, 384*b* such as 3M CV62F from 3M, St. Paul, MN ("pressure adhesive tape"), wherein the double-sided adhesive tape 84*b*, 184*b*, 284*b*, 384*b* is an acrylic foam tape having an adhesive layer 86*e*, 186*e*, 286*e*, 386*e* which includes pressure-sensitive adhesive and having an adhesive layer 86*f*, 186*f*, 286*f*, 386*f* which includes pressure-sensitive adhesive which may be protected by a release strip (not shown) until it is desired to activate the pressure-sensitive adhesive, adhesive layer 86*f*, 186*f*, 286*f*, 386*f*. Preferably, the adhesive layer 86*e*, 186*e*, 286*e*, 386*e* (in this example, pressure-sensitive adhesive) is aligned with and adhered to the upper surface 74*d*, 174*d*, 274*d*, 374*d* of the support bow 50, 150, 250, 350 to adhere the double-sided adhesive tape 84*b*, 184*b*, 284*b*, 384*b* to the support bow 50, 150, 250, 350; the support bow 50, 150, 250, 350 together with the attached double-sided adhesive tape 84*b*, 184*b*, 284*b*, 384*b* is subsequently aligned with the panel 36, 136, 236, 336 and the release strip is removed. Preferably, the adhesive layer 86*f*, 186*f*, 286*f*, 386*f* is then aligned with the panel 36, 136, 236, 336, and the support bow 50, 150, 250, 350 is attached to the respective panel 36, 136, 236, 336 by activating the adhesive layer 86*f*, 186*f*, 286*f*, 386*f* (in this example, pressure-sensitive adhesive). While the arrangement just described is a preferred configuration, any of the adhesive layers just described can include heat-activated adhesive or pressure-sensitive adhesive, and the acrylic foam material is also preferable but not always required. For example, in alternative configurations, a single layer of adhesive could be used, similar to the arrangement shown in FIG. 5A. Other pressure-activated acrylic adhesive foam tape can be used, such as Lamatek 5357 from Lamatek, Inc., West Deptford, NJ. The sidebars or handles 59, 159, 259, 359 are preferably also attached to the underside 38, 138, 238, 338 of the respective panels 36, 136, 236, 336, preferably in a similar manner as that just described for the support bow 50, 150, 250, 350. Although adhesive 82*b*, 182*b*, 282*b*, 382*b* can be applied at selected portions of the length of the support bow 50, 150, 250, 350 or the sidebar 59, 159, 259, 359, adhesive 82*b*, 182*b*, 282*b*, 382*b* is preferably applied along substantially the entire length of the support bow 50, 150, 250, 350 and the sidebar 59, 159, 259, 359, to enhance stability and to minimize unwanted vibrations. Alternatively, the sidebars 59, 159, 259, 359, support bows 50, 150, 250, 350, or the flexible sheet material 80, 180, 280, 380 of hinges 44, 144, 244, 344 can be attached to the panels 36, 136, 236, 336 with adhesives such as glue, or with fasteners, or spot welds.

Figure 5D:
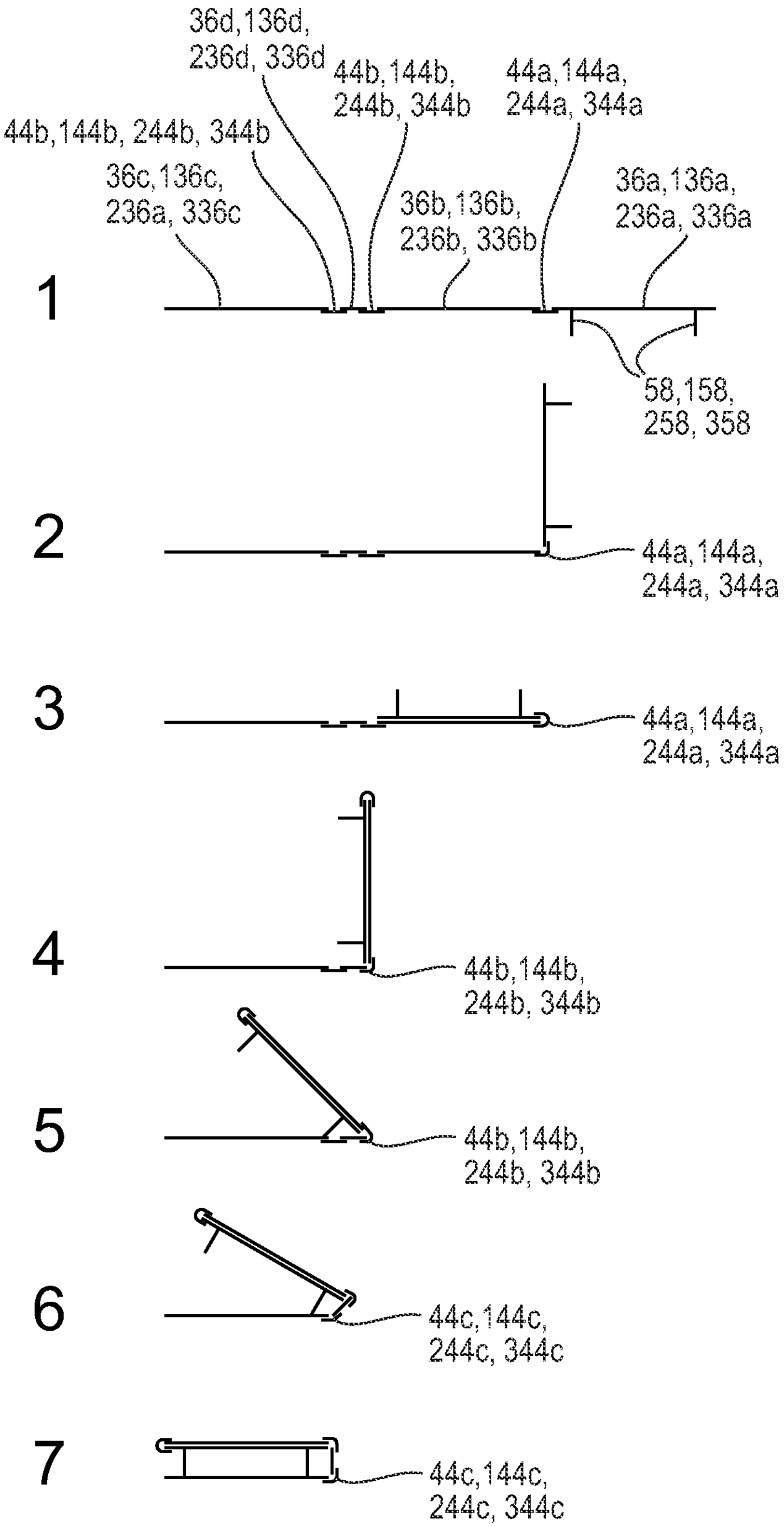
FIG. 5D is a schematic illustration showing the general steps and configurations of the folding tonneau cover of FIG. 1 as it is folded up.

In some apparatus and methods embodiments, the folding cover assembly 30, 120, 230, 330 folds in stages or steps; a preferred embodiment is schematically illustrated in FIG. 5D. In this embodiment, starting from the unfolded or closed configuration of the folding cover assembly 30 (configuration 1), the hinge 44*a* flexes to allow the rear panel 36*a* to fold up, passing through 90 degrees (configuration 2) towards the middle panel 36*b*, and fold over onto the middle panel 36*b* (configuration 3). The hinge 44*b* flexes to allow the middle panel 36*b* (together with the rear panel 36*a* which is folded onto the middle panel 36*b*) to fold up, passing through 90 degrees (configuration 4) towards the spacer panel 36*d*, passing through a point at which standoffs 58 contact the front panel (configuration 5). The hinge 44*b* flexes back towards 90 degrees as hinge 44*c* flexes to allow the spacer panel 36*d* to fold up, and continue to fold over (together with the rear panel 36*a* which is folded onto the middle panel 36*b*, and the middle panel 36*b*) towards the front panel 36*c* (configuration 6), until the folding cover assembly 30 is folded up (configuration 7). Note that FIG. 5D is a schematic overview of the general folding of the folding cover assembly 30; the various configurations are further illustrated and described elsewhere herein in greater detail.

Figure 5E:
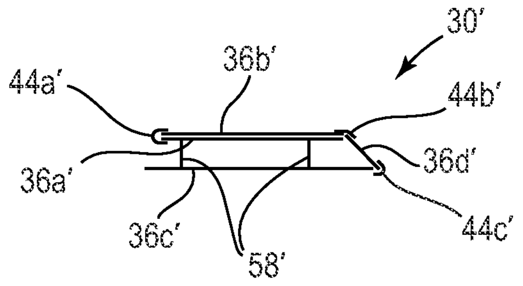
FIG. 5E is a schematic illustration showing an alternate configuration of an alternate tonneau cover folded up.

FIG. 5E is a schematic illustration showing an alternate configuration of an alternate folding cover assembly 30' folded up. In some embodiments, the front panel 36*c'* is noticeably longer than panels 36*a'* and 36*b'*. In some embodiments, the spacer panel 36*d* is oriented approximately vertically when the folding cover assembly 30 is folded up, and the front panel 36*c* simply extends farther frontward than the middle panel 36*b* and the rear panel 36*a*. In the example illustrated in FIG. 5E, the spacer panel 36*d'* is correspondingly longer to accommodate the lengths of the panels 36*a'*, 36*b'*, and 36*c'* as illustrated. In this case, the spacer panel is noticeably non-vertical when the folding cover assembly 30' is folded up.

Figure 5F:
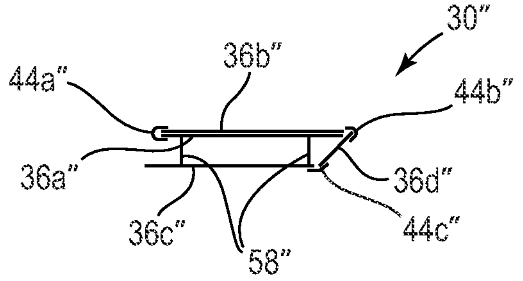
FIG. 5F is a schematic illustration showing an alternate configuration of a further alternate tonneau cover folded up.

FIG. 5F is a schematic illustration similar to that of FIG. 5E, showing a further alternate configuration of an alternate folding cover assembly 30" folded up. In some embodiments, the front panel 36*c"* is noticeably shorter than panels 36*a"* and 36*b"*. In some embodiments, the spacer panel 36*d* is oriented approximately vertically when the folding cover assembly 30 is folded up, and the middle panel 36*b* and the rear panel 36*a* simply extend farther frontward than the front panel 36*c*. In the example illustrated in FIG. 5F, the spacer panel 36*d"* is correspondingly longer to accommodate the lengths of the panels 36*a"*, 36*b"*, and 36*c"* as illustrated. In this case, the spacer panel is noticeably non-vertical when the folding cover assembly 30" is folded up. In the examples illustrated in FIGS. 5E and 5F, the spacer panel can be oriented preferably from about zero to about 60 degrees from a vertical orientation; the orientation is determined by the various lengths of the panels 36 and the standoff distance (see FIG. 14C). When the cover assembly is in the fully folded position, the top surface 37*d* of the spacer panel 36*d* can stand generally at an angle of from about 30 to about 150 degrees to the top surface 37*c* of the front panel 36*c*, preferably from about 40 to about 140 degrees to the top surface 37*c* of the front panel 36*c*; more preferably from about 50 to about 130 degrees to the top surface 37*c* of the front panel 36*c*; even more preferably from about 60 to about 120 degrees to the top surface 37*c* of the front panel 36*c*, and even more preferably from about 80 to about 100 degrees to the top surface 37*c* of the front panel 36*c*, generally depending upon the length of the front panel 36*c*, which can be varied in various embodiments of the cover assembly. In the preferred embodiment shown in FIG. 1, the top surface 37*d* of the hinge panel 36*d* will generally reside at an angle of about 90 degrees to the top surface 37*c* of the front panel 36*c*.

Preferably, the length 39*a* of the rear panel 36*a* is somewhat smaller than the length 39*b* of the middle panel 36*b* so that the rear panel 36*a* does not interfere with the hinges 44*b*, 44*c*, support bow 50*e*, or other nearby structures when the folding cover assembly 30 is folded up or unfolded. If the length 39*a* of the rear panel 36*a* is too much smaller than the length 39*b* of the middle panel 36*b*, the standoffs 58 attached to the support bow 50*a* will be farther removed from the respective edges of the front panel 36*c* and the middle panel 36*b* and may not provide the desired support in the folded up configuration. More preferably, the length 39*a* of the rear panel 36*a* is from about 0.25 inch to about 8 inches smaller than the length 39*b* of the middle panel 36*b*. Still more preferably, the length 39*a* of the rear panel 36*a* is from about 0.5 inch to about 2 inches smaller than the length 39*b* of the middle panel 36*b*. Even more preferably, the length 39*a* of the rear panel 36*a* is about 0.75 inch smaller than the length 39*b* of the middle panel 36*b*.

Figure 10A:
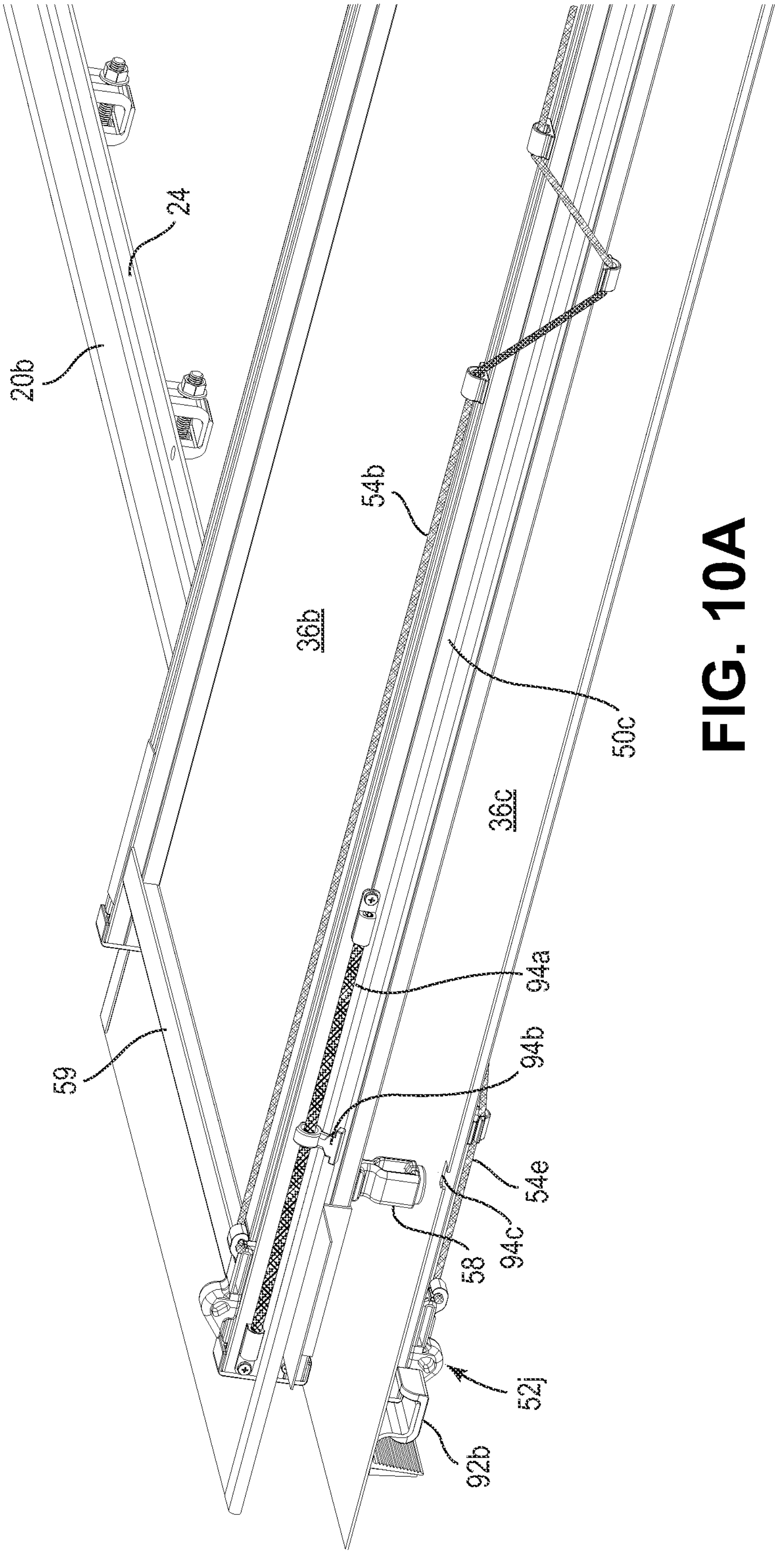
FIG. 10A is a front perspective view of the folding tonneau cover apparatus of FIG. 1 wherein the rear panel together with the middle panel and the spacer panel has been rotated forward so that the middle panel and the rear panel are resting on the spacers on top of the rear panel as in FIG. 9A and showing a storage strap stowed along the middle panel, but for clarity of illustration the perimeter seal is not shown.
Figure 10B:
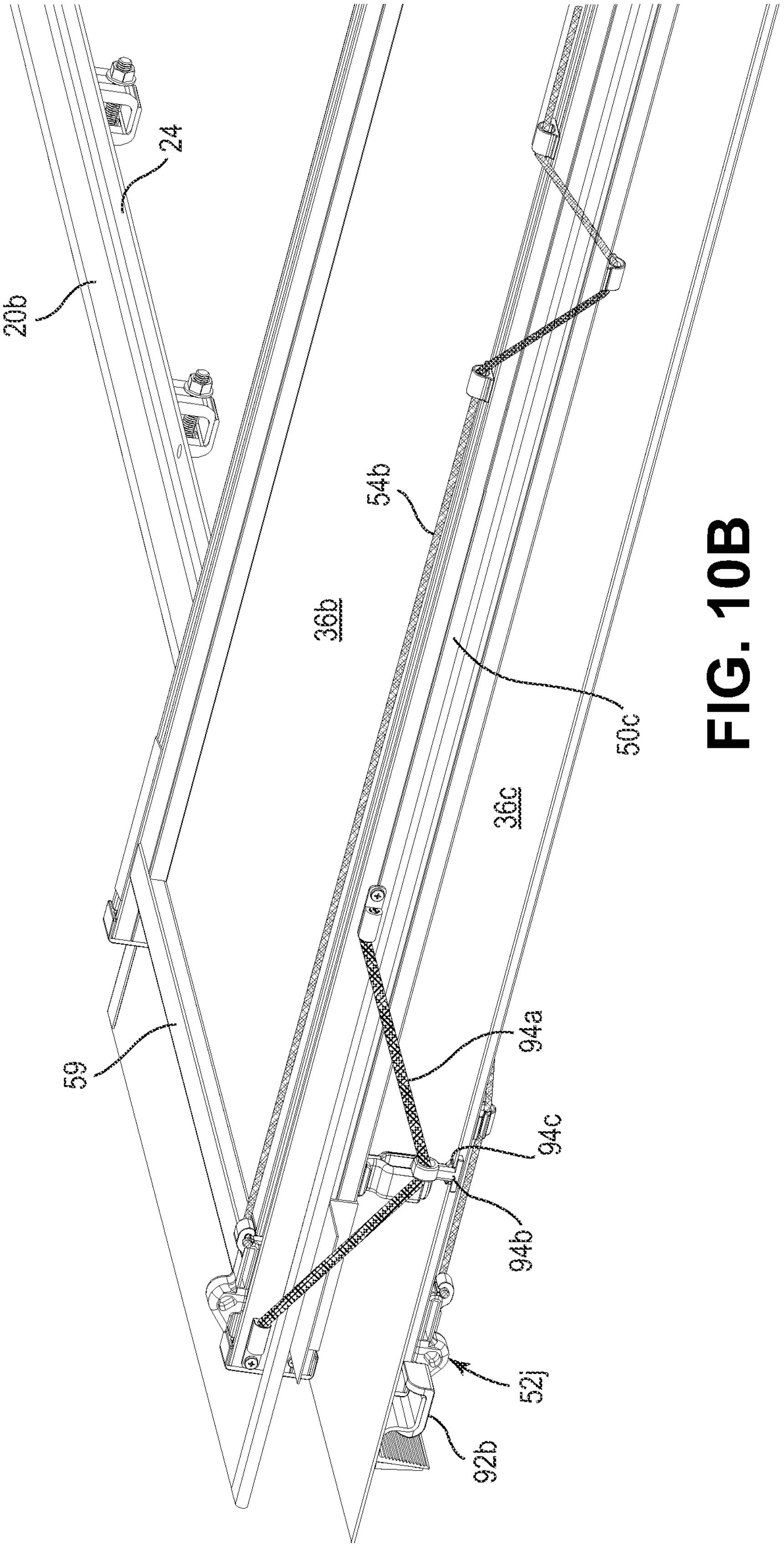
FIG. 10B is a front perspective view of the folding tonneau cover apparatus of FIG. 1 similar to the view of FIG. 10A but showing the storage strap pulled down and engaged with a strap bracket to the front panel, securing the folding tonneau cover in the folded up configuration, but for clarity of illustration the perimeter seal is not shown.
Figure 10C:
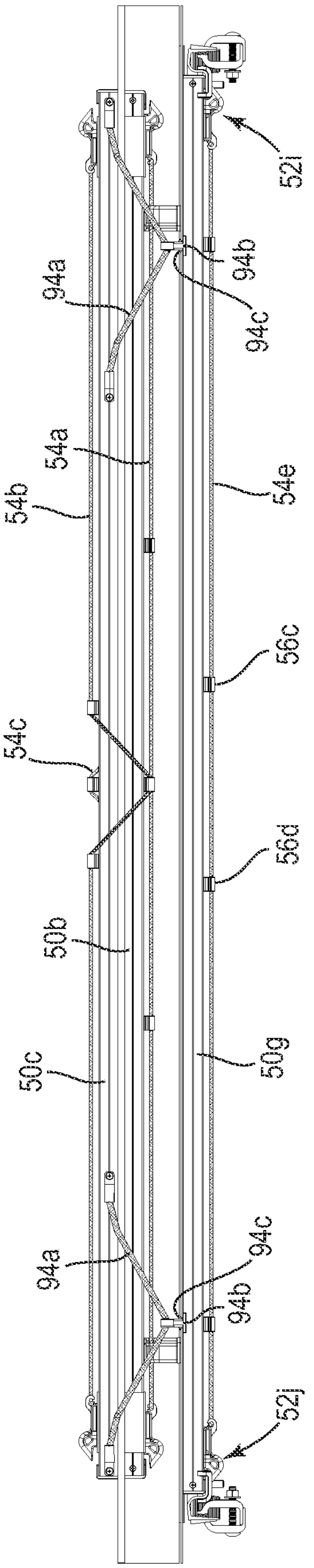
FIG. 10C is a front view of the folding tonneau cover apparatus of FIG. 1 showing a storage strap towards each side of the folded tonneau cover, with each storage strap pulled down and engaged with a strap bracket to the front panel, securing the folding tonneau cover in the folded up configuration, but for clarity of illustration the perimeter seal is not shown.
Figure 10D:
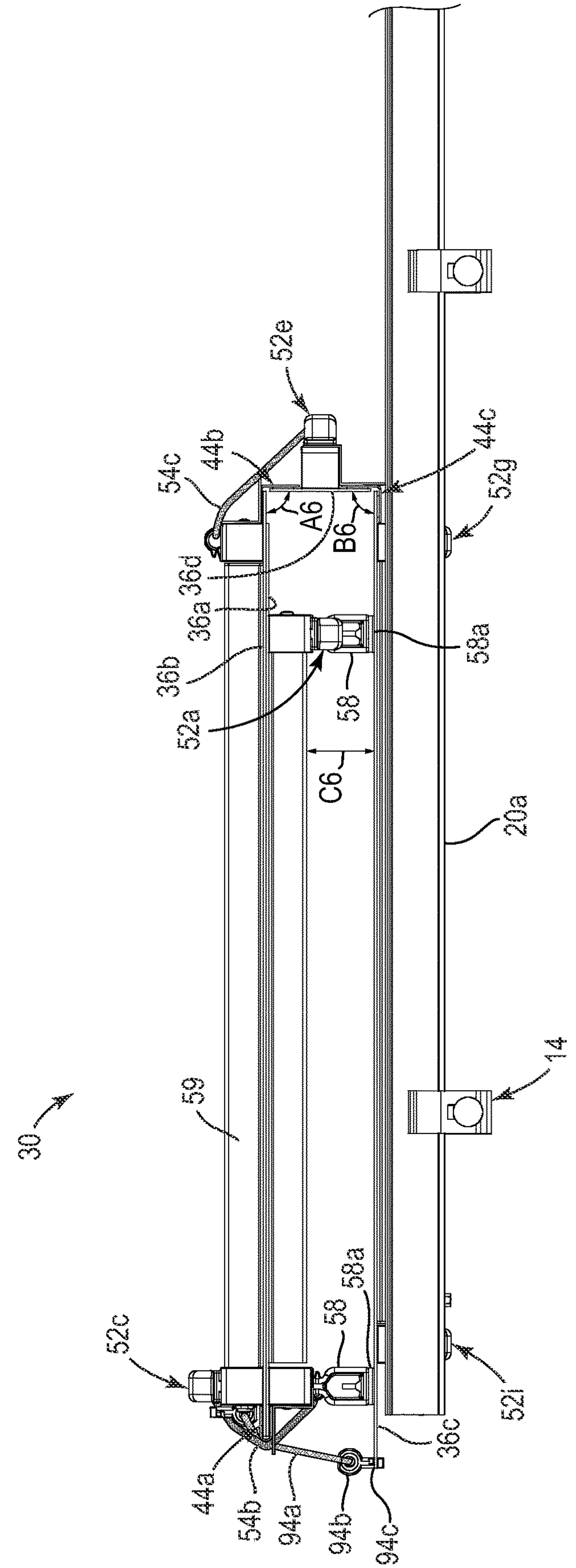
FIG. 10D is a side view from the driver's side of the folding tonneau cover apparatus of FIG. 1 in the configuration of FIG. 10C further showing the folded configuration and illustrating the flexible hinges in the folded-up configuration, with one of the storage straps being visible and engaged with a strap bracket on the front panel, securing the folding tonneau cover in the folded up configuration, but for clarity of illustration the perimeter seal is not shown.

Preferably, the length 39*d* of the spacer panel 36*d* is large enough to accommodate the hinges 44*b* and 44*c* without interference with the support bow 50*e*, but is preferably not significantly larger than required to accommodate the hinges 44*b*, 44*c* and support bow 50*e* so that the stored profile of the folding cover assembly 30 is minimized and minimize the folded profile when the folding cover assembly 30 is folded up but remains attached to the side rails 20*a*, 20*b* as illustrated in FIG. 10D is minimized, which is believed to reduce any tendency for the folding cover assembly 30 to catch wind when the folding cover assembly 30 is folded up but remains attached to the side rails 20*a*, 20*b* and when the truck 2 is in motion. In some embodiments, the length 39*d* of the space panel 36*d* is no greater than about one-third the lengths 39*a*, 39*b*, 39*c* of the other respective panels 36*a*, 36*b*, 36*c*.

Preferably, the length 39*b* of the middle panel 36*b* is somewhat smaller than the length 39*c* of the front panel 36*c* so that the driver or operator 8 can easily grasp the storage straps 94*a* and strap brackets 94*b*, when the folding cover assembly 30 is in the folded up configuration illustrated in FIG. 10A, to hook the strap brackets 94*b* in the bracket slots 94*c* at the front of the front panel 36*c* as illustrated in FIG. 10B. If the length 39*c* of the front panel 36*c* is longer than the length 39*b* of the middle panel 36*b*, the folded up configuration of the folding cover assembly 30, as illustrated in FIG. 10D, will cover a larger portion of the cargo box 5 so that there is a more limited opening to the cargo box 5 when the folding cover assembly 30 is folded up and secured on the truck 2 as illustrated in FIG. 10D. More preferably, the length 39*b* of the middle panel 36*b* is from about 0.25 inch to about 6 inches smaller than the length 39*c* of the front panel 36*c*. Still more preferably, the length 39*b* of the middle panel 36*b* is from about 1 inch to about 3 inches smaller than the length 39*c* of the front panel 36*c*. Even more preferably, the length 39*b* of the middle panel 36*b* is about 1.733 inches smaller than the length 39*c* of the front panel 36*c*.

Figure 6A:
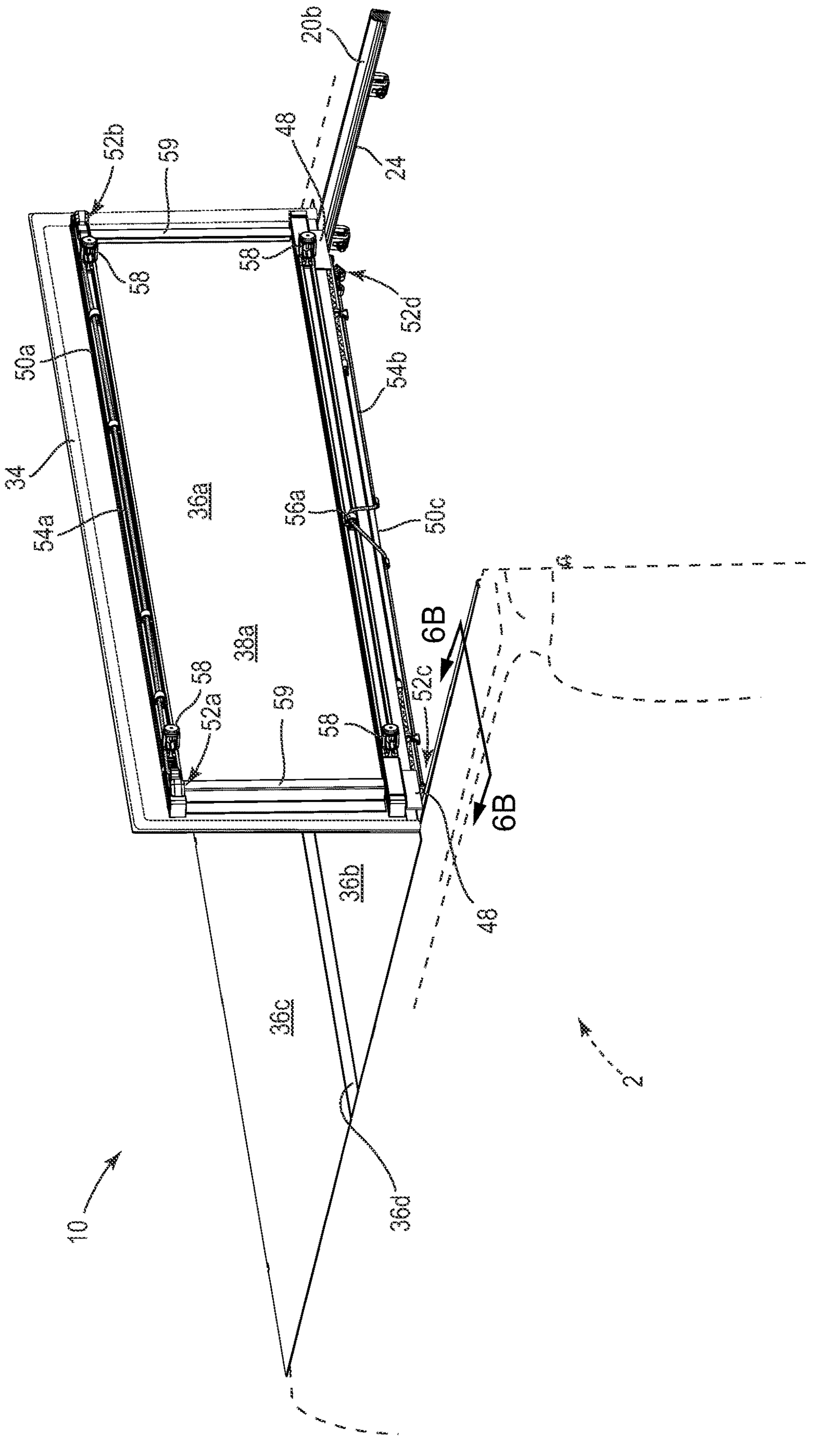
FIG. 6A is a rear perspective view of the folding tonneau cover apparatus of FIG. 1 wherein the latches on the rear panel have been released and the rear panel has been lifted up, whereby displacement of another release cord releases latches on the middle panel.

Once the latches 52 at both ends of the support bow 50*a* are retracted as shown in FIGS. 4A and 4B and described above, the rear end of the rear panel 36*a* can be lifted up from both side rails 20*a* and 20*b*, as illustrated in FIG. 6A. The support bow 50*b* near the front end of the rear panel 36*a* does not have latches 52; rather, the rear panel 36*a* is interconnected with the middle panel 36*b* by flexible hinge 44*a*. Since the front end of the rear panel 36*a* is in close proximity to the rear end of the middle panel 36*b*, the latches 52 at the ends of the support bow 50*c* at the rear end of the middle panel 36*b* sufficiently secure the front portion of the rear panel 36*a* of the folding cover assembly 30 to the side rails 20*a* and 20*b*.

Figure 6B:
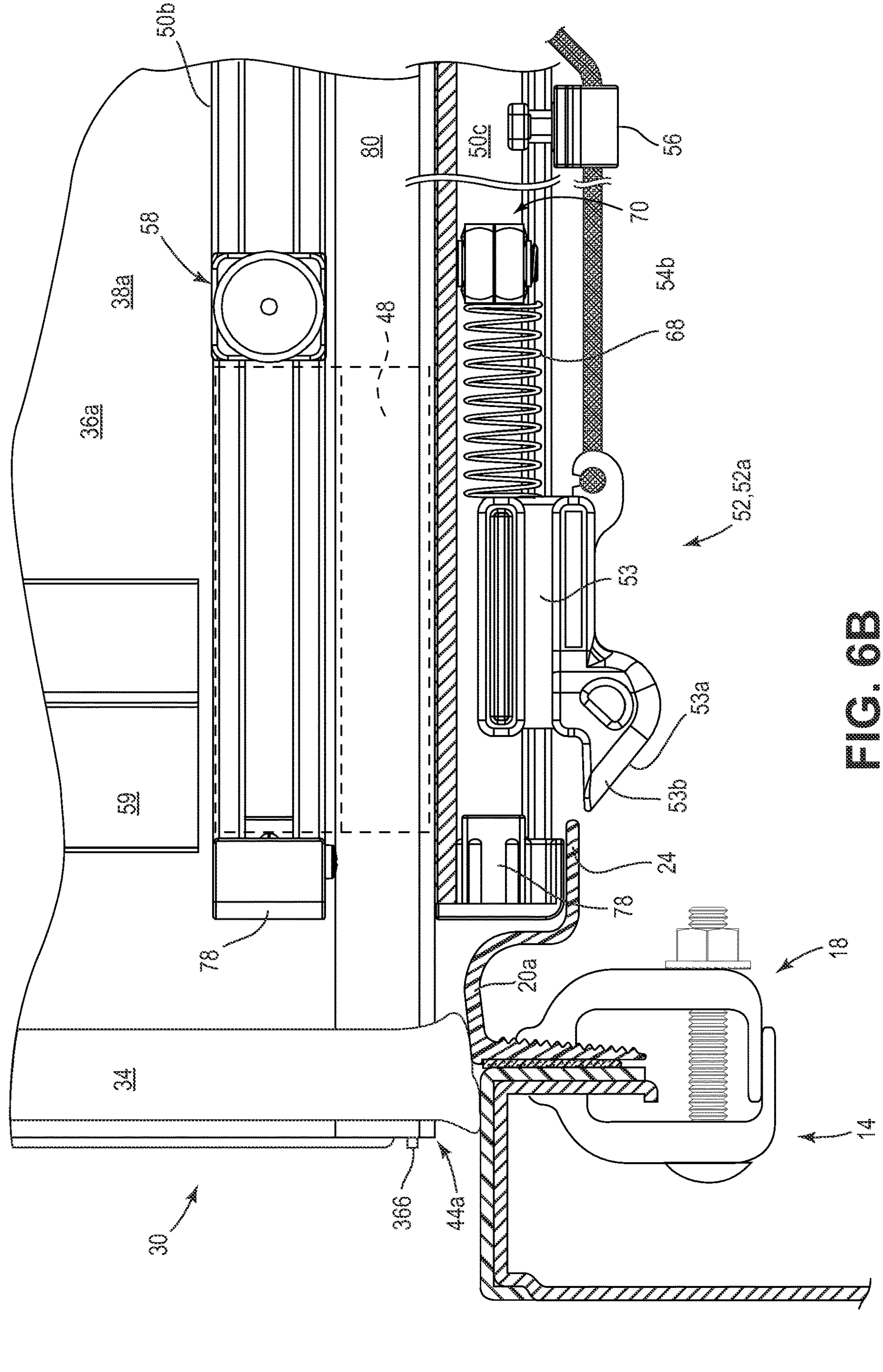
FIG. 6B is a is a partial section view as indicated on FIG. 6A similar to the view of FIG. 4B but showing the latch near the driver's side end portion of the rear support bow of the middle panel with the engaging portion of the latch retracted from the lip of the side rail.

When the latches 52 near the rear end of the rear panel 36*a* are retracted and the rear end of the rear panel 36*a* is lifted up from the side rails 20*a* and 20*b*, the rear panel 36*a* pivots upwards and frontwards, bending the hinge 44*a* as illustrated in FIG. 6A. The release cord 54*b* is attached to the latches 52 at the ends of the support bow 50*c* near the rear end of the middle panel 36*b* and passes through cord guides 56 along the support bow 50*c*. However, the release cord 54*b* also passes through cord guide 56*a* along the support bow 50*b*. As the rear panel 36*a* is lifted up, the cord guide 56*a* is displaced, automatically pulling release cord 54*b*. When the rear panel 36*a* is lifted up to an angle of about 45 to 90 degrees as illustrated in FIG. 6A, the release cord 54*b* is pulled far enough to release the latches 52 at the ends of the support bow 50*c*, with the engaging portion 53*b* of each latch 52 being retracted from the side rail lip 24 of each of the side rails 20*a* and 20*b* as shown in FIG. 6B to allow the rear portion of the middle panel 36*b* to be lifted up from the side rails 20*a* and 20*b*. Note that the optional hinge guard 48 is shown in phantom in FIG. 6B and some other figures herein.

Figure 7A:
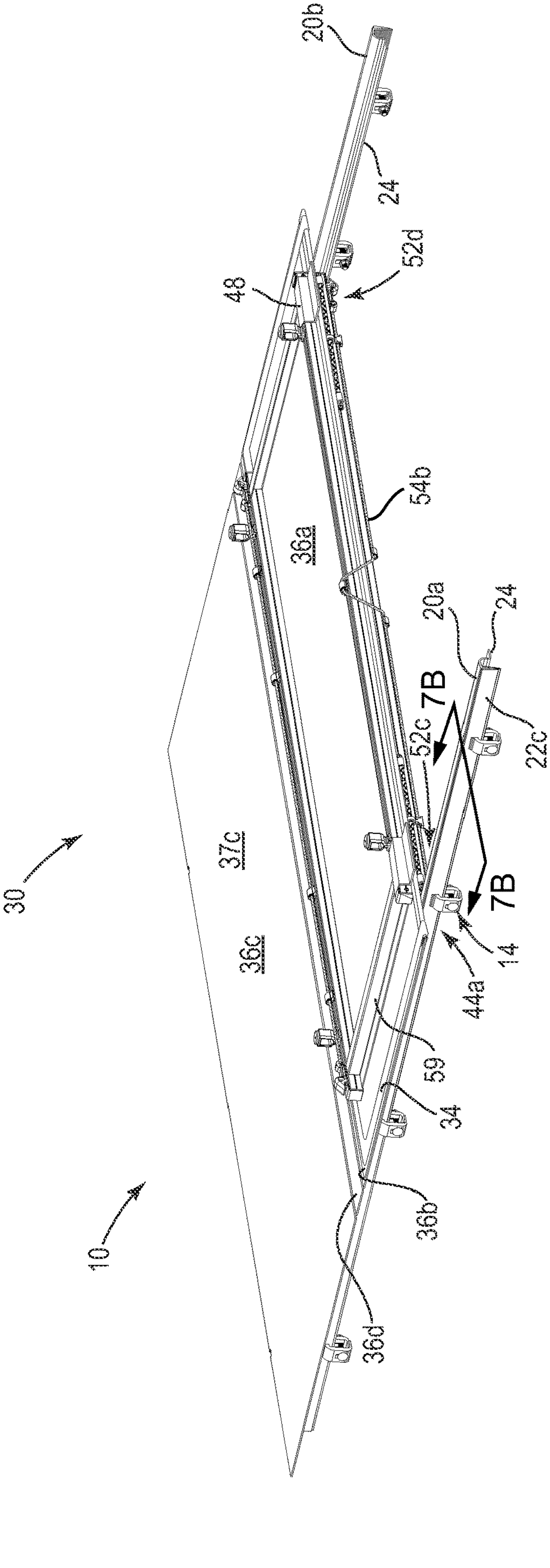
FIG. 7A is a rear perspective view of the folding tonneau cover apparatus of FIG. 1 wherein the rear panel has been rotated forward onto the middle panel.
Figure 7B:
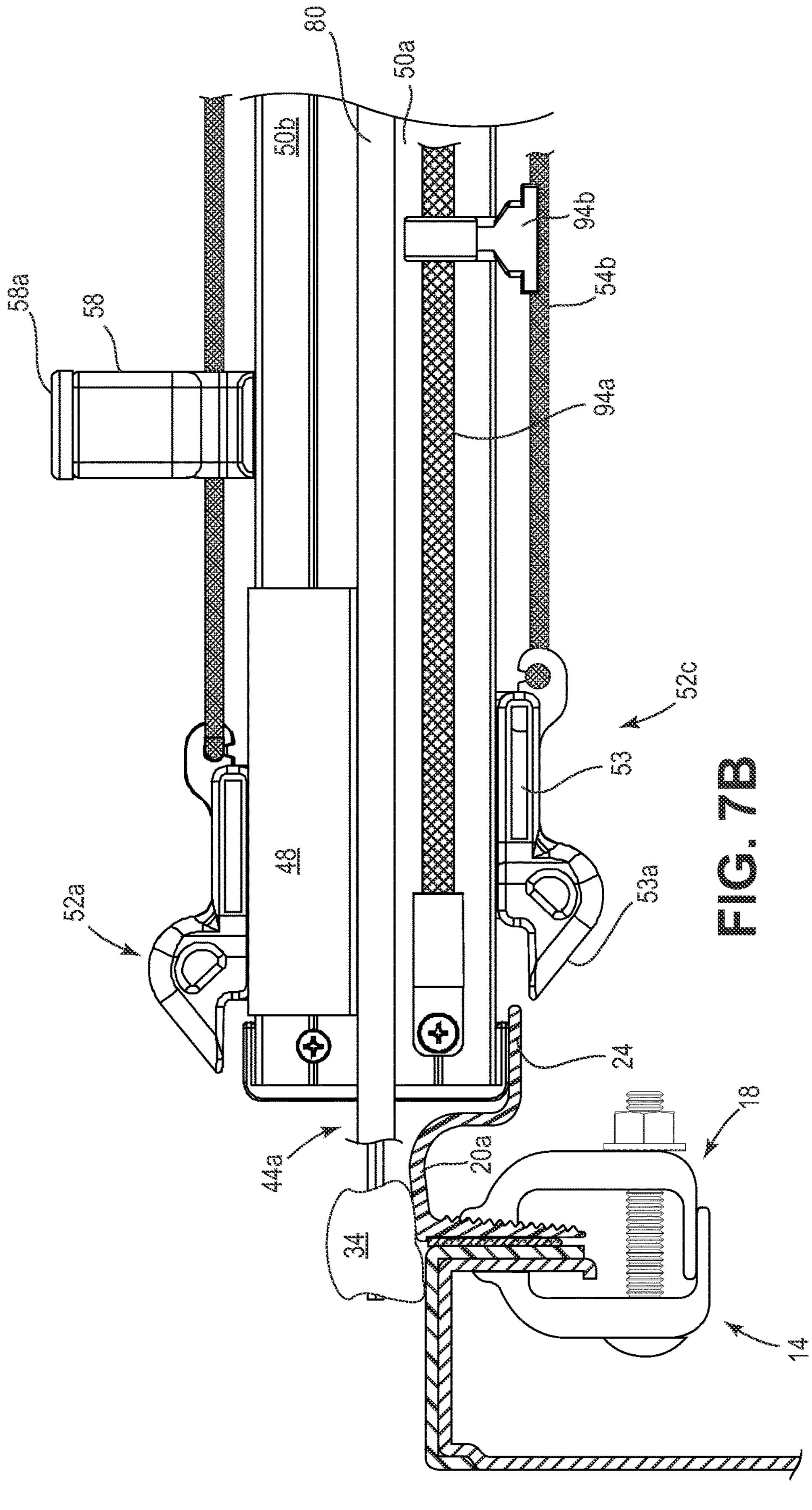
FIG. 7B is a partial section view as indicated on FIG. 7A similar to the view of FIG. 6B but with the engaging portion of the latch retracted from the lip of the side rail.

The rear panel 36*a* is rotated further, onto the middle panel 36*b* as illustrated in FIGS. 7A and 7B. Note that in FIG. 7B, a small portion of the hinge 44*a* has been removed and is shown in phantom to reveal the underlying panels 36*a*, 36*b*. At this point, since the latches 52 at the ends of the support bow 50*c* are automatically retracted as previously described, the middle panel 36*b* can be lifted from the side rails 20*a* and 20*b*, with the middle panel 36*b* (together with the rear panel 36*a* which is folded onto the middle panel 36*b*) pivoting upwards and frontwards, bending the hinge 44*b*. A release cord 54*c* is attached to the latches 52 at the ends of the support bow 50*e* which is attached to the spacer panel 36*d* and passes through cord guides 56 along the support bow 50*e*. However, the release cord 54*c* also passes through cord guide 56*b* along the support bow 50*d*. As the middle panel 36*b* is lifted up, the cord guide 56*b* is displaced, automatically pulling release cord 54*c*. When the middle panel 36*b* is lifted up to an angle of about 45 to 90 degrees as illustrated in FIG. 8A, the release cord 54*c* is pulled far enough to release the latches 52 at the ends of the support bow 50*e*, with the engaging portion 53*b* of each latch 52 being retracted from the side rail lip 24 of the side rails 20*a* and 20*b* as illustrated in FIG. 8B to allow the spacer panel 36*d* to be lifted up from the side rails 20*a* and 20*b*.

Figure 9A:
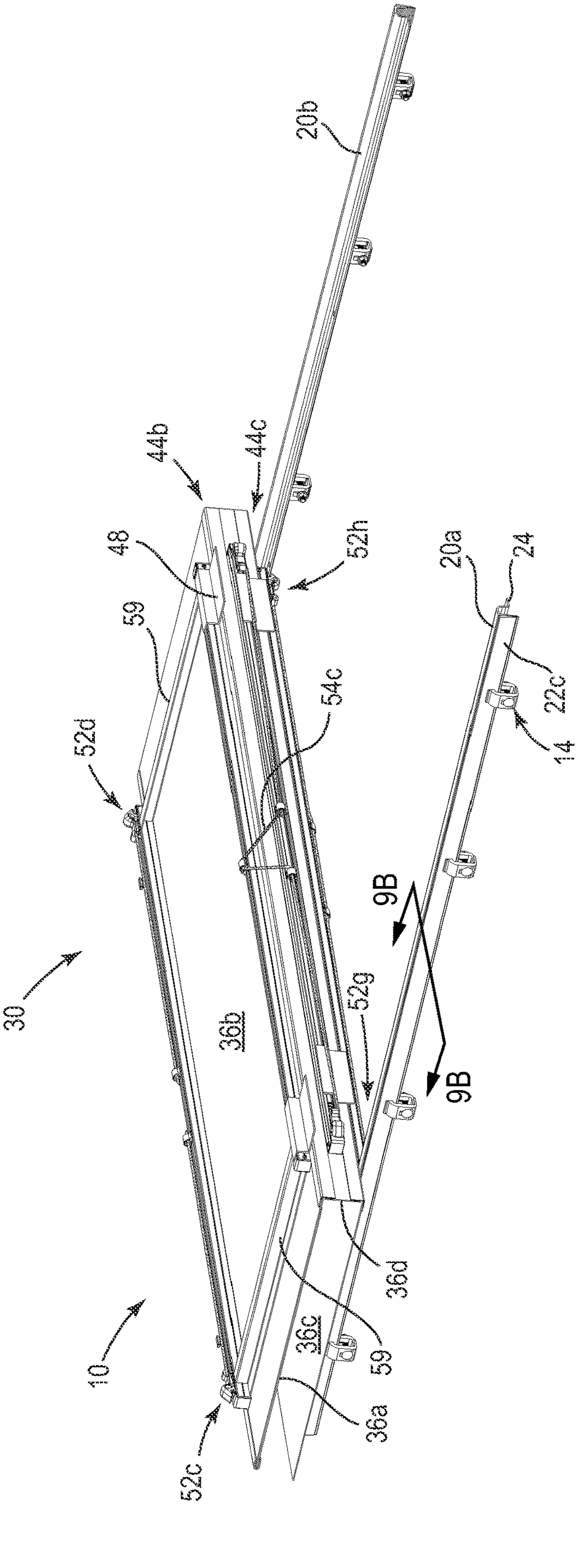
FIG. 9A is a rear perspective view of the folding tonneau cover apparatus of FIG. 1 wherein the rear panel together with the middle panel and the spacer panel has been rotated forward so that the middle panel and the rear panel are resting on the spacers on top of the rear panel, and with the spacer panel rotated upwards, but for clarity of illustration the perimeter seal is not shown.

With continued lifting and rotating of the middle panel 36*b* frontwards, the middle panel 36*b* together with the rear panel 36*a* rotates frontwards towards the front panel 36*c*. Standoffs 58 are attached to the bottom side of the rear panel 36*a*; in the example illustrated, there are two standoffs 58 attached to the support bow 50*a*, and two standoffs 58 attached to the support bow 50*b*. Through the folding and rotating of the middle panel 36*b* and the rear panel 36*a* as just described, the standoffs 58 attached to the support bow 50*a* contact the top of the front panel 36*c* as shown in FIG. 8C. Standoffs 58 help to maintain a spaced relationship between the rear panel 36*a* and the front panel 36*c*. With continued rotating of the middle panel 36*b* (together with the front panel 36*a*) the hinge 44*c* bends and the spacer panel 36*d* lifts off the side rails 20*a* and 20*b* as illustrated in FIG. 8D. With continued rotating of the middle panel 36*b* frontwards, together with the rear panel 36*a* and the spacer panel 36*d*, and pivoting and sliding of the standoffs 58, the middle panel 36*b*, the rear panel 36*a*, and the spacer panel 36*d* rotate progressively farther frontwards towards the front panel 36*c*, as illustrated in FIGS. 8E and 8F, until the standoffs 58 all contact the front panel 36*c* (FIG. 9A). During this folding of the folding cover assembly 30, the hinges 44*b* and 44*c* flex as the middle panel 36*b*, the rear panel 36*a*, and the spacer panel 36*d* rotate towards the front panel 36*c*. Depending on forces applied by the driver or other operator 8, the hinges 44*b* and 44*c* can flex to pass through various increasing or decreasing angles. Most commonly, however, the angles will vary in the following manner. Referring to FIGS. 8A, 8C-8F, and 10D, during the folding up of the folding cover assembly 30, the angle A between the middle panel 36*b* and the spacer panel 36*d* (which is about 180 degrees before beginning the folding up of the folding cover assembly 30, as in the configuration illustrated in FIG. 7A) initially decreases to angle A1 which is about 90 degrees as shown in FIG. 8A, then decreases past 90 degrees to angle A2 at which point the standoffs 58 contact the top surface 37*c* of the front panel 36*c* as shown in FIG. 8C; angle A2 may be about 35 degrees, but may be somewhat larger or smaller than about 35 degrees depending on the standoff distance 90*a* and the setback distance 90*b* between the standoff 58 and the bending portion of the hinge 44*b* (see FIG. 14C). Angle B between the spacer panel 36*d* and the front panel 36*c* (which is about 180 degrees before beginning the folding up of the folding cover assembly 30, as in the configuration illustrated in FIG. 7A) is shown as angle B1 in the configuration of FIG. 8A as about 180 degrees, and is shown as angle B2 in the configuration of FIG. 8C, preferably remaining at about 180 degrees until the standoffs 58 contact the top surface 37*c* of the front panel 36*c* as shown in FIG. 8C. Angle C between the rear panel 36*b* and the front panel 36*c* (which is about 180 degrees before beginning the folding up of the folding cover assembly 30, as in the configuration illustrated in FIG. 7A) initially decreases to angle C1 which is about 90 degrees as shown in FIG. 8A, then decreases past 90 degrees to angle C2 at which point the standoffs 58 contact the top surface 37*c* of the front panel 36*c* as shown in FIG. 8C. With continued rotation of the rear panel 36*a* and middle panel 36*b* and spacer panel 36*d*, depending on the forces and manipulations applied by the driver or operator 8, the angle A may remain about the same or may increase again as the angle B begins to decrease and the angle C continues to decrease, as shown as angles A3, B3, and C3 in FIG. 8D. With still continued rotation of the rear panel 36*a* and middle panel 36*b* and spacer panel 36*d*, the angle A may increase again as the angles B and C continue to decrease, as shown as angles A4, B4, and C4 in FIG. 8E. With further continued rotation of the rear panel 36*a* and middle panel 36*b* and spacer panel 36*d*, the angles A and B continue to approach about 90 degrees as the angle C continues to approach zero degrees as shown as angles A5, B5 and C5 in FIG. 8F. When the folding cover assembly 30 is completely folded, the angles A and B are preferably about 90 degrees and the angle C is preferably about zero degrees, as shown as angles A6, B6 and C6 on FIG. 10D, with the rear panel 36*a*, the middle panel 36*b*, and the front panel 36*c* being approximately parallel to each other, and the spacer panel 36*d* approximately vertical, oriented at about 90 degrees with respect to the panels 36*a*, 36*b*, and 36*d*. Other folding cover assemblies such as folding cover assemblies 130, 230, and 330 can fold in a similar manner as that just described; folding cover assembly 330 can additionally fold in a somewhat inverted configuration as depicted in FIGS.

After passing through angle A2 as depicted in FIG. 8C, with continued rotation of the rear panel 36*a* and middle panel 36*b*, the angle A may increase again as the angle B between the spacer panel 36*d* and the front panel 36*c* (which was 180 degrees before beginning the folding up of the folding cover assembly 30) decreases towards about 90 degrees. As the folding cover assembly 30 is folded up, the angle 88*c* between the rear panel 36*a* and the front panel 36*c* decreases towards about zero degrees, passing through the configurations depicted in FIGS. 8C-8F. For embodiments in which the folded configuration of the folding cover assembly 30 has the rear panel 36*a* folded so that it is parallel to the front panel 36*c*, so that angle 88*c* is about zero degrees when the folding cover assembly 30 is folded up, the folding cover assembly 30 passes from the configuration depicted in FIG. 7*a*, through those of 8A and 8C-8F, to that of 9A and 10D, the approximate relationship between the angles 88*a*, 88*b*, and 88*c* is believed to be given by the equation (angle 88*c*)=(angle 88*a*)+(angle 88*b*)−(180 degrees).

Figure 9B:
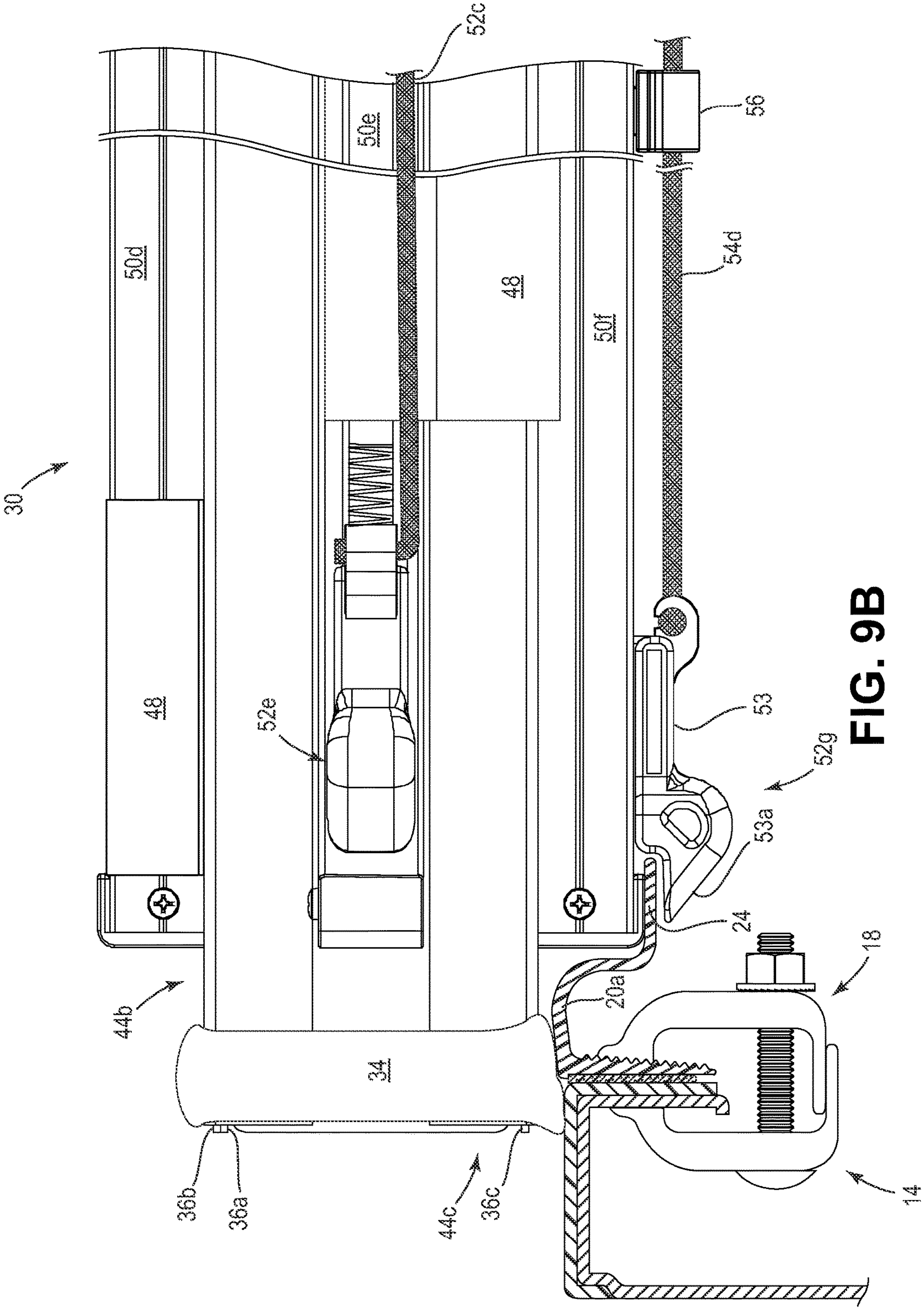
FIG. 9B is a partial section view as indicated on FIG. 9A illustrating the engaging portion of the latch on the driver's side of the rear support bow of the front panel engaged to the lip of the side rail.
Figure 11A:
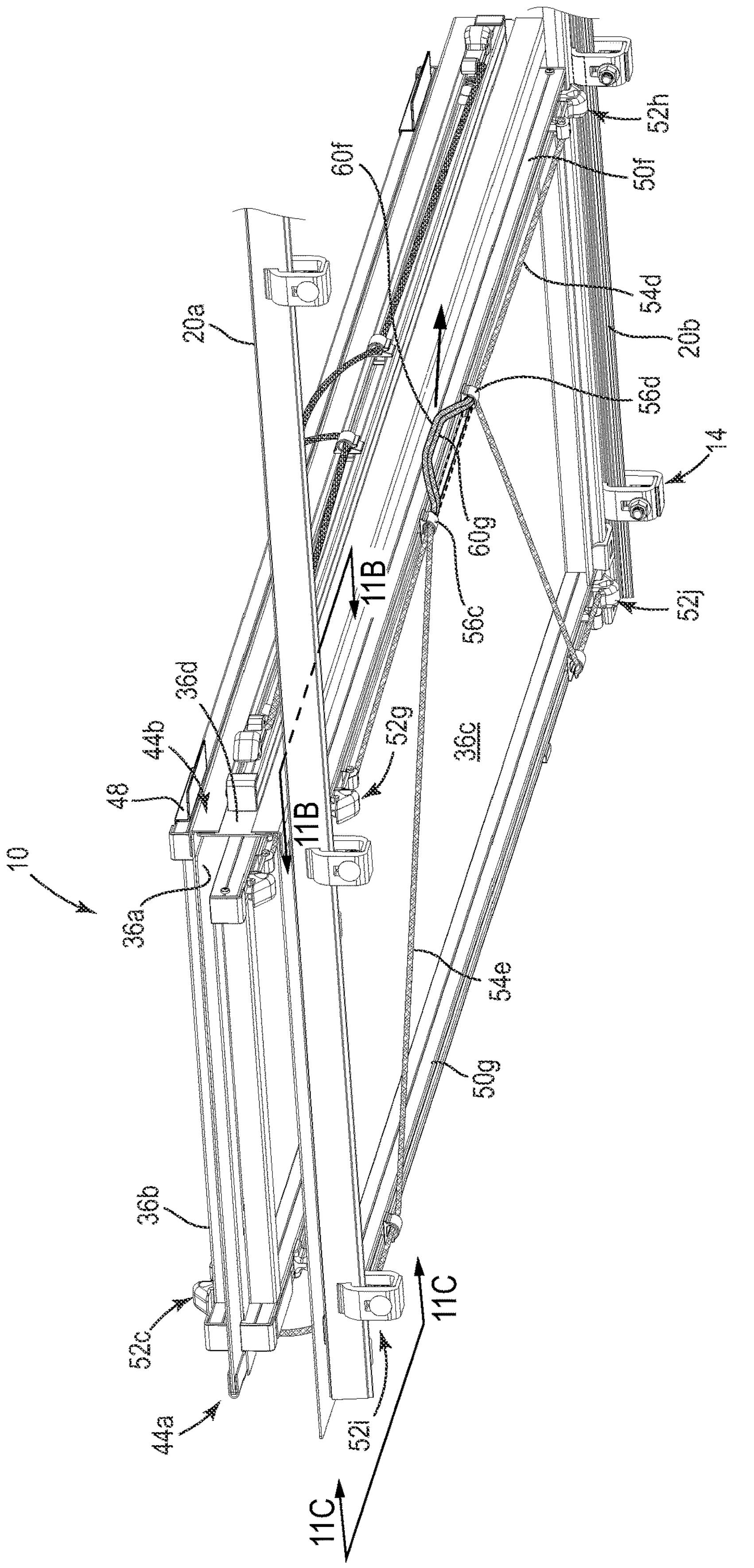
FIG. 11A is a rear perspective view of the folding tonneau cover apparatus of FIG. 1 viewed from slightly below and to the driver's side of the folding tonneau cover apparatus, wherein the folding tonneau cover is secured in the folded up configuration similar to that of FIGS. 10B-10D, showing two release cords for releasing the latches on the front panel pulled to release the latches, but for clarity of illustration the perimeter seal is not shown.
Figure 11B:
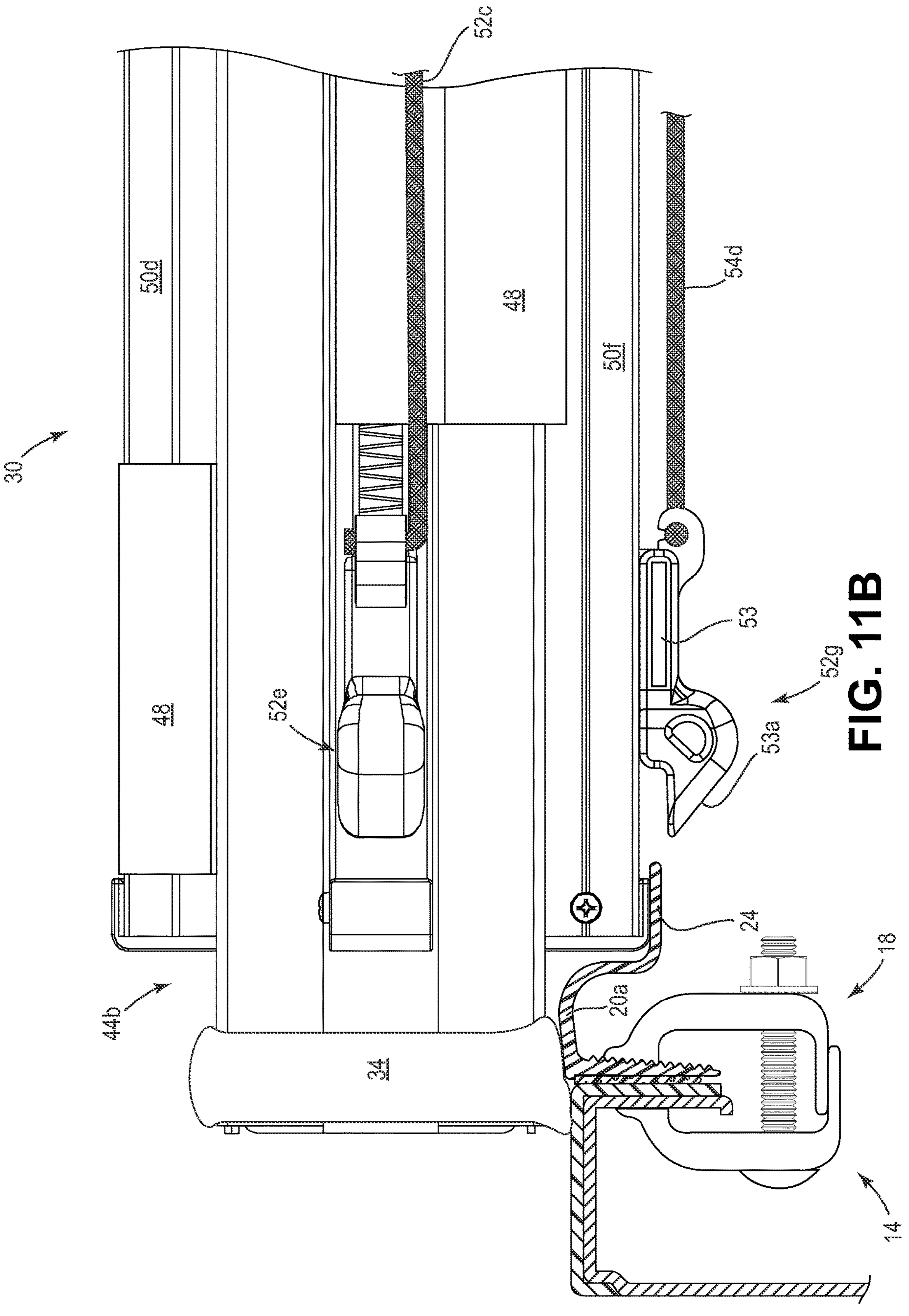
FIG. 11B is partial section view as indicated on FIG. 11A showing the latch near the driver's side end portion of the rear support bow of the front panel with the engaging portion of the latch retracted from the lip of the side rail.
Figure 11C:
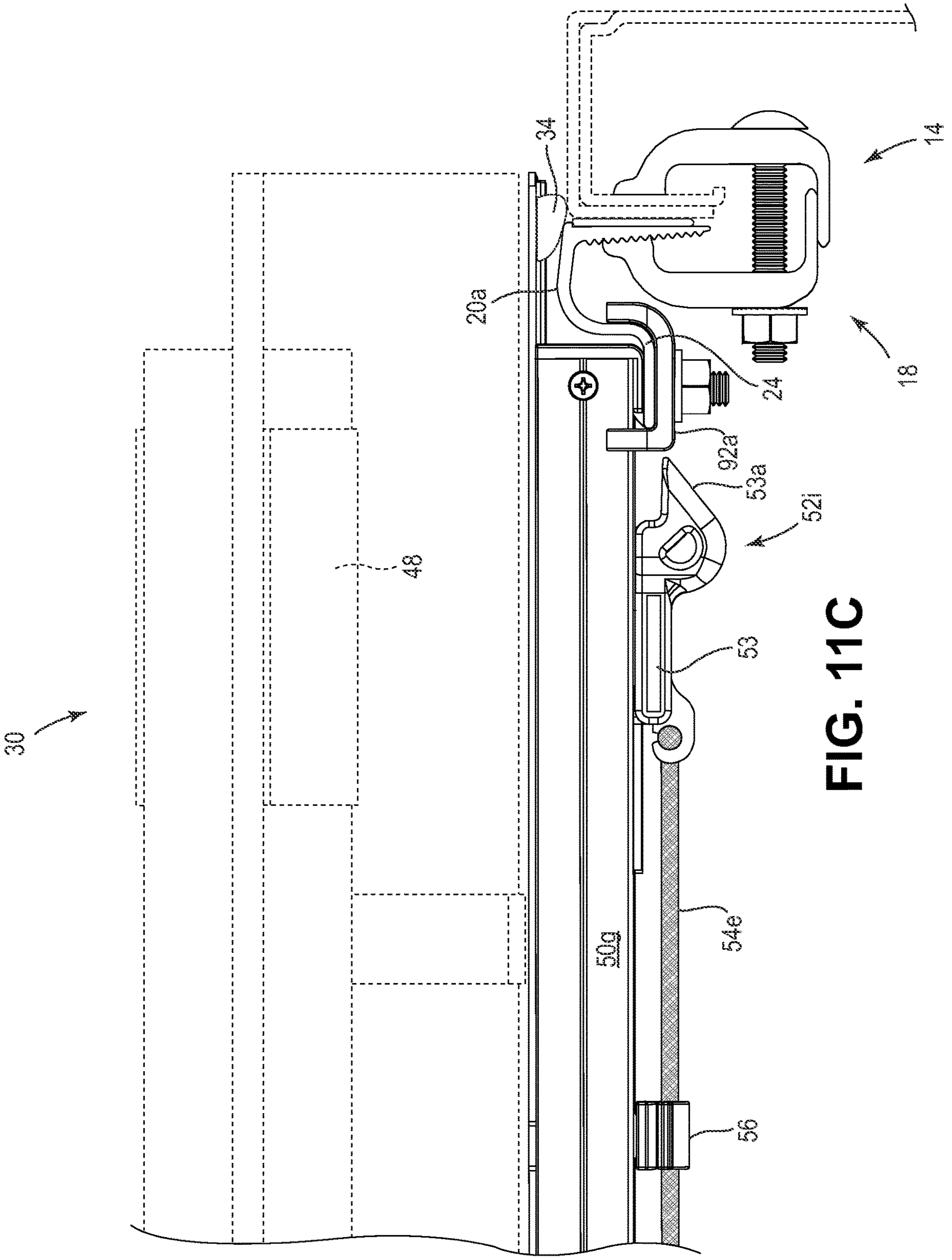
FIG. 11C is partial section view as indicated on FIG. 11A showing the latch near the driver's side end portion of the front support bow of the front panel with the engaging portion of the latch retracted from the lip of the side rail.

At this point, as illustrated in FIGS. 9A-10D, the folding cover assembly 30 is folded up, but is still attached to the side rails 20*a* and 20*b*, and the latches 52 at each end of the support bow 50*f* are engaged with the side rail lip 24 of the side rails 20*a* and 20*b* as illustrated in FIG. 9B. The latches 52 at each end of the support bow 50*g* are similarly engaged with the side rail lip 24 of the side rails 20*a* and 20*b* (FIG. 10C). Preferably, a containment bracket or anchor socket 92*a* is affixed to the side rail 20*a* as shown in FIGS. 10C and 11C, and a mirror-image anchor socket 92*b* is affixed to side rail 20*b* (FIGS. 10A-10C). The anchor sockets 92*a* and 92*b* keep the engaging portion 53*b* of the latches 52 at each end of the support bow 50*g* in a desired location along the side rail lip 24 of the side rails 20*a* and 20*b* and thereby aid in positioning the folding cover assembly 30 in a desired alignment with respect to the cargo box 5 when the engaging portion 53*b* of the latches 52 at each end of the support bow 50*g* are engaged with the side rail lip 24 of the side rails 20*a* and 20*b*.

Referring now to FIGS. 10A-10D, bundling means such as bungee cords or storage straps 94 can be utilized to fix the folding cover assembly 30 in the folded configuration; other straps, buckles, or hooks can be utilized as bundling means. FIGS. 10A-10D show a preferred embodiment, in which two elastic storage straps 94*a* are provided, one towards either side of the middle panel 36*b*, for securing the folding cover assembly 30 in a folded configuration. Preferably, strap brackets 94*b* are provided for each storage strap 94*a*, for hooking the storage straps 94*a* to the front panel 36*c*; the strap brackets 94*b* are formed of a strong polymer such as a polyamide, although other materials, including composites and metals, can be used. Preferably, the strap brackets are formed of nylon. Preferably, bracket slots 94*c* are provided in the front panel 36*c* as shown, and accommodate the strap brackets 94*b*. The strap brackets 94*b* are attached to or captured on the storage straps 94*a*, and the strap brackets 94*b* hook to the bracket slots 94*c* in the front panel 36*c* to secure the folding cover assembly 30 in the folded configuration when desired. In the front perspective view of FIG. 10B of the folded folding cover assembly 30, a storage strap 94*a* is hooked to the front panel 36*c* with a strap bracket 94*b*. FIG. 10C is a front view which illustrates a storage strap 94*a* near each side of the middle panel 36*b* which is hooked to the front panel 36*c* with corresponding strap brackets 94*b* to secure the folded folding cover assembly 30 in a folded configuration as shown. FIG. 10D shows a side view of this folded configuration of the folding cover assembly 30, with the rear panel 36*a* secured to the front panel 36*c*. The folding cover assembly 30 can be left in this folded configuration, as illustrated in FIG. 10D, covering only the front portion of the cargo box 5.

Figure 12:
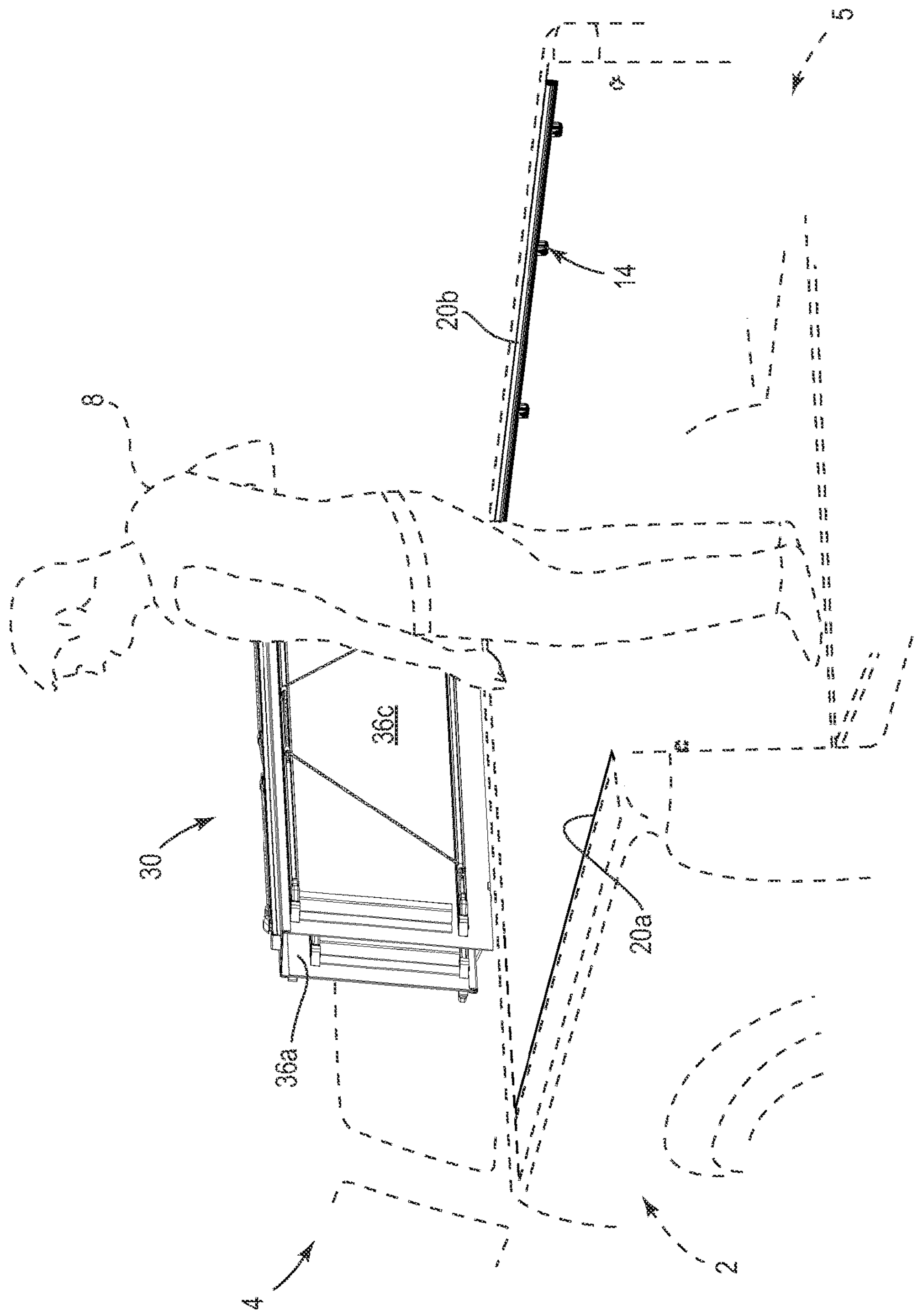
FIG. 12 illustrates the folding tonneau cover apparatus of FIG. 1, secured in the folded up configuration, and with the latches on the front panel released as illustrated in FIGS. 11A-11C, being carried away from the side rails, but for clarity of illustration the perimeter seal is not shown.

Alternatively, if it is desired to remove the folding cover assembly 30 to leave the cargo box 5 completely uncovered, the folding cover assembly 30 can be removed as follows. As illustrated in FIGS. 11A and 11B, segment 60*f* of the release cord 54*d* and segment 60*g* of the release cord 54*e* are accessible between cord guides 56*c* and 56*d*. Conveniently, segment 60*f* of release cord 54*d* and segment 60*g* of release cord 54*e* are arranged adjacent to each other, and can easily be grasped simultaneously by a driver or other operator 8. Pulling on the release cord 54*d* in segment 60*f* will retract the latches 52 at the ends of the support bow 50*f* against the force of the biasing members or springs 68 as illustrated in FIG. 11B, while pulling on the release cord 54*e* in segment 60*g* will retract the latches 52 at the ends of the support bow 50*g* against the force of the biasing members or springs 68, as illustrated in FIG. 11C. Note that as in some other figures herein, some elements are depicted simply in phantom on FIG. 11C to indicate their locations but are shown in detail in other figures. Typically, the release cords 54*d* and 54*e* will be pulled by a driver or other operator 8; the operator 8 preferably has entered the cargo box 5 via the tailgate 6*d* to grasp segments 60*f* and 60*g* of release cords 54*d* and 43*e*, respectively. When the release cords 54*d* and 43*e* are pulled, the engaging portions 53*b* of the latches 52 at the ends of support bows 50*f* and 50*g* are retracted away from the lips side rail lips 24 of the side rails 20*a* and 20*b*, releasing the latches 52 from the side rails 20*a* and 20*b*, and allowing both the rear portion of the front panel 36*c* and the front portion of the front panel 36*c* to be lifted up from the side rails 20*a* and 20*b*. In this configuration, the folded folding cover assembly 30 is free from the side rails 20*a* and 20*b* and can be lifted up and off the cargo box 5 as illustrated in FIG. 12; the folding cover assembly 30 can be moved away from the pickup truck 2, or stowed in the cargo box 5 or elsewhere as desired.

When it is desired to replace the folding cover assembly 30 on the cargo box 5, or to close one or more panels 36, the various steps illustrated can be done in the reverse order. To latch the various latches 52, however, it is not necessary to manually retract any of the release cords, since the latch slide 53 has an inclined bottom surface 53*a*. When the latch slide 53 contacts and is forced further towards the side rail lip 24 of the side rails 20*a* or 20*b*, the inclined bottom surface 53*a* of the latch slide 53 will retract the engaging portion 53*b* to allow the engaging portion 53*b* to move past the side rail lip 24, whereupon the spring 68 will move the engaging portion 53*b* into the secured configuration, such as illustrated in FIG. 3B and elsewhere herein.

Figure 13A:
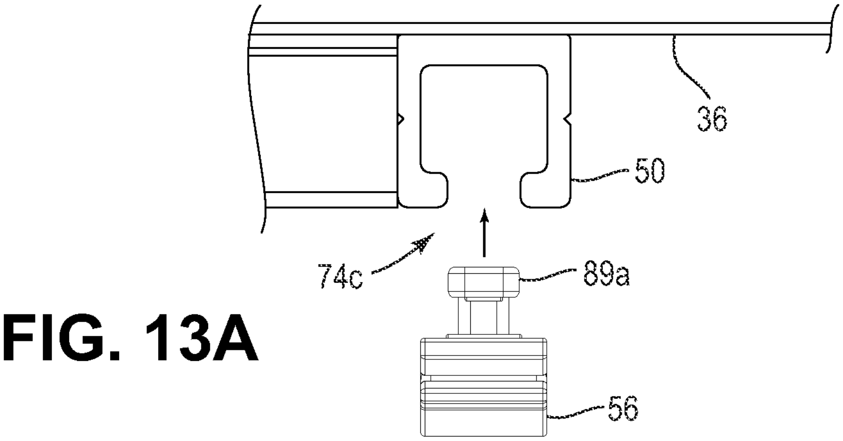
FIG. 13A illustrates a cord guide aligned for attachment to a support bow.
Figure 13B:
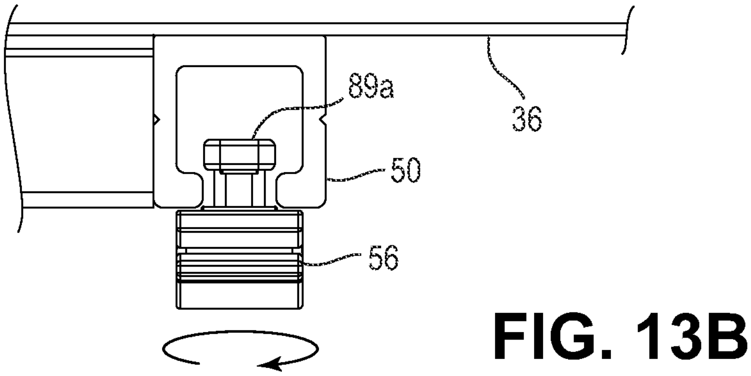
FIG. 13B illustrates the cord guide of FIG. 13A inserted into the support bow.
Figure 13C:
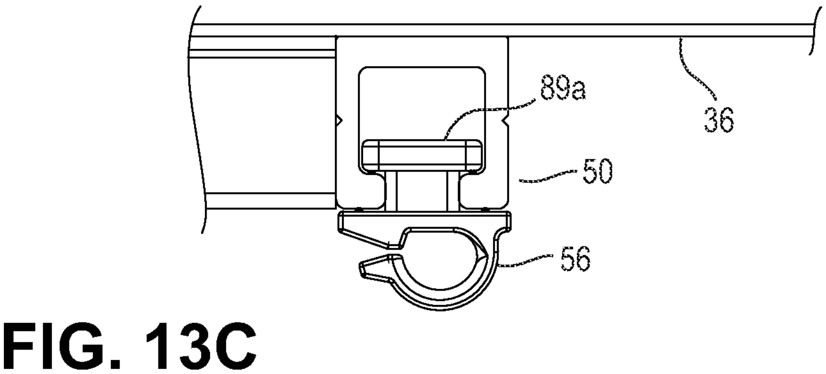
FIG. 13C illustrates the cord guide of FIGS. 13A and 13B rotated so that an oblong securement feature engages the support bow.

Referring now to FIGS. 13A-13C, attachment of a cord guide 56 to a support bow 50 is illustrated. The cord guide 56 has a securement feature 89*a* which is configured for attachment to the support bow 50. Preferably, the securement feature 89*a* is oblong and is narrow enough to fit into the channel opening 74*c*, and when aligned with the open bottom of the bow bottom portion 74*b* it can be inserted into the support bow 50 as shown in FIG. 13B. The cord guide 56 is rotated so that the oblong securement feature 89*a* secures the cord guide 56 to the support bow 50 as shown in FIG. 13C.

Referring now to FIGS. 14A-14C, attachment of a standoff 58 to a support bow 50 is illustrated. The standoff 58 has a securement feature 89*b* which is configured for attachment to the support bow 50. Preferably, the securement feature 89*b* is oblong and is narrow enough to fit into the channel opening 74*c*, and when aligned with the open bottom of the bow bottom portion 74*b* it can be inserted into the support bow 50 as shown in FIG. 14B. The standoff 58 is rotated so that the oblong securement feature 89*b* secures the standoff 58 to the support bow 50 as shown in FIG. 14C. The standoff distance 90*a* and the setback distance 90*b* together determine the angle 88*a* (FIG. 8C) at which the standoff 58 contacts the front panel 36*c* when the folding cover assembly 30 is being folded up. Preferably, protective pad or insert or rubber foot 58*a* is attached to the end of the standoff 58 as shown. Protective pad 58*a* serves to reduce impact or abrasion damage to the front panel 36*c* when the folding cover assembly 30 is folded up onto the front panel 36*c*.

In this example, the length 39*d* of the spacer panel 36*d* is substantially smaller than the lengths 39*a*, 39*b*, 39*c* of the other panels 36*a*, 36*b*, 36*c* (FIG. 2A). The length 39*d* of the spacer panel 36*d*, together with the standoff distance 90*a*, determine the separation between the front panel 36*a* and the rear panel 36*c* in the folded configuration such as is illustrated in FIG. 10D. The larger lengths 39*a*, 39*b*, 39*c* of panels 36*a*, 36*b*, 36*c* provide for efficient coverage of the cargo box 5, while the smaller length 39*d* of the spacer panel 36*d* provides for folding up of the folding cover assembly 30 to a convenient folded size, while providing space for the various hinges 44, support bows 50, and other components within the folded-up folding cover assembly 30. The standoff distance 90*a* together with the setback distance 90*b* also provide for controlled folding of the folding cover assembly 30, as illustrated in FIGS. 8A-9A. As the spacer panel 36*d*, the middle panel 36*b*, and the rear panel 36*a* are folded together onto the front panel 36*c*, the standoff 58 near each end of the support bow 50*a* contacts the front panel 36*c* and provides a pivot point and sliding support to aid in orienting the panels 36 in the folded configuration as shown. The standoff distance 90*a* is chosen to accommodate the length 39*d* of the spacer panel 36*d*, allowing for the thickness of the hinges 44*b*, 44*c* as illustrated in FIGS. 10D and 14C. Preferably, the standoff distance 90*a* is long enough to ensure contact between the protective pad 58*a* and the top surface 37*c* of the panel 36*c* in order to minimize movement and stress on the hinges 44*b*, 44*c* and to minimize any damage due to abrasion between the protective pad 58*a* and the top surface 37*c* of the panel 36*c*. Preferably, the standoff distance 90*a* is short enough to avoid undue stress on the panel 36*c* and the hinges 44*b*, 44*c* when the folding cover assembly 30 is folded up as illustrated in FIGS. 10A-10D.

Figure 15A:
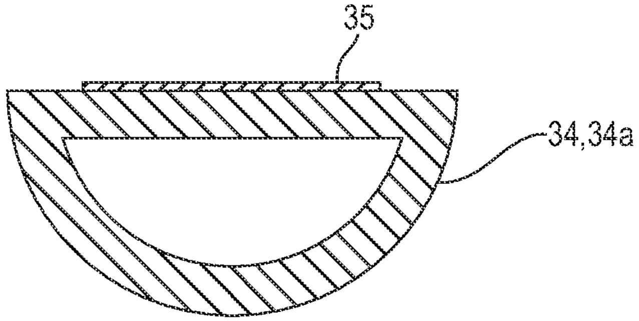
FIG. 15A illustrates a perimeter seal in cross section.
Figure 15B:
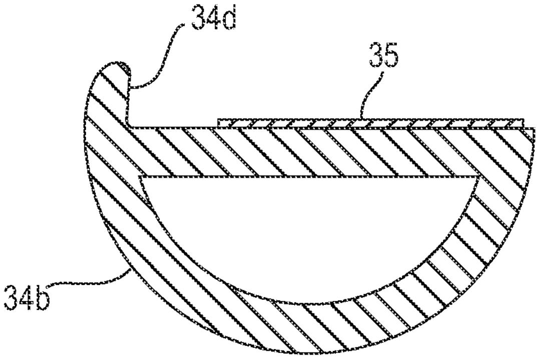
FIG. 15B illustrates an alternative perimeter seal in cross section.
Figure 15C:
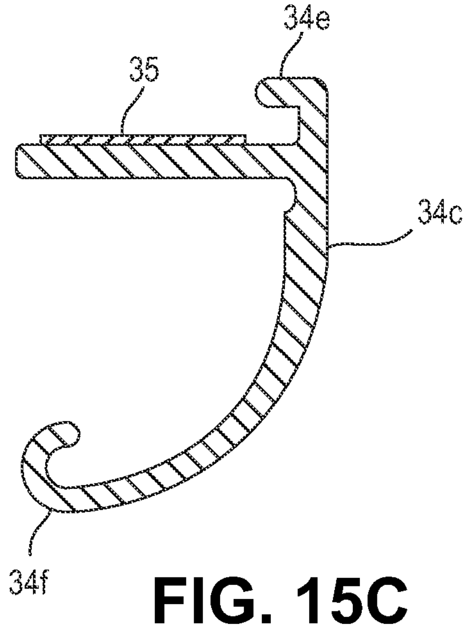
FIG. 15C illustrates a further alternative perimeter seal in cross section.
Figure 15D:
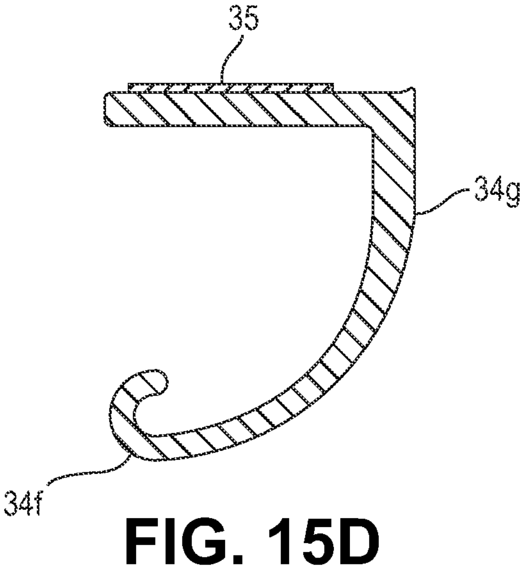
FIG. 15D illustrates another perimeter seal in cross section.
Figure 15E:
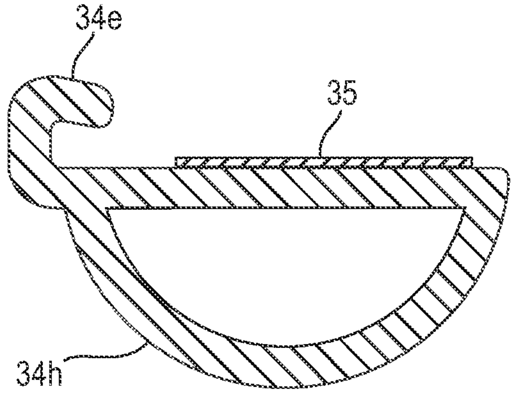
FIG. 15E illustrates another alternative perimeter seal in cross section.
Figure 15F:
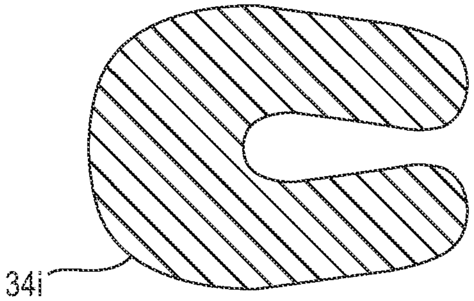
FIG. 15F illustrates an edge guard in cross section.
Figure 15G:
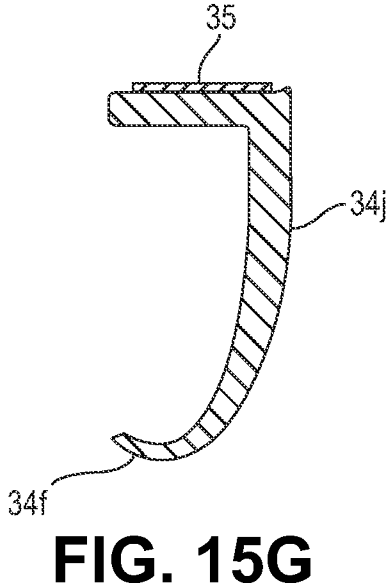
FIG. 15G illustrates a still further alternative perimeter seal in cross section.

Referring to FIGS. 15A-15C, the perimeter seal 34 provides a seal against the entry of water, dust, or other debris into the cargo box 5 around the perimeter of the folding cover assembly 30. The perimeter seal can also adapt to irregularities in the fit between the folding cover assembly 30 and the sidewalls 6*a*, 6*b*, front wall 6*c*, and tailgate 6*d* of the cargo box 5. The perimeter seal 34 is preferably attached to the panels 36 with adhesive such as adhesive 82*a*, 82*b* described above, although other attachment mechanisms can be used to secure the perimeter seal to the underside 38 of the respective panel 36, such as those described herein for attachment of the flexible sheet material 80 or the support bows 50 to the panels 36. Preferably, the perimeter seal 34 is attached to the panels 36 in the same manner as are the hinges 44. FIG. 15A schematically illustrates one example perimeter seal 34*a* having D-shaped cross section as shown. Preferably, adhesive 35 is used to secure the perimeter seal 34 to the panels 36; although other types of adhesive, such as pressure-activated, heat-activated, UV-activated, chemical-reaction-cure, or other adhesives that are known in the art, can be used, preferably adhesive 35 is an adhesive such as the previously described adhesives 82*a*, 82*b*, 84*a*, 84*b*. FIG. 15B schematically illustrates another example perimeter seal 34*b* having a perimeter seal lip 34*d*; perimeter seal lip 34*d* can aid in alignment of the perimeter seal 34 at the edge of the panel 36, and can also provide some protection when manipulating panel 36 so that injury from contact with any narrow or sharp edges of the panel 36 is avoided. FIG. 15C schematically illustrates another example perimeter seal 34*c* having an extended perimeter seal flange 34*e* which provides similar advantages as the perimeter seal lip 34*d* but also extends a short distance over the top surface of the panel 36; the example perimeter seal 34*c* has an open cross section with an extended sealing feature 34*f*. Different configurations of the perimeter seal 34 can be used in different portions of the folding cover assembly 30. For example, the perimeter seal 34*a* could be used along the front of the front panel 36*c* to seal against the front wall 6*c* of the cargo box 5, while the perimeter seal 34*b* could be used along the sides of the panels 36 to seal against the sidewalls 6*a*, 6*b* (or sidewall cap 6*e*, if the truck 2 is so equipped), while the perimeter seal 34*c* could be used along the rear of the rear panel 36*a* to seal against the tailgate 6*d*. Further example perimeter seals include perimeter seal 34*g*, schematically illustrated in FIG. 15D, which has an open cross section similar to perimeter seal 34*c* but without an extended lip or flange. FIG. 15E illustrates an example perimeter seal 34*h* which is similar to perimeter seal 34*b* but also includes an extended perimeter seal flange similar to that shown in FIG. 15C. FIG. 15F shows an edge guard 34*i* for attachment at an exposed edge of a panel 36 but with minimal intrusion along the top surface 37 or the bottom surface or underside 38 of the respective panel (corresponding to the top surface 32*a* or the bottom surface 32*b*, respectively, of the folding cover assembly 30); edge guard 34*i* can be used for protection at the rear edge of the rear panel 36*a*, for example. Edge guard 34*i* is preferably secured by an interference fit with the respective panel 36; alternatively, edge guard 34*i* can be secured to the respective panel 36 by an adhesive such as adhesive 35 illustrated in FIGS. 15A-15E. FIG. 15G schematically illustrates a perimeter seal 34*j* similar to perimeter seal 34*g* of FIG. 15D but having an extended sealing feature 34*f* somewhat shorter than the perimeter seal of FIG. 15D, as shown. The perimeter seal 34 can be formed into a bend at the corners of the cargo box 5, or separate segments of the perimeter seal 34 can be applied near each of the driver's side, passenger side, front side, and rear side of the folding cover apparatus 30, preferably cut to meet at a 45 degree angle to provide an essentially continuous perimeter seal around the perimeter. In a similar manner, differing configurations of perimeter seal 34, such as various perimeter seals 34*a*, 34*b*, 34*c*, 34*g*, 34*h*, and 34*j* described herein can be used along different portions of the perimeter, preferably cut to meet in close approximation and thereby providing an essentially continuous perimeter seal around the perimeter but with differing seal configurations at different portions of the perimeter. An edge guard such as edge guard 34*i* can be used to protect against damage or injury from the edge of the panel 36. Preferably, the perimeter seal 34 is arranged to provide an essentially continuous perimeter seal around the perimeter of the cargo box 5, and in addition, the rear edge of the rear panel 36*a* preferably has an edge guard 34*i*. Thus, some portions of the folding cover assembly 30 have perimeter seals 34 (which may include perimeter seals 34*a*, 34*b*, 34*c*, 34*g*, 34*h*, 34*j*, for example) in addition to edge guard 34*i*. Alternatively, the extended perimeter seal flange 34*e* can be incorporated into the perimeter seal 34 so that a separate edge guard 34*i* is not required. Various perimeter seals and edge guards are available from Lakeview Industries, Chaska, MN. Preferably, each of the folding cover assemblies 30, 130, 230, 330, 430 described herein includes a perimeter seal such as a perimeter seal disclosed herein, such as perimeter seal 34, 34*a*, 34*b*, 34*c*, 34*g*, 34*h*, 34*j*, 134, 134*a*, 134*b*, 134*c*, 134*g*, 134*h*, 134*j*, 234, 234*a*, 234*b*, 234*c*, 234*g*, 234*h*, 234*j*, 334, 334*a*, 334*b*, 334*c*, 334*g*, 334*h*, 334*j*, 434, 434*a*, 434*b*, 434*c*, 434*g*, 434*h*, 434*j*. In some views in the drawings, the perimeter seal is not shown for clarity of illustration.

Now referring to FIGS. 16A-16E, the panels 36 preferably include sheet metal, although a rigid and tough polymer sheet can be used. In particular, lightweight and strong metal alloys, such as aluminum alloys, are preferred. The panels 36 are preferably relatively rigid as compared to the hinges 44, so that when the folding cover assembly 30 is folded up as described herein, the panels 36 remain relatively flat, while the hinges 44 can flex to fold up the folding cover assembly 30. Preferably, the panels 36 are from about 0.020 inches to about 0.200 inches thick. More preferably, the panel material is 5052-T34 rolled aluminum alloy from Aleris Inc., Cleveland, OH, which has a thickness of about 0.063 inches thick and is coated on the top with a Krystal Kote™ polyester paint system coating from Valspar Sourcing, Inc., Minneapolis, MN and on the bottom with a clear epoxy coating while it is in the factory. The rolled aluminum alloy is manufactured into a coil of rolled aluminum. Once cooled, the coil is unrolled and separately coated on the top and the bottom surfaces of the aluminum material, heat treated and recoiled for delivery to a material handler or to the buyer. The coated panel material is then unrolled and panels are cut using a laser cutting machine or such other equipment that allows the panels to be effectively cut to desired size and shape specifications. The thickness of the respective panels is minimized to limit the weight of the respective panels and the cost of the materials, but it the panels are too thin they will be subject to deformation between supporting structures. The panel material will preferably have a thickness of from about 0.020 inches to about 0.200 inches, more preferably from about 0.030 inches to about 0.126 inches, still more preferably from about 0.040 inches to about 0.100 inches, even more preferably from about 0.050 inches to about 0.080 inches, and most preferably about 0.063 inches.

This most preferred thickness was selected for a number of reasons including strength and process limitations. For the preferred coating described above, 0.063 inches is the thickest size that is believed to be presently available from manufacturers of the product. Since this was the thickest material that could be obtained with the preferred coating, the rigid alloy 5052-T34 with the aforementioned coatings was selected from a number of other materials having a number of other sizes. We determined that using an aluminum alloy allows the cover to be both light weight and rigid. The 5052-T34 material was chosen because it allows the cover to be strong and resistant to permanent deflections under static loads, denting, bending and long term abuse. The thickness also creates limitations if it is too thick because the cover panels may interfere with one another at the hinge points and can therefore add a lot of unwanted stress on the hinge adhesive such as adhesive 82*a*, 84*a* where the respective hinges 44 are attached and sealed to the adjacent panels 36. If the panel material is too thin, the panels will sag and easily deform with static loads. In alternate embodiments, other materials are used to make the panels 36 such as steel, aluminum, fiberglass, carbon fiber, ceramic, thermoset plastics, thermoplastics, HDPE, LDPE, ABS, PVC, Nylon, titanium alloy, magnesium alloy, copper, brass, stainless steel, rubber, fiber-reinforced or glass-containing polymeric materials and the like.

As noted, the preferred coatings on the panels 36 are a Kyrstal Kote™ polyester paint system from Valspar, preferably a black polyester base coat with a clear texture top coat on the top surface 37 and a clear epoxy coating on the underside or bottom surface 38 of the panels 36. Other coatings that could be used in alternate embodiments include acrylic paints, polyester paints, epoxy coatings, galvanized coatings, zinc plating, anodizing, other plating systems and the like. Alternative coatings include any combination of the above-mentioned coatings on either the top or the bottom sides of the panels 36. The texture on the top surface 37, bottom surface 38 of the respective panels 36 can be smooth, brushed, embossed, dented, sandblasted, rolled, waved and the like. Although a black top surface is preferred on the panels 36, coating including others colors that are well known in the art may also be applied on the top surfaces 37 and the bottom surfaces 38 of the respective panels 38 in alternative embodiments. It will be appreciated that the coating on the respective surfaces are desirable both aesthetically and functionally to enable the respective surfaces to hold up over time in harsh environments.

Figure 16A:
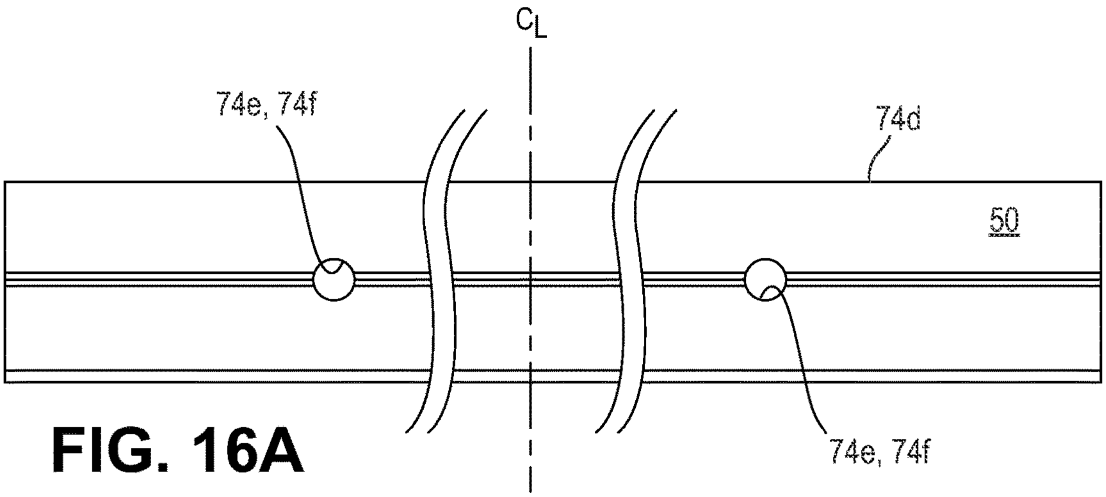
FIG. 16A illustrates a front view of a support bow.
Figure 16B:
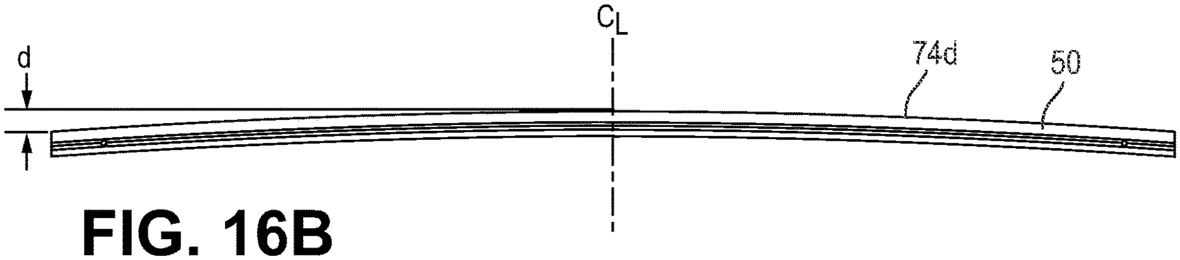
FIG. 16B illustrates the support bow of FIG. 16A showing an optional deflection of the support bow.
Figure 16C:
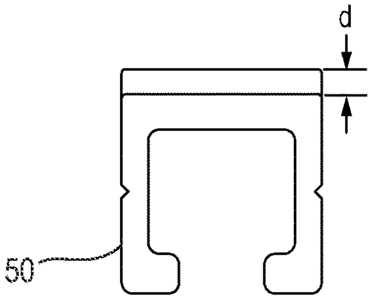
FIG. 16C is a cross sectional view of the support bow of FIGS. 16A and 16B.
Figure 16D:
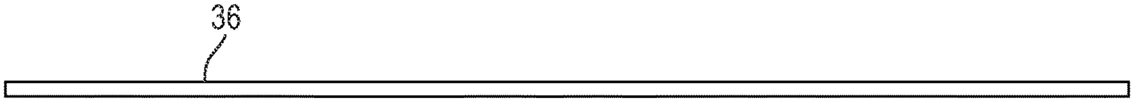
FIG. 16D is a schematic illustration of a front view of a panel of the folding tonneau cover of FIG. 1.
Figure 16E:
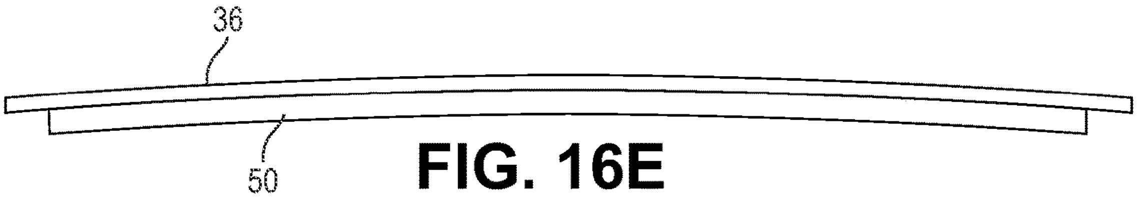
FIG. 16E is a schematic illustration of the panel of FIG. 16E which been attached to the support bow of FIG. 16A, causing the panel to have a slight downwardly concave curvature.

The support bows 50 are preferably metal channels, although a strong polymer can be used. Preferably, the support bows 50*b*-50*f* have a slight bend or bow, and are downwardly concave or concave down as shown (deflection distance d is exaggerated for illustration). When the panels 36 are attached to the bent support bows 50*b*-50*f*, the panels 36 deflect and take on a corresponding slight bend or bow, except for the rear portion of the rear panel 36*a* and the front portion of the front panel 36*c*, which are preferably flat so that they approximate the shape of the tailgate 6*d* and the front wall 6*c* of the cargo box 5. For this reason, the support bows 50*a* and 50*g* are preferably straight. The resulting slight bow in the folding cover assembly 30 aids in shedding of water or debris from the folding cover assembly 30. Although the support bows 50 preferably include extruded channel, as long as the upper surface 74*d* of the support bow 50 has this downward curvature, the curvature will be imposed upon the panels 36 in the manner described. The upper surface 74*d* of the respective support bow 50 is preferably curved so that the upper surface 74*d* at the ends of the support bow 50 are a deflection distance d lower than a highest extent of the upper surface 74*d* of the support bow 50 as shown (between the ends of the support bow 50, but preferably at the center portion of the support bow 50 as shown in FIG. 16B). The deflection distance d is preferably between about zero and about 1 inch; more preferably, the deflection distance d is preferably between about 1/64th inch and about ½ inch; still more preferably, the deflection distance d is about ⅛ inch. These example approximate deflection distances are for a typical cargo box 5 of a typical pickup truck 2; for wider or narrower cargo boxes, the length of the panels 36 and the respective support bows 50 may be longer or shorter, and the deflection distance d is preferably correspondingly larger or smaller, in order to provide a similar function in aiding the run-off of water or other debris from the panels 36. Currently, for example, most common pickup truck cargo boxes are from about 3.5 feet to about 6 feet in width; the deflection distance is preferably correspondingly smaller or larger when the folding cover assembly is sized to cover a cargo box which is narrower than about 3.5 feet or wider than about 6 feet, respectively. We have found that for most common trucks, a deflection distance d which is about 1/16 inch or less typically does not provide the preferred water run-off. We have also found that a deflection distance d which is about 3/16 inch or more can create unwanted stress particularly in the panels 36*a* and 36*c* which preferably have one curved support bow 50 and one generally straight support bow 50 configured to approximate the shape of the tailgate 6*d* and the front wall 6*c* of the cargo box 5. Therefore, we have found that for the typical truck cargo boxes 5 about 3.5 to about 6 feet in width, the preferred deflection distance is between about 1/16 inch and 3/16 inch. In some embodiments, support bows 50 include optional opposed support holes 74*e*, 74*f* in the front and rear portions, respectively, of the support bow as illustrated.

In preferred embodiments, the support bows 50 include generally C-shaped channels oriented with the channel opening 74*c* at the bottom. Some components of the folding tonneau cover apparatus 10 preferably slide into or are attached to the support bows 50, including the latch slides 53, the cord guides 56, the standoffs 58, spring 68, and the spring retainers 70. The bow end caps 78 preferably slide into the ends of the support bows 50.

Sidebars or handles 59 are attached to panels 36*a*, 36*b*, and 36*c* near each side of each panel 36. Sidebars 59 provide additional support along the side portions of the panels 36. The sidebars 59 are preferably metal, although a strong polymer can be used. More preferably, the sidebars 59 are formed of aluminum. The sidebars 59 are preferably formed with recesses or other grasping features, to facilitate grasping for lifting and positioning the panels 36 during opening and closing of the folding cover assembly 30. Preferably, the support bows 50 and the sidebars or handles 59 are elongated, so that they can provide support across the width 40 or length 39, respectively, of the respective panel 36.

Figure 17A:
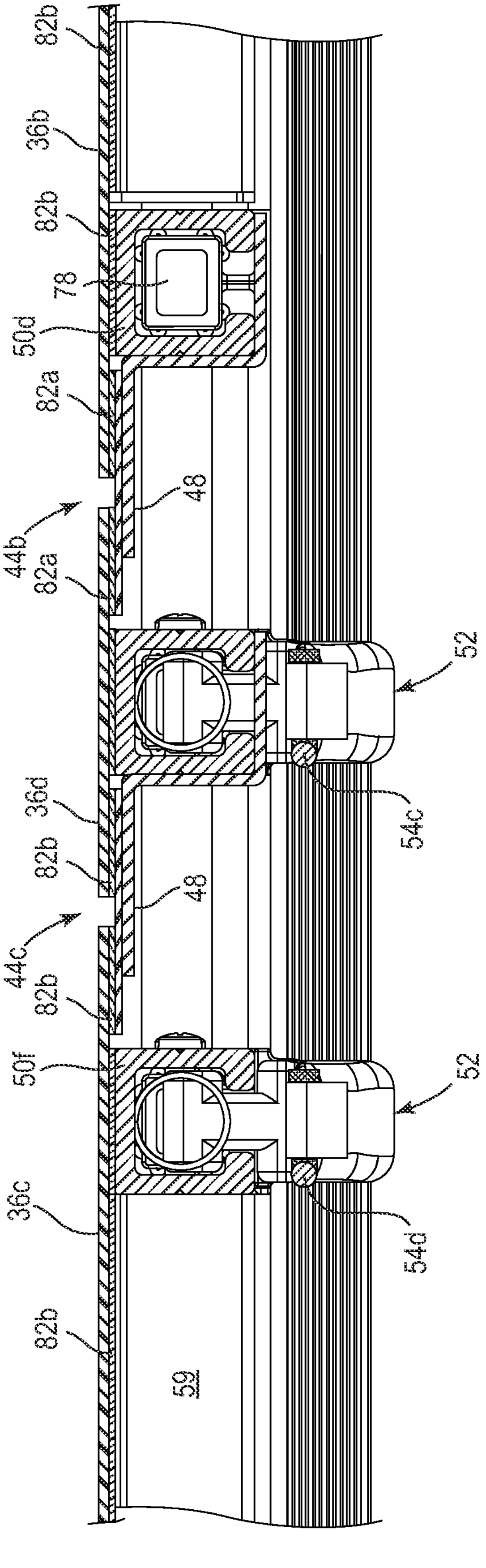
FIG. 17A is detail view along the section 17A-17A as indicated on FIG. 3A, showing additional details in the vicinity of the side of the spacer panel, and showing two flexible hinges, latches, and a rigid hinge guard, but for clarity of illustration the perimeter seal is not shown.
Figure 17B:
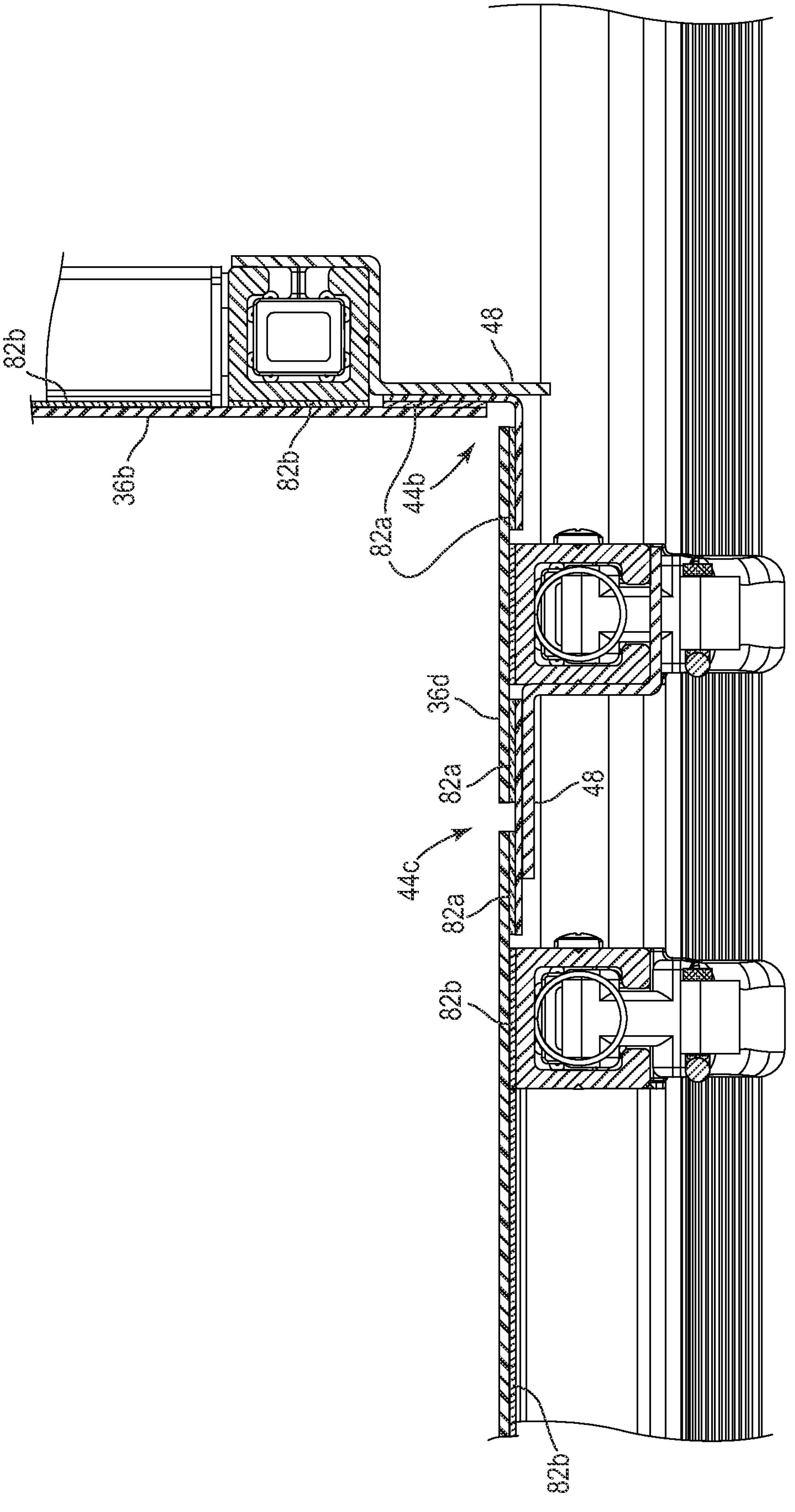
FIG. 17B is detail view along the section 17B-17B as indicated on FIG. 8A, one of the flexible hinges folded up from the side rail, but for clarity of illustration the perimeter seal is not shown.

Referring now to FIGS. 17A-17B, viewed along the viewing line 17A-17A on FIG. 3A, additional details in the vicinity of the side of the spacer panel 36*d* are illustrated. These views show hinges 44, latches 52, and hinge guards 48. A hinge guard 48 is preferably attached to the support bow 50 which is immediately to the rear of the hinge 44 which the respective hinge guard 48 supports; in this view, a hinge guard 48 is shown attached to the support bow 50*d*, and extending under the hinge 44*b*. In alternative embodiments, a hinge guard 48 can be attached to a support bow 50 immediately to the front of the hinge 44 which the hinge guard 48 supports; this configuration may be more convenient in some situations, such as to reduce any interference of the hinge guard 44 with other structures. Preferably, a hinge guard 48 is also attached to support bow 50*e* and extends under hinge 44*c* as shown. Hinge guards 48 are preferably attached to support bows 50 at locations which do not interfere with operation of the respective latch 52. Preferably, the hinge guards 48 are attached to the respective support bow 50 using a fasteners such as a screw or a bolt and nut combination; more preferably, size #8 self-tapping screws are used to attach the hinge guards 48 to the respective support bows 50. The location of release cords 54*c* are schematically indicated in cross section attached to respective latches 52. In FIG. 17B, the middle panel 36*b* has been raised up to begin folding this portion of the folding cover assembly 30. The hinge 44*b* is shown flexing, and the release cord 54*c* is shown being displaced as described above, thereby releasing the latches 52 near the ends of the support bow 50*e*, so that the spacer panel 36*d* can also be lifted up as also described above. Some elements shown elsewhere herein are not shown in FIGS. 17A and 17B to show the hinge function more clearly.

Figure 18A:
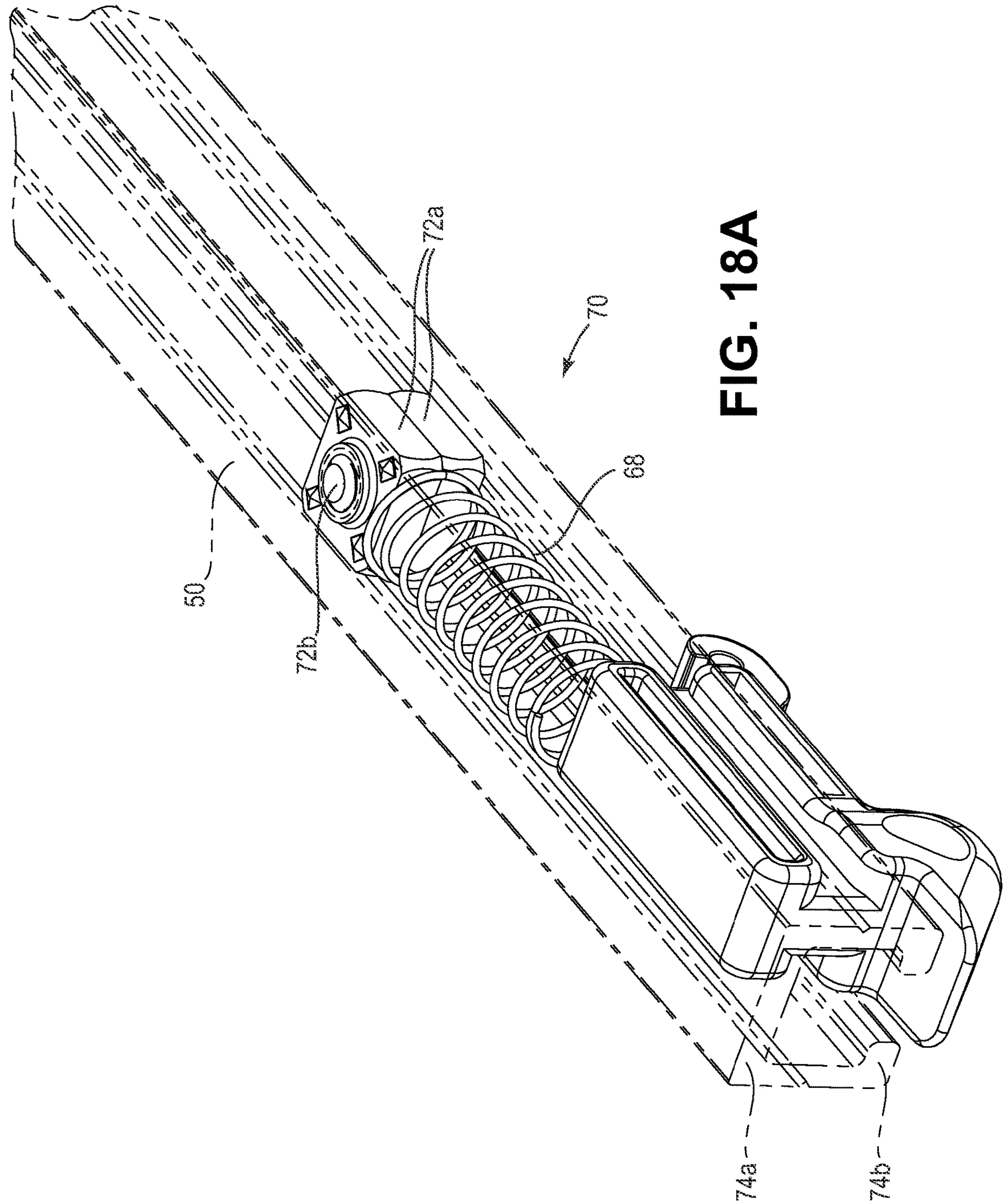
FIG. 18A is a perspective detail view of a preferred spring retention mechanism having a square nut, which mounts in a support bow, with the support bow shown in phantom to reveal the underlying structure.
Figure 18B:
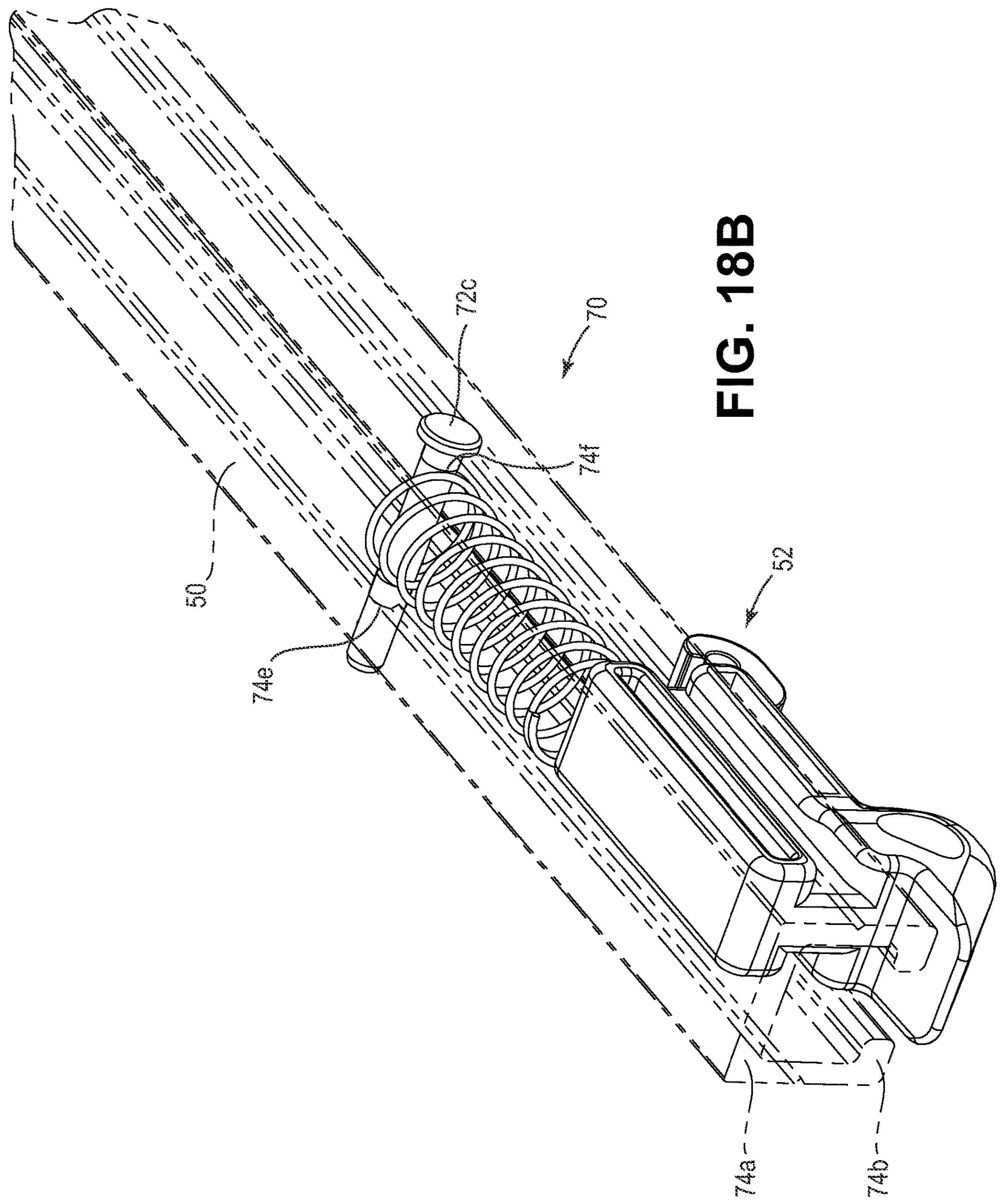
FIG. 18B is a perspective detail view of an alternative spring retention mechanism having a pin which mounts in a support bow, with the support bow shown in phantom to reveal the underlying structure.

Referring now to FIGS. 18A-18B, alternative arrangements for spring retainer 70 are illustrated. In FIG. 18A, a preferred spring retainer 70 is shown, which includes square nuts 72*a* and a retainer bolt 72*b*; in assembly, the spring retainer 70 can be inserted into the support bow 50 and by rotating the retainer bolt 72*b* with respect to the square nuts 72*a*, the upper end of the retainer bolt 72*b* presses against the bow top portion 74*a* of the support bow 50 while the square nuts press against the bow bottom portion 74*b* of the support bow 50, fixing the spring retainer 70 in the desired location in the support bow 50. FIG. 18B illustrates an alternative spring retainer 70, which includes a retainer pin 72*c* which attaches to the support bow 50, such as by passing through opposed holes 74*e*, 74*f* in the front and rear portions of the support bow as illustrated. Note that in the spring retainer configuration illustrated in FIG. 18A, the support bow 50 can still have opposed holes 74*e*, 74*f* which may simply be unused in that case; these optional opposed holes 74*e*, 74*f* can be seen in FIGS. 16A and 43B and can accommodate the spring retainer configuration of FIG. 18B but may be unused with the spring retainer configuration of FIG. 18A. Other fastening mechanisms or retainers can be used.

Figure 19A:
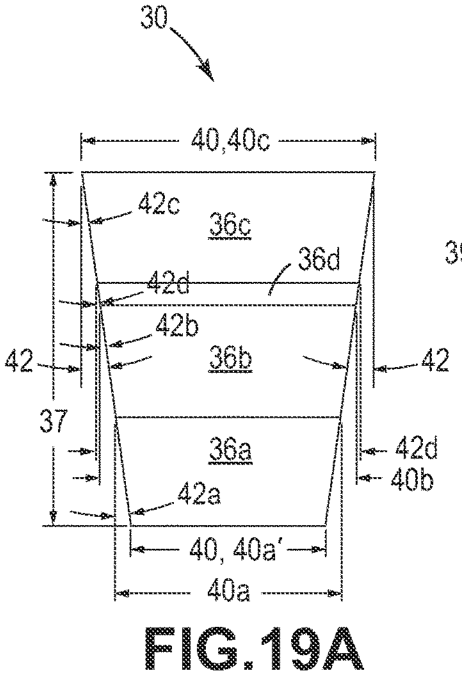
FIG. 19A is a schematic illustration of the folding tonneau cover apparatus of FIG. 1, as configured for a cargo box having angled sides.

FIGS. 19A-19E are schematic illustrations of the folding tonneau cover apparatus 10 for various configurations of cargo box 5 geometries as may be found on various trucks 2. Preferred embodiments of the folding cover assembly 30 include a rear panel 36*a*, a middle panel 36*b*, a front panel 36*c*, and a spacer panel 36*d*, as previously described. In FIGS. 19A-19E, the overall length 33 of the folding cover assembly 30 is shown, and the length 39 of each of the panels 36*a*-36*d* is indicated as 39*a*-39*d*, respectively, and the width 40 of the panels 36*a*-36*d* is indicated as 40*a*-40*d*, respectively, and the side angle 42 of the panels 36*a*-36*d* is indicated as 42*a*-42*d*, respectively. Panels 36*a*-36*c* can have similar length 39*a*-39*c*, or the length of some or all of panels 36*a*-36*c* can differ. Panel 36*d* can have a similar length 39*d* as panels 36*a*-36*c*, but preferably the length 39*d* of panel 36*d* is substantially smaller than the lengths 39*a*-39*c* of panels 36*a*-36*c*. Panels 36*a*-36*d* can have similar width 40, or the width of some or all of panels 36*a*-36*d* can differ. Panels 36*a*-36*d* can have the same side angle 42, or the side angle 42*a*-42*d* of some or all of panels 36*a*-36*d* can differ. FIG. 19A shows the folding cover assembly 30 as configured for a cargo box having angled sides.

Figure 19B:
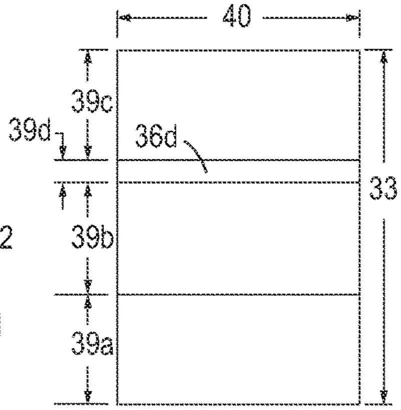
FIG. 19B is a schematic illustration of the folding tonneau cover apparatus of FIG. 1, as configured for a cargo box having parallel sides.
Figure 19C:
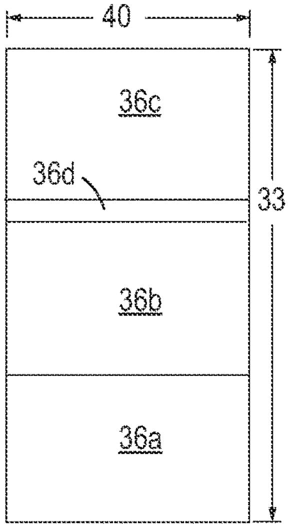
FIG. 19C is a schematic illustration of the folding tonneau cover apparatus of FIG. 1, as configured for an elongated cargo box.
Figure 19D:
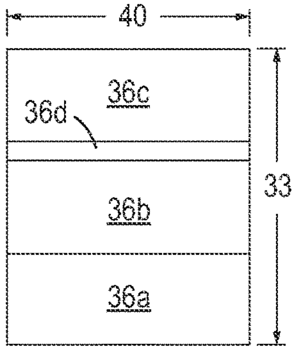
FIG. 19D is a schematic illustration of the folding tonneau cover apparatus of FIG. 1, as configured for a shorter cargo box.
Figure 19E:
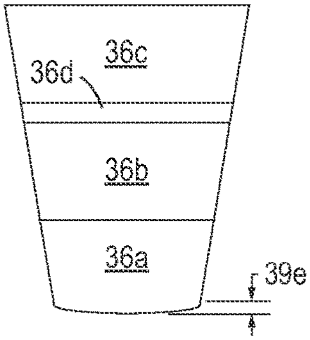
FIG. 19E is a schematic illustration of the folding tonneau cover apparatus of FIG. 1, as configured for a cargo box with arbitrary shape.

FIG. 19B is a schematic illustration of the folding cover assembly 30 as configured for a cargo box having parallel sides; in this example, the width 40 of each of the panels is similar. FIG. 19C is a schematic illustration of the folding cover assembly 30 as configured for an elongated cargo box; in this example, the overall length 33 is longer than in the example of FIG. 19B. FIG. 19D is a schematic illustration of the folding cover assembly 30 as configured for a shorter cargo box; in this example, the overall length 33 is shorter than in the example of FIG. 19B. FIG. 19E is a schematic illustration of the folding cover assembly 30 as configured for a cargo box with arbitrary shape; in this example, the sides of the panels 36 are angled, and the rear of the rear panel 36*a* is curved, extending a curved extension distance 39*e* in the central portion with respect to the side portions of the rear panel 36*a*. The folding cover assembly 30 can be configured for a variety of other configurations of truck box 5, with any of the panels 36*a*-36*d* configured with straight or angled or curved shapes such as those illustrated in the examples of FIGS. 19A-19E, in various combinations.

Figure 20:
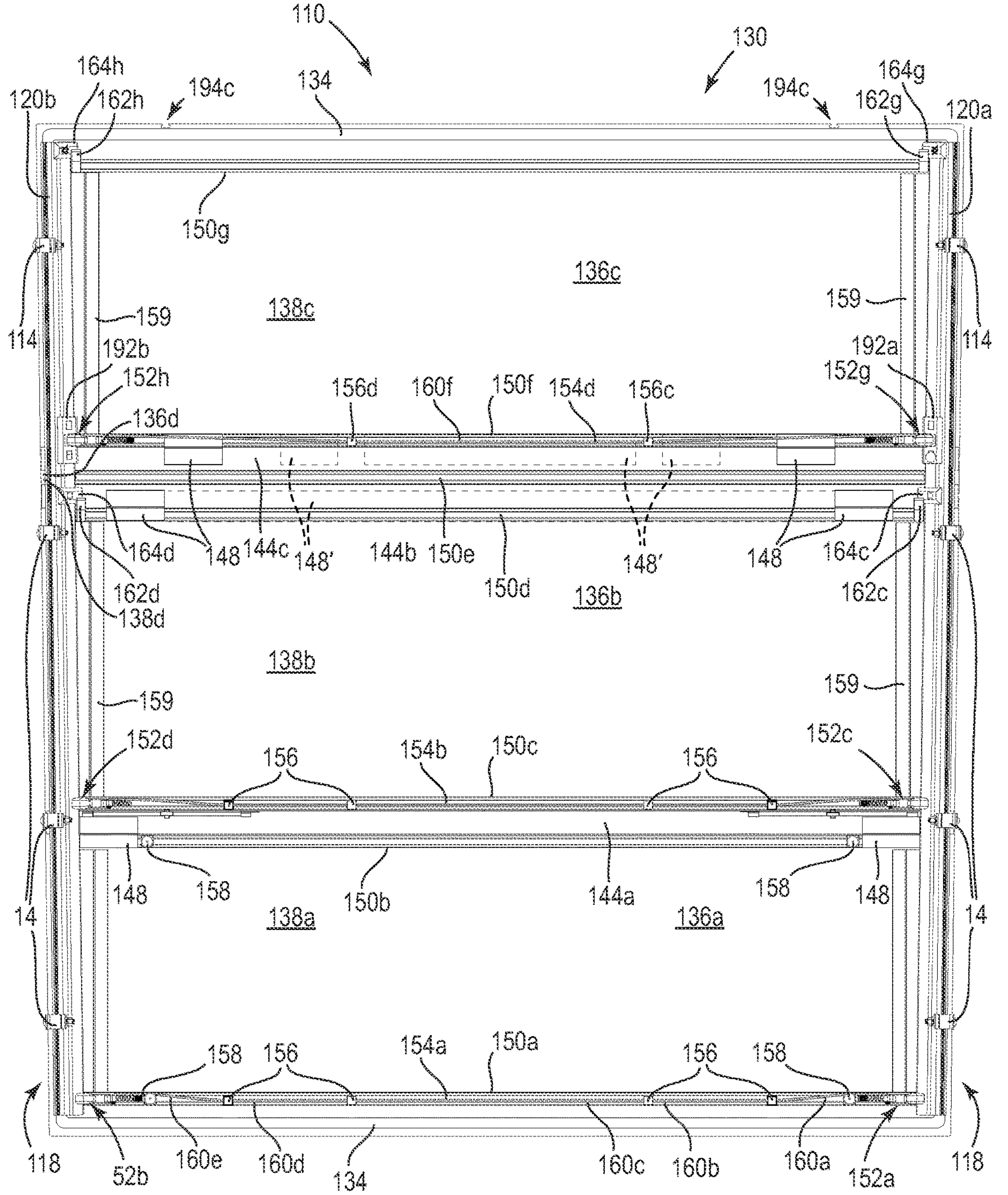
FIG. 20 is a bottom plan view of an alternate embodiment of folding tonneau cover apparatus incorporating hooks.
Figure 21A:
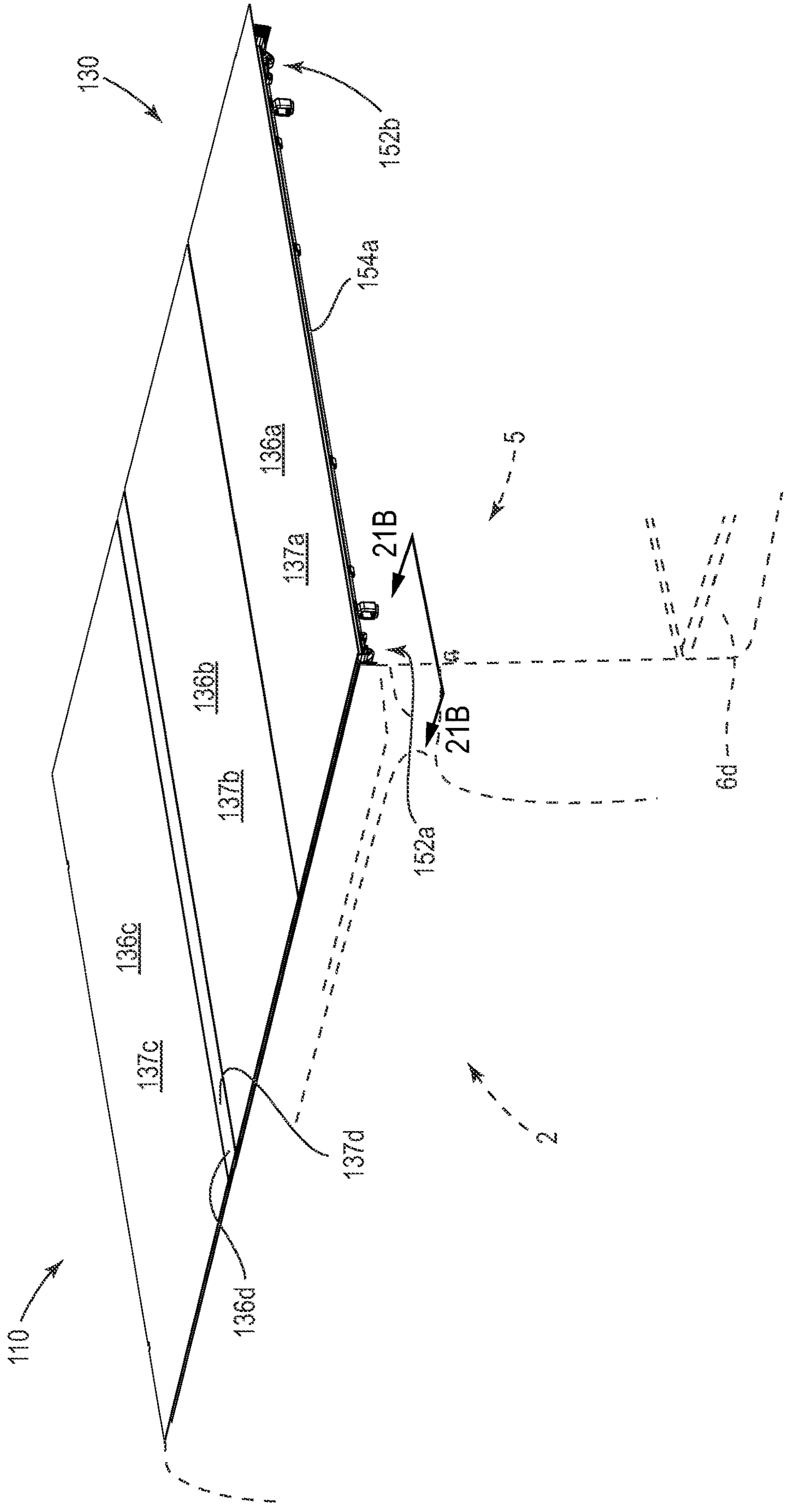
FIG. 21A is a is a rear perspective view of the folding tonneau cover apparatus of FIG. 20, illustrating additional details.
Figure 21B:
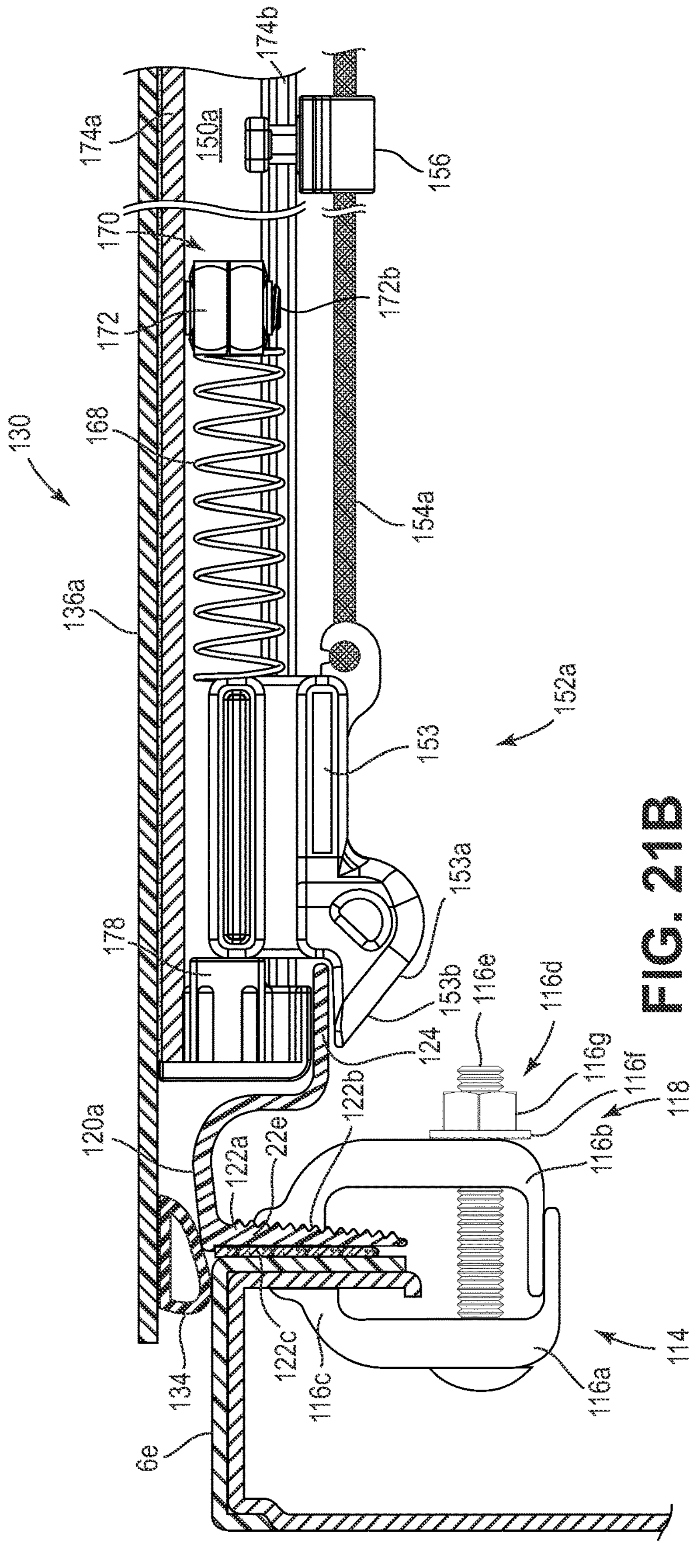
FIG. 21B is a partial section view as indicated on FIG. 21A illustrating the engaging portion of one of the latches on the rear support bow of the rear panel engaged to the lip of the side rail and the side rail clamped to the sidewall of the pickup truck.

FIG. 20 shows a bottom view of an alternate folding tonneau cover apparatus 110. Visible in this view are hinges 144, which are situated between adjacent panels 136 and adjoin adjacent panels 136. Each panel 136 has a top surface 137 and a bottom surface or underside 138; panel 136*a* has a top surface 137*a* and a bottom surface or underside 138*a*, panel 136*b* has a top surface 137*b* and a bottom surface or underside 138*b*, panel 136*c* has a top surface 137*c* and a bottom surface or underside 138*c*, panel 136*d* has a top surface 137*d* and a bottom surface or underside 138*d*. For ease of discussion, hinges 144 are specifically referenced herein as 144*a*-144*c*, and non-specifically or collectively referenced as 144. Specifically, situated between the rear panel 136*a* and the middle panel 136*b* is hinge 144*a*. Similarly, situated between the middle panel 136*b* and the spacer panel 136*d* is hinge 144*b*, and situated between the spacer panel 136*d* and the front panel 136*c* is hinge 144*c*. Hinges 144 allow the folding cover assembly 130 to be folded up and will be more fully described below. Optional hinge guards 148 are shown; hinge guards 148 provide additional support to the hinges 144 when the folding cover assembly 130 is unfolded and in place covering the cargo box 5 of truck 2 (FIG. 21A). Hinge guards 148 also provide protection against slicing through the hinges 144; further description of the hinge guards 148 is provided below. Support bows 150 are attached to the panels 136 to provide additional support and rigidity to the panels 136, and also provide a structure for mounting of various other components as described in detail later herein. For ease of discussion, support bows 150 are specifically referenced herein as 150*a*-150*g*, and non-specifically or collectively referenced as 150. The folding tonneau cover apparatus 110 is removably secured to the support frame assembly 118 by securing apparatus 151*a*. Preferably, securing apparatus 151*a* includes at least one locking member 151*b* which is engageable and disengageable from the support frame assembly 118. Preferably, the locking member 151*b* includes latches 152 which are located at the support bows as shown and secure the folding cover assembly 130 to the side rails 120*a* and 120*b*. Release cords 154 are attached to the latches 152. For ease of discussion, release cords 154 are specifically referenced herein as 154*a*, 154*b*, and 154*d*, and non-specifically or collectively referenced as 154. The release cords 154 pass through cord guides 156 which are attached to support bows 150 as shown. The cord guides are non-specifically or collectively referenced herein as 156, but cord guides 156*a*-156*d* are specifically referenced herein to facilitate the detailed description herein. Standoffs 158 are shown, and will be described in further detail below. Sidebars or handles 159 are attached to panels 136*a*, 136*b*, and 136*c*, near each side of each panel 136 to further support the panels 136. Perimeter seal 134 is located on the bottom 132*b* of the folding cover assembly 130 and is arranged to seal against the sidewalls 6*a* and 6*b* and the front wall 6*c* and the tailgate 6*d* of the cargo box 5; some portions of perimeter seal 134 are behind side rails 120*a* and 120*b* and not visible in FIG. 20. The perimeter seal 134 is further described herein. Clamps 114 secure the side rails 120*a* and 120*b* to the sidewalls 6*a* and 6*b* of the cargo box 5 (FIG. 21B).

The support bows or transverse frame members or channels 150 provide additional support for the panels 136. In this embodiment, the panels each have two support bows 150, one located near each of the front and rear ends of each panel 136, except for the spacer panel 136*d*, which has only a single support bow 150. In this embodiment, there are latches 152 mounted in pairs, one of each pair mounted near each end of each of the support bows 150*a*, 150*c*, and 150*f* as shown. As further described below, the latches 152 engage the side rails 120*a* and 120*b* to secure the folding cover assembly 130, and can slide a short distance towards or away from the side rails 120*a* and 120*b* to engage or release the folding cover assembly 130 or selected panels 136 or portions thereof from the side rails 120*a* and 120*b* as further described below. In this embodiment, there are three latch release cords or release cords or cords 154, each of which are connected to opposing pairs of latches 152 which secure the panels 136 to the side rails 120*a* and 120*b*. The release cords 154 pass through cord guides 156 which are mounted to the support bows 150; the release cords 154 can slide within the cord guides 156. The release cords 154 generally extend from the latches 152 along the support bows 150. The release cords 154 can be actuated to release each pair of latches 152 by a driver or operator when desired, to open the folding cover assembly 130.

Also seen on FIG. 20 are optional hinge guards 148; the optional hinge guards 148 are preferably attached to one of the support bows 150 adjacent to each of the respective hinges 144. In this example, the hinge guards 148 are shown attached to the support bows 150*b*, 150*d*, and 50*f*. The hinge guards 148 provide support for the hinges 144, such as to support weight or pressure applied to the hinges 144, the panels 136, or other portions of the folding cover assembly 130. The hinge guards 148 can also provide some protection against cutting through a hinge 144 to enter the cargo box 5. Preferably, a hinge guard 148 is attached to support bows 150 which are adjacent to each hinge 144. In some embodiments, two hinge guards 148 are provided for each hinge 144, and are located one towards each side of the respective support bows 150. Alternatively, a single hinge guard 148 can be used to support a hinge 144; the single hinge guard 148 can be long, extending much or all of the distance between the side rails 120 to support substantially the entire length of the respective hinge 144. Alternatively, more than two hinge guards 148 can be included to support a hinge 144. Different numbers and lengths and configurations of hinge guards 148 can be used to support the different hinges 144. For example, two short hinge guards 148 can be attached to support bow 150*b* to support hinge 144*a*, while a single long hinge guard 148 can extend along substantially the length of the support bow 150*d* to support hinge 144*b*, and three hinge guards 148 of differing lengths can be attached to support bow 150*f* to support hinge 144*c*. Various configurations and combinations of hinge guards 148 can be utilized. Shown in phantom on FIG. 20 are additional example locations 148' for hinge guards 148. Although the location of the hinge guards 148 attached to the support bows 150*b*, 150*d*, and 150*f* are preferred, hinge guards can alternatively be attached to support bows 150*c* or 150*d*; preferably, the placement and configuration of the hinge guards 148 is chosen to accommodate other features of the folding tonneau cover apparatus 110, such as to avoid interference with latches 152, release cords 154, cord guides 156, standoffs 158, or other structures. Although discussed relating to FIG. 20, any of the folding tonneau cover apparatus 10, 110, 210, 310 described herein can utilize the varied configurations of optional hinge guards 148 as just described, such as the locations 148', for the respective hinge guards 48, 148, 248, 348.

In the embodiment of FIG. 20, hooks 162 are attached to some of the support bows 150. Preferably, hooks 162 are located adjacent each end of each of the support bows 150*d* and 150*g*, and are aligned with catches 164 which are attached to the side rails 120*a* and 120*b* as illustrated. As further described below (see also FIGS. 33-34), when the folding cover assembly 130 is in place covering the cargo box 5, the hooks 162 are engaged with the catches 164 and help to secure the folding cover assembly 130 to the side rails 120*a* and 120*b*. When a panel 130 is rotated upward, the hooks 162 disengage from the catches 164, allowing the panel to be rotated and stacked onto other panels 130, as shown below. Preferably, the hooks 162 slide into the support bows 150 and are secured in position. The hooks 162 can be secured by an interference fit with the support bows 150, but other securement mechanisms can be utilized, such as screws or other fasteners or adhesives known in the art, or a combination of securement mechanisms. Preferably, the hook 162 slide into the respective support bow 150 and is secured using a #8 self-tapping screw. In various embodiments disclosed herein, hooks and catches such as hooks 162 and catches 164 are located along selected support bows 150, 250, 350. In the embodiment of FIG. 20, hooks 162*c* and 162*d* are located near the driver's side end and passenger side end, respectively, of support bow 150*d* (near the front of the middle panel 136*b*); hooks 162*g* and 162*h* are located near the driver's side end and passenger side end, respectively, of support bow 150*g* (near the front of the front panel 136*c*). Together, the various latches 152 and hooks 162 engage the catches 164 and the side rails 120*a* and 120*b* to secure the folding cover assembly 130 to the side rails 120*a* and 120*b* and thereby to the cargo box 5 in order to cover the cargo box 5 when desired, but can be disengaged as described herein to open the folding cover assembly 130 to enter the cargo box 5 when desired.

Referring now to FIGS. 21A and 21B, the release cord 154*a* near the rear end of the rear panel 136*a* passes through cord guides 156, similar to the embodiment of FIG. 1. FIG. 21B is an enlarged partial section view of the driver's side end portion of the support bow 150*a* as indicated on FIG. 21A. A standoff 158 can be seen in FIG. 21A, similar to standoff 58 described above.

As seen in FIG. 21B, the latch 152 includes latch slide 153 having a engaging portion 153*b* which extends forward to engage the lip 124 of the side rail 120*a*, so as to secure the respective panel 136*a* to the side rail 120*a*. The latch slide 153 preferably includes a stiff polymer, composite, or metal, although other materials and combinations can be used. Preferably, the latch slide 153 includes fiberglass-reinforced nylon. The latch slide 153 is biased by a biasing member or spring 168 towards the side rail 120*a* so that the engaging portion 153*b* engages the side rail 120*a* to form a secured configuration in which the respective panel 136 is restricted from being lifted up from the cargo box 5; in this example, the spring 168 is a compression spring, but an extension spring, or an elastic element, or other known elements could alternatively be used to bias the latch slide 153 towards the side rail 120*a* so that the engaging portion 153*b* engages the side rail 120*a* so that the latch 152 is in the secured configuration. In this embodiment, the spring 168 is held between the latch slide 153 and a spring retainer 170. In this example, the spring retainer 170 includes square nuts 172*a* and a retainer bolt 172*b*; in assembly, the spring retainer 170 can be inserted into the support bow 150*a* and by rotating the retainer bolt 172*b* with respect to the square nuts 172*a*, the upper end of the retainer bolt 172*b* presses against the bow top portion 174*a* of the support bow 150*a* while the square nuts press against the bow bottom portion 174*b* of the support bow 150*a*, fixing the spring retainer 170 in the desired location in the support bow 150*a*. The side rails 120*a* and 120*b* preferably include extruded metal, and have an side rail engagement portion 122*a* (FIG. 21B), arranged to approximate a portion of the sidewall 6*a*, 6*b* of the pickup truck 2. A clamp 114 is shown in detail in FIG. 21B, similar to clamp 14 illustrated in FIG. 3B. Clamps 114 preferably include aluminum, although other metals or alloys or polymers or other composite materials can be used. Clamps 114 as illustrated have an outer member 116*a* and an inner member 116*b* which are tightened towards each other and held as an assembly on the sidewall 6*a* by a fastener assembly 116*d* which typically includes a bolt 116*e*, a washer 116*f*, and a nut 116*g*. Preferably, inner member 116*b* has a clamp engagement portion 116*c* which, together with side rail engagement portion 122*a* of side rail 120*a*, aids in securing the clamps 114 in place on the side rail 120*a*. Preferably, the clamps 114 are arranged and tightened to secure the side rail 120*a* to the sidewall 6*a*, with a sidewall gasket 176 arranged between the side rail 120*a* and the sidewall 6*a* as illustrated. A bow end cap 178 is located at the end of the support bow 150*a*. A release cord 154 passes through a cord guide 156 as shown. In the present example, the side rail engagement portion 122*a* is a generally vertically-oriented portion which configured to be located adjacent a similarly vertically-oriented portion of the sidewall 6*a*, 6*b*. In the example of FIG. 21B, a portion of the sidewall 6*a* of a cargo box 5 of a Chevrolet Silverado pickup truck is illustrated; however, other sidewalls of other cargo boxes of other pickup trucks and the like can be accommodated, by incorporating a side rail engagement portion 122*a* along the length of the side rails 120*a* and 120*b* that are appropriately configured and oriented. In this example, the cargo box 5 of the pickup truck 2 includes a sidewall cap 6*e*, but other cargo boxes 5 lack a sidewall cap. Preferably, the side rail engagement portion 122*a* has a side rail engagement feature 122*b*, such as ridges, knurling, surface patterns or textures, or other features which aid in securing the clamps 114. Preferably, a sidewall gasket 122*c* is located between the side rail engagement portion 122*a* and the sidewall 6*a*; the sidewall gasket 122*c* can provide protection against damage to the sidewall 6*a* by abrasion against the side rail 120*a*. The sidewall gasket 122*c* can provide leak resistance to prevent water, dust, or other debris from passing into the cargo box 5 along the side rail engagement portion 122*a*. The side rail 120*a* has a flange or side rail lip 124 along the length of the side rail 120*a*. The side rail lip 124 provides support for the folding cover assembly 130. In addition, the side rail lip 124 provides a feature for engagement of the engaging portion 153*b* of the latches 152. The driver's side portion of the support bow 150*a* is shown in FIG. 21B; the other end of the support bow 150*a* (toward the passenger side) has a mirror-image configuration, with a latch 152 engaging side rail 120*b*, and side rail 120*b* being attached to sidewall 6*b* in a similar manner.

Figure 22A:
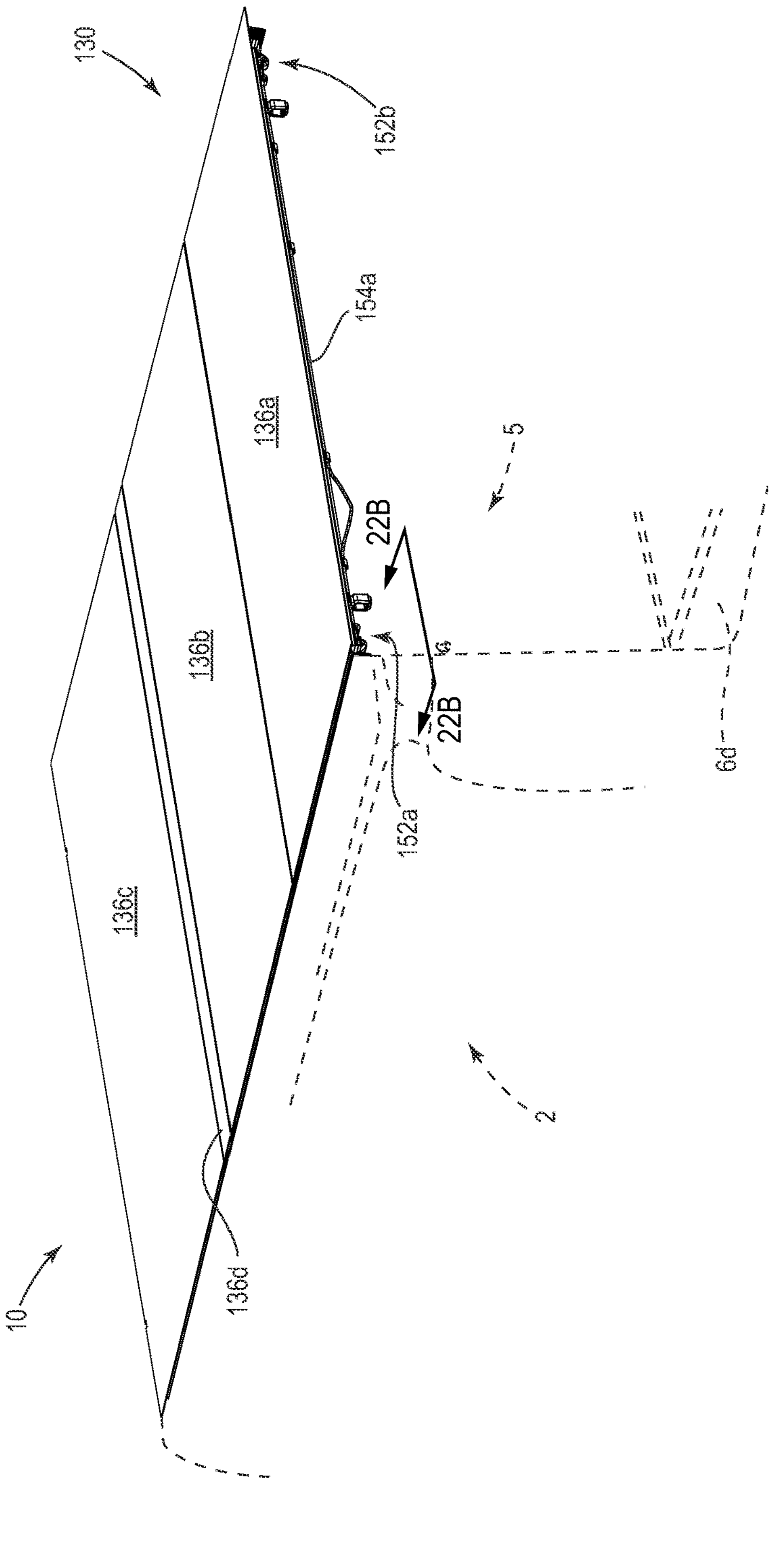
FIG. 22A is a rear perspective view of the folding tonneau cover apparatus of FIG. 20, with the release cord pulled to release the latches.
Figure 22B:
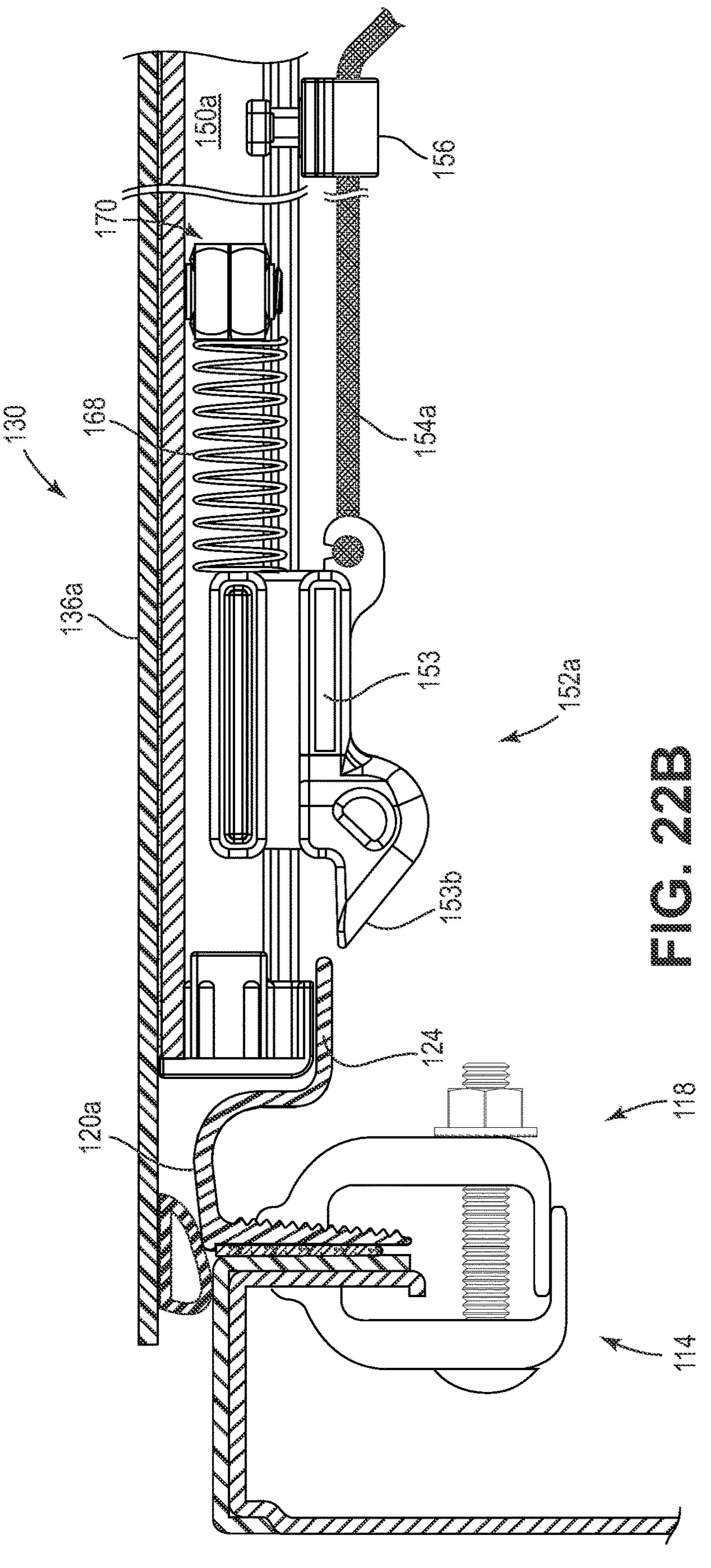
FIG. 22B is a is a partial section view as indicated on FIG. 22A similar to the view of FIG. 21B but showing the arrangement with the engaging portion of the latch retracted from the lip of the side rail.

Similar to the embodiment illustrated in FIGS. 4A and 4B, FIGS. 22A and 22B illustrate that when it is desired to release the latches 152 at the rear end of the rear panel 136*a*, the release cord 154*a* is pulled to retract the latches 152 against the force of the biasing member or spring 168. Preferably, the release cord 154*a* will be pulled as illustrated, by a driver (not shown) who has walked to the rear of the cargo box 5 and has opened the tailgate 6*d* and reaches in to pull the release cord 154*a*, preferably in the segment 160*b*. When the release cord 154*a* is pulled, the engaging portion 153*b* of the latch 152 is retracted away from the lip 124 of the side rail 120*a* as shown in FIG. 22B, releasing the latch 152 from the side rail 120*a* and allowing the rear portion of the rear panel 136*a* to be lifted up from the side rail 120*a*. The cord guides 156 adjacent to the latches 152 help to maintain alignment of the ends of the release cord 154*a* so that the latches 152 are retracted in alignment with the support bow 150*a*, to avoid excessive friction, wear and potential binding. The driver's side portion of the support bow 150*a* is shown in FIG. 22B; the other end of the support bow 150*a* (toward the passenger side) has a mirror-image configuration, and when the release cord 154*a* is pulled, the latches 152 at both ends of the support bow 150*a* are retracted, so that the rear end of the rear panel 136*a* can be lifted up from both side rails 120*a* and 120*b*.

Figure 23:
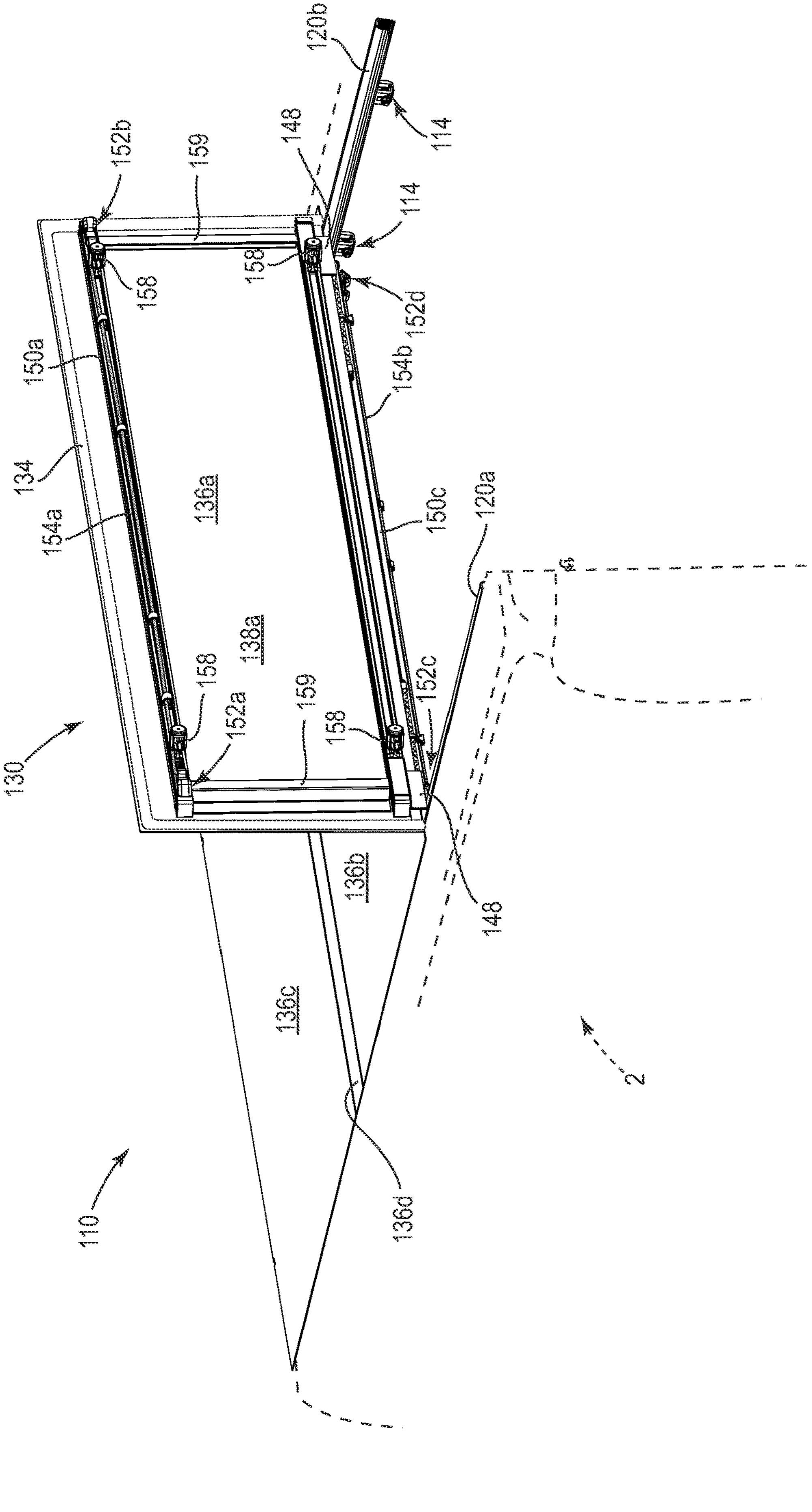
FIG. 23 is a rear perspective view of the folding tonneau cover apparatus of FIG. 20 wherein the latches on the rear panel have been released and the rear panel has been lifted up.

When the latches 152 near the rear end of the rear panel 136*a* are retracted and the rear end of the rear panel 136*a* is lifted up from the side rails 120*a* and 120*b*, the rear panel 136*a* pivots upwards and frontwards, bending the hinge 144*a* as illustrated in FIG. 23.

Figure 24A:
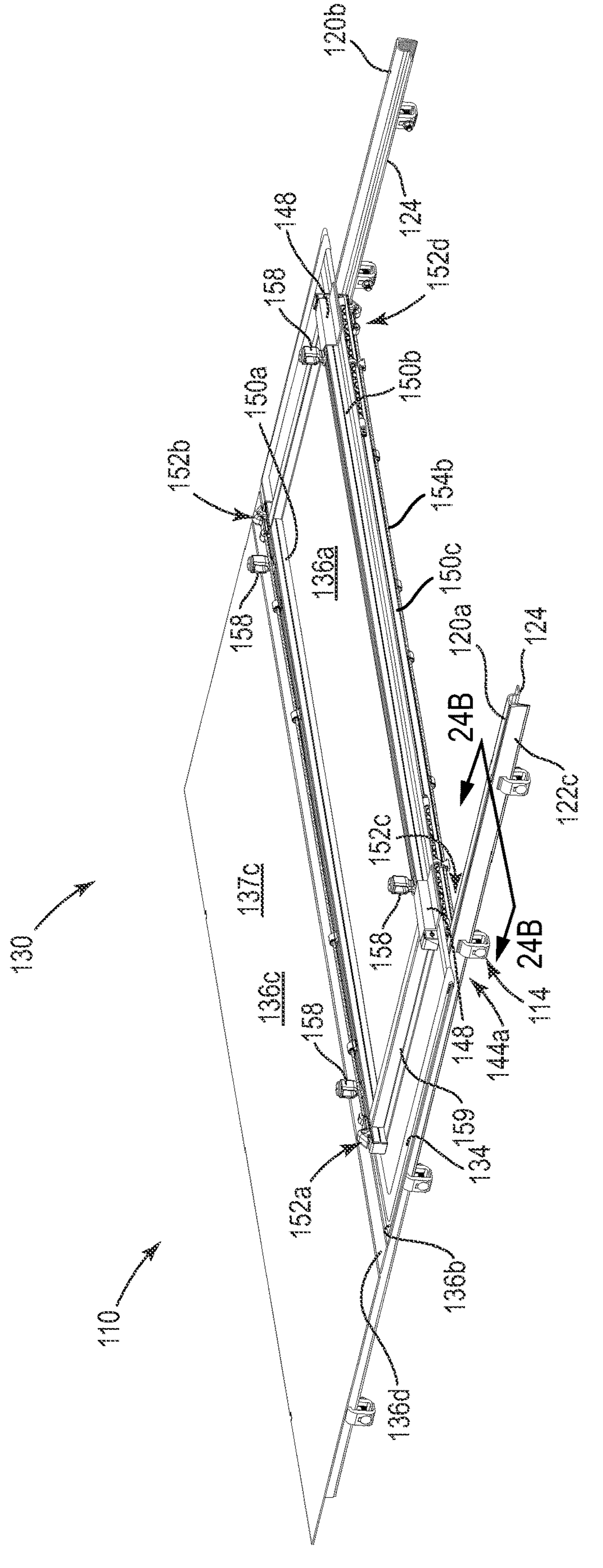
FIG. 24A is a rear perspective view of the folding tonneau cover apparatus of FIG. 20 wherein the rear panel has been rotated forward onto the middle panel, with a release cord at the rear of the middle panel visible.
Figure 24B:
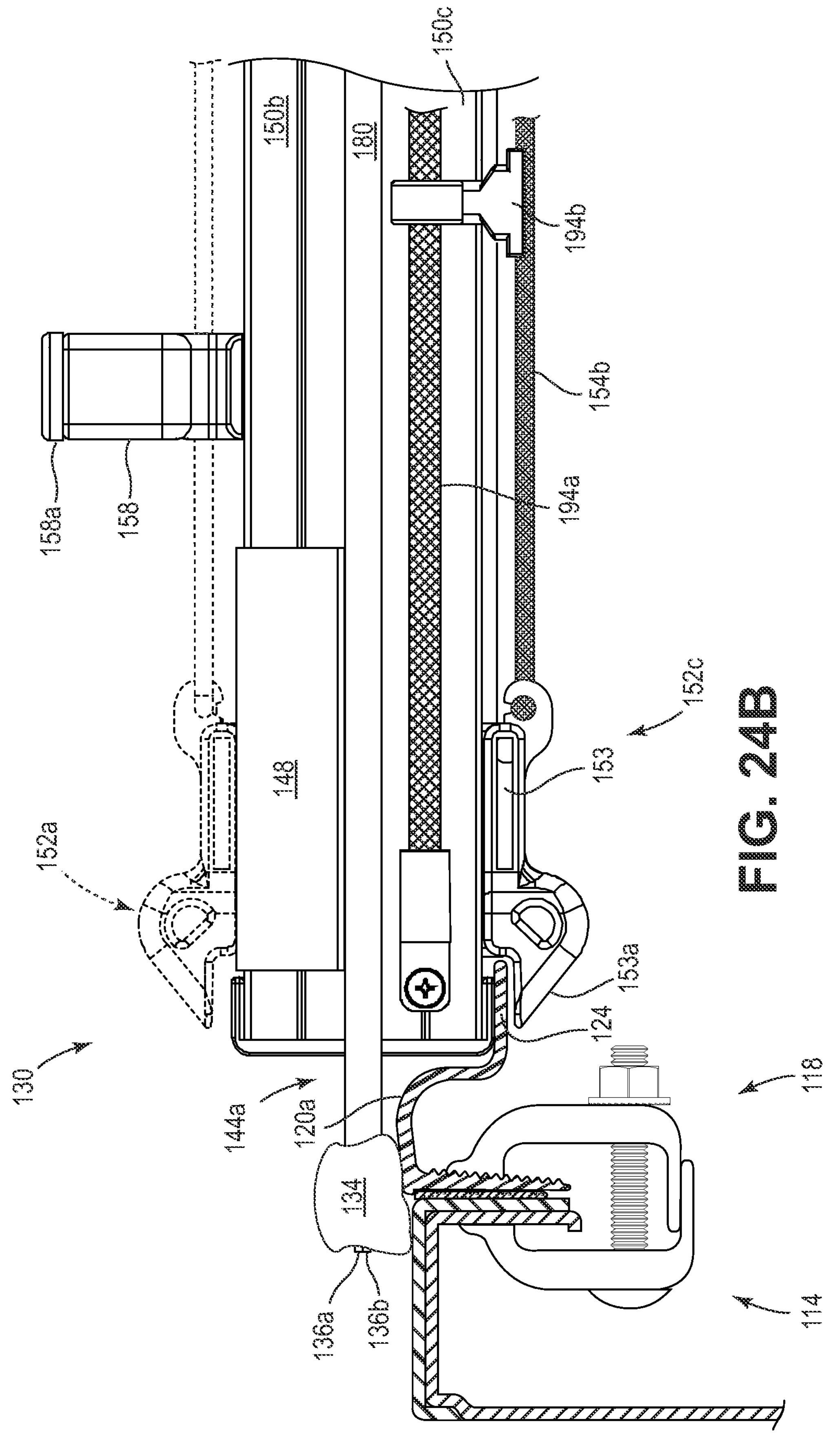
FIG. 24B is a partial section view as indicated on FIG. 24A, illustrating the engaging portion of one of the latches on the rear support bow of the middle panel engaged to the lip of the side rail.

FIG. 24A illustrates the rear panel 136*a* rotated further, onto the middle panel 136*b*, showing the release cord 154*b* visible and accessible to the operator. At this point, the latches 152 at each end of the support bow 150*c* are engaged with the side rail lip 124 of the side rails 120*a* and 120*b*. The driver's side portion of the support bow 150*c* is illustrated in FIG. 24B, which shows the latch 152*c* engaged with the side rail lip 124 of the side rail 120*a*, similar to the engagement illustrated in FIG. 21B. The side rail 120*a* is attached to the sidewall 6*a* as shown in FIG. 21B. The engaging portion 153*b* of latch slide 153 of latch 152*c* is engaged with the lip 124 of the side rail 120*a*, so as to secure the respective panel 136*b* to the side rail 120*a*. The driver's side portion of the support bow 150*c* is shown in this figure; the other end of the support bow 150*c* (toward the passenger side) has a mirror-image configuration, with a latch 152*d* engaging side rail 120*b*, and side rail 120*b* being attached to sidewall 6*b* in a similar manner.

Figure 25A:
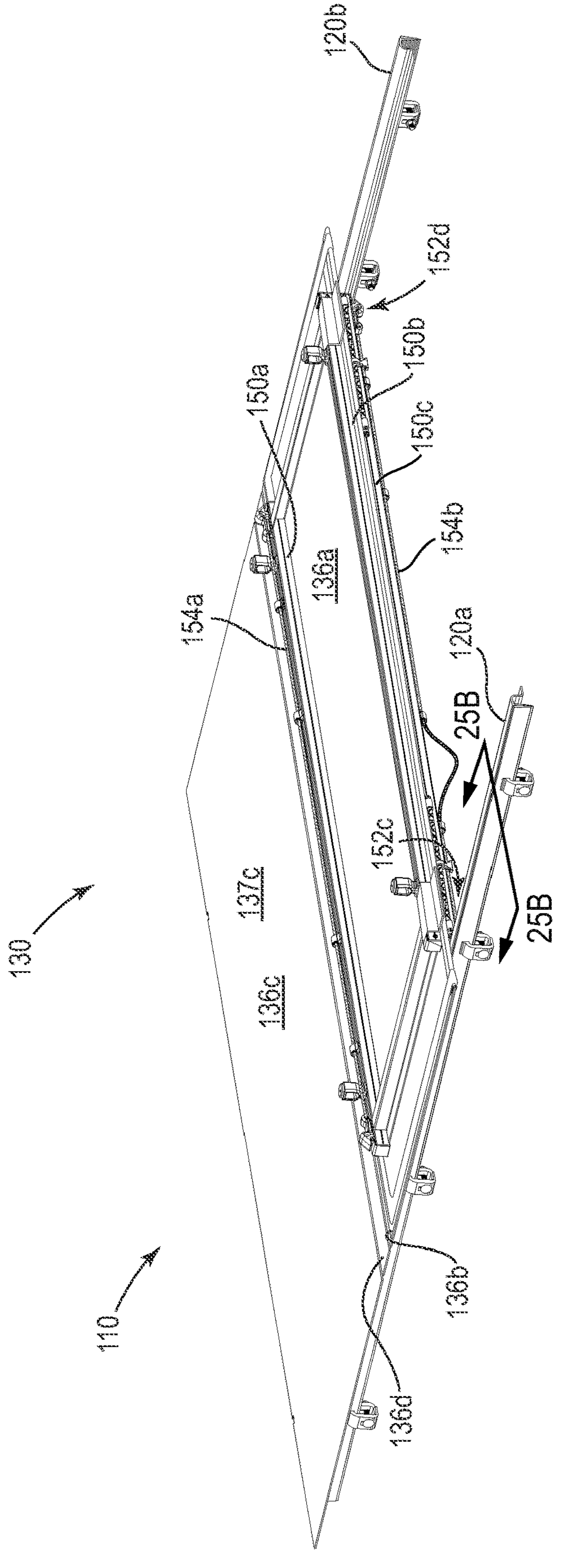
FIG. 25A is a rear perspective view of the folding tonneau cover apparatus of FIG. 20 similar to the view of FIG. 24A but with the release cord pulled to release the latches.
Figure 25B:
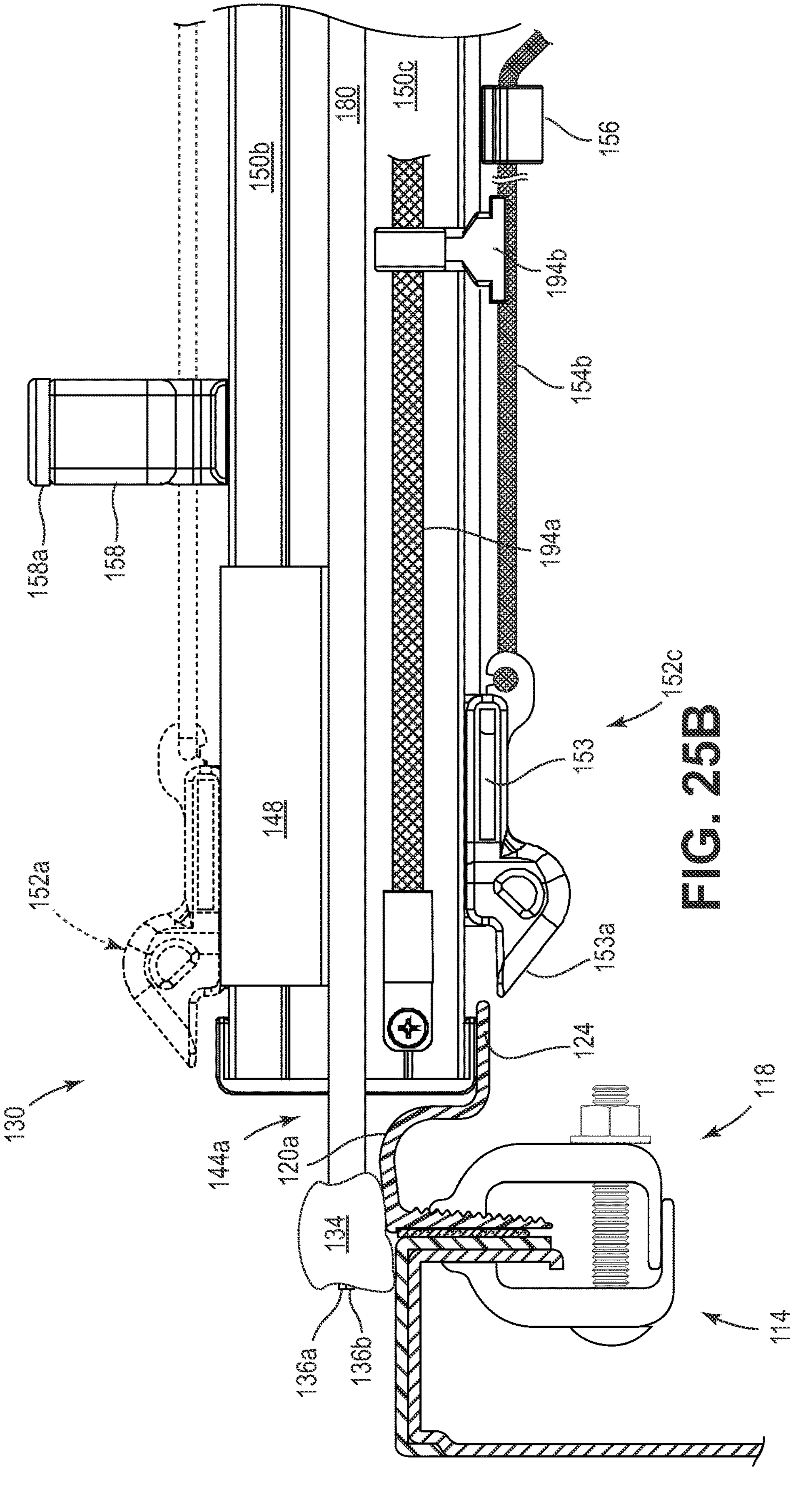
FIG. 25B is a partial section view as indicated on FIG. 25A similar to the view of FIG. 24B but with the engaging portion of the latch retracted from the lip of the side rail.

When it is desired to release the latches 152 at the rear end of the middle panel 136*b*, the release cord 154*b* is pulled as indicated in FIG. 25A by the driver or operator 8 (not shown) to retract the latches 152*c*, 152*d* against the force of the biasing member or spring 168. When the release cord 154*b* is pulled, the engaging portion 153*b* of the respective latches 152*c*, 152*d* are retracted away from the lips 124 of the side rail 120*a*, 120*b*. FIG. 25B illustrates the driver's side portion as indicated on FIG. 25A; when the release cord 154*b* is pulled, the engaging portion 153*b* of the latch 152*c* is retracted from the side rail 120*a* as shown. The driver's side portion of the support bow 150*c* is illustrated in FIG. 25B; the other end of the support bow 150*c* (toward the passenger side) has a mirror-image configuration, and when the release cord 154*b* is pulled, the latches 152*c*, 152*d* at both ends of the support bow 150*c* are retracted, so that the rear end of the middle panel 136*b* can be lifted up from both side rails 120*a* and 120*b*, together with the rear panel 136*a*, as illustrated in FIG. 26A, bending hinge 144*b*.

Figure 26A:
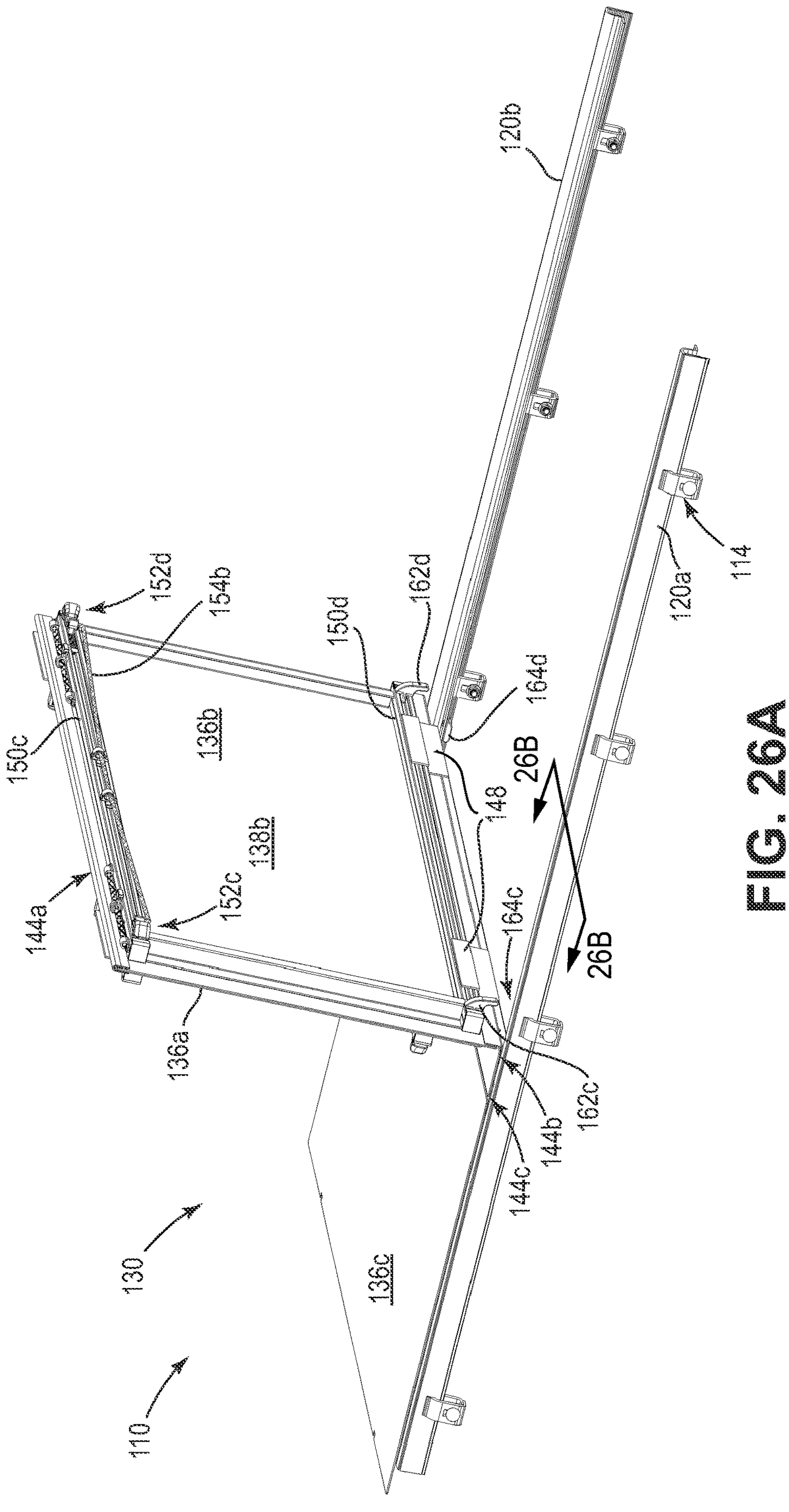
FIG. 26A is a rear perspective view of the folding tonneau cover apparatus of FIG. 20 wherein the rear panel together with the middle panel has been lifted up and rotated forward, whereby hooks near the front of the middle panel are disengaged from catches on the side rails, but for clarity of illustration the perimeter seal is not shown.

With the middle panel 136*b* (including the rear panel 136*a*) raised and rotated as shown in FIG. 26A, hooks 162 disengage from catches 164; specifically, hook 162*c* disengages from catch 164*c* attached to side rail 120*a*, and hook 162*d* disengages from catch 164*d* attached to side rail 120*b*.

Figure 26B:
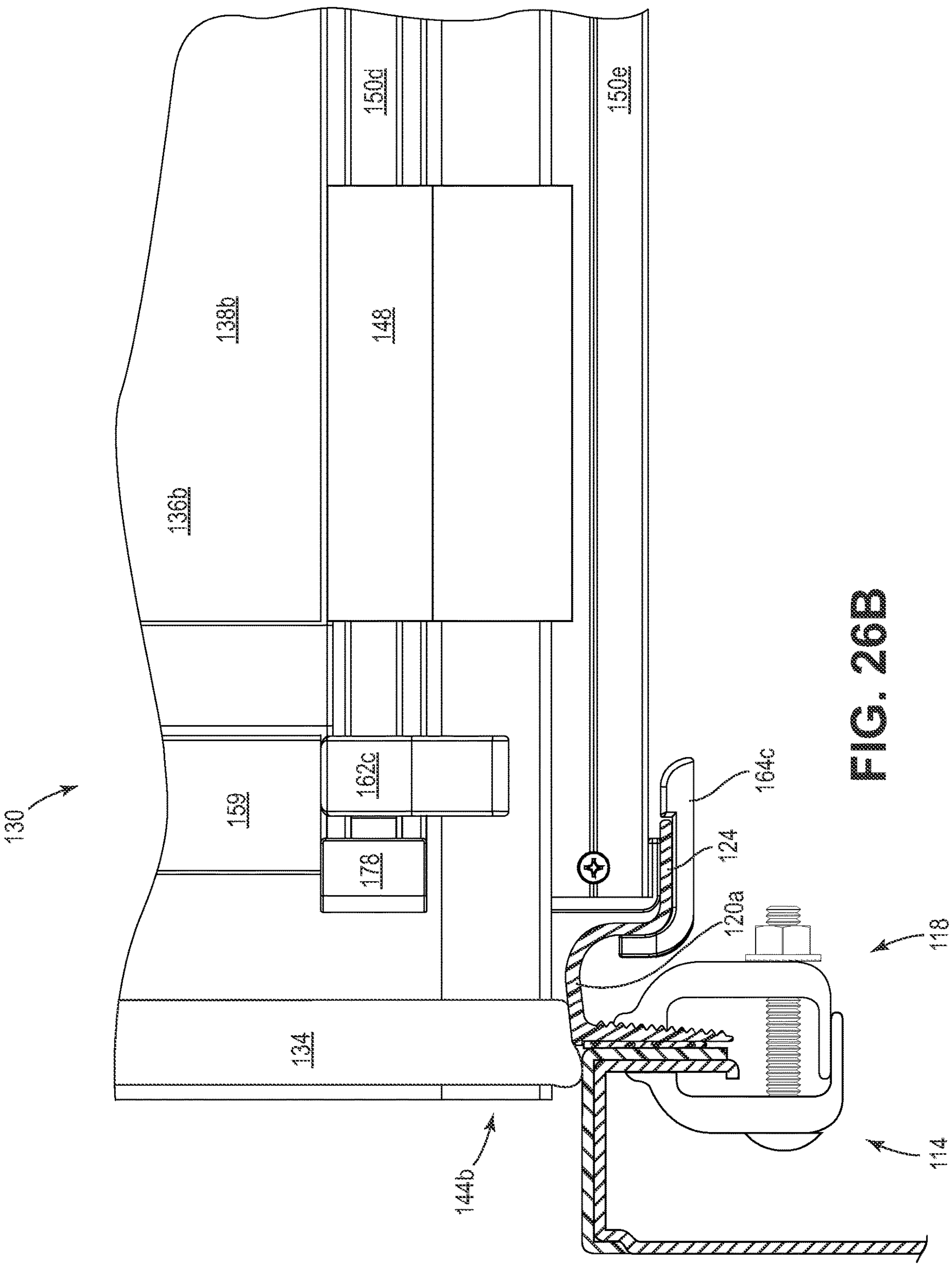
FIG. 26B is a partial section view as indicated on FIG. 26A showing the hook near the driver's side end portion of the front support bow of the middle panel disengaged from the respective catch on the side rail.

FIG. 26B is a detail view of a portion of the configuration of FIG. 26A as indicated on FIG. 26A. Catch 164*c* is seen attached to side rail 120*a*, and hook 162*c* is seen disengaged from catch 164*c*. The driver's side portion of the support bow 150*c* is illustrated in FIG. 25A; the other end of the support bow 150*c* (toward the passenger side) has a mirror-image configuration. With the middle panel 136*b* (including the rear panel 136*a*) raised and rotated as shown in FIG. 26A, hooks 162*c* and 162*d* disengage from catches 164*c* and 164*d*, respectively.

Figure 27A:
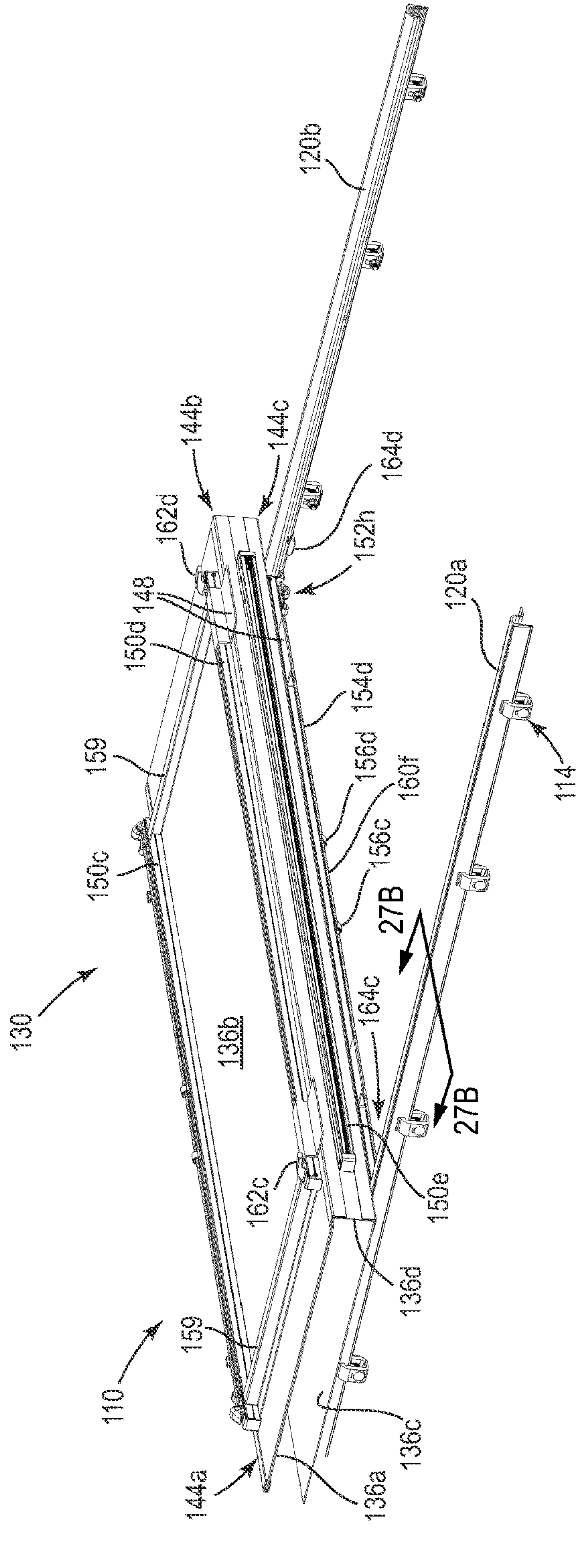
FIG. 27A is a rear perspective view of the folding tonneau cover apparatus of FIG. 20 wherein the rear panel together with the middle panel and the spacer panel has been rotated forward so that the middle panel and the rear panel are resting on the spacers on top of the front panel, and with the spacer panel rotated upwards, but for clarity of illustration the perimeter seal is not shown.

As the middle panel 136*b*, together with the rear panel 136*a*, is rotated further frontward towards the front panel 136*c*, bending the hinge 144*b*, the spacer panel 136*d* lifts and rotates frontward as well, bending the hinge 144*c*. The folding and rotating of the folding cover assembly 130 are similar to that illustrated for the folding cover assembly 30 as shown in FIGS. 8C-9A, as follows. With continued folding and rotating of the folding cover assembly 130, the standoffs 158 attached to the support bow 150*a* contact the top of the front panel 136*c*. With further rotating of the middle panel 136*b* (together with the front panel 136*a*) the hinge 144*c* bends and the spacer panel 136*d* lifts off the side rails 120*a* and 120*b*; with still further rotating of the middle panel 136*b* frontwards, together with the rear panel 136*a* and the spacer panel 136*d*, and pivoting and sliding of the standoffs 158, the middle panel 136*b*, the rear panel 136*a*, and the spacer panel 136*d* rotate progressively farther frontwards towards the front panel 136*c*, until the standoffs 158 attached to the support bow 150*b* also contact the front panel 136*c*, as illustrated in FIG. 27A. The standoffs 158 help to maintain a spaced relationship between the rear panel 136*a* and the front panel 136*c*. During this folding of the folding cover assembly 130, the hinges 144*b* and 144*c* flex as the middle panel 136*b*, the rear panel 136*a*, and the spacer panel 136*d* rotate towards the front panel 136*c*. Depending on forces applied by the driver or other operator 8, the hinges 144*b* and 144*c* can flex to pass through various increasing or decreasing angles.

FIG. 27A is a rear perspective view of the folding tonneau cover apparatus 130 wherein the rear panel 136*a* together with the middle panel 136*b* and the spacer panel 136*d* has been rotated forward so that the middle panel 136*b* and the rear panel 136*a* are resting on the spacers 158 on top of the front panel 136*c*, and with the spacer panel 136*d* rotated upwards.

Figure 27B:
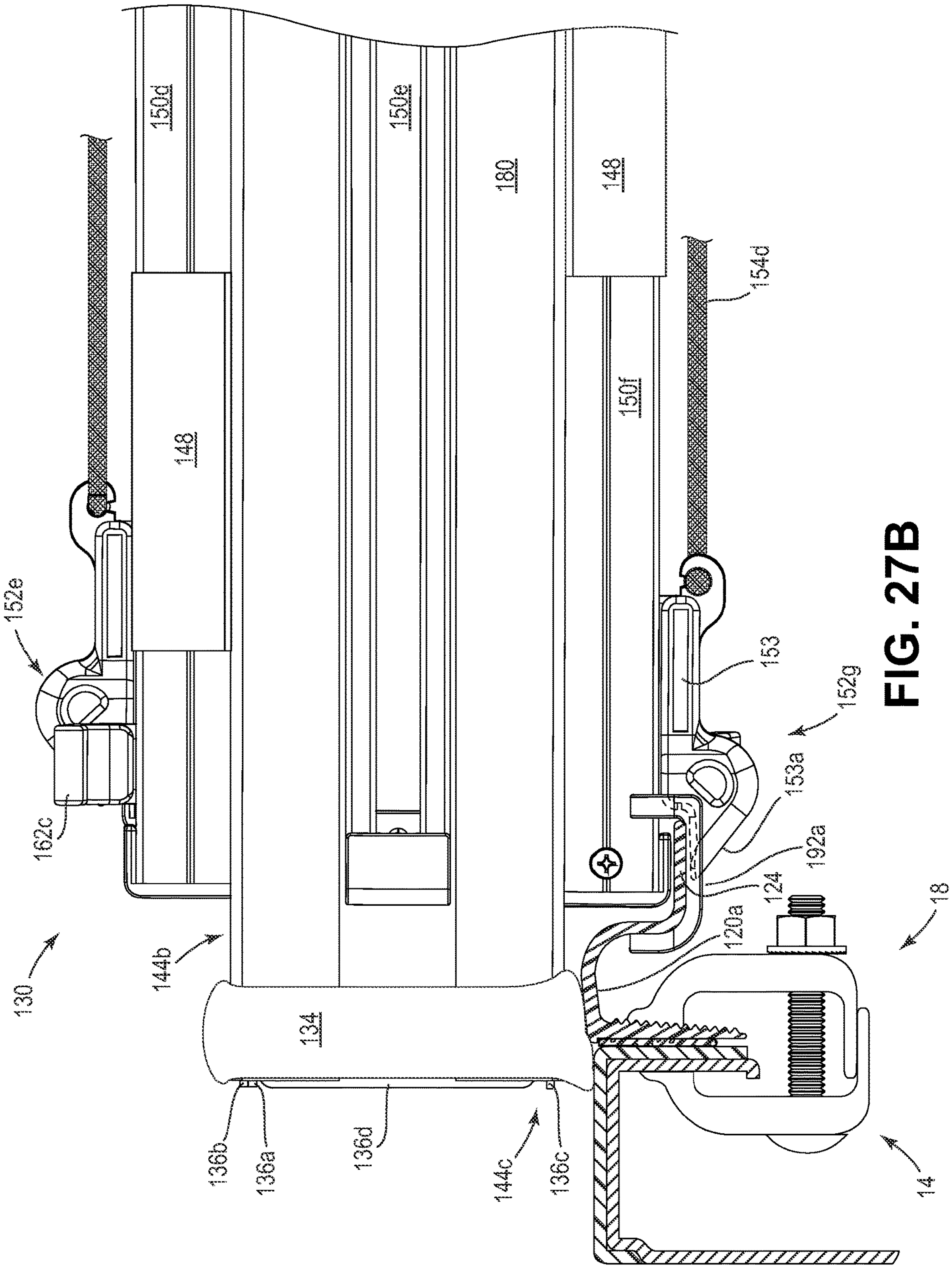
FIG. 27B is a partial section view as indicated on FIG. 27A illustrating the engaging portion of the latch on the driver's side of the rear support bow of the front panel engaged to the lip of the side rail and within the containment bracket.

FIG. 27B is a partial section view as indicated on FIG. 27A illustrating the engaging portion 153*b* of the latch 152*g* on the driver's side of the rear support bow 150*f* of the front 136*c* panel engaged to the lip 124 of the side rail 120*a* and within the containment bracket 192*a*.

FIG. 28A is a front perspective view of the folding tonneau cover apparatus 110 in the configuration of FIG. 27B; a storage strap 194*a* and a strap bracket 194*b* are seen along the middle panel 136*b*, with the storage strap 194*a* attached to the support bow 150*c*. A bracket slot 194*c* is seen in the front panel 136*c*. FIG. 28B is a front perspective view of the folding tonneau cover apparatus 110 similar to the view of FIG. 28A but showing the storage strap 194*a* pulled down and engaged with a strap bracket 194*b* to a bracket slot 194*c* in the front panel 136*c*, securing the folding cover assembly 130 in the folded up configuration. The folding cover assembly 130 may be left in this folded and bundled configuration if desired. Alternatively, if it is desired to remove the folding cover assembly 130 to leave the cargo box 5 completely uncovered, the folding cover assembly 130 may be removed from the side rails 120*a* and 120*b* as follows.

Figure 29A:
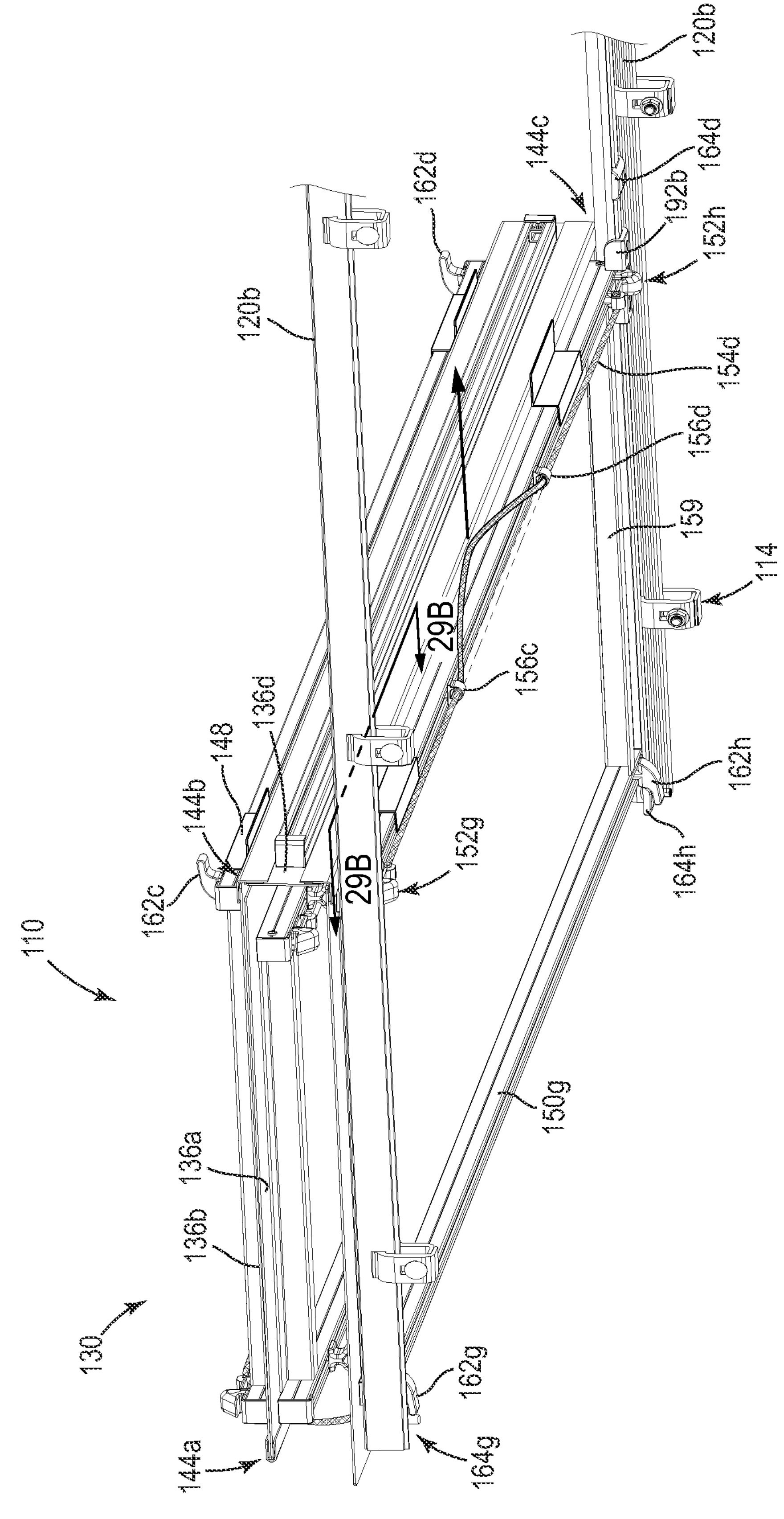
FIG. 29A is a rear perspective view of the folding tonneau cover apparatus of FIG. 20 viewed from slightly below and to the driver's side of the folding tonneau cover apparatus, wherein the folding tonneau cover is secured in the folded up configuration similar to that of FIGS. 28A-28B, showing the release cord for releasing the latches on the front panel pulled to release the latches, but for clarity of illustration the perimeter seal is not shown.

FIG. 29A is a rear perspective view of the folding tonneau cover apparatus 110 viewed from slightly below and to the driver's side of the folding tonneau cover apparatus 110, wherein the folding cover assembly 130 is secured in the folded up configuration similar to that of FIG. 28B, showing the release cord 154*d* for releasing the latches 152 on the front panel 136*c* pulled to release the latches 152*g* and 152*h*. To release the latches 152*g* and 152*h*, the release cord 154*a* is preferably pulled in the segment 160*f*, between the cord guides 156*c* and 156*d*.

Figure 29B:
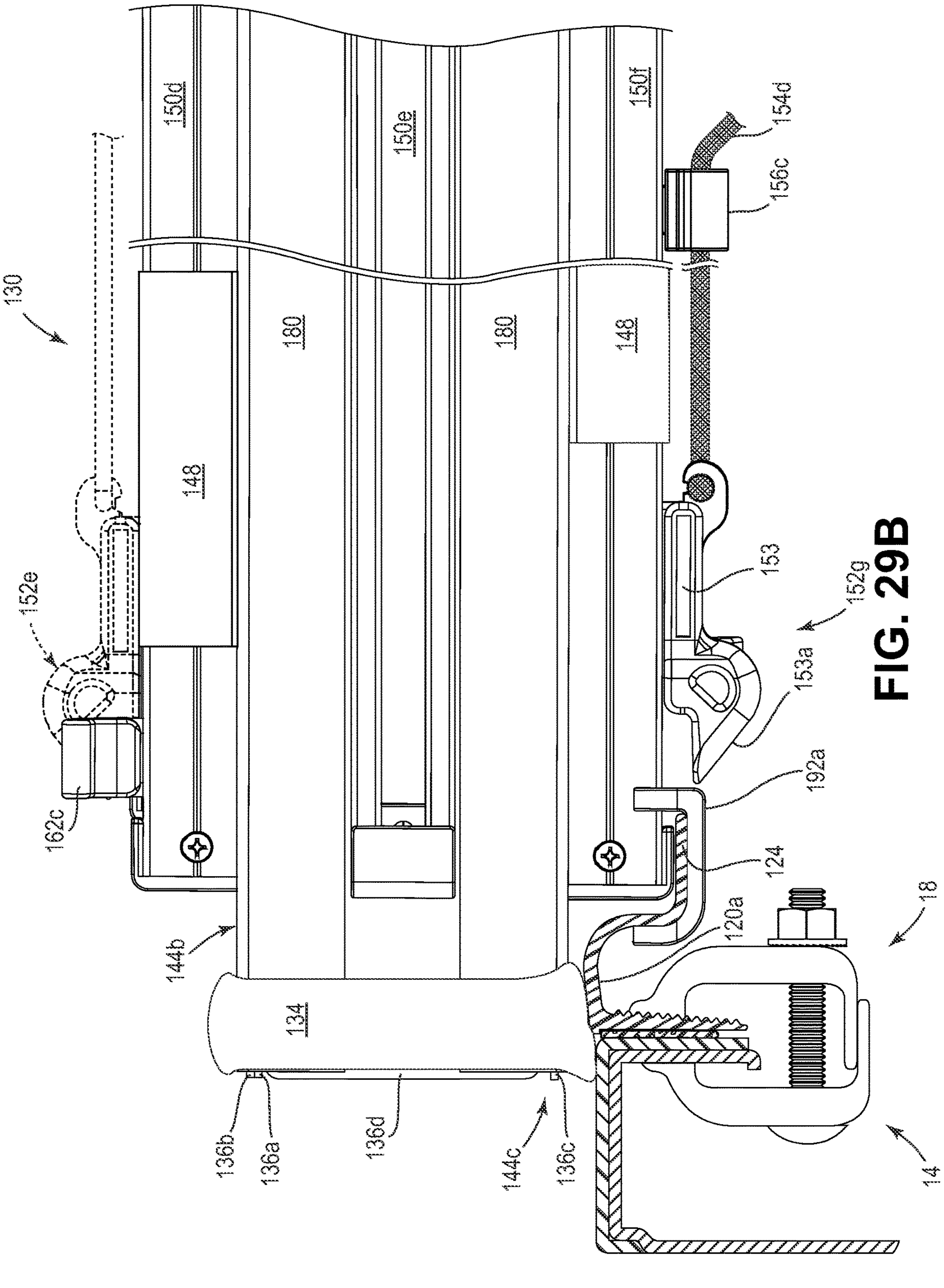
FIG. 29B is partial section view as indicated on FIG. 29A showing the latch near the driver's side end portion of the rear support bow of the front panel with the engaging portion of the latch retracted from the lip of the side rail and disengaged from the containment bracket.
Figure 29C:
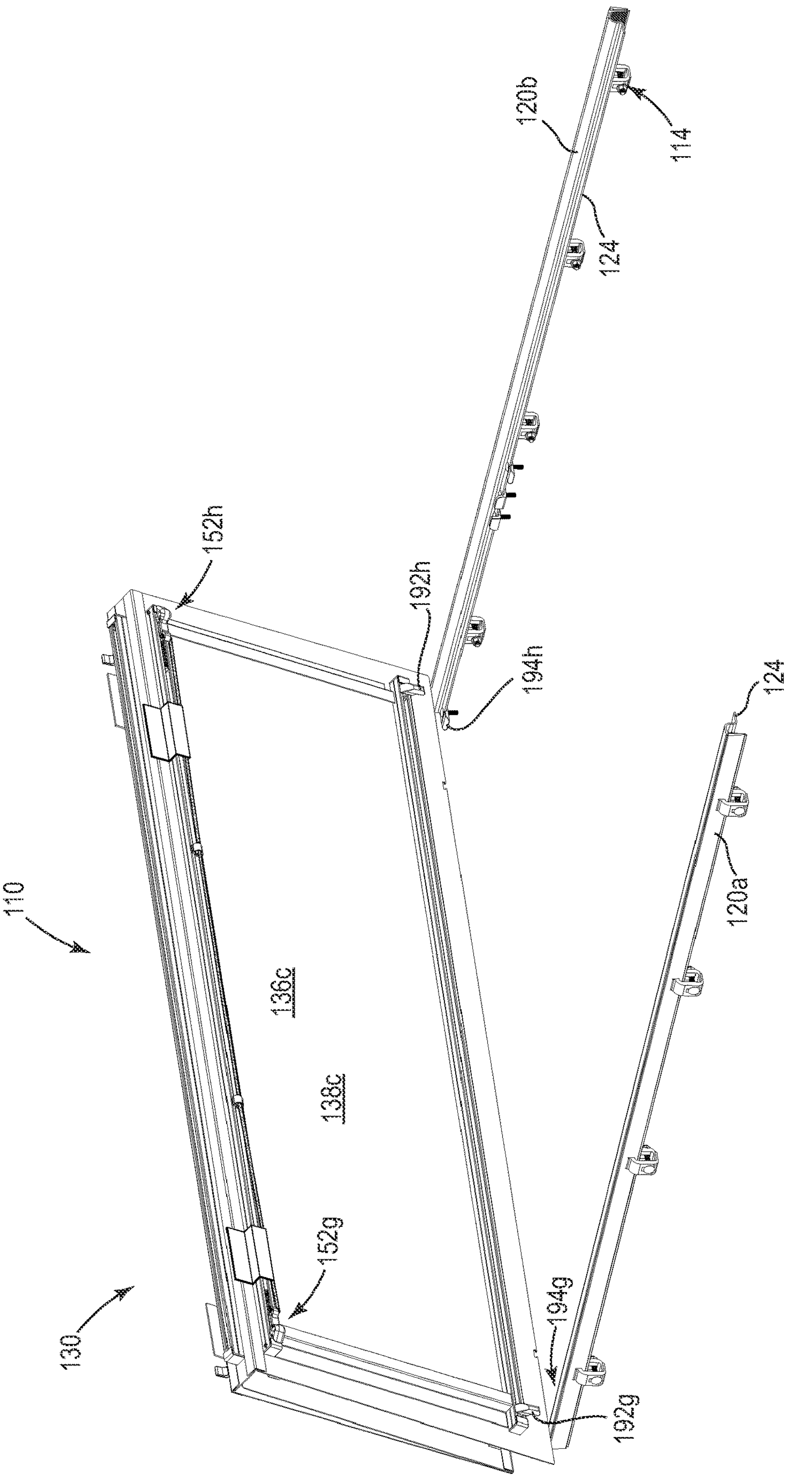
FIG. 29C is a rear perspective view of the folding tonneau cover apparatus of FIG. 20, secured in the folded up configuration, wherein the folding tonneau cover has been lifted up and rotated forward, whereby hooks near the rear of the front panel are disengaged from respective catches on the side rails, and the folding tonneau cover is free to be removed from the side rails, but for clarity of illustration the perimeter seal is not shown.

FIG. 29B is partial section view as indicated on FIG. 29A showing the latch 152*g* near the driver's side end portion of the rear support bow 150*f* of the front panel 136*c* with the engaging portion 153*b* of the latch 152*g* retracted from the lip 124 of the side rail 120*a* and disengaged from the containment bracket 192*a*. The driver's side portion of the support bow 150*f* is illustrated in FIG. 29B; the other end of the support bow 150*f* (toward the passenger side) has a mirror-image configuration, and when the release cord 154*d* is pulled, the latch slide 153 of the latches 152*g*, 152*h* at both ends of the support bow 150*f* are retracted, so that the rear end of the front panel 136*c* can be lifted up from both side rails 120*a* and 120*b*, together with the rear panel 136*a* and spacer panel 136*d*, as illustrated in FIG. 29C. With the front panel 136*c*, together with the middle panel 136*b* and the spacer panel 136*d* and the rear panel 136*a* raised and rotated as shown in FIG. 29C, hooks 162 at the front of the front panel 136*c* disengage from catches 164; specifically, hook 162*g* disengages from catch 164*g* attached to side rail 120*a*, and hook 162*h* disengages from catch 164*h* attached to side rail 120*b*.

In this configuration, with the hooks 162*g* and 162*h* disengaged from the catches 164*g* and 164*h*, respectively, the bundled folding cover assembly 130 is free from the side rails 120*a* and 120*b* can be lifted up and off the cargo box 5 in a similar manner as illustrated in FIG. 12 for the folding cover assembly 30, and can be moved away from the pickup truck 2, or stowed in the cargo box 5 or elsewhere as desired.

When it is desired to replace the folding cover assembly 130 on the cargo box 5, the various steps illustrated can be done in the reverse order, beginning with placing the bundled folding cover assembly 130 on the side rails 120*a*, 120*b* with the hooks 162*g* and 162*h* aligned with the catches 164*g* and 164*h*, respectively, similar to the configuration illustrated in FIG. 29C. The folding cover assembly 130 can be lowered onto the side rails 120*a*, 120*b* to the configuration illustrated in FIG. 28B. Alternatively, if it is desired to unfold the folding cover assembly 130 to cover the cargo box 5, the strap brackets 194*b* can be disengaged from the bracket slots 194*c*, and the folding cover assembly 130 can then be progressively unfolded as desired.

Figure 30:
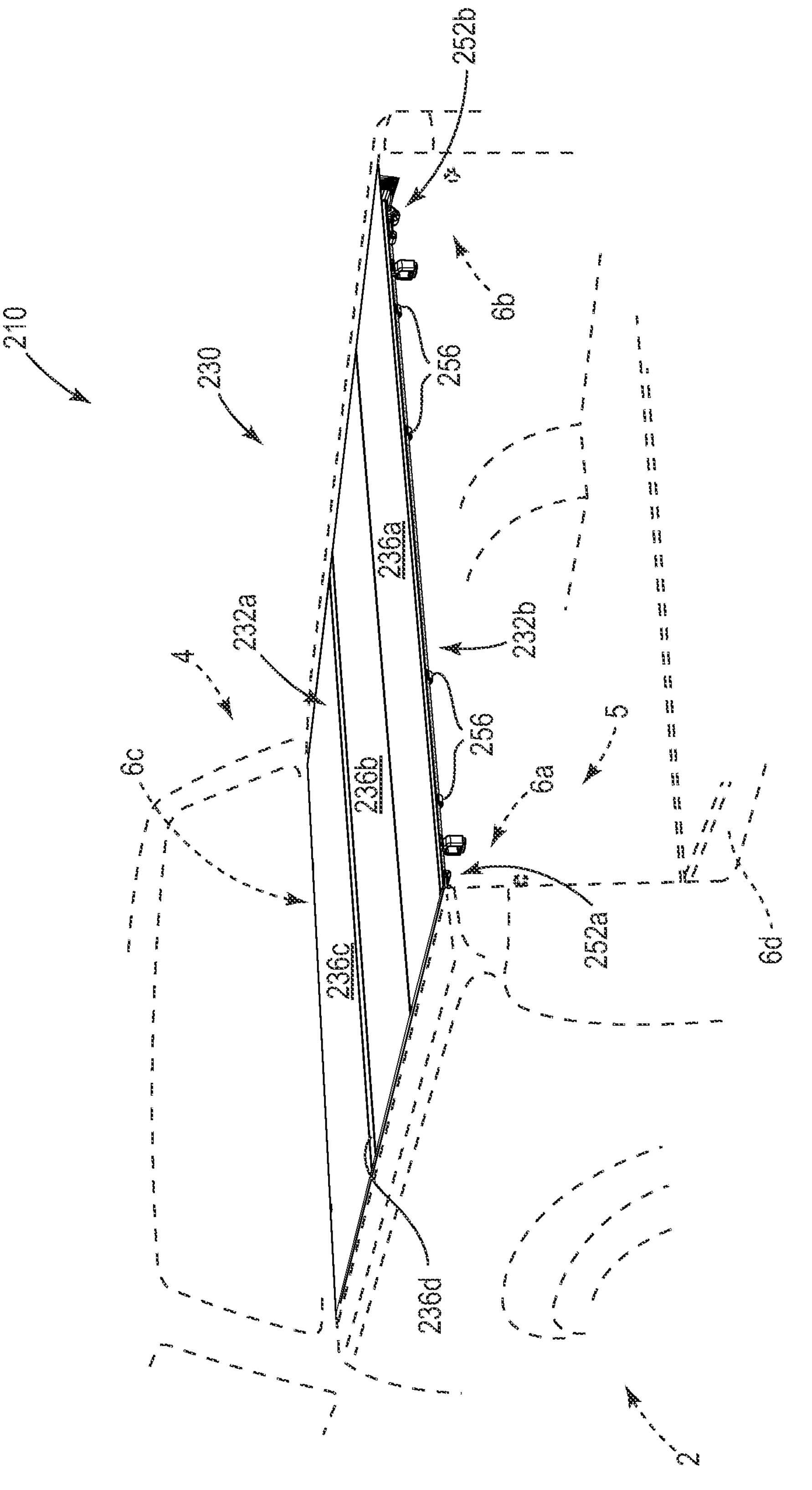
FIG. 30 is a rear perspective view of another alternate embodiment of folding tonneau cover apparatus incorporating hooks, with the folding tonneau cover apparatus attached to a pickup truck which is shown in phantom.

FIG. 30 shows a rear perspective view of another alternate folding tonneau cover apparatus 210 attached to a pickup truck which is shown in phantom.

Figure 31:
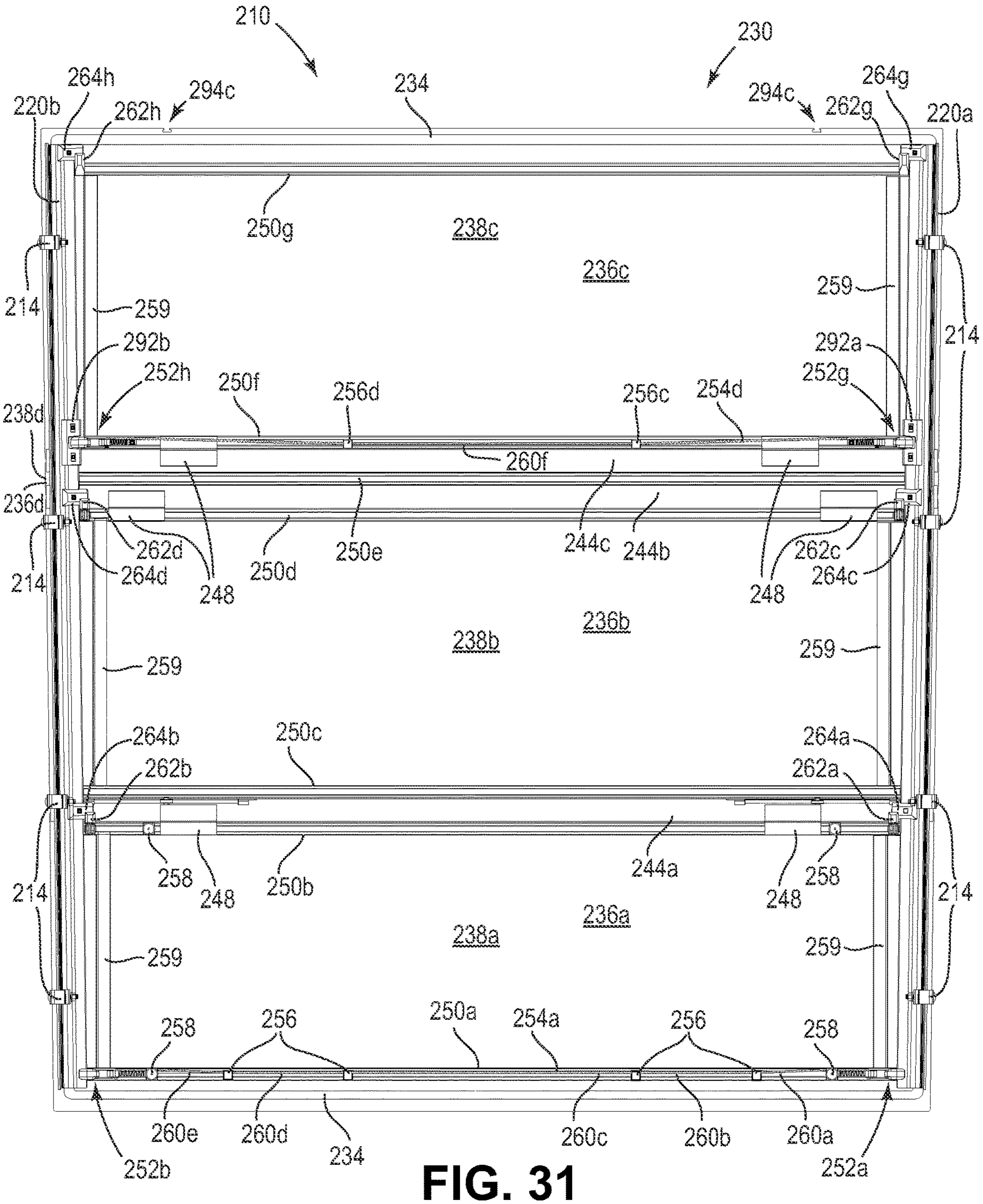
FIG. 31 is a bottom plan view of the folding tonneau cover apparatus of FIG. 30.

FIG. 31 shows a bottom view of the folding tonneau cover apparatus 210 of FIG. 30. Visible in this view are hinges 244, which are situated between adjacent panels 236 and adjoin adjacent panels 236. Each panel 236 has a top surface 237 and a bottom surface or underside 238; panel 236*a* has a top surface 237*a* and a bottom surface or underside 238*a*, panel 236*b* has a top surface 237*b* and a bottom surface or underside 238*b*, panel 236*c* has a top surface 237*c* and a bottom surface or underside 238*c*, panel 236*d* has a top surface 237*d* and a bottom surface or underside 238*d*. For ease of discussion, hinges 244 are specifically referenced herein as 244*a*-244*c*, and non-specifically or collectively referenced as 244. Specifically, situated between the rear panel 236*a* and the middle panel 236*b* is hinge 244*a*. Similarly, situated between the middle panel 236*b* and the spacer panel 236*d* is hinge 244*b*, and situated between the spacer panel 236*d* and the front panel 236*c* is hinge 244*c*. Hinges 244 allow the folding cover assembly 230 to be folded up and will be more fully described below. Optional hinge guards 248 are shown; hinge guards 248 provide additional support to the hinges 244 when the folding cover assembly 230 is unfolded and in place covering the cargo box 5 of truck 2 (FIG. 30). Hinge guards 248 also provide protection against slicing through the hinges 244; further description of the hinge guards 248 is provided below. Support bows 250 are attached to the panels 236 to provide additional support and rigidity to the panels 236, and also provide a structure for mounting of various other components as described in detail later herein. For ease of discussion, support bows 250 are specifically referenced herein as 250*a*-250*g*, and non-specifically or collectively referenced as 250. The folding tonneau cover apparatus 210 is removably secured to the support frame assembly 218 by securing apparatus 251*a*.

Preferably, securing apparatus 251*a* includes at least one locking member 251*b* which is engageable and disengageable from the support frame assembly 218. Preferably, the locking member 251*b* includes latches 252 which are located at the support bows as shown and secure the folding cover assembly 230 to the side rails 220*a* and 220*b*. Release cords 254 are attached to the latches 252. For ease of discussion, release cords 254 are specifically referenced herein as 254*a* and 254*d*, and non-specifically or collectively referenced as 254. The release cords 254 pass through cord guides 256 which are attached to support bows 250 as shown. The cord guides are non-specifically or collectively referenced herein as 256, but cord guides 256*a*-256*d* are specifically referenced herein to facilitate the detailed description herein. Standoffs 258 are shown, and will be described in further detail below. Sidebars or handles 259 are attached to panels 236*a*, 236*b*, and 236*c*, near each side of each panel 236 to further support the panels 236. Perimeter seal 234 is located on the bottom 232*b* of the folding cover assembly 230 and is arranged to seal against the sidewalls 6*a* and 6*b* and the front wall 6*c* and the tailgate 6*d* of the cargo box 5; some portions of perimeter seal 234 are behind side rails 220*a* and 220*b* and not visible FIG. 31. The perimeter seal 234 is further described herein. Clamps 214 secure the side rails 220*a* and 220*b* to the sidewalls 6*a* and 6*b* of the cargo box 5 (see FIG. 36B).

The support bows or transverse frame members or channels 250 provide additional support for the panels 236. In this embodiment, the panels each have two support bows 250, one located near each of the front and rear ends of each panel 236, except for the spacer panel 236*d*, which has only a single support bow 250. In this embodiment, there are latches 252 mounted in pairs, one of each pair mounted near each end of each of the support bows 250*a* and 250*f* as shown. As further described below, the latches 252 engage the side rails 220*a* and 220*b* to secure the folding cover assembly 230, and can slide a short distance towards or away from the side rails 220*a* and 220*b* to engage or release the folding cover assembly 230 or selected panels 236 or portions thereof from the side rails 220*a* and 220*b* as further described below. In this embodiment, there are two latch release cords or release cords or cords 254, each of which are connected to opposing pairs of latches 252 which secure the panels 236 to the side rails 220*a* and 220*b*. The release cords 254 pass through cord guides 256 which are mounted to the support bows 250; the release cords 254 can slide within the cord guides 256. The release cords 254 generally extend from the latches 252 along the support bows 250. The release cords 254 can be actuated to release each pair of latches 252 by a driver or operator when desired, to open the folding cover assembly 230. Also seen on FIG. 31 are optional hinge guards 248; the optional hinge guards 248 are preferably attached to one of the support bows 250 adjacent to each of the respective hinges 244. In this example, the hinge guards 248 are shown attached to the support bows 250*b*, 250*d*, and 250*f*. The hinge guards 248 provide support for the hinges 244, such as to support weight or pressure applied to the hinges 244, the panels 236, or other portions of the folding cover assembly 230. The hinge guards 248 can also provide some protection against cutting through a hinge 244 to enter the cargo box 5.

In the folding tonneau cover apparatus 210, hooks 262 are attached to some of the support bows 250. Preferably, hooks 262 are located adjacent each end of each of the support bows 250*b*, 250*d* and 250*g*, and are aligned with respective catches 264 which are attached to the side rails 220*a* and 220*b* as illustrated. As further described below (see also FIGS. 33-34), when the folding cover assembly 230 is in place covering the cargo box 5, the hooks 262 are engaged with the catches 264 and help to secure the folding cover assembly 230 to the side rails 220*a* and 220*b*. When a panel 230 is rotated upward, the hooks 262 disengage from the catches 264, allowing the panel to be rotated and stacked onto other panels 230, as shown below. Preferably, the hooks slide into the support bows 250 and are secured in position; preferably, the hooks are secured by an interference fit with the support bows 250, but other securement mechanisms can be utilized, such as screws or other fasteners or adhesives known in the art, or a combination of securement mechanisms. In various embodiments disclosed herein, hooks and catches such as hooks 262 and catches 264 are located along selected support bows 150, 250, 350. In the folding tonneau cover apparatus 210, hooks 262*a* and 262*b* are located near the driver's side end and passenger side end, respectively, of support bow 250*b* (near the front end of the rear panel 236*a*), hooks 262*c*, 262*d* on support bow 250*d* (near the front end of the middle panel 236*b*); hooks 262*g* and 262*h* are located near the driver's side end and passenger side end, respectively, of support bow 250*g* (near the front of the front panel 236*c*). Together, the various latches 252 and hooks 262 engage the catches 264 and the side rails 220*a* and 220*b* to secure the folding cover assembly 230 to the side rails 220*a* and 220*b* and thereby to the cargo box 5 in order to cover the cargo box 5 when desired, but can be disengaged as described herein to open the folding cover assembly 230 to enter the cargo box 5 when desired.

Figure 32:
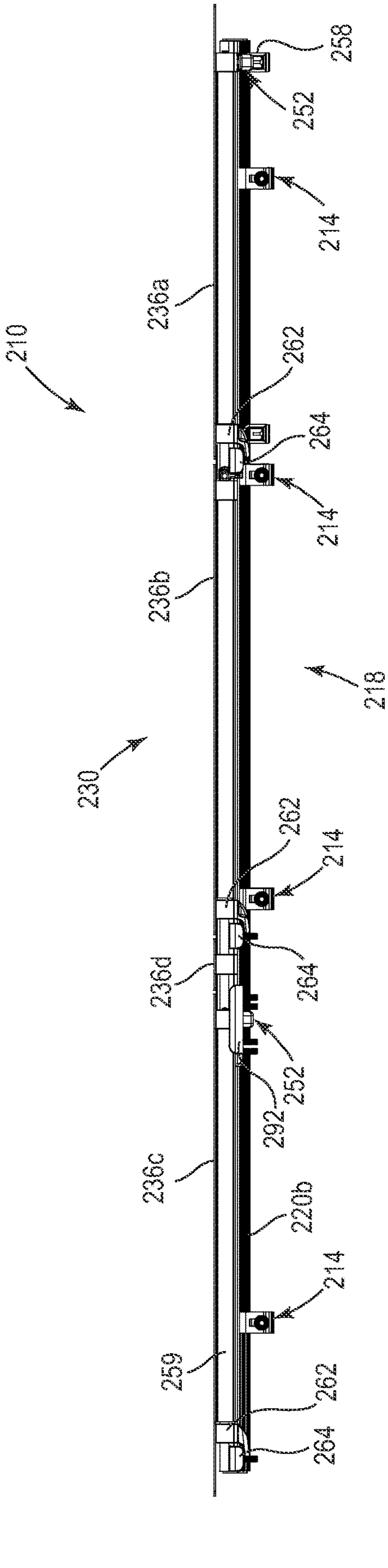
FIG. 32 is a side view of the folding tonneau cover apparatus of FIG. 30 as viewed from the driver's side, with the driver's-side side rail removed to show the underlying structure, but for clarity of illustration the perimeter seal is not shown.

FIG. 32 is a side view of the folding tonneau cover apparatus 210 of FIG. 30 as viewed from the driver's side, with the driver's-side side rail 220*a* removed to show the underlying structure. Clamps 214, latches 252, standoffs 258, hooks 262, catches 264, sidebars or handles 259, panels 236*a*, 236*b*, 236*c*, 236*d*, hinges 244*a*, 244*b*, 244*c*, and containment bracket 292*a* are shown.

Figure 33:
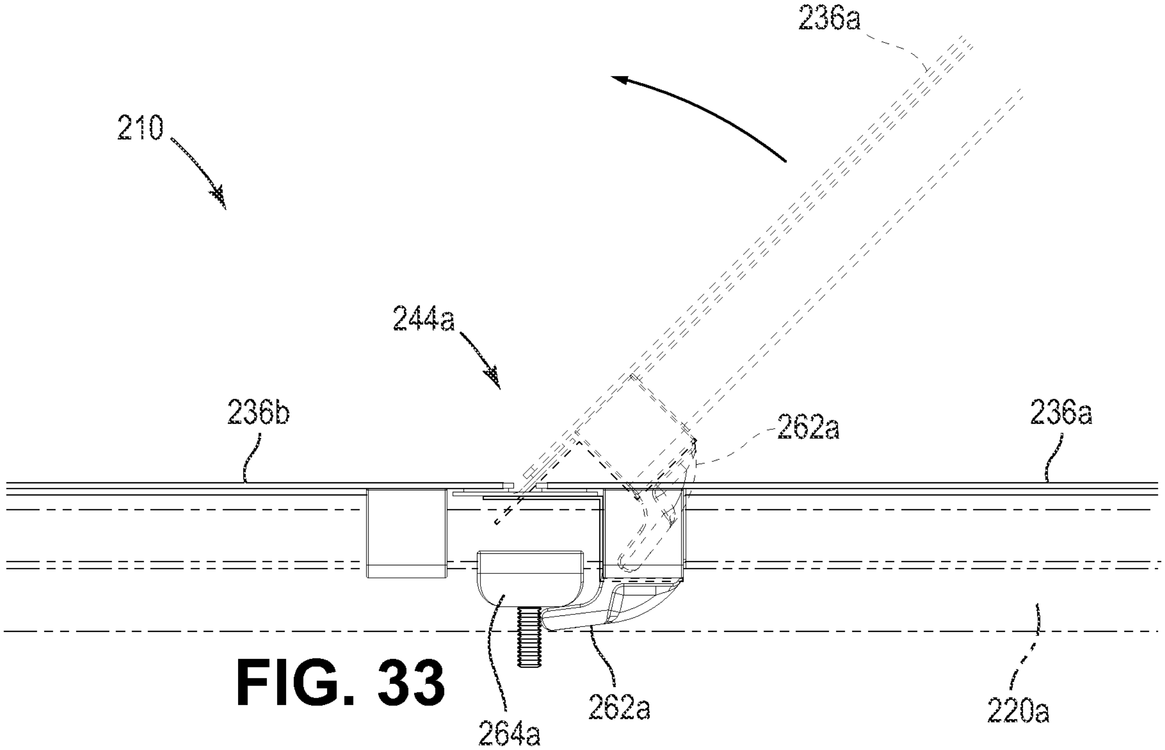
FIG. 33 is a detail side view of a portion of the folding tonneau cover apparatus of FIG. 30 as viewed from line 33-33 as indicated on FIG. 30, with the side rail on the driver's side in phantom and the truck removed to show the underlying structure, and showing in phantom an alternate position of the same portion of the folding tonneau cover apparatus in which the rear panel has been lifted up and rotated frontward somewhat so that the hook is disengaged from the catch to allow the middle panel to be subsequently lifted up, but for clarity of illustration the perimeter seal is not shown.
Figure 34:
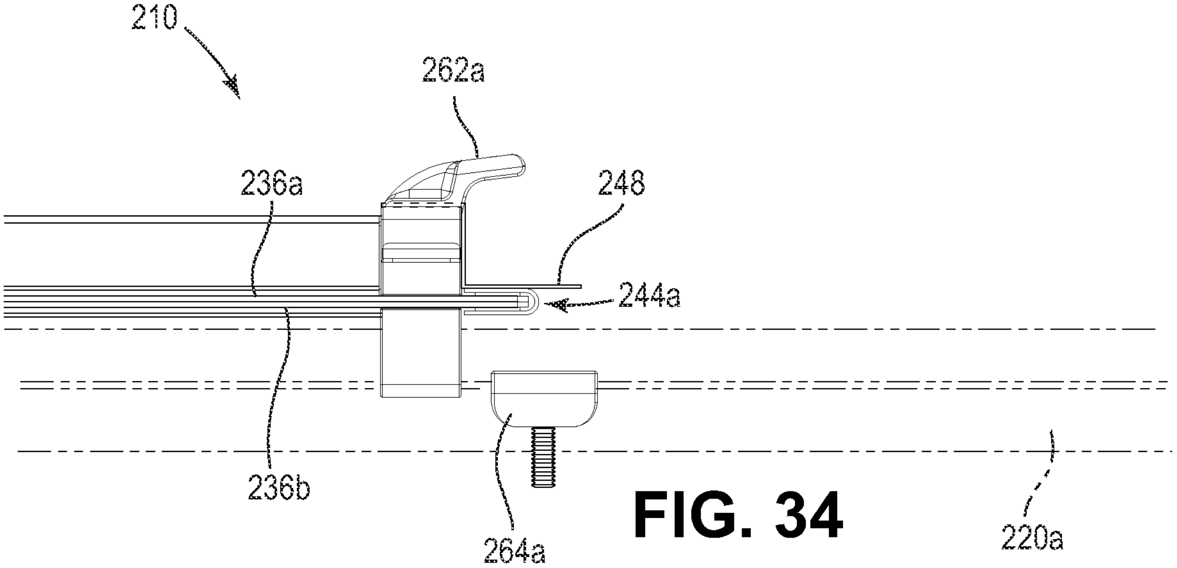
FIG. 34 is a detail side view similar to that of FIG. 33, but in which the rear panel has been rotated completely forward onto the middle panel, but for clarity of illustration the perimeter seal is not shown.

FIG. 33 is a detail side view of a portion of the folding tonneau cover apparatus 210 as viewed from line 33-33 as indicated on FIG. 30, with the driver's-side side rail 220*a* shown in phantom and the truck 2 removed to show the underlying structure, and showing in phantom an alternate position of the same portion of the folding tonneau cover apparatus 210 in which the rear panel 236*a* has been lifted up and rotated frontward somewhat in the direction of the arrow so that the hook 262*a* is disengaged from the catch 264*a*. In FIG. 34, the rear panel 236*a* has been rotated completely forward onto the middle panel 236*b*, and the hook 262*a* is disengaged from the catch 264*a*, so the middle panel 236*b* is free to be lifted up if desired. The other hooks and catches, including hooks 162, 262, 362 and catches 164, 264, 364, described herein function in a similar manner as hook 262*a* and catch 264*a* just described.

Figure 36A:
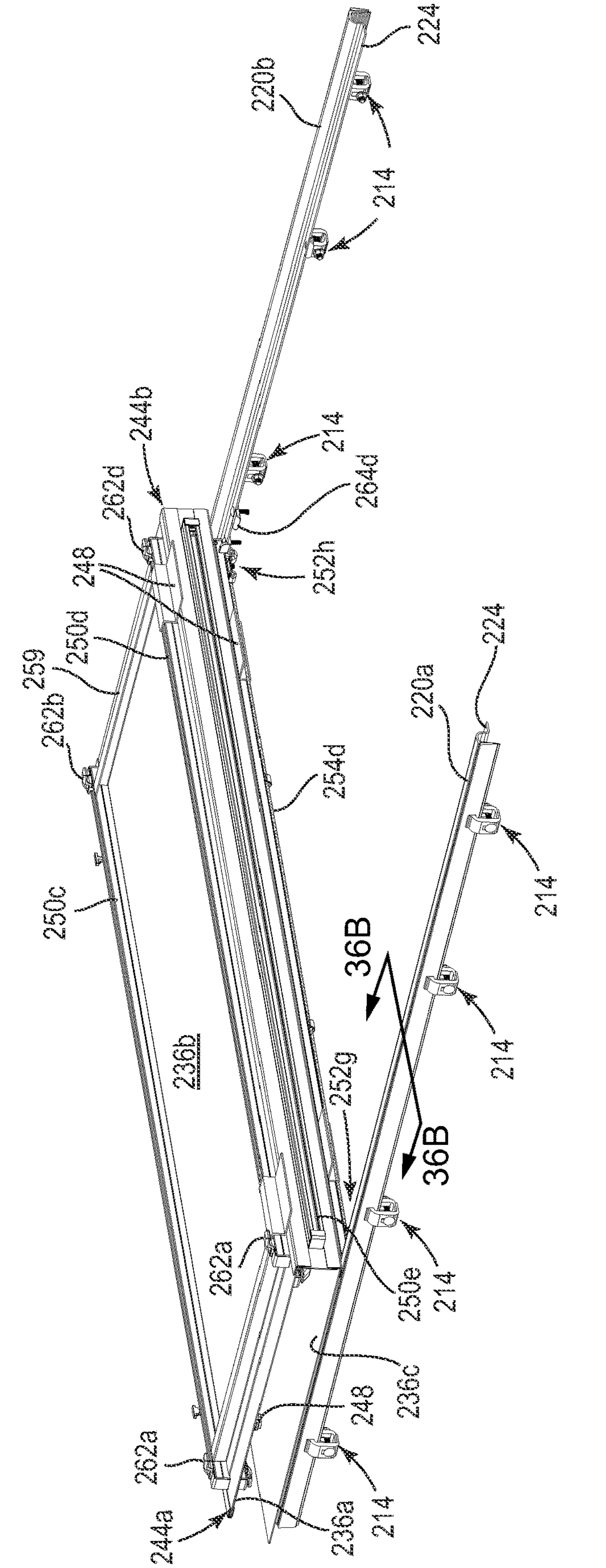
FIG. 36A is a rear perspective view similar to that of FIGS. 35A-35C, in which the middle panel together with the rear panel has been lifted and rotated completely forward onto the front panel, and showing that the release cord at the rear of the front panel is accessible, but for clarity of illustration the perimeter seal is not shown.
Figure 36B:
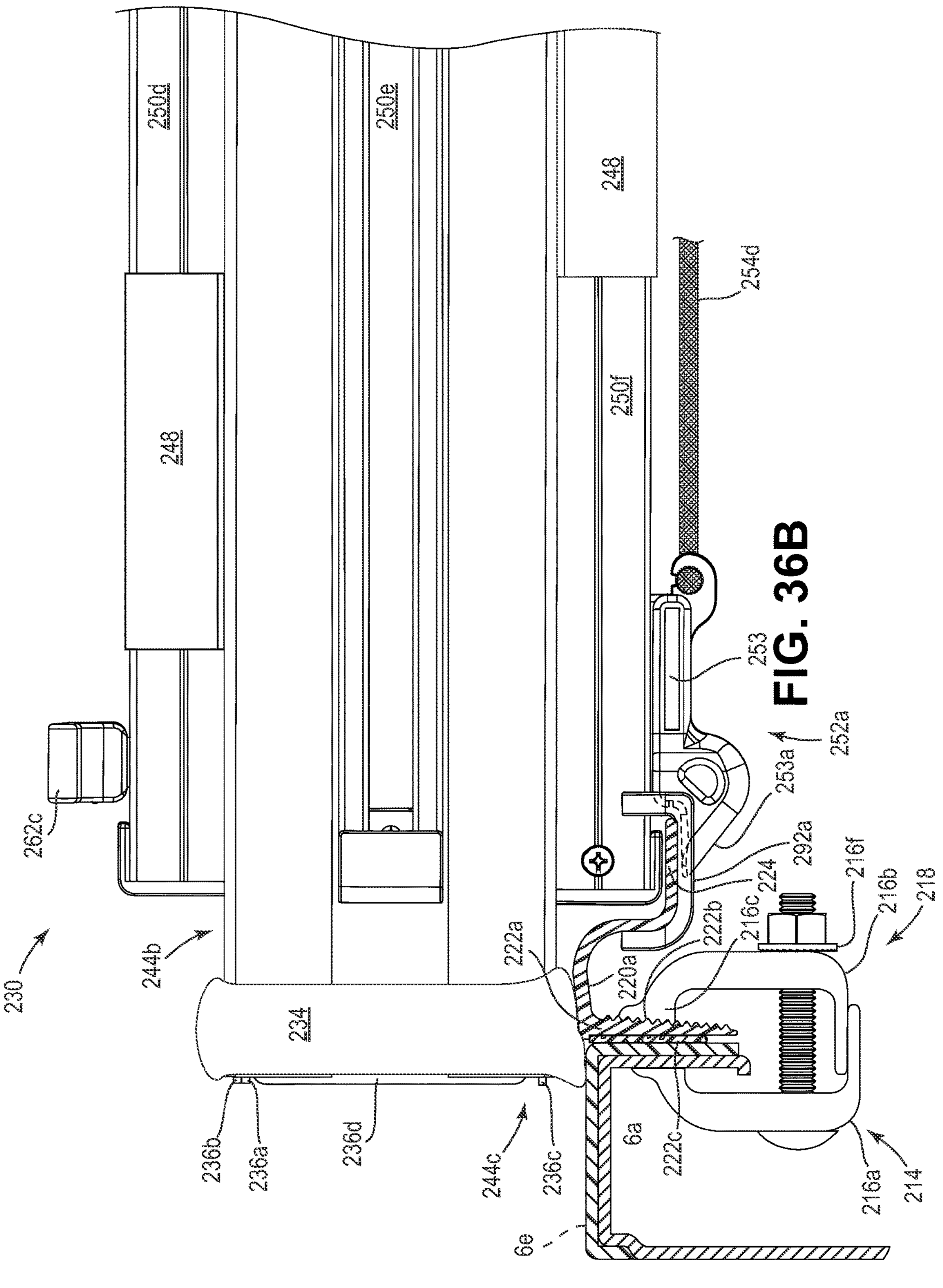
FIG. 36B is a partial section view as indicated on FIG. 36A illustrating the engaging portion of the latch on the driver's side of the rear support bow of the front panel engaged to the lip of the side rail and with the containment bracket.

The operation of the latches 252 and the hooks 262 and catches 264 of the folding tonneau cover apparatus 210 are similar to those described for latches 152, hooks 162 and catches 264 of the folding tonneau cover apparatus 110, with corresponding parts having similar structure and function. In the configuration illustrated in FIG. 30, the each latch 252 includes a latch slide 253 having a engaging portion 253*b* which extends forward to engage the lip 224 of the side rail 220*a*, 220*b* so as to secure the rear panel 236*a* to the side rails 220*a*, 22*b*, similar to the structure illustrated in FIGS. 21A-21B. The latch slide 253 is biased by a biasing member or spring 268 towards the respective side rail 220 so that the engaging portion 253*b* engages the side rail 220 to form a secured configuration in which the respective panel 236 is restricted from being lifted up from the cargo box 5; in this example, the spring 268 is a compression spring, but an extension spring, or an elastic element, or other known elements could alternatively be used to bias the latch slide 253 towards the side rail 220 so that the engaging portion 253*b* engages the side rail 220 so that the latch 152 is in the secured configuration. In this embodiment, the spring 268 is held between the latch slide 253 and a spring retainer 270. In this example, the spring retainer 270 includes square nuts 272*a* and a retainer bolt 272*b*; in assembly, the spring retainer 270 can be inserted into the support bow 250*a* and by rotating the retainer bolt 272*b* with respect to the square nuts 272*a*, the upper end of the retainer bolt 272*b* presses against the bow top portion 274*a* of the support bow 250*a* while the square nuts press against the bow bottom portion 274*b* of the support bow 250*a*, fixing the spring retainer 270 in the desired location in the support bow 250*a*. The side rails 220*a* and 220*b* preferably include extruded metal, and have a side rail engagement portion 222*a* (FIG. 36B), arranged to approximate a portion of the sidewall 6*a*, 6*b* of the pickup truck 2. A clamp 214 is shown in detail in FIG. 36B, similar to clamp 14 illustrated in FIG. 3B. Clamps 214 are preferably cut from an aluminum extrusion, although other metals or alloys or polymers or other composite materials can be used. Clamps 214 as illustrated have an outer member 216*a* and an inner member 216*b* which are tightened towards each other and held as an assembly on the sidewall 6*a* by a fastener assembly 216*d* which typically includes a bolt 216*e*, a washer 216*f*, and a nut 216*g*. Preferably, inner member 216*b* has a clamp engagement portion 216*c* which, together with side rail engagement portion 222*a* of side rail 220*a*, aids in securing the clamps 214 in place on the side rail 220*a*. Preferably, the clamps 214 are arranged and tightened to secure the side rail 220*a* to the sidewall 6*a*, with a sidewall gasket 276 arranged between the side rail 220*a* and the sidewall 6*a* as illustrated. A bow end cap 278 is located at the end of the support bow 250*a*. In the present example, the side rail engagement portion 222*a* is a generally vertically-oriented portion which configured to be located adjacent a similarly vertically-oriented portion of the sidewall 6*a*, 6*b*. In the example of FIG. 36B, a portion of the sidewall 6*a* of a cargo box 5 of a Chevrolet Silverado pickup truck is illustrated; however, other sidewalls of other cargo boxes of other pickup trucks and the like can be accommodated, by incorporating a side rail engagement portion 222*a* along the length of the side rails 220*a* and 220*b* that are appropriately configured and oriented. In this example, the cargo box 5 of the pickup truck 2 includes a sidewall cap 6*e*, but other cargo boxes 5 lack a sidewall cap. Preferably, the side rail engagement portion 222*a* has a side rail engagement feature 222*b*, such as ridges, knurling, surface patterns or textures, or other features which aid in securing the clamps 214. Preferably, a sidewall gasket 222*c* is located between the side rail engagement portion 222*a* and the sidewall 6*a*; the sidewall gasket 222*c* can provide protection against damage to the sidewall 6*a* by abrasion against the side rail 220*a*. The sidewall gasket 222*c* can provide leak resistance to prevent water, dust, or other debris from passing into the cargo box 5 along the side rail engagement portion 222*a*. The side rail 220*a* has a flange or side rail lip 224 along the length of the side rail 220*a*. The side rail lip 224 provides support for the folding cover assembly 230. In addition, the side rail lip 224 provides a feature for engagement of the engaging portion 253*b* of the latches 252. The driver's side portion of the support bow 250*f* is shown in FIG. 36B; the other end of the support bow 250*f* (toward the passenger side) has a mirror-image configuration, with a latch 252 engaging side rail 220*b*, and side rail 220*b* being attached to sidewall 6*b* in a similar manner.

Figure 35A:
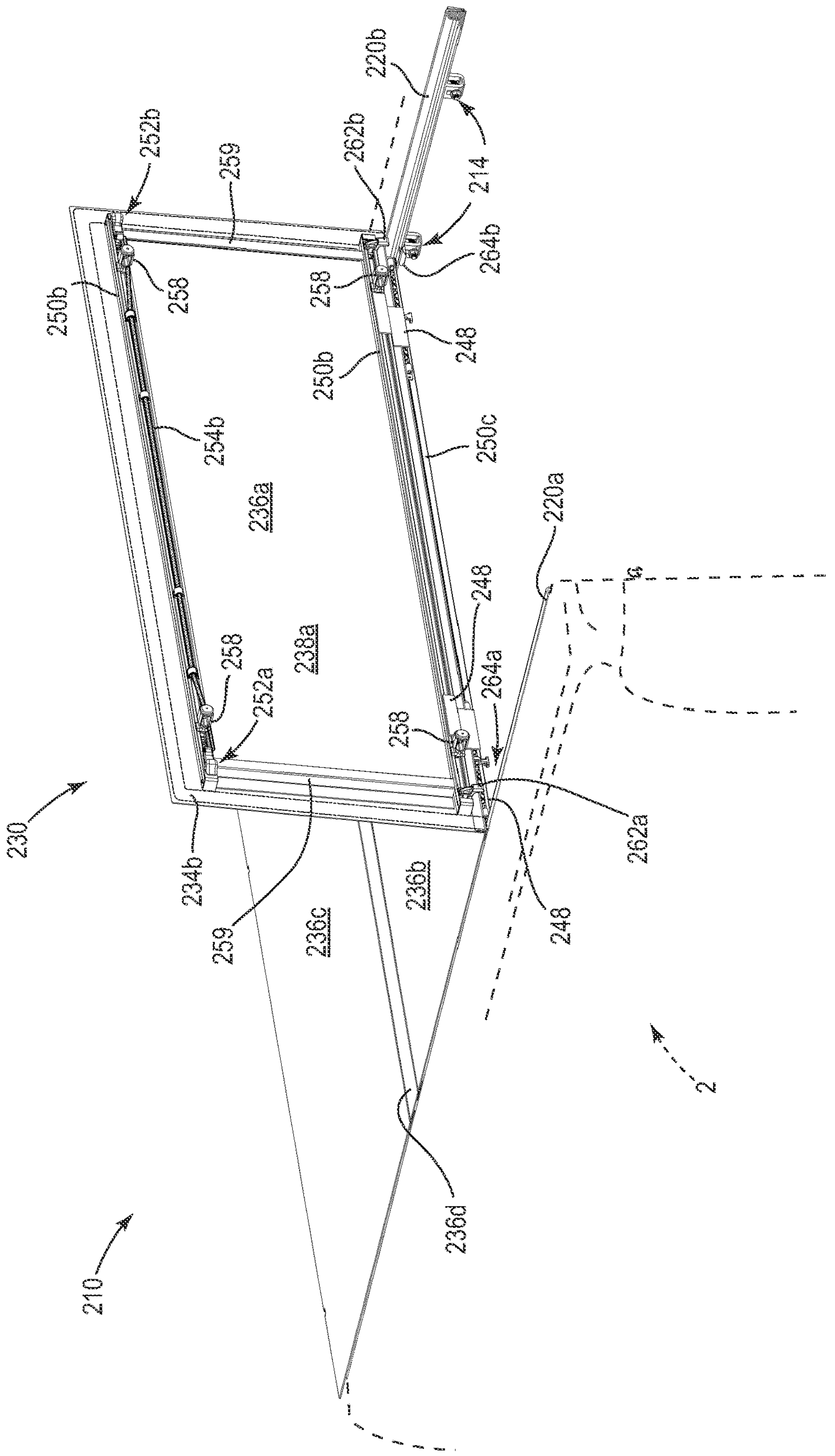
FIG. 35A is a rear perspective view of the folding tonneau cover apparatus of FIG. 30 in which the rear panel has been lifted and rotated frontward approximately 90 degrees.
Figure 35B:
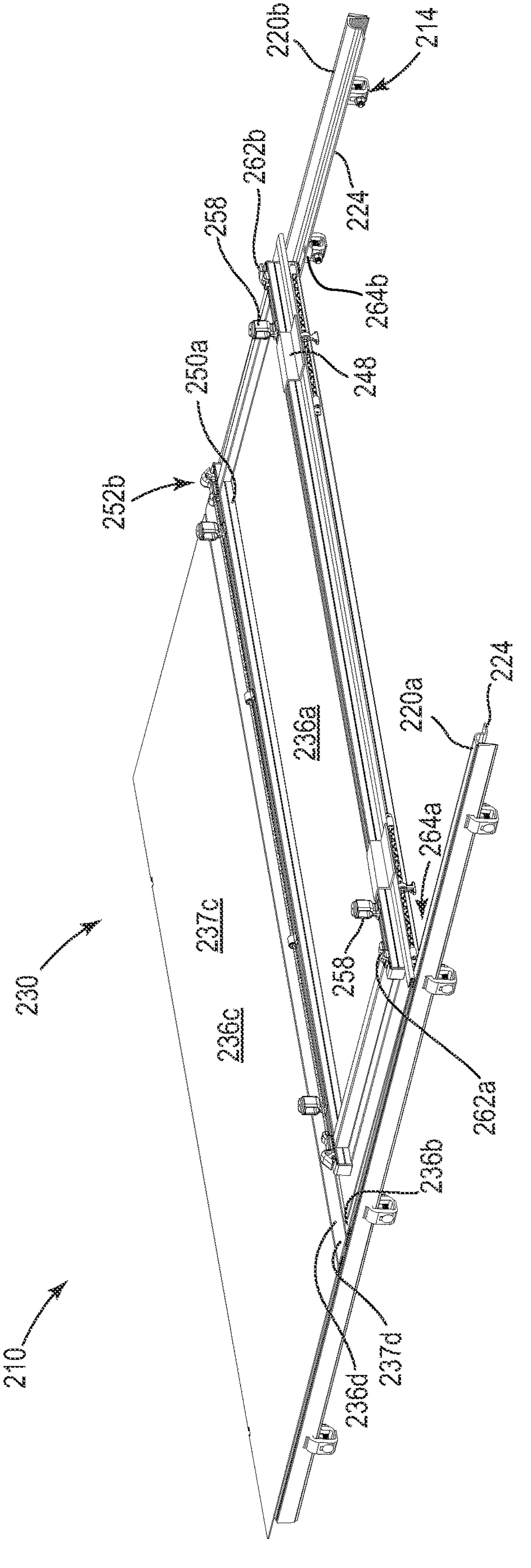
FIG. 35B is a rear perspective view similar to that of FIG. 35A, in which the rear panel has been lifted up and rotated completely forward onto the middle panel, but for clarity of illustration the perimeter seal is not shown.

Similar to the folding tonneau cover apparatus 10 and the folding tonneau cover apparatus 10, when it is desired to release the latches 252 at the rear end of the rear panel 236*a*, the release cord 254*a* is pulled to retract the latches 252 against the force of the biasing member or spring 268. Preferably, the release cord 254*a* will be pulled as illustrated, by a driver (not shown) who has walked to the rear of the cargo box 5 and has opened the tailgate 6*d* and reaches in to pull the release cord 254*a*. When the release cord 254*a* is pulled, the engaging portion 253*b* of the latch 252 at the driver's-side end of the support bow 250*a* is retracted away from the lip 224 of the side rail 220*a*, releasing the latch 252 from the side rail 220*a*. The cord guides 256 adjacent to the latches 252 help to maintain alignment of the ends of the release cord 254*a* so that the latches 252 are retracted in alignment with the support bow 250*a*, to avoid excessive friction, wear and potential binding. The passenger-side end of the support bow 250*a* has a mirror-image configuration to that just described for the driver's-side end of the support bow 250*a*, and when the release cord 254*a* is pulled, the latches 252 at both ends of the support bow 250*a* are retracted, so that the rear end of the rear panel 236*a* can be lifted up from both side rails 220*a* and 220*b*. The hinge 244*a* bends to accommodate the lifting up and pivoting frontward of the rear panel 136*a*, as illustrated in FIG. 35A. FIG. 35B illustrates the rear panel 236*a* rotated further, onto the middle panel 236*b*. With the rear panel 236*a* rotated back onto the middle panel 236*b* as shown in FIG. 35B, hooks 262 at the ends of the support bow 250 at the front of the rear panel disengage from the respective catches 264; specifically, hook 262*a* disengages from catch 264*a* attached to side rail 220*a*, and hook 262*b* disengages from catch 264*b* attached to side rail 220*b*. In this configuration, the rear portion of the middle panel 236*b* is free to be lifted up when desired by a driver or operator.

Figure 35C:
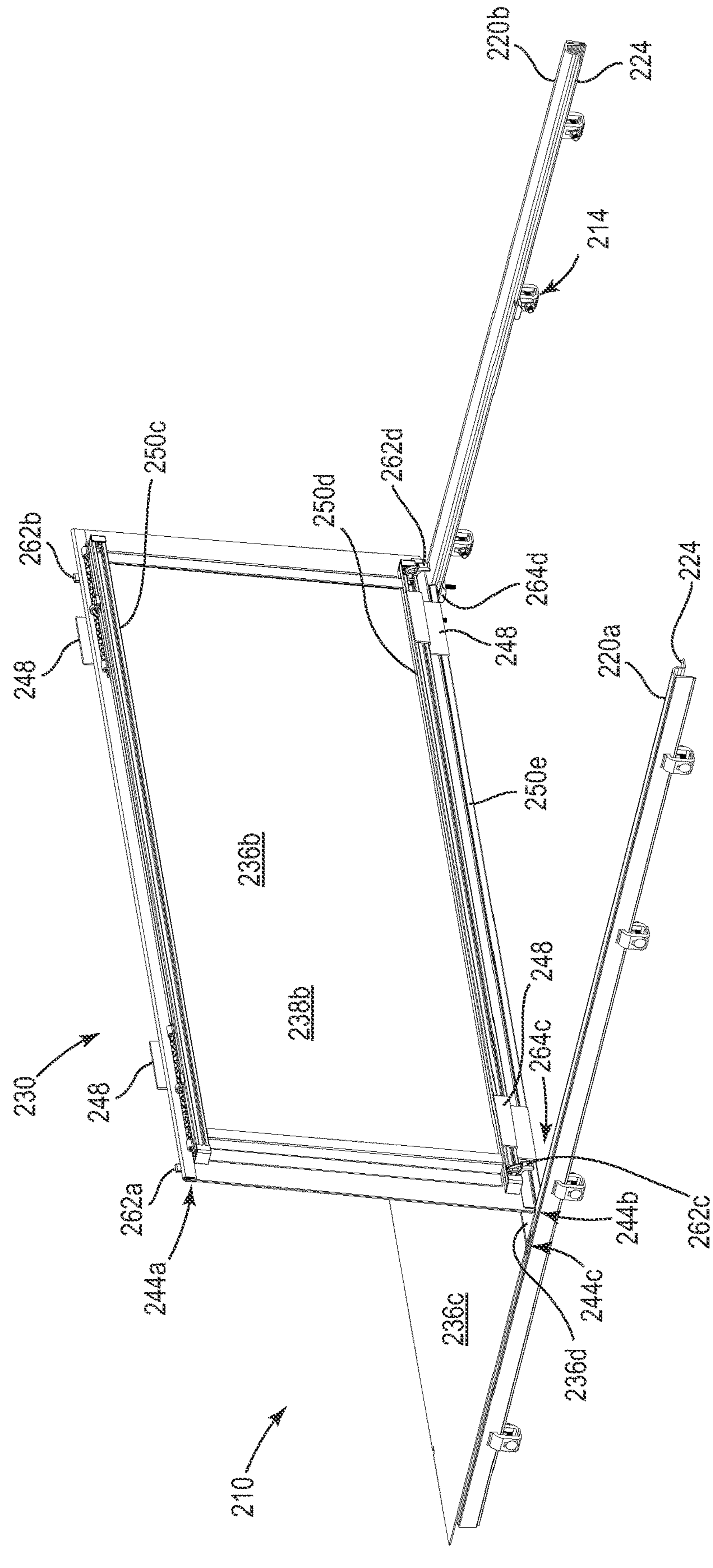
FIG. 35C is a rear perspective view similar to that of FIGS. 35A and 35B, in which the middle panel together with the rear panel has been lifted and rotated frontward approximately 90 degrees, but for clarity of illustration the perimeter seal is not shown.

FIG. 35C illustrates the middle panel 236*b* together with the rear panel 236*a* lifted up and rotated frontward towards the front panel 236*c*. With the middle panel 236*b* lifted up and rotated frontward, hooks 262 at the ends of the support bow 250 at the front of the middle panel 236*b* disengage from the respective catches 264; specifically, hook 262*c* disengages from catch 264*c* attached to side rail 220*a*, and hook 262*d* disengages from catch 264*d* attached to side rail 220*b*. In this configuration, the rear portion of the middle panel 236*b* is free to be lifted up when desired by a driver or operator.

As the middle panel 236*b*, together with the rear panel 236*a*, is rotated further frontward towards the front panel 236*c*, bending the hinge 244*b*, the spacer panel 236*d* lifts and rotates frontward as well, bending the hinge 244*c*. The folding and rotating of the folding cover assembly 230 are similar to that illustrated for the folding cover assembly 30 as shown in FIGS. 8C-9A, as follows. With continued folding and rotating of the folding cover assembly 230, the standoffs 258 attached to the support bow 250*a* contact the top of the front panel 236*c*. With further rotating of the middle panel 236*b* (together with the front panel 236*a*) the hinge 244*c* bends and the spacer panel 236*d* lifts off the side rails 220*a* and 220*b*; with still further rotating of the middle panel 236*b* frontwards, together with the rear panel 236*a* and the spacer panel 236*d*, and pivoting and sliding of the standoffs 258, the middle panel 236*b*, the rear panel 236*a*, and the spacer panel 236*d* rotate progressively farther frontwards towards the front panel 236*c*, until the standoffs 258 attached to the support bow 250*b* also contact the front panel 236*c*, as illustrated in FIG. 36A. The standoffs 258 help to maintain a spaced relationship between the rear panel 236*a* and the front panel 236*c*. During this folding of the folding cover assembly 230, the hinges 244*b* and 244*c* flex as the middle panel 236*b*, the rear panel 236*a*, and the spacer panel 236*d* rotate towards the front panel 236*c*. Depending on forces applied by the driver or other operator 8, the hinges 244*b* and 244*c* can flex to pass through various increasing or decreasing angles.

FIG. 36A is a rear perspective view of the folding tonneau cover apparatus 230 wherein the rear panel 236*a* together with the middle panel 236*b* and the spacer panel 236*d* has been rotated forward so that the middle panel 236*b* and the rear panel 236*a* are resting on the spacers 258 on top of the front panel 236*c*, and with the spacer panel 236*d* rotated upwards.

FIG. 36B is a partial section view as indicated on FIG. 36A illustrating the engaging portion 253*b* of the latch 252*g* on the driver's side of the rear support bow 250*f* of the front 236*c* panel engaged to the lip 224 of the side rail 220*a* and within the containment bracket 292*a*.

When desired, the storage strap 294*a* is preferably pulled down and engaged with a strap bracket 294*b* to a bracket slot 294*c* in the front panel 236*c*, securing the folding cover assembly 230 in the folded up configuration in a manner similar to that illustrated in FIGS. 28A-28B for the folding cover assembly 130. The folding cover assembly 230 may be left in this folded and bundled configuration if desired. Alternatively, if it is desired to remove the folding cover assembly 230 to leave the cargo box 5 completely uncovered, the folding cover assembly 230 may be removed from the side rails 220*a* and 220*b* in the same manner as that illustrated in FIGS. 29A-29C, as follows.

Figure 37A:
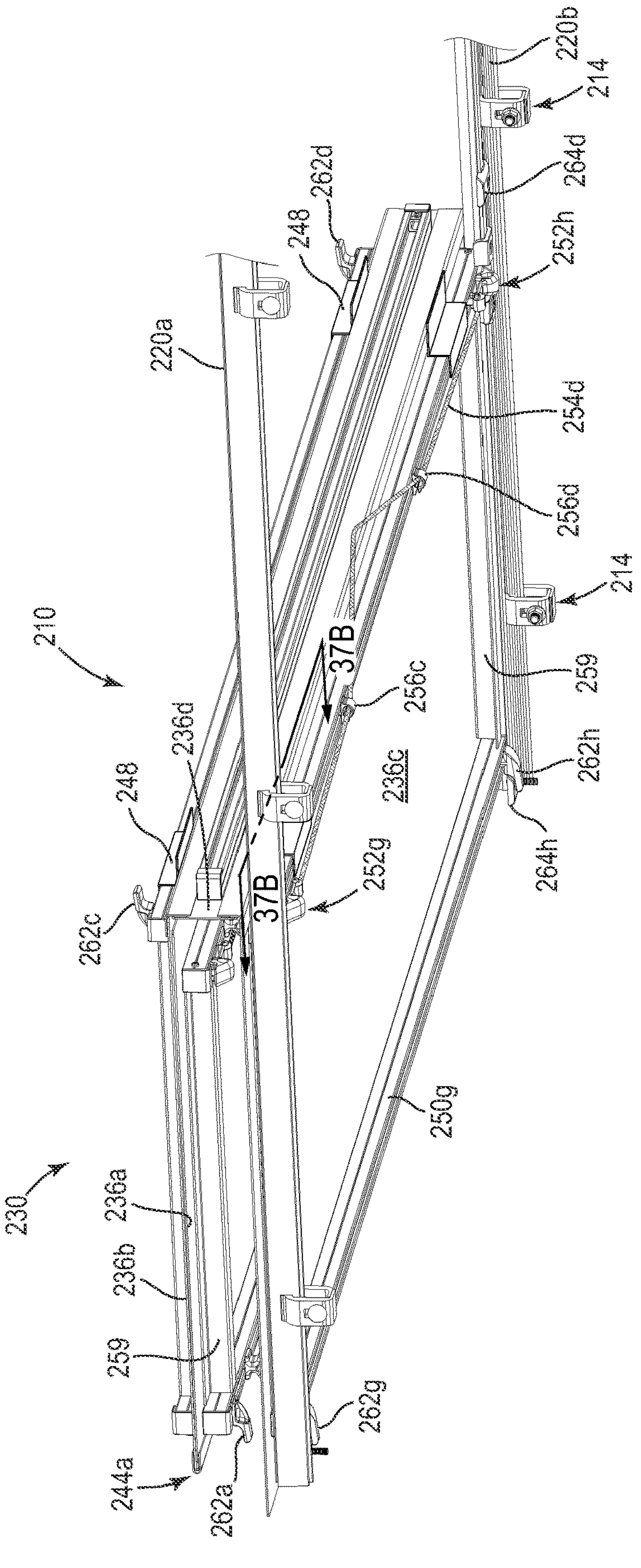
FIG. 37A is a rear perspective view of the folding tonneau cover apparatus of FIG. 30 viewed from slightly below and to the driver's side of the folding tonneau cover apparatus, wherein the folding tonneau cover is secured in the folded up configuration similar to that of FIGS. 36A-36B, showing the release cord for releasing the latches on the front panel pulled to release the latches, but for clarity of illustration the perimeter seal is not shown.

FIG. 37A is a rear perspective view of the folding tonneau cover apparatus 210 viewed from slightly below and to the driver's side of the folding tonneau cover apparatus 210, wherein the folding cover assembly 230 is secured in the folded up configuration similar to that of FIG. 28B for folding cover assembly 130, with the release cord 254*d* for releasing the latches 252 on the front panel 236*c* pulled to release the latches 252*g* and 252*h*.

Figure 37B:
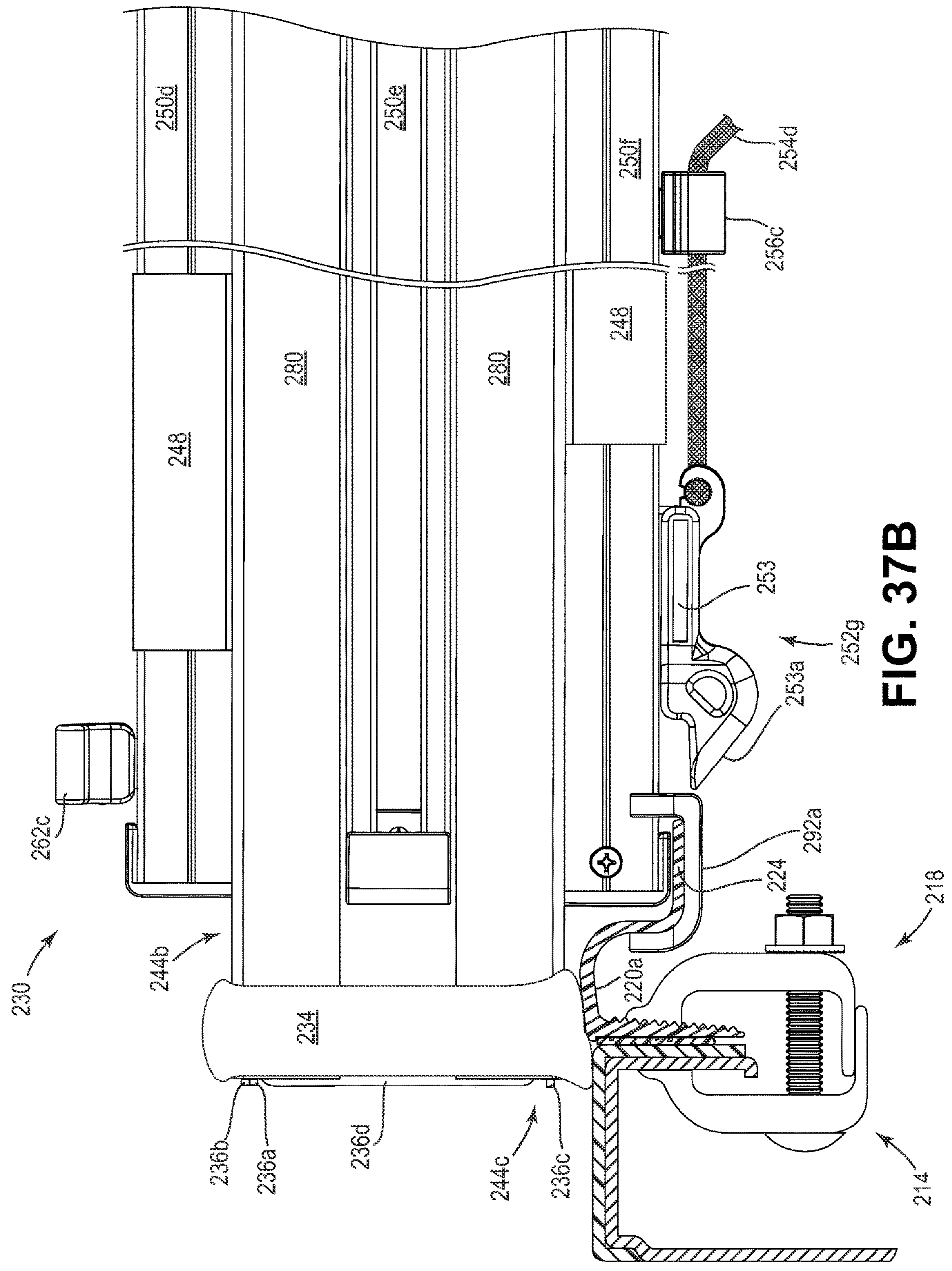
FIG. 37B is partial section view as indicated on FIG. 37A showing the latch near the driver's side end portion of the rear support bow of the front panel with the engaging portion of the latch retracted from the lip of the side rail and disengaged from the containment bracket.

FIG. 37B is partial section view as indicated on FIG. 37A showing the latch 252*g* near the driver's side end portion of the rear support bow 250*f* of the front panel 236*c* with the engaging portion 253*b* of the latch 252*g* retracted from the lip 224 of the side rail 220*a* and disengaged from the containment bracket 292*a*. The driver's side portion of the support bow 250*f* is illustrated in FIG. 37B; the other end of the support bow 250*f* (toward the passenger side) has a mirror-image configuration, and when the release cord 254*d* is pulled, the latch slide 253 of the latches 252*g*, 252*h* at both ends of the support bow 250*f* are retracted, so that the rear end of the front panel 236*c* can be lifted up from both side rails 220*a* and 220*b*, together with the rear panel 236*a* and spacer panel 236*d*. With the front panel 236*c*, preferably bundled together with the middle panel 236*b* and the spacer panel 236*d* and the rear panel 236*a* and raised and rotated similar to the configuration illustrated in FIG. 29C for the folding tonneau cover apparatus 110, hooks 262 at the front of the front panel 236*c* disengage from catches 264; specifically, hook 262*g* disengages from catch 264*g* attached to side rail 220*a*, and hook 262*h* disengages from catch 264*h* attached to side rail 220*b*.

In this configuration, with the hooks 262*g* and 262*h* disengaged from the catches 264*g* and 264*h*, respectively, the bundled folding cover assembly 230 is free from the side rails 220*a* and 220*b* can be lifted up and off the cargo box 5 in a similar manner as illustrated in FIG. 12 for the folding cover assembly 30, and can be moved away from the pickup truck 2, or stowed in the cargo box 5 or elsewhere as desired.

Figure 38:
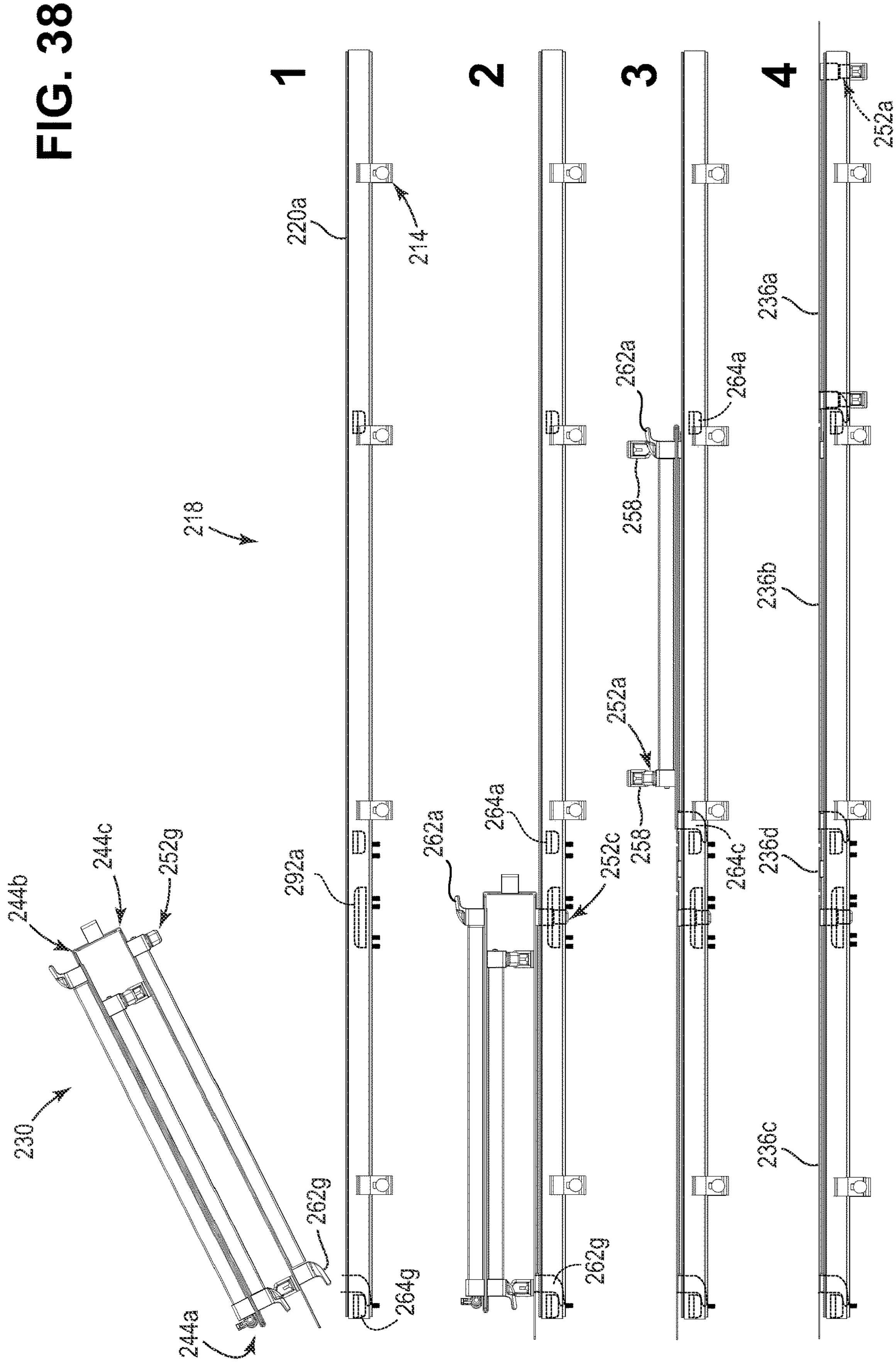
FIG. 38 is an illustration of steps and configurations of the folding tonneau cover of FIG. 30 being installed onto the side rails, showing the hooks at the front of the front panel approaching the catches at the front of the side rails, then the hooks at the front of the front panel engaged with the catches at the front of the side rails and the latches at the rear of the front panel engaged with the side rails and the respective containment brackets, then the spacer panel and middle panel unfolded with the hooks at the front of the middle panel engaged with the respective catches on the side rails, then the rear panel unfolded with the hooks at the front of the rear panel engaged with the respective catches on the side rails and the latches at the rear of the rear panel engaged with the side rails and the respective containment brackets, but for clarity of illustration the perimeter seal is not shown.

When it is desired to replace the folding cover assembly 230 on the cargo box 5, the various steps illustrated can be done in the reverse order, as schematically illustrated in FIG. 38, beginning with (1) placing the bundled folding cover assembly 230 on the side rails 220 with the hooks 162 at the front of the front panel 236*c* aligned with the respective catches 164 on the respective side rails 220; (2) lowering the folding cover assembly 230 onto the side rails 220 until the latches 250 at the rear of the front panel 236*c* are engaged with the side rail lip 224 of the respective side rails 220 and the containment brackets 92. The bundled folding cover assembly 230 can be left secured in this configuration, or if it is desired to unfold the folding cover assembly 230 to cover the cargo box 5, the strap brackets 294*b* can be disengaged from the bracket slots 294*c*, and (3) the middle panel 236*b* can be rotated rearward onto the side rails 220, with the hooks 262 at the front of the middle panel 236*b* engaging the respective catches 264, and (4) the rear panel 236*a* can be rotated rearward onto the side rails 220, with the hooks 262 at the front of the rear panel 236*a* engaging the respective catches 264 and the latches 250 at the rear of the rear panel 236*a* are engaged with the side rail lip 224 of the respective side rails 220.

Figure 39A:
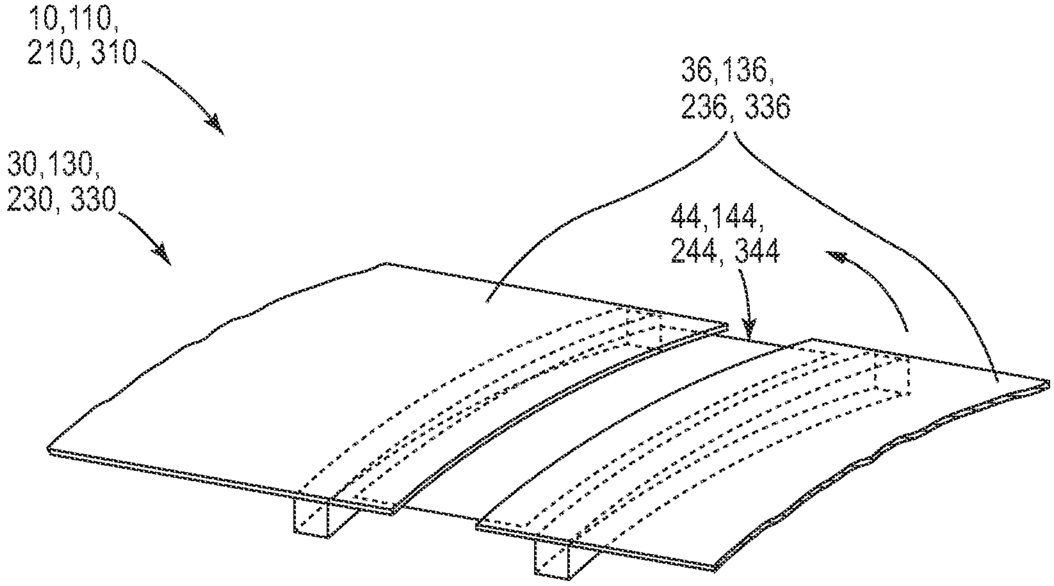
FIG. 39A is a schematic illustration of a portion of the folding tonneau cover apparatus of any of FIG. 1, 20, 30, or 40, illustrating a flexible hinge interconnecting two adjacent panels, showing bent or bowed support bows creating a bending or bowing of the panels attached thereto (see also FIGS. 16B-16E), with the bending or bowing exaggerated for illustration, with the panels unfolded.
Figure 39B:
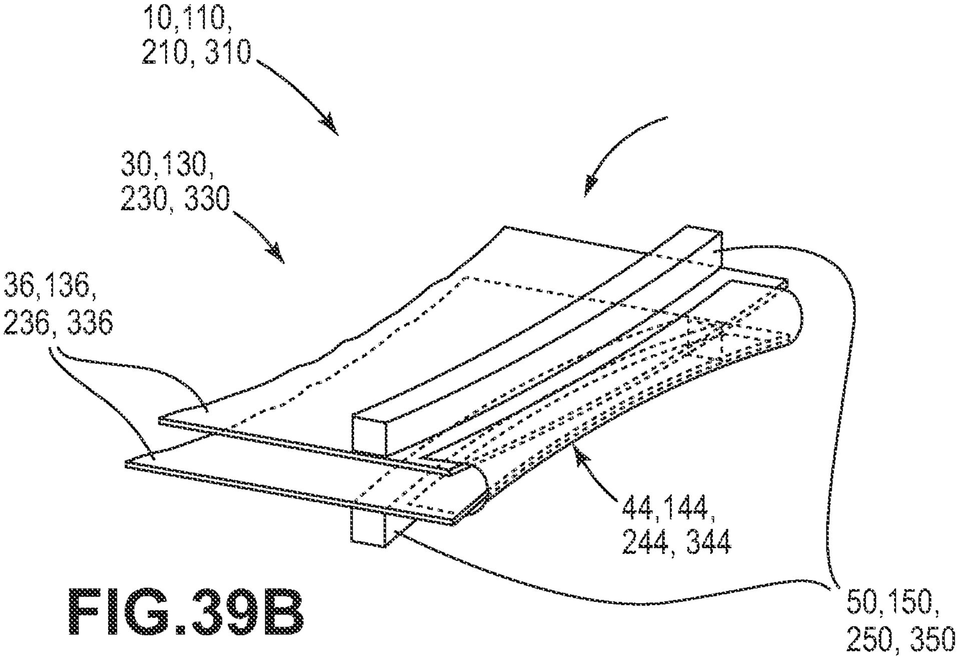
FIG. 39B is a schematic illustration similar to that of FIG. 39A, showing the panels folded up, and together with FIG. 39A illustrating how the flexible hinge can accommodate the folding up and unfolding of such bent or bowed panels.

FIGS. 39A-39D illustrate further advantages to the structure described herein of hinge 44, 144, 244, 344. The hinge 44, 144, 244, 344 as described is low profile, reducing the overall thickness, bulk, and weight of the folding cover assembly 30, 130, 230, 330. The flexible sheet material 80 can tolerate some deformation, so that if adjacent panels 36, 136, 236, 336 are not aligned perfectly, or are not perfectly flat, the hinge 44, 144, 244, 344 can still function to allow the folding cover assembly 30, 120, 230, 330 to fold without binding. The configuration disclosed herein of hinge 44, 144, 244, 344 can accommodate panels 36, 136, 236, 336, some of which are preferably slightly bowed as described herein and illustrated in FIG. 16E. FIG. 39A is a schematic illustration of a portion of the folding tonneau cover apparatus 10, 110, 210, 310 showing a respective flexible hinge 44, 144, 244, 344 interconnecting two respective adjacent panels 36, 136, 236, 336, showing bent or bowed support bows creating a bending or bowing of the panels attached thereto (see also FIGS. 16B-16E), with the bending or bowing exaggerated for illustration, with the panels 36, 136, 236, 336 unfolded. FIG. 39B is a schematic illustration similar to that of FIG. 39A, showing the two respective adjacent panels 36, 136, 236, 336 folded up (in the direction indicated by the arrow. FIGS. 39A-39B illustrate how the flexible hinge 44, 144, 244, 344 can accommodate the folding up and unfolding of such bent or bowed panels 36, 136, 236, 336.

Figure 39C:
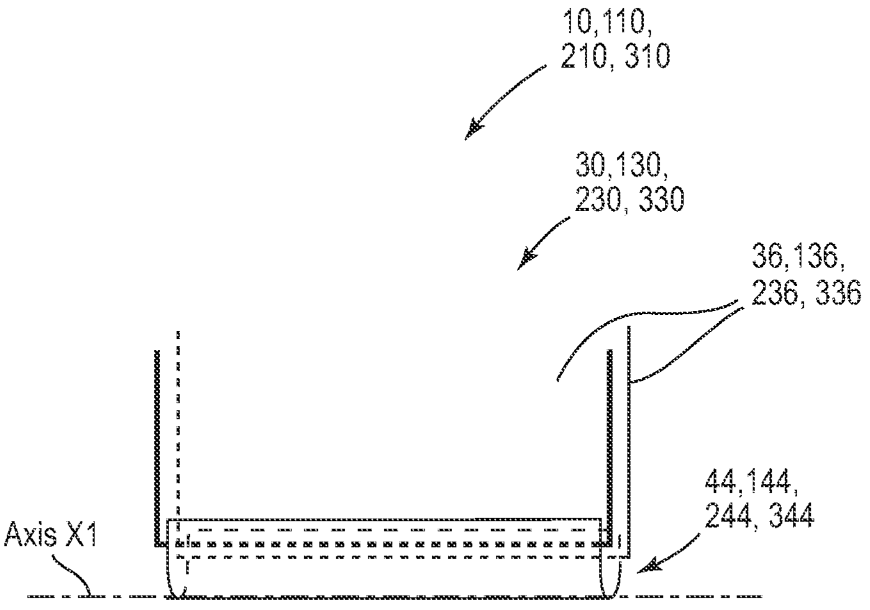
FIG. 39C is a schematic illustration of a portion of the folding tonneau cover apparatus of any of FIG. 1, 20, 30, or 40, illustrating a flexible hinge interconnecting two adjacent panels, showing a panel folded onto another panel and the two panels generally aligned with each other, with the flexible hinge flexing generally about a first axis X1.
Figure 39D:
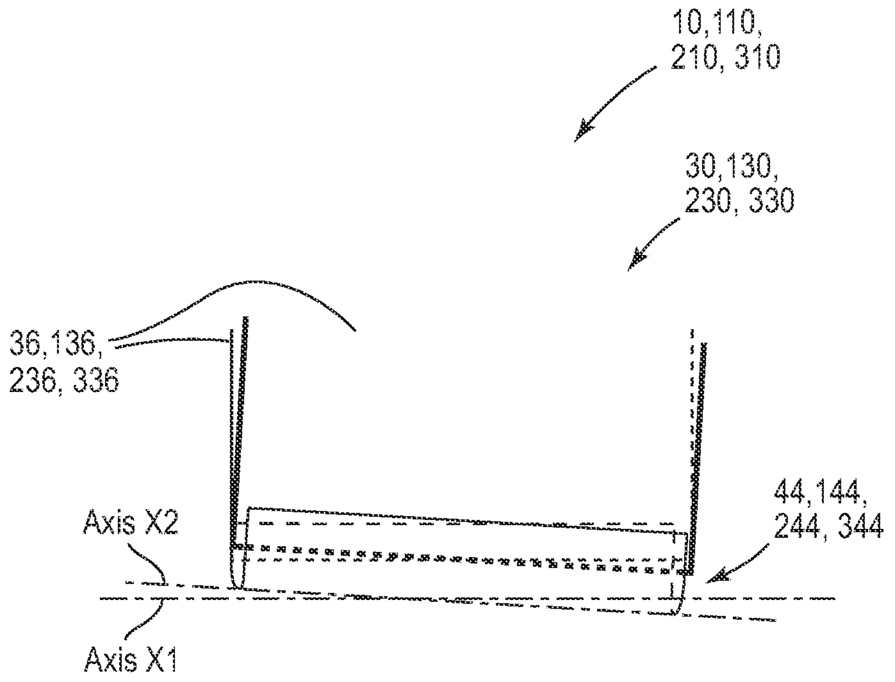
FIG. 39D is a schematic illustration similar to that of FIG. 39C, but showing the two panels somewhat misaligned or skewed with respect to each other and the flexible hinge flexing generally about a second axis X2, and together with FIG. 39A illustrating how the flexible hinge can accommodate the folding up and unfolding of panels which are aligned differently or misaligned.

FIG. 39C is a schematic illustration of a portion of the folding tonneau cover apparatus 10, 110, 210, 310 showing a respective flexible hinge 44, 144, 244, 344 interconnecting two respective adjacent panels 36, 136, 236, 336, showing the two respective adjacent panels 36, 136, 236, 336 folded up with the two respective panels generally aligned with each other, with the flexible hinge 44, 144, 244, 344 flexing generally about a first axis X1. FIG. 39D is a schematic illustration similar to that of FIG. 39C, but showing the two respective adjacent panels 36, 136, 236, 336 somewhat misaligned or skewed with respect to each other and the flexible hinge 44, 144, 244, 344 flexing generally about a second axis X2. FIGS. 39C-39D illustrate how the flexible hinge 44, 144, 244, 344 can accommodate the folding up and unfolding of such panels respective panels 36, 136, 236, 336 which are aligned differently or misaligned. The gap 41 between adjacent panels (See FIG. 2A) will affect the magnitude of panel misalignment or panel bowing which can be accommodated by the flexible hinge 44.

FIG. 40 is a rear perspective view of a further alternate folding tonneau cover apparatus 310 incorporating an external actuator mechanism 395 to release the latches 352 at the front of the front panel 336*c*, with the folding tonneau cover apparatus 310 attached to a pickup truck 2 which is shown in phantom.

Figure 41:
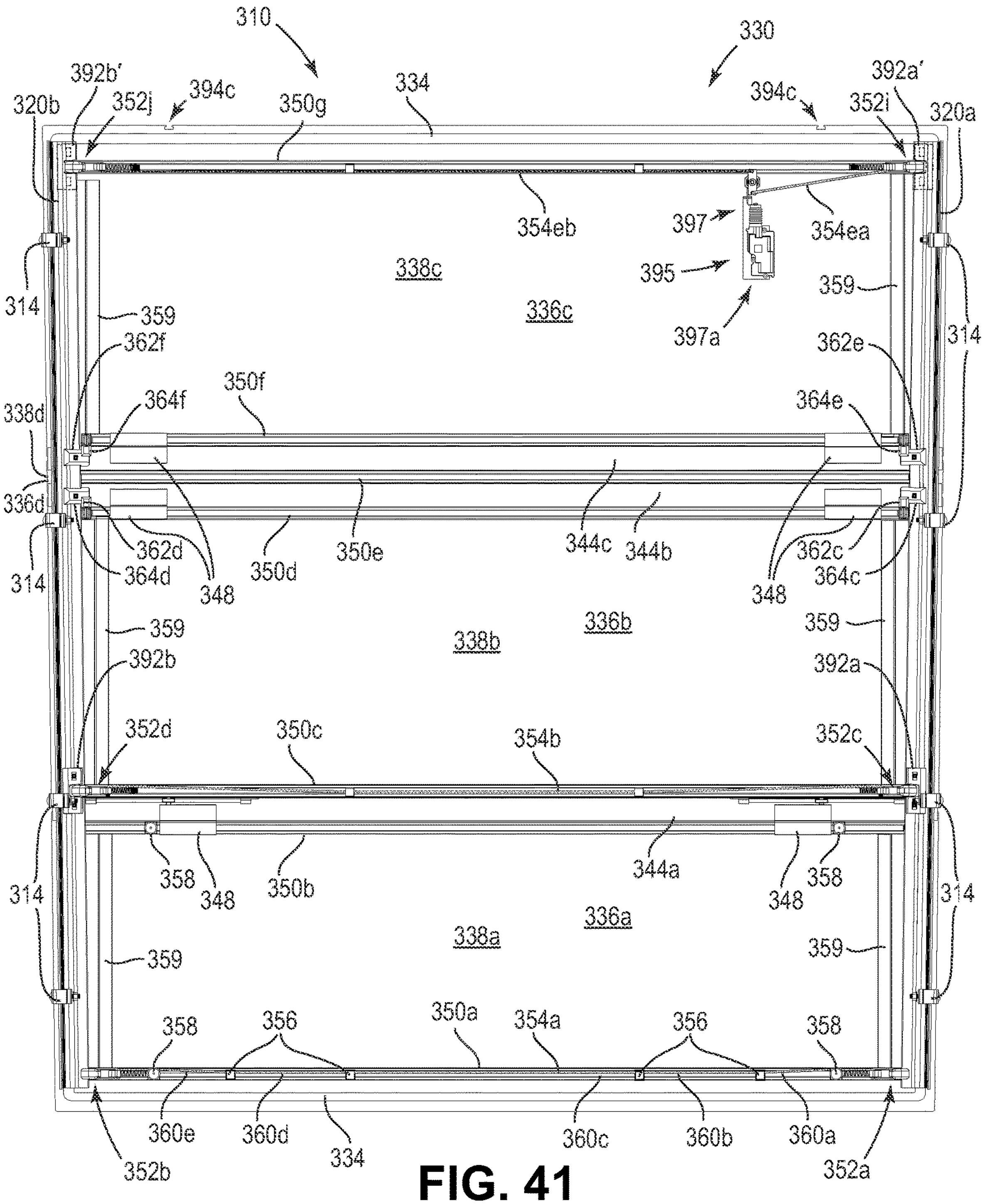
FIG. 41 is a bottom plan view of the folding tonneau cover apparatus of FIG. 40.

FIG. 41 is a bottom plan view of the folding tonneau cover apparatus 310 of FIG. 40. Visible in this view are hinges 344, which are situated between adjacent panels 336 and adjoin adjacent panels 336. Each panel 336 has a top surface 337 and a bottom surface or underside 338; panel 336*a* has a top surface 337*a* and a bottom surface or underside 338*a*, panel 336*b* has a top surface 337*b* and a bottom surface or underside 338*b*, panel 336*c* has a top surface 337*c* and a bottom surface or underside 338*c*, panel 336*d* has a top surface 337*d* and a bottom surface or underside 338*d*. For ease of discussion, hinges 344 are specifically referenced herein as 344*a*-344*c*, and non-specifically or collectively referenced as 344. Specifically, situated between the rear panel 336*a* and the middle panel 336*b* is hinge 344*a*. Similarly, situated between the middle panel 336*b* and the spacer panel 336*d* is hinge 344*b*, and situated between the spacer panel 336*d* and the front panel 336*c* is hinge 344*c*. Hinges 344 allow the folding cover assembly 330 to be folded up and will be more fully described below. Optional hinge guards 348 are shown; hinge guards 348 provide additional support to the hinges 344 when the folding cover assembly 330 is unfolded and in place covering the cargo box 5 of truck 2 (FIG. 40). Hinge guards 348 also provide protection against slicing through the hinges 344; further description of the hinge guards 348 is provided herein. Support bows 350 are attached to the panels 336 to provide additional support and rigidity to the panels 336, and also provide a structure for mounting of various other components as described in detail herein. For ease of discussion, support bows 350 are specifically referenced herein as 350*a*-350*g*, and non-specifically or collectively referenced as 350. The folding tonneau cover apparatus 310 is removably secured to the support frame assembly 318 by securing apparatus 351*a*. Preferably, securing apparatus 351*a* includes at least one locking member 351*b* which is engageable and disengageable from the support frame assembly 318. Preferably, the locking member 351*b* includes latches 352 which are located at the support bows as shown and secure the folding cover assembly 330 to the side rails 320*a* and 320*b*. Release cords 354 are attached to the latches 352. For ease of discussion, release cords 354 are specifically referenced herein as 354*a*, 354*b*, and 354*e*, and non-specifically or collectively referenced as 354. In this embodiment, the release cord 354*e* at the front of the front panel 336*c* preferably includes 2 separate segments or release cords referenced as 354*ea*, 354*eb*. The release cords 354 pass through cord guides 356 which are attached to support bows 350 as shown. The cord guides are non-specifically or collectively referenced herein as 356, but cord guides 356*a*-356*d* are specifically referenced herein to facilitate the detailed description herein. Standoffs 358 are shown, and are described in further detail herein. Sidebars or handles 359 are attached to panels 336*a*, 336*b*, and 336*c*, near each side of each panel 336 to further support the panels 336. Perimeter seal 334 is located on the bottom 332*b* of the folding cover assembly 330 and is arranged to seal against the sidewalls 6*a* and 6*b* and the front wall 6*c* and the tailgate 6*d* of the cargo box 5; some portions of perimeter seal 334 are behind side rails 320*a* and 320*b* and not visible in FIG. 41. The perimeter seal 334 is further described herein. Clamps 314 secure the side rails 320*a* and 320*b* to the sidewalls 6*a* and 6*b* of the cargo box 5 (see FIG. 43B).

The support bows or transverse frame members or channels 350 provide additional support for the panels 336. In this embodiment, the panels each have two support bows 350, one located near each of the front and rear ends of each panel 336, except for the spacer panel 336*d*, which has only a single support bow 350. In this embodiment, there are latches 352 mounted in pairs, one of each pair mounted near each end of each of the support bows 350*a*, 350*b* and 350*f* as shown. As further described below, the latches 352 engage the side rails 320*a* and 320*b* to secure the folding cover assembly 330, and can slide a short distance towards or away from the side rails 320*a* and 320*b* to engage or release the folding cover assembly 330 or selected panels 336 or portions thereof from the side rails 320*a* and 320*b* as further described below. In this embodiment, latch release cord or release cord or cord 354*a* is connected to the opposing pair of latches 352*a*, 2352*b* and release cord 354*b* is connected to opposing pair of latches 352*c*, 352*d*, and a pair of release cords 354*ea*, 354*eb*, each of which are connected to latches 352*i*, 352*j*, respectively, which together form an opposed pair of latches 352. The release cords 354 pass through cord guides 356 which are mounted to the support bows 350; the release cords 354 can slide within the cord guides 356. The release cords 354 generally extend from the latches 352 along the support bows 350. The release cords 354 can be actuated to release each pair of latches 352 by a driver or operator when desired, to open the folding cover assembly 330. Also seen on FIG. 41 are optional hinge guards 348; the optional hinge guards 348 are preferably attached to one of the support bows 350 adjacent to each of the respective hinges 344. In this example, the hinge guards 348 are shown attached to the support bows 350*b*, 350*d*, and 50*f*. The hinge guards 348 provide support for the hinges 344, such as to support weight or pressure applied to the hinges 344, the panels 336, or other portions of the folding cover assembly 330. The hinge guards 348 can also provide some protection against cutting through a hinge 344 to enter the cargo box 5.

In the folding tonneau cover apparatus 310, hooks 362 are attached to some of the support bows 350. Preferably, hooks 362 are located adjacent each end of each of the support bows 350*d* and 350*f*, and are aligned with respective catches 364 which are attached to the side rails 320*a* and 320*b* as illustrated. As further described below (see also FIGS. 33-34), when the folding cover assembly 330 is in place covering the cargo box 5, the hooks 362 are engaged with the catches 364 and help to secure the folding cover assembly 330 to the side rails 320*a* and 320*b*. When a panel 330 is rotated upward, the hooks 362 disengage from the catches 364, allowing the panel to be rotated and stacked onto other panels 330, as shown below. Preferably, the hooks slide into the support bows 350 and are secured in position; preferably, the hooks are secured by an interference fit with the support bows 350, but other securement mechanisms can be utilized, such as screws or other fasteners or adhesives known in the art, or a combination of securement mechanisms. In various embodiments disclosed herein, hooks and catches such as hooks 362 and catches 364 are located along selected support bows 150, 250, 350. In the folding tonneau cover apparatus 310, hooks 362*c* and 362*d* are located near the driver's side end and passenger side end, respectively, of support bow 350*b* (near the front end of the rear panel 336*a*), and hooks 362*e* and 362*f* on support bow 350*f* (near the rear end of the front panel 336*c*). Together, the various latches 352 and hooks 362 engage the catches 364 and the side rails 320*a* and 320*b* to secure the folding cover assembly 330 to the side rails 320*a* and 320*b* and thereby to the cargo box 5 in order to cover the cargo box 5 when desired, but can be disengaged as described herein to open the folding cover assembly 330 to enter the cargo box 5 when desired. In this embodiment, hooks 362*e* and 362*f* are oriented opposite the other hooks 162, 262, 362 described herein, and provide for engaging and disengaging the respective catches 364 when the front panel 336*c* is lifted up and rotated rearward to open the front panel 336*c* or rotated forward and down to close the front panel 336*c*. The containment brackets 392*a*, 392*b* are shown, and help to secure the folding cover assembly 330 in position on the side rails 320*a*, 320*b* especially when the folding cover assembly 330 is in a folded configuration such as those illustrated in FIG. 49A, 49B, or 50. Similarly, the containment brackets 392*a*', 392*b*' are shown, and help to secure the folding cover assembly 330 in position on the side rails 320*a*, 320*b* especially when the folding cover assembly 330 is in a folded configurations such as those illustrated in FIG. 44A, 45, or 46. Note that in FIG. 41 the containment brackets 392*a*', 392*b*' are shown in phantom indicating that in some alternate embodiments the containment brackets 392*a*', 392*b*' are not required. Preferably, the tonneau cover apparatus 310 includes containment brackets 392*a*, 392*b*, 392*a*' and 392*b*'.

Figure 42:
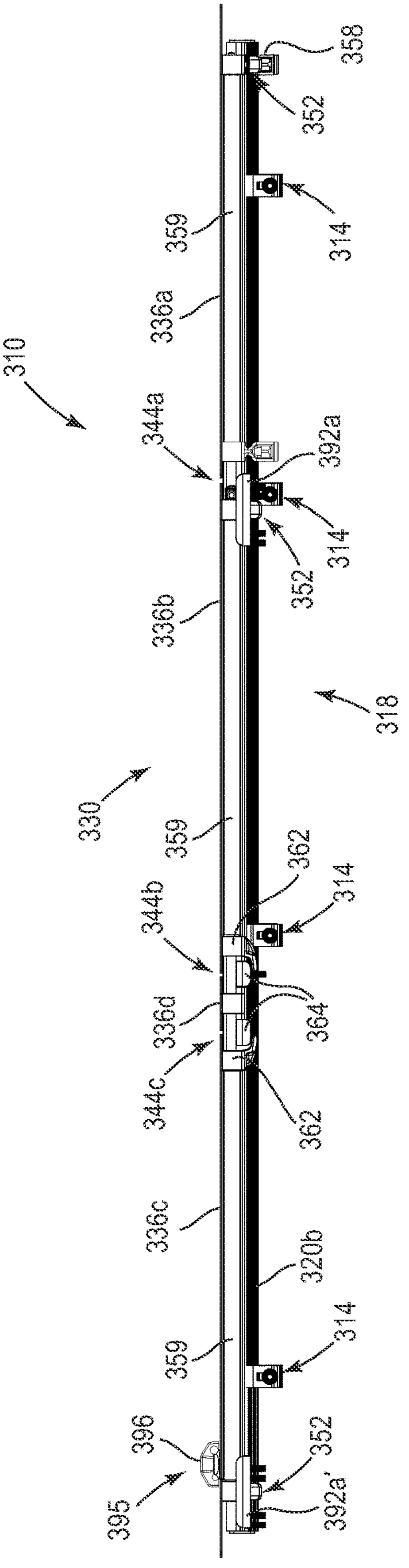
FIG. 42 is a side view of the folding tonneau cover apparatus of FIG. 40 as viewed from the driver's side, with the driver's-side side rail shown in phantom, but for clarity of illustration the perimeter seal is not shown.

FIG. 42 is a side view of the folding tonneau cover apparatus 310 of FIG. 40 as viewed from the driver's side, with the driver's-side side rail 320*a* removed to show the underlying structure. Clamps 314, latches 352, standoffs 358, hooks 362, catches 364, sidebars or handles 359, panels 336*a*, 336*b*, 336*c*, 336*d*, hinges 344*a*, 344*b*, 344*c*, and containment brackets 392*a*, 392*a*' are shown.

Similar to the folding tonneau cover apparatus 10 and the folding tonneau cover apparatus 10, when it is desired to release the latches 352 at the rear end of the rear panel 336*a*, the release cord 354*a* is pulled to retract the latches 352 against the force of the biasing member or spring 368. Preferably, the release cord 354*a* will be pulled as illustrated, by a driver (not shown) who has walked to the rear of the cargo box 5 and has opened the tailgate 6*d* and reaches in to pull the release cord 354*a*. When the release cord 354*a* is pulled, the engaging portion 353*b* of the latch 352 at the driver's-side end of the support bow 350*a* is retracted away from the lip 324 of the side rail 320*a*, releasing the latch 352 from the side rail 320*a*. The cord guides 356 adjacent to the latches 352 help to maintain alignment of the ends of the release cord 354*a* so that the latches 352 are retracted in alignment with the support bow 350*a*, to avoid excessive friction, wear and potential binding. The passenger-side end of the support bow 350*a* has a mirror-image configuration to that just described for the driver's-side end of the support bow 350*a*, and when the release cord 354*a* is pulled, the latches 352 at both ends of the support bow 350*a* are retracted, so that the rear end of the rear panel 336*a* can be lifted up from both side rails 320*a* and 320*b*. The hinge 344*a* bends to accommodate the lifting up and pivoting frontward of the rear panel 136*a*.

Figure 43B:
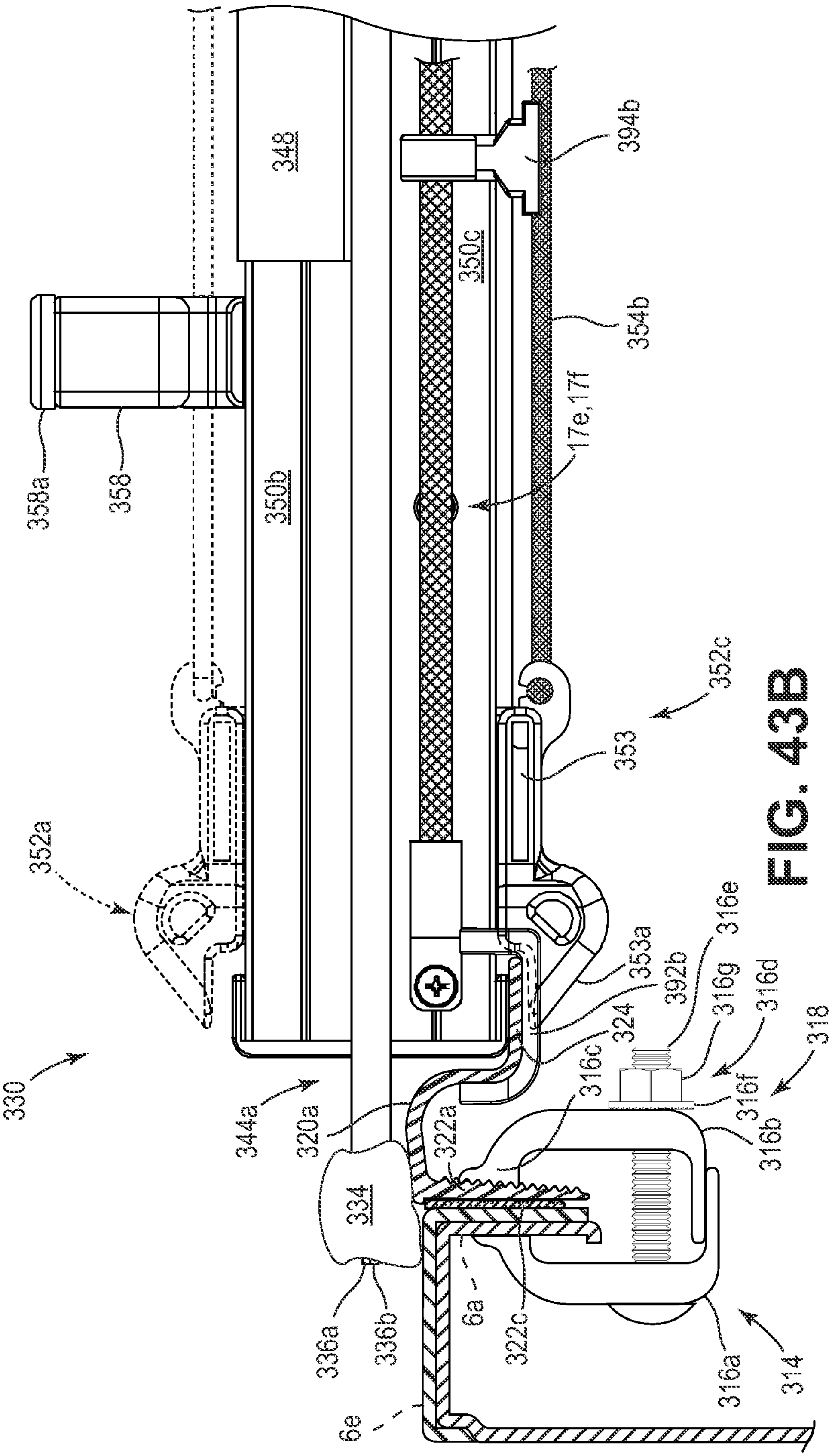
FIG. 43B is a partial section view as indicated on FIG. 43A, illustrating the engaging portion of one of the latches on the rear support bow of the middle panel engaged to the lip of the side rail and within the containment bracket.

FIG. 43A illustrates the rear panel 336*a* rotated onto the middle panel 336*b*, showing the release cord 354*b* visible and accessible to the operator. At this point, the latches 352 at each end of the support bow 350*c* are engaged with the side rail lip 324 of the side rails 320*a* and 320*b*. The driver's side portion of the support bow 350*c* is illustrated in FIG. 43B, which shows the latch 352*c* engaged with the side rail lip 324 of the side rail 320*a*. The side rail 320*a* is attached to the sidewall 6*a*. The engaging portion 353*b* of latch slide 353 of latch 352*c* is engaged with the lip 324 of the side rail 320*a* and the containment bracket 392*a*, so as to secure the respective panel 336*b* to the side rail 320*a*. The driver's side portion of the support bow 350*c* is shown in this figure; the other end of the support bow 350*c* (toward the passenger side) has a mirror-image configuration, with a latch 352*d* engaging side rail 320*b*, and side rail 320*b* being attached to sidewall 6*b* in a similar manner.

Figure 44A:
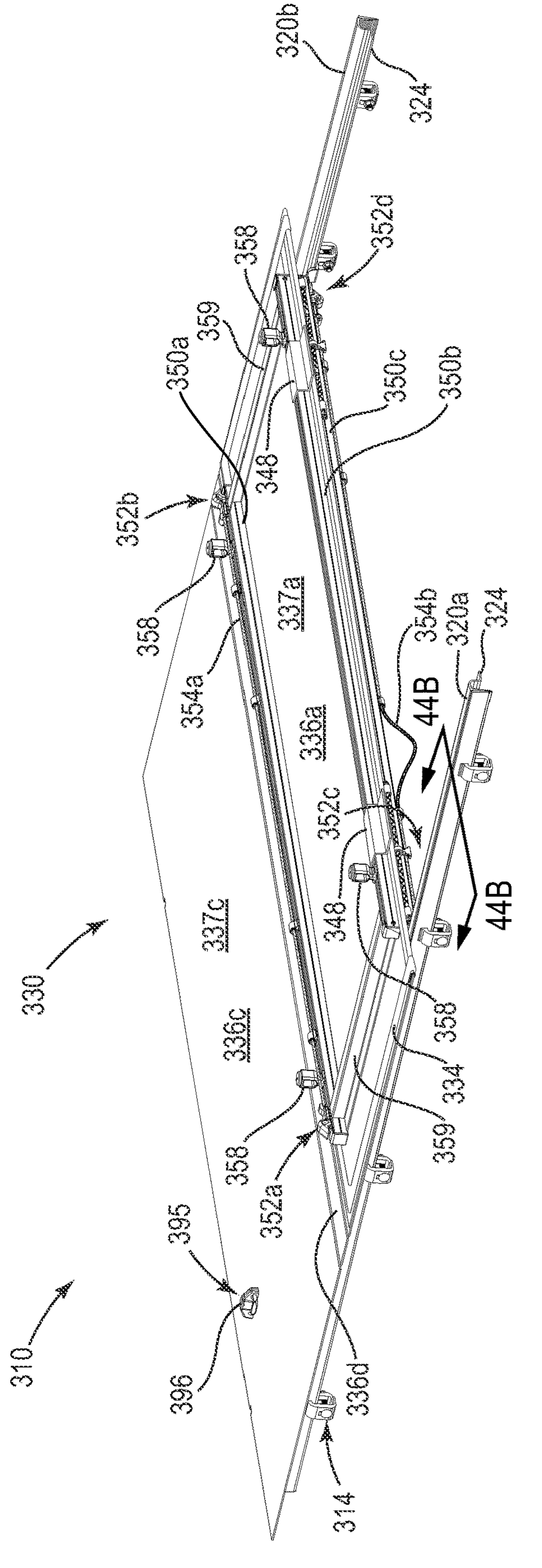
FIG. 44A is a rear perspective view of the folding tonneau cover apparatus of FIG. 40 similar to the view of FIG. 43A but with the release cord pulled to release the latches.
Figure 44B:
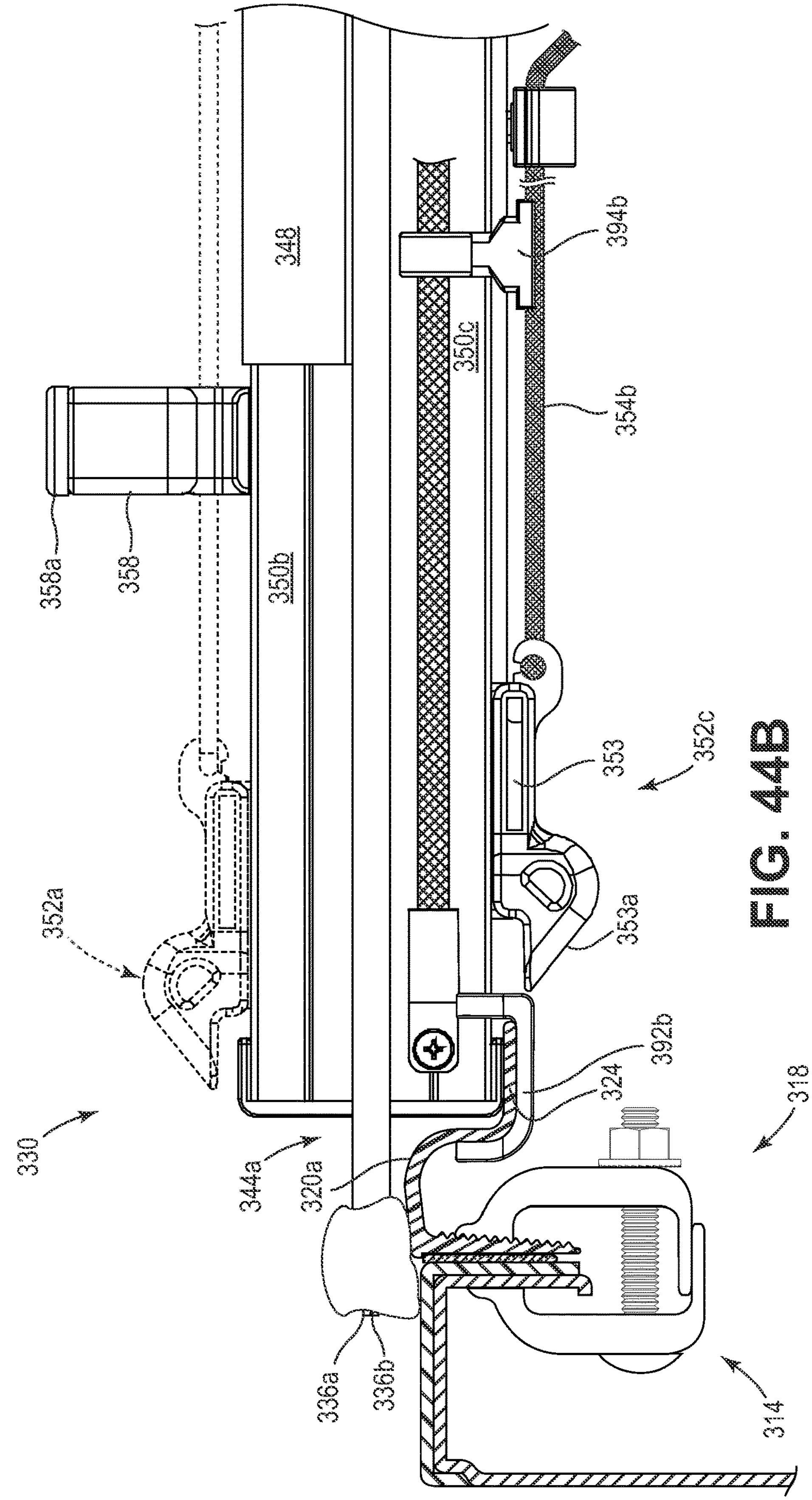
FIG. 44B is a partial section view as indicated on FIG. 44A similar to the view of FIG. 43B but with the engaging portion of the latch retracted from the lip of the side rail.

When it is desired to release the latches 352 at the rear end of the middle panel 336*b*, the release cord 354*b* is pulled as indicated in FIG. 44A by the driver or operator 8 (not shown) to retract the latches 352*c*, 352*d* against the force of the biasing member or spring 368. When the release cord 354*b* is pulled, the engaging portion 353*b* of the respective latches 352*c*, 352*d* are retracted away from the lips 324 of the side rail 320*a*, 320*b*. FIG. 44B illustrates the driver's side portion as indicated on FIG. 44A; when the release cord 354*b* is pulled, the engaging portion 353*b* of the latch 352*c* is retracted from the side rail 320*a* as shown. The driver's side portion of the support bow 350*c* is illustrated in FIG. 44B; the other end of the support bow 350*c* (toward the passenger side) has a mirror-image configuration, and when the release cord 354*b* is pulled, the latches 352*c*, 352*d* at both ends of the support bow 350*c* are retracted, so that the rear end of the middle panel 336*b* can be lifted up from both side rails 320*a* and 320*b*, together with the rear panel 336*a*, as illustrated in FIG. 45, bending hinge 344*b*.

Figure 45:
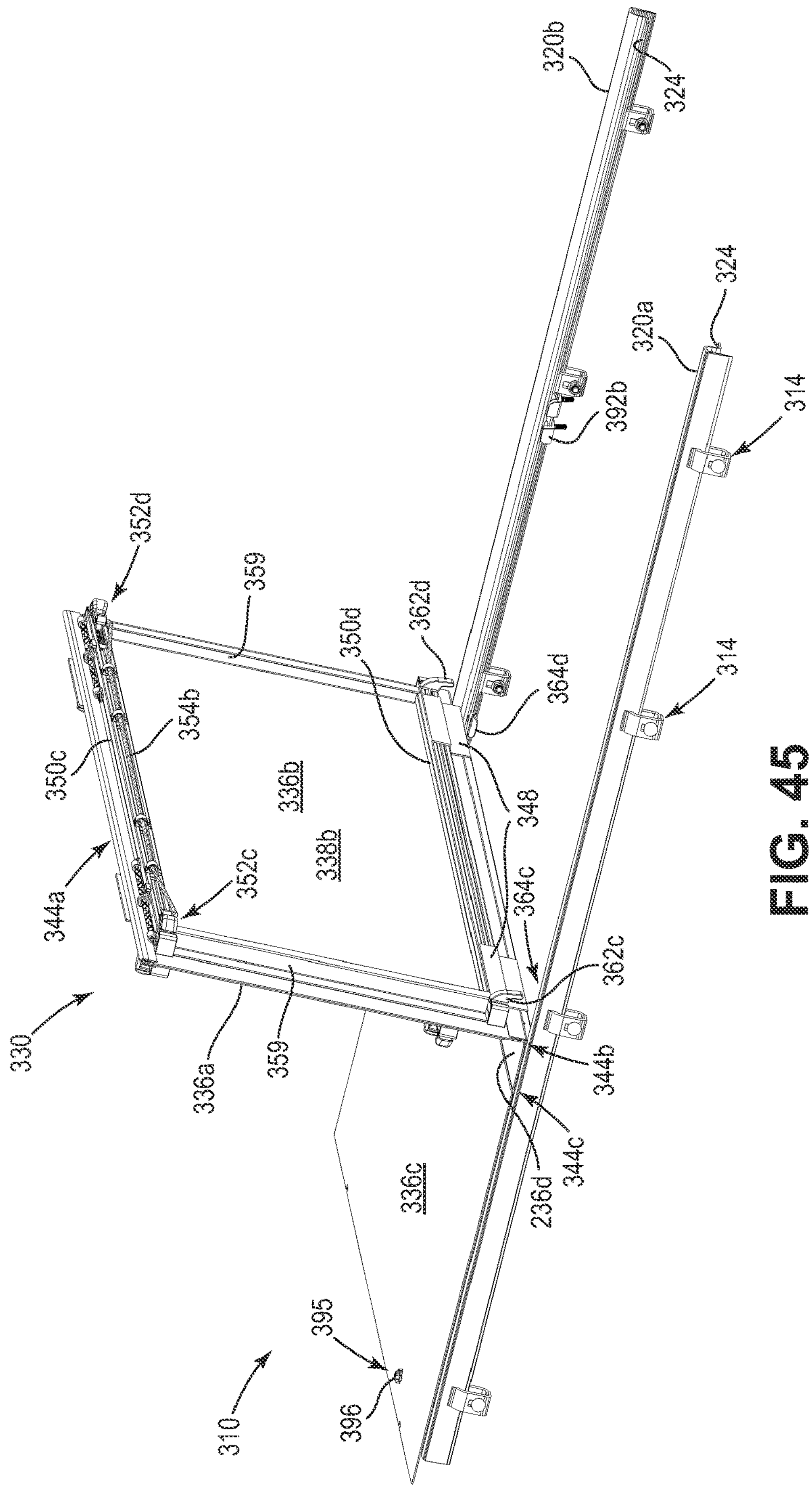
FIG. 45 is a rear perspective view of the folding tonneau cover apparatus of FIG. 40 wherein the rear panel together with the middle panel has been lifted up and rotated forward, whereby hooks near the front of the middle panel are disengaged from catches on the side rails, but for clarity of illustration the perimeter seal is not shown.

With the middle panel 336*b* (including the rear panel 336*a*) raised and rotated as shown in FIG. 45, hooks 362 disengage from catches 364; specifically, hook 362*c* disengages from catch 364*c* attached to side rail 320*a*, and hook 362*d* disengages from catch 364*d* attached to side rail 320*b*.

Figure 46:
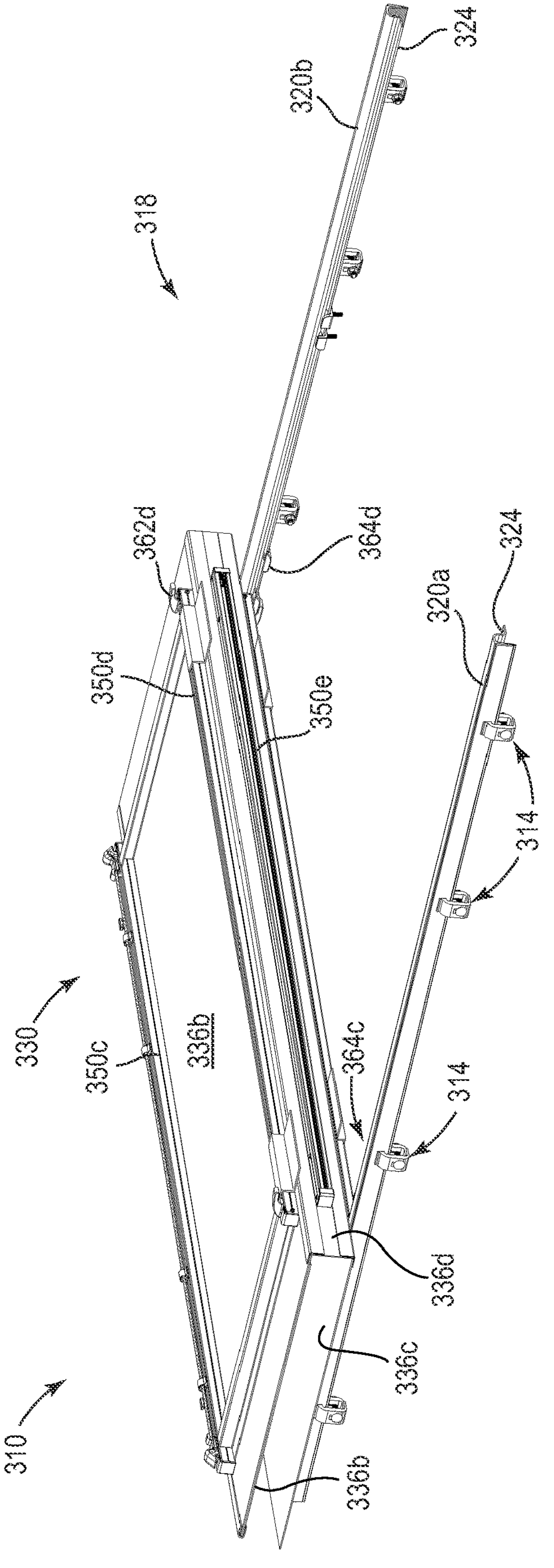
FIG. 46 is a rear perspective view of the folding tonneau cover apparatus of FIG. 40 wherein the rear panel together with the middle panel and the spacer panel has been rotated forward so that the middle panel and the rear panel are resting on the spacers on top of the rear panel, and with the spacer panel rotated upwards, but for clarity of illustration the perimeter seal is not shown.

As the middle panel 336*b*, together with the rear panel 336*a*, is rotated further frontward towards the front panel 336*c*, bending the hinge 344*b*, the spacer panel 336*d* lifts and rotates frontward as well, bending the hinge 344*c*. The folding and rotating of the folding cover assembly 330 are similar to that illustrated for the folding cover assembly 30 as shown in FIGS. 8C-9A, as follows. With continued folding and rotating of the folding cover assembly 330, the standoffs 358 attached to the support bow 350*a* contact the top of the front panel 336*c*. With further rotating of the middle panel 336*b* (together with the front panel 336*a*) the hinge 344*c* bends and the spacer panel 336*d* lifts off the side rails 320*a* and 320*b*; with still further rotating of the middle panel 336*b* frontwards, together with the rear panel 336*a* and the spacer panel 336*d*, and pivoting and sliding of the standoffs 358, the middle panel 336*b*, the rear panel 336*a*, and the spacer panel 336*d* rotate progressively farther frontwards towards the front panel 336*c*, until the standoffs 358 attached to the support bow 350*b* also contact the front panel 336*c*, as illustrated in FIG. 46. The standoffs 358 help to maintain a spaced relationship between the rear panel 336*a* and the front panel 336*c*. During this folding of the folding cover assembly 330, the hinges 344*b* and 344*c* flex as the middle panel 336*b*, the rear panel 336*a*, and the spacer panel 336*d* rotate towards the front panel 336*c*. Depending on forces applied by the driver or other operator 8, the hinges 344*b* and 344*c* can flex to pass through various increasing or decreasing angles.

The folding cover assembly 330 can be folded up onto the front panel 336*c* as just described. However, the folding cover assembly 330 also accommodates folding up in a different manner, as follows. FIG. 47A is a rear perspective view of the folding tonneau cover apparatus 310, similar to the illustration of FIG. 43A, in which the rear panel has been lifted up and rotated completely forward onto the middle panel. In this configuration, however, the external actuator mechanism 395 includes a handle or quarter-turn handle or release handle 396 which has been rotated as indicated by the arrow in FIG. 47A. Rotation of the release handle 396 as shown actuates a release mechanism 397 (FIGS. 47B-48B, which pulls release cords 354*ea*, 354*eb* to retract the latch slide 353 of the respective latches 352*i*, 352*j*, respectively to disengage the respective engaging portion 353*b* from the lip 324 of the respective side rail 320*a*, 320*b*.

FIGS. 47B and 47C are a perspective views from above of a portion of the folding tonneau cover apparatus 310, showing a portion of an external actuator mechanism 395 which includes the release handle 396 and the release mechanism 397 which are connected to the release cords 354*ea*, 354*eb* which are attached to the latch slide 353 of the latches 352*i*, 352*j* at the front of the front panel 336*c*. Similarly, FIGS. 48A and 48B are a perspective view from below of a similar portion of the folding tonneau cover apparatus 310. In FIGS. 47B-48B, the driver's side portion of the support bow 350*g* is shown, including latch 352*i*; the other end of the support bow 350*g* (toward the passenger side) has a mirror-image configuration, including the latch 352*j*. FIGS. 47B and 48A show the latched configuration in which the engaging portion 353*b* of the latch slide 353 of the latch 352*i* is engaged with the side rail 320*a*, with the front panel 336*c* shown in phantom to illustrate the underlying structure. In this latched configuration, the biasing member or spring 368 urges the latch slide 353 of each respective latch 352*i*, 352*j* outward so that the engaging portion 353*b* engages the lip 324 of the respective side rails 320*a*, 320*b*; the biasing member or spring 368 also creates tension in the release cords 354*ea*, 354*eb* which urges the release handle 396 to rotate (in this example, in a clockwise direction when viewed from above) towards a latched orientation.

FIGS. 47C and 48B show the released configuration, in which the release handle 396 is rotated (in this example, in a counterclockwise direction when viewed from above) by a driver or other operator 8. Rotation of the release handle 396 actuates the release mechanism 397 which pulls the release cords 354*ea*, 354*eb* to retract latch slide 353 and disengage the engaging portion 353*b* of the latches 352*i*, 352*j* from the lip 324 of the respective side rails 320*a*, 320*b*. The release mechanism 397 can be purely a mechanical mechanism, or can include an optional electric actuator 397*a*. The electric actuator 397*a* can be powered by a battery, or can receive power from the truck 5, for example. Preferably, when the release mechanism 397 includes an electric actuator 397*a*, the release mechanism 397 can be actuated by either the electric actuator 397*a* or by an operator manually rotating the release handle 396. In this way, the release mechanism 397 can be actuated even if there were an electrical failure such as a dead battery or faulty wiring, etc.

With the latches 352 at the front of the front panel 336*c* released so that the engaging portion 353*b* of the latches 352*i*, 352*j* are disengaged from the lip 324 of the respective side rails 320*a*, 320*b* and the front of the front panel 336*c* is free to be lifted up and rotated rearward, the front panel 336*c* can be rotated rearward onto the rear panel 336*a* and middle panel 336*b* (with the spacer panel 336*d* being rotated upward) as illustrated in FIG. 49A. In this configuration, the driver or operator can enter the front portion and the rear portion of the cargo box 5.

The external actuator mechanism 395 also allows the front panel 336*c* to be opened independently, even if the rear panel 336*a* has not been opened, as illustrated in FIG. 49B. In FIG. 49B, the latches 352 at the front of the front panel 336*c* are released so that the engaging portion 353*b* of the latches 352*i*, 352*j* are disengaged from the lip 324 of the respective side rails 320*a*, 320*b* and the front of the front panel 336*c* is free to be lifted up and rotated rearward, the front panel 336*c* can be rotated rearward onto the middle panel 336*b* (with the spacer panel 336*d* being rotated upward). In this configuration, the driver or operator can selectively enter the front portion of the cargo box 5, with the rear panel 336*a* remaining closed and secured, with the latches 352 at the rear of the rear panel 336*a* being engaged with the lips 324 of the respective side rails 320*a*, 320*b*.

When desired, the folding cover assembly 330 can be secured on the cargo box 5 in a configuration similar to that shown in FIG. 49A, with the front panel 336*c* stacked on the rear panel 336*a* and middle panel 336*b* and the spacer panel 336*d* rotated upward, as follows. The driver or operator 8 pulls the storage straps 394*a* up and engages the strap brackets 394*b* in the bracket slots 394*c* in the front panel as illustrated in FIG. 50. The folding cover assembly 330 may be left in this folded and bundled configuration if desired. Alternatively, if it is desired to remove the folding cover assembly 330 to leave the cargo box 5 completely uncovered, the folding cover assembly 330 may be removed from the side rails 320*a* and 320*b* as follows.

The release cord 354*b* at the rear end of the middle panel 336*b* is accessible when the folding cover assembly 330 is folded up and bundled together as shown in FIG. 50. If it is desired to remove the folding cover assembly 330 from the cargo box 5, the driver or operator 8 pulls the release cord 354*b* as indicated in FIG. 51A to release the respective latches 352.

FIG. 51B is partial section view as indicated on FIG. 51A showing the latch 352*c* near the driver's side end portion of the rear support bow 350*c* of the middle panel 336*b* with the engaging portion 353*b* of the latch 352*c* retracted from the lip 324 of the side rail 320*a* and disengaged from the containment bracket 392*a*. The driver's side portion of the support bow 350*c* is illustrated in FIG. 51B; the other end of the support bow 350*c* (toward the passenger side) has a mirror-image configuration, and when the release cord 354*b* is pulled, the latch slide 353 of the latches 352*c*, 352*d* at both ends of the support bow 350*c* are retracted, so that the rear end of the middle panel 336*b* can be lifted up from both side rails 320*a* and 320*b*, together with the front panel 336*c*, the rear panel 336*a* and the spacer panel 336*d*.

The rear end of the middle panel 336*b* is lifted up from both side rails 320*a* and 320*b*, together with the front panel 336*c*, the rear panel 336*a* and the spacer panel 336*d*, to rotate the folding cover assembly 330 forward, as shown in FIG. 52; in this position, the hooks 362*c*, 362*d* near the front of the middle panel 336*b* are disengaged from respective catches 364*c*, 364*d* and the folding cover assembly 330 is free to be removed from the side rails 320*a*, 320*b*, and can be lifted up and off the cargo box 5 in a similar manner as illustrated in FIG. 12 for the folding cover assembly 30, and can be moved away from the pickup truck 2, or stowed in the cargo box 5 or elsewhere as desired.

In some embodiments, the external actuator mechanism 395 includes an electric actuator 397*a* and a wireless receiver 397*b* as schematically illustrated in FIG. 53A.

Preferably, a remote transmitter 398 is actuated by the driver or operator when desired; when actuated, the remote transmitter 398 transmits a wireless signal to the wireless receiver 397*b*, which actuates the electric actuator 397*a* to operate the release mechanism 397 pull the release cords 354*ea*, 354*eb* to retract latch slide 353 and disengage the engaging portion 353*b* of the latches 352*i*, 352*j* from the lip 324 of the respective side rails 320*a*, 320*b*. Alternatively, a wired remote (not shown) can be used to operate the electric actuator 397*a*.

In some situations, it may be desired to remove the bundled folding cover assembly 330 from the front of the cargo box 5, as follows. From the configuration illustrated in FIG. 47, the driver or operator 8 pulls the storage straps 394*a* down and engages the strap brackets 394*b* in the bracket slots 394*c*, similar to the illustration in FIG. 28B for the folding tonneau cover apparatus 110. In this configuration, as illustrated in FIG. 53B, the external actuator mechanism 395 is then operated to release the latches 352*i*, 352*j* at the front of the front panel 336*c*. FIG. 53B shows a portion of the folding cover assembly 330 broken away so that the handle 396 can be more clearly seen.

Preferably, the driver or operator 8 actuates the remote transmitter 398 to release the latches 352*i*, 352*j* as described above. With the latches 352 released, the folding cover assembly 330 can be lifted up and rotated rearward as shown in FIG. 53C, disengaging the hooks 362*e*, 362*f* from the respective catches 364*e*, 364*f* on the side rails 320*a*, 320*b* and the folding cover assembly 330 is free to be lifted up and off the cargo box 5.

FIG. 54 is a rear perspective view of a further alternate embodiment of folding tonneau cover apparatus 410 having a folding cover assembly 430 incorporating a cab panel 336*e* onto which the rear, middle, spacer, and front panels 436*a*, 436*b*, 436*d*, and 436*c*, respectively, can fold, with the folding tonneau cover apparatus 410 attached to a pickup truck 2 which is shown in phantom.

FIG. 55 is a bottom plan view of the folding tonneau cover apparatus 410 of FIG. 54. Visible in this view are hinges 444, which are situated between adjacent panels 436 and adjoin adjacent panels 436. Each panel 436 has a top surface 437 and a bottom surface or underside 438; panel 436*a* has a top surface 437*a* and a bottom surface or underside 438*a*, panel 436*b* has a top surface 437*b* and a bottom surface or underside 438*b*, panel 436*c* has a top surface 437*c* and a bottom surface or underside 438*c*, panel 436*d* has a top surface 437*d* and a bottom surface or underside 438*d*, and panel 436*e* has a top surface 437*e* and a bottom surface or underside 438*e*. For ease of discussion, hinges 444 are specifically referenced herein as 444*a*-444*c*, and non-specifically or collectively referenced as 444. Specifically, situated between the rear panel 436*a* and the middle panel 436*b* is hinge 444*a*. Similarly, situated between the middle panel 436*b* and the spacer panel 436*d* is hinge 444*b*, situated between the spacer panel 436*d* and the front panel 436*c* is hinge 444*c*, and situated between the front panel 436*c* and the cab panel 436*e* is hinge 444*d*. Hinges 444 allow the folding cover assembly 430 to be folded up and will be more fully described below. Optional hinge guards 448 are shown; hinge guards 448 provide additional support to the hinges 444 when the folding cover assembly 430 is unfolded and in place covering the cargo box 5 of truck 2 (FIG. 54). Hinge guards 448 also provide protection against slicing through the hinges 444; further description of the hinge guards 448 is provided herein. Support bows 450 are attached to the panels 436 to provide additional support and rigidity to the panels 436, and also provide a structure for mounting of various other components as described in detail herein. For ease of discussion, support bows 450 are specifically referenced herein as 450*a*-450*i*, and non-specifically or collectively referenced as 450. The folding tonneau cover apparatus 410 is removably secured to the support frame assembly 418 by securing apparatus 451*a*. Preferably, securing apparatus 451*a* includes at least one locking member 451*b* which is engageable and disengageable from the support frame assembly 418.

Preferably, the locking member 451*b* includes latches 452 which are located at the support bows as shown and secure the folding cover assembly 430 to the side rails 420*a* and 420*b*. Release cords 454 are attached to the latches 452. For ease of discussion, release cords 454 are specifically referenced herein as 454*a*, 454*d*, and 454*f*, and non-specifically or collectively referenced as 454. The release cords 454 pass through cord guides 456 which are attached to support bows 450 as shown. The cord guides are non-specifically or collectively referenced herein as 456, but cord guides 456*c*-456*d* are specifically referenced herein to facilitate the detailed description herein. Standoffs 458 are shown, and are described in further detail herein. Sidebars or handles 459 are preferably attached to panels 436*a*, 436*b*, 436*c*, and 436*e* near each side of each respective panel 436 to further support the respective panels 436. Perimeter seal 434 is located on the bottom 432*b* of the folding cover assembly 330 and is arranged to seal against the sidewalls 6*a* and 6*b* and the front wall 6*c* and the tailgate 6*d* of the cargo box 5; some portions of perimeter seal 434 are behind side rails 420*a* and 420*b* and not visible in FIG. 55. The perimeter seal 434 is further described herein. Clamps 414 secure the side rails 420*a* and 420*b* to the sidewalls 6*a* and 6*b* of the cargo box 5 in a similar manner as other clamps 14, 114, 214, 314 described herein.

The support bows or transverse frame members or channels 4450 provide additional support for the panels 436. In this embodiment, the panels each have two support bows 450, one located near each of the front and rear ends of each panel 436, except for the spacer panel 436*d*, which has only a single support bow 450. In this embodiment, there are latches 452 mounted in pairs, one of each pair mounted near each end of each of the support bows 450*a*. 450*f* and 450*h* as shown, similar to the latches 52, 152, 252, 352 of other embodiments described herein. As further described herein, the latches 452 engage the side rails 420*a* and 420*b* to secure the folding cover assembly 430, and can slide a short distance towards or away from the side rails 420*a* and 420*b* to engage or release the folding cover assembly 430 or selected panels 436 or portions thereof from the side rails 420*a* and 420*b* as further described herein. In this embodiment, there are three latch release cords or release cords or cords 454, each of which are connected to opposing pairs of latches 452 which secure the panels 436 to the side rails 420*a* and 420*b*. The release cords 454 pass through cord guides 456 which are mounted to the support bows 450; the release cords 454 can slide within the cord guides 456. The release cords 454 generally extend from the latches 452 along the support bows 450. The release cords 454 can be actuated to release each pair of latches 452 by a driver or operator when desired, to open the folding cover assembly 430. Also seen on FIG. 55 are optional hinge guards 448; the optional hinge guards 448 are preferably attached to one of the support bows 450 adjacent to each of the respective hinges 444. In this example, the hinge guards 448 are shown attached to the support bows 450*b*, 450*d*, and 450*f*. Optionally, hinge guards 448 can be attached to the support bow 450*g* or 450*h* to provide support for the hinge 444*d* in a similar manner. The hinge guards 448 provide support for the hinges 444, such as to support weight or pressure applied to the hinges 444, the panels 436, or other portions of the folding cover assembly 430. The hinge guards 448 can also provide some protection against cutting through a hinge 444 to enter the cargo box 5.

In the folding tonneau cover apparatus 410, hooks 462 are attached to some of the support bows 450. Preferably, hooks 462 are located adjacent each end of each of the support bows 450*b*, 450*d*, and 450*i*, and are aligned with respective catches 464 which are attached to the side rails 420*a* and 420*b* as illustrated. Similar to other embodiments further described herein, when the folding cover assembly 430 is in place covering the cargo box 5, the hooks 462 are engaged with the catches 464 and help to secure the folding cover assembly 430 to the side rails 420*a* and 420*b*. When a panel 430 is rotated upward, the hooks 462 disengage from the catches 464, allowing the panel to be rotated and stacked onto other panels 430, as shown herein. Preferably, the hooks 462 slide into the support bows 450 and are secured in position; preferably, the hooks 462 are secured by an interference fit with the support bows 450, but other securement mechanisms can be utilized, such as screws or other fasteners or adhesives known in the art, or a combination of securement mechanisms. In various embodiments disclosed herein, hooks and catches such as hooks 462 and catches 464 are located along selected support bows 150, 250, 350, 450. In the folding tonneau cover apparatus 410, hooks 462*a* and 462*b* are located near the driver's side end and passenger side end, respectively, of support bow 450*b* (near the front end of the rear panel 436*a*), hooks 462*c*, 462*d* on support bow 450*d* (near the front end of the middle panel 436*b*); hooks 462*g* and 462*h* are located near the driver's side end and passenger side end, respectively, of support bow 450*i* (near the front of the cab panel 436*e*). Together, the various latches 452 and hooks 462 engage the catches 464 and the side rails 420*a* and 420*b* to secure the folding cover assembly 430 to the side rails 420*a* and 420*b* and thereby to the cargo box 5 in order to cover the cargo box 5 when desired, but can be disengaged as described herein to open the folding cover assembly 430 to enter the cargo box 5 when desired. The containment brackets 492*a*, 492*b* are shown, which help to secure the folding cover assembly 430 in position on the side rails 420*a*. Similarly, the containment brackets 492*a*', 492*b*' are shown, which help to secure the folding cover assembly 430 in position on the side rails 420*a*, 420*b* especially when the folding cover assembly 430 is in a folded configurations such as those illustrated in FIGS. 59, 60A-60E. Note that in some embodiments, the containment brackets 492*a*, 492*b* can be omitted, as long as the containment brackets 492*a*', 492*b*' are present. Preferably, the tonneau cover apparatus 410 includes containment brackets 492*a*, 492*b*, 492*a*' and 492*b*'.

FIG. 56 is a partial section view of the rear portion of the folding tonneau cover apparatus 410 of FIG. 54 as indicated on FIG. 55 and illustrating the edge guard 434*i* at the rear portion of the rear panel 436*a*. Preferably, the folding cover assembly 430 includes a perimeter seal 434, such as the perimeter seal 434*a* (or other perimeter seals shown in FIGS. 15A-15E, 15G, for example) around substantially the entire perimeter, attached to the bottom surface 438 of each respective panel as described with regard to other embodiments herein. Preferably, the folding cover assembly 430 also includes the edge guard 434*i* (such as the edge guard 34*i* shown in FIG. 15F) at the rear portion of the rear panel 436*a*. This edge guard will minimize potential contusions or abrasions that may arise to an operator 8, if the operator accidentally allows one or more of his or her fingers to rest of the top of the tailgate when securing the rear panel to the respective side rails.

FIG. 57 is a schematic illustration showing a preferred embodiment of general steps and configurations of the folding cover assembly of FIG. 54 as it is folded up or unfolded. In this embodiment, starting from the unfolded or closed configuration of the folding cover assembly 30 (configuration 1), the hinge 444*a* flexes to allow the rear panel 436*a* to fold up, passing through 90 degrees (configuration 2) towards the middle panel 436*b*, and fold over onto the middle panel 436*b* (configuration 3). The hinge 444*b* flexes to allow the middle panel 436*b* (together with the rear panel 436*a* which is folded onto the middle panel 436*b*) to fold up, passing through 90 degrees (configuration 4) towards the spacer panel 436*d*, passing through a point at which standoffs 458 contact the front panel (configuration 5). The hinge 444*b* flexes back towards 90 degrees as hinge 444*c* flexes to allow the spacer panel 436*d* to fold up, and continue to fold over (together with the rear panel 436*a* which is folded onto the middle panel 436*b*, and the middle panel 436*b*) towards the front panel 436*c* (configuration 6), until the rear panel 436*a*, middle panel 436*b*, and spacer panel 436*d* are folded onto the front panel 436*c* (configuration 7). The hinge 444*d* flexes to allow the rear panel 436*a*, middle panel 436*b*, spacer panel 436*d*, and front panel 436*c* to fold up onto the cab panel 444*d* (configuration 8). The hinge 444*d* flexes further to allow the rear panel 436*a*, middle panel 436*b*, spacer panel 436*d*, and front panel 436*c*, folded up onto the cab panel 444*d*, to be secured near or adjacent or touching the cab (configuration 9) with various securing members 465 as are described below. Note that FIG. 57 is a schematic overview of the general folding of the folding cover assembly 430; the various configurations are further illustrated and described elsewhere herein in greater detail in relation to the folding cover assembly 430 or other folding cover assemblies 30, 130, 230, 220 described herein.

FIG. 58 is a side perspective view from the driver's side of the folding tonneau cover apparatus 410 of FIG. 54, showing a configuration in which the rear panel 436*a*, the middle panel 436*b*, and the spacer panel 436*d* are folded onto the front panel 436*c* and secured with storage straps 494*a*. The various mechanisms and methods in releasing latches 450, disengaging hooks 462 from catches 464, bending the hinges 444, rotating and folding up of panels 436 of the folding cover assembly 430 to the configuration of FIG. 58 are generally similar to those previously described herein in relation to folding cover assemblies 30, 130, 230, and 330, and particularly similar to that of the folding cover assembly 230 described herein. In this embodiment, the storage straps 494*a* can attach to the panel brackets 466 which are attached to the top surface 437*e* of the cab panel 436*e*. Panel brackets 466 also provide support to the panels 436*a*, 436*b*, 436*c*, 436*d* as seen in FIGS. 60A-60E. This configuration allows entry into a substantial portion of the cargo box 5. If entry into a greater portion of the cargo box 5 is desired, then the folding cover assembly 430 can be folded up onto the cab panel 436*e* as shown in FIG. 59; as with other latches 52 described herein, the driver or operator 8 can pull release cord 454*f* to release the latches 452*k* and 452*m* at the ends of the support bow 450*h* at the rear of the cab panel 436*e*, disengaging them from the side rails 420*a*, 420*b* and the containment brackets 492*a*', 492*b*' in a manner similar to that already described herein with regard to other latches 52, 152, 252, 352. In the configuration illustrated in FIG. 59, the rear panel 436*a*, the middle panel 436*b*, the front panel 436*c* and the spacer panel or hinge panel 436*d* are folded together and are turned upward on top of the cab panel 436*e*, with the rear panel 436*a*, the middle panel 436*b*, and the front panel 436*c*, oriented in a generally vertically orientation while resting upon the can panel 436*e*.

The folding cover assembly 430 can be secured in the generally vertical position with the with the rear panel 436*a*, the middle panel 436*b*, and the front panel 436*c*, oriented generally vertically, by securing member(s) 465 (such as cab strap 465*a*, side strap 465*b*, cab panel strap 465*c*, securing magnet 465*d*, or securing bracket 465*e*) are used to secure the folding cover assembly 430 in this configuration, as illustrated in FIGS. 60A-60E. In some of the configurations illustrated in FIGS. 60A-60E, cab securement member(s) 467 (such as cab bracket 467*a* or cab magnet 467*b*) facilitate securement of the folding cover assembly 430 with the securing member(s) 465 as shown. FIG. 60A illustrates cab straps 465*a* which are secured to cab brackets 467*a*.

FIG. 60B illustrates a side strap 465*b* which secures the folding cover assembly 430 in position as shown. A side strap 465*b* can be provided on both the driver's side and the passenger side, or on only one side. The side strap 465*b* can form a single long loop which passes through the cab 4 (by temporarily opening the doors or the windows of the cab). Alternatively, the side strap 465*b* can attach using a buckle to a separate strap which is secured inside the cab 4.

FIG. 60C illustrates a cab panel strap 465*c* which secures the folding cover assembly 430 in position as shown. A cab panel strap 465*c* can be provided on both the driver's side and the passenger side, or on only one side. The cab panel strap 465*c* can attach to the cab panel 436*e*; alternatively, the cab panel strap 465*c* can attach using a buckle to a separate strap which is secured to the cab panel 436*e*.

FIG. 60D illustrates a securing magnet 465*d* which secures the folding cover assembly 430 in position as shown. A single securing magnet 465*d* can be provided or a plurality of securing magnets 465*d* can be provided. The securing magnet 465*d* can magnetically attach to a cab magnet 467*b* for securement to the cab 4. Alternatively, the securing magnet 465*d* can magnetically attach to a portion of the cab 4.

FIG. 60E illustrates a securing bracket 465*e* which secures the folding cover assembly 430 in position as shown. A securing bracket 465*e* can be provided on both the driver's side and the passenger side, or on only one side. The securing bracket 465*e* can retain the middle panel 436*b* and the front panel 436*c* and the cab panel 436*e* in the illustrated configuration (with the rear panel 436*a* and spacer panel 436*d* also held since they are attached to the other panels 436 by the hinges 444). Alternatively, the securing bracket 436*e* can attach to the respective support bows 450 to secure the folding cover assembly in the illustrated configuration. In some embodiments, the securing bracket 436*e* attaches to the panel bracket 466.

FIG. 61A is a rear perspective view of the folding cover assembly 430 of FIG. 54 attached to the truck 2, showing the ornamental design of the folding cover assembly 430. The rear panel 436*a*, the middle panel 436*b*, the front panel 436*c*, the spacer panel 436*d* and the cab panel 436*e* are shown.

FIG. 61B is a top plan view of the folding cover assembly 430 of FIG. 61A further showing its ornamental design.

FIG. 61C is a left side ("driver's side") elevational view, which is a mirror image of the right side ("passenger side") elevational view, of the folding cover assembly 430 of FIG. 61A, further showing its ornamental design.

FIG. 61D is an enlarged view of a portion of the left side elevational view of the folding cover assembly 430 as indicated by the encircled portion of FIG. 61C, and is a mirror image of such an enlarged view thereof of a similar portion of the right side elevational view thereof.

FIG. 61E is a rear elevational view of the folding cover assembly 430 of FIG. 61A, further illustrating its ornamental design. The rear aspect of the rear panel 436*a* can be seen. Note that the truck 2, the cab 4, the cargo box 5, the cab securement members 467 (in this example, cab securement members 467*a*), and the panel brackets 466 are shown in phantom and are not a part of the ornamental design of the folding cover assembly 430. Note also that the front elevational view of the folding cover assembly 430 is obstructed by the cab 4 of the pickup truck 2 and is not visible.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position, the tonneau cover apparatus comprising:

a cover assembly including a plurality of rigid panels including a first panel, a second panel, and a third panel; wherein the first panel and the second panel are pivotally interconnected by a first hinge; and wherein the first panel includes a first panel edge, and the cover assembly further includes a securing recess proximate a top surface of the third panel, and wherein, when the cover assembly is engaged with the top of the perimeter of the cargo box, and the third panel is in a generally horizontal orientation, the first panel can pivot with respect to the second panel, and wherein when the first panel and the second panel are in a generally vertical orientation adjacent to and above a top surface of the third panel, the first panel edge can engage the securing recess to secure the first panel in the generally vertical orientation.

2. The tonneau cover apparatus of claim 1, wherein the first hinge is a flexible hinge.

3. The tonneau cover apparatus of claim 1, wherein the first hinge is a first flexible hinge and the first panel and the second panel are pivotally interconnected by the first flexible hinge that is secured to a first underside of the first panel and a second underside of the second panel.

4. The tonneau cover apparatus of claim 1, wherein, when the cover assembly is engaged with the top of the perimeter of the cargo box, and the third panel is in a generally horizontal orientation, the first panel can pivot with respect to the second panel so that the first panel can rest upon the third panel in an upright orientation in which the first panel is secured.

5. The tonneau cover apparatus of claim 1, wherein the first panel can pivot with respect to the second panel so that the first panel can rest upon the third panel in an upright orientation when the first panel is secured in the upright orientation.

6. The tonneau cover apparatus of claim 1, wherein the first hinge is a flexible hinge and the flexible hinge is secured to a first underside of the first panel and a second underside of the second panel by an adhesive.

7. The tonneau cover apparatus of claim 1, wherein the cover assembly further includes a securing member that can secure the first panel and the second panel in a generally vertical orientation with respect to a top surface of the third panel when the cover assembly is secured to the top of the perimeter of the cargo box.

8. The tonneau cover apparatus of claim 7, wherein the securing member is selected from a group consisting of a panel bracket, a cab bracket, a cab strap, a cab magnet, a side strap, a cab panel strap, a securing magnet, a securing bracket, and combinations thereof.

9. The tonneau cover apparatus of claim 1, wherein each of the first, second and third panels has a thickness of from about 0.020 inches to about 0.200 inches.

10. A tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position, the tonneau cover apparatus comprising:

- a cover assembly including a plurality of rigid panels including a first panel, a second panel, and a third panel; wherein the first panel and the second panel are pivotally interconnected by a first hinge;
- wherein the first panel includes a first panel edge, and the cover assembly further includes a securing recess proximate a top surface of the third panel; wherein, when the cover assembly is engaged with the top of the perimeter of the cargo box, and a third top surface of the third panel is in a generally horizontal orientation with respect to the top of the perimeter of the cargo box, the first panel can pivot with respect to the second panel, and when the first panel and the second panel are in a generally vertical orientation adjacent to and above the top surface of the third panel, the first panel edge can engage the securing recess to secure the first panel in the generally vertical orientation so that the first panel can be secured so that a first top surface of the first panel is in a generally upright orientation with respect to the third top surface of the third panel.

11. The tonneau cover apparatus of claim 10, wherein the first hinge is a flexible hinge.

12. The tonneau cover apparatus of claim 10, wherein the first hinge is a flexible hinge and the first panel and the second panel are pivotally interconnected by a first flexible hinge that is secured to a first underside of the first panel and a second underside of the second panel.

13. The tonneau cover apparatus of claim 10, wherein, when the cover assembly is engaged with the top of the perimeter of the cargo box, and the third panel is in a generally horizontal orientation, the first panel can pivot with respect to the second panel so that the first panel can rest upon the third panel in an upright orientation in which the first panel is secured.

14. The tonneau cover apparatus of claim 10, wherein the first panel can pivot with respect to the second panel so that the first panel can rest upon the third panel in an upright orientation when the first panel is secured in the upright orientation.

15. The tonneau cover apparatus of claim 10, wherein the first hinge is a flexible hinge and the flexible hinge is secured to a first underside of the first panel and a second underside of the second panel by an adhesive.

16. The tonneau cover apparatus of claim 10, wherein the cover assembly further includes a securing member that can secure the first panel and the second panel in a generally vertical orientation with respect to a top surface of the third panel when the cover assembly is secured to the top of the perimeter of the cargo box.

17. The tonneau cover apparatus of claim 16, wherein the securing member is selected from a group consisting of a panel bracket, a cab bracket, a cab strap, a cab magnet, a side strap, a cab panel strap, a securing magnet, a securing bracket, and combinations thereof.

18. The tonneau cover apparatus of claim 10, wherein each of the first, second and third panels has a thickness of from about 0.020 inches to about 0.200 inches.

19. A method of using a hard folding tonneau cover, the method comprising:

- providing a tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position, the tonneau cover apparatus including a cover assembly including a plurality of rigid panels including a first panel, a second panel, and a third panel; wherein the first panel and the second panel are pivotally interconnected by a first hinge; wherein the cover assembly further includes a securing recess proximate a top surface of the third panel, and the first panel includes a first panel edge; and
- securing the cover assembly to the top of the perimeter of the cargo box; wherein, when the cover assembly is engaged with the top of the perimeter of the cargo box, and a third top surface of the third panel is in a generally horizontal orientation with respect to the top of the perimeter of the cargo box, the first panel can pivot with respect to the second panel, and when the first panel and the second panel are in a generally vertical orientation adjacent to and above a top surface of the third panel, the first panel edge can engage the securing recess to secure the first panel in the generally vertical orientation so that the first panel can be secured so that a first top surface of the first panel is in a generally upright orientation with respect to the third top surface of the third panel.

20. The method of claim 19, wherein the first hinge is a flexible hinge.

21. The method of claim 19, wherein the first hinge is a first flexible hinge and the first panel and the second panel are pivotally interconnected by the first flexible hinge that is secured to a first underside of the first panel and a second underside of the second panel.

22. The method of claim 19, wherein, when the cover assembly is engaged with the top of the perimeter of the cargo box, and the third panel is in a generally horizontal orientation, the first panel can pivot with respect to the second panel so that the first panel can rest upon the third panel in an upright orientation in which it is secured.

23. The method of claim 19, wherein the first panel can pivot with respect to the second panel so that the first panel can rest upon the third panel in an upright orientation when the first panel is secured in the upright orientation.

24. The tonneau cover apparatus of claim 19, wherein the first hinge is a flexible hinge and the flexible hinge is secured to a first underside of the first panel and a second underside of the second panel by an adhesive.

25. The tonneau cover apparatus of claim 19, wherein the cover assembly further includes a securing member that can secure the first panel and the second panel in a generally vertical orientation with respect to a top surface of the third panel when the cover assembly is secured to the top of the perimeter of the cargo box.

26. The tonneau cover apparatus of claim 25, wherein the securing member is selected from a group consisting of a panel bracket, a cab bracket, a cab strap, a cab magnet, a side strap, a cab panel strap, a securing magnet, a securing bracket, and combinations thereof.

27. The tonneau cover apparatus of claim 10, wherein each of the first, second and third panels has a thickness of from about 0.020 inches to about 0.200 inches.

* * * * *